(12) United States Patent
Philippe et al.

(10) Patent No.: US 12,478,082 B2
(45) Date of Patent: *Nov. 25, 2025

(54) URIDINE DIPHOSPHATE-DEPENDENT GLYCOSYLTRANSFERASE ENZYME

(71) Applicant: Manus Bio Inc., Waltham, MA (US)

(72) Inventors: Ryan Philippe, Waltham, MA (US); Ajikumar Parayil Kumaran, Waltham, MA (US); Jason Donald, Waltham, MA (US); Krishna Patel, Waltham, MA (US); Swati Gupta, Waltham, MA (US); Ryan Lim, Waltham, MA (US); Liwei Li, Waltham, MA (US)

(73) Assignee: Manus Bio Inc., Waltham, MA (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/467,362

(22) Filed: Sep. 14, 2023

(65) Prior Publication Data

US 2024/0215615 A1    Jul. 4, 2024

Related U.S. Application Data

(60) Continuation of application No. 16/862,214, filed on Apr. 29, 2020, now Pat. No. 11,819,042, which is a continuation of application No. 16/251,993, filed on Jan. 18, 2019, now Pat. No. 10,743,567, which is a division of application No. 15/524,015, filed as application No. PCT/US2015/059273 on Nov. 5, 2015, now Pat. No. 10,463,062.

(60) Provisional application No. 62/075,644, filed on Nov. 5, 2014.

(51) Int. Cl.
| | |
|---|---|
| A23L 2/60 | (2006.01) |
| A23L 27/30 | (2016.01) |
| C12N 9/02 | (2006.01) |
| C12N 9/10 | (2006.01) |
| C12P 19/56 | (2006.01) |

(52) U.S. Cl.
CPC .............. A23L 2/60 (2013.01); A23L 27/36 (2016.08); C12N 9/0073 (2013.01); C12N 9/1048 (2013.01); C12N 9/1051 (2013.01); C12P 19/56 (2013.01); C12Y 114/13079 (2013.01); C12Y 204/01017 (2013.01); *A23V 2002/00* (2013.01)

(58) Field of Classification Search
CPC ...................................................... C12P 19/56
See application file for complete search history.

(56) References Cited

U.S. PATENT DOCUMENTS

| | | |
|---|---|---|
| 8,703,225 B2 | 4/2014 | Morita et al. |
| 9,243,273 B2 | 1/2016 | Markosyan et al. |
| 9,562,251 B2 | 2/2017 | Kishore et al. |
| 9,848,632 B2 | 12/2017 | Morita et al. |
| 9,957,540 B2 | 5/2018 | Mikkelsen et al. |
| 10,463,062 B2 | 11/2019 | Philippe et al. |
| 2008/0064063 A1 | 3/2008 | Brandle et al. |
| 2014/0357588 A1 | 12/2014 | Markosyan et al. |
| 2016/0186225 A1* | 6/2016 | Mikkelsen ............... C12N 9/90 |
| 2016/0198748 A1* | 7/2016 | Prakash ............... A24B 15/302 |
| | | 426/71 |
| 2017/0275666 A1* | 9/2017 | Prakash .................. C07H 1/00 |
| 2023/0279459 A1* | 9/2023 | Dalgaard Mikkelsen .................. |
| | | A23L 27/36 |

FOREIGN PATENT DOCUMENTS

| | | |
|---|---|---|
| JP | 3277275 | 12/1991 |
| WO | 2011153378 | 12/2011 |
| WO | 2012075030 | 7/2012 |
| WO | 2013022989 | 2/2013 |
| WO | 2014122227 | 8/2014 |

OTHER PUBLICATIONS

International Search Report and Written Opinion, International Application No. PCT/US2015/059273, dated Mar. 30, 2016, 10 pages.
Ohta, et al., "Characterization of Novel Steviol Glycosides from Leaves of Stevia rebaudiana Morita", J. Appl. Glycosci., 2010 57, pp. 199-209.
Brandle, et al., "Steviol glycoside biosynthesis", Phytochemistry, 2007, vol. 68, pp. 1855-1863.
Richman et al., Functional genomics uncovers three glucosyltransferases involved in the synthesis of the major sweet glucosides of Stevia rebaudiana, The Plant Journal, 2005 vol. 41, pp. 56-67.
Li et al., "Phylogenetic Analysis of the UDP-glycosyltransferase Multigene Family of *Arabidopsis thaliana*", The Journal of Biological Chemistry, 2001, vol. 276, No. 6, pp. 4338-4343.
Shibata et al., Glucosylation of Steviol and Steviol-Glucosides in Extracts from Stevia rebaudiana Bertoni, Plant Physiol., 1991, vol. 95, pp. 152-156.
Lim, et al., The Activity of Arabidopsis Glycosyltransferases toward Salicylic Acid, 4-Hydroxybenzoic Acid, and Other Benzoates, 2002, The Journal of Biological Chemistry, vol. 277, No. 1, pp. 586-592.

(Continued)

*Primary Examiner* — Suzanne M Noakes
(74) *Attorney, Agent, or Firm* — Morgan, Lewis & Bockius LLP

(57) ABSTRACT

The invention provides methods for making steviol glycosides, including RebM and glycosylation products that are minor products in *stevia* leaves, and provides enzymes, encoding polynucleotides, and host cells for use in these methods. The invention provides engineered enzymes and engineered host cells for producing steviol glycosylation products, such as RebM, at high purity and/or yield. The invention further provides methods of making products containing steviol glycosides, such as RebM, including food products, beverages, oral care products, sweeteners, and flavoring products.

15 Claims, 69 Drawing Sheets

Specification includes a Sequence Listing.

(56) References Cited

OTHER PUBLICATIONS

Ko, et al., "Glycosylation of Flavonoids with a Glycosyltransferase from Bacillus cereus," FEMS Microbiol Lett, 2006, vol. 258, pp. 263-268.

* cited by examiner

SEQUENCE LISTING

```
Sequence total quantity: 65
SEQ ID NO: 1                 moltype = AA   length = 481
FEATURE                      Location/Qualifiers
source                       1..481
                             mol_type = protein
                             organism = Stevia rebaudiana
SEQUENCE: 1
MDAMATTEKK PHVIFIPFPA QSHIKAMLKL AQLLHHKGLQ ITFVNTDFIH NQFLESSGPH     60
CLDGAPGFRF ETIPDGVSHS PEASIPIRES LLRSIETNFL DRFIDLVTKL PDPPTCIISD    120
GFLSVFTIDA AKKLGIPVMM YWTLAACGFM GFYHIHSLIE KGFAPLKDAS YLTNGYLDTV    180
IDWVPGMEGI RLKDFPLDWS TDLNDKVLMF TTEAPQRSHK VSHHIFHTFD ELEPSIIKTL    240
SLRYNHIYTI GPLQLLLDQI PEEKKQTGIT SLHGYSLVKE EPECFQWLQS KEPNSVVYVN    300
FGSTTVMSLE DMTEFGWGLA NSNHYFLWII RSNLVIGENA VLPPELEEHI KKRGFIASWC    360
SQEKVLKHPS VGGFLTHCGW GSTIESLSAG VPMICWPYSW DQLTNCRYIC KEWEVGLEMG    420
TKVKRDEVKR LVQELMGEGG HKMRNKAKDW KEKARIAIAP NGSSSLNIDK MVKEITVLAR    480
N                                                                    481

SEQ ID NO: 2                 moltype = AA   length = 460
FEATURE                      Location/Qualifiers
source                       1..460
                             mol_type = protein
                             organism = Stevia rebaudiana
SEQUENCE: 2
MAEQQKIKKS PHVLLIPFPL QGHINPFIQF GKRLISKGVK TTLVTTIHTL NSTLNHSNTT     60
TTSIEIQAIS DGCDEGGFMS AGESYLETPK QVGSKSLADL IKKLQSEGTT IDAIIYDSMT    120
EWVLDVAIEF GIDGGSFFTQ ACVVNSLYYH VHKGLISLPL GETVSVPGFP VLQRWETPLI    180
LQNHEQIQSP WSQMLFGQFA NIDQARWVFT NSFYKLEEEV IEWTRKIWNL KVIGPTLPSM    240
YLDKRLDDDK DNGFNLYKAN HHECMNWLDD KPKESVVYVA FGSLVKHGPE QVEEITRALI    300
DSDVNFLWVI KHKEEGKLPE NLSEVIKTGK GLIVAWCKQL DVLAHESVGC FVTHCGFNST    360
LEAISLGVPV VAMPQFSDQT TNAKLLDEIL GVGVRVKADE NGIVRRGNLA SCIKMIMEEE    420
RGVIIRKNAV KWKDLAKVAV HEGGSSDNDI VEFVSELIKA                          460

SEQ ID NO: 3                 moltype = AA   length = 458
FEATURE                      Location/Qualifiers
source                       1..458
                             mol_type = protein
                             organism = Stevia rebaudiana
SEQUENCE: 3
MENKTETTVR RRRRIILFPV PFQGHINPIL QLANVLYSKG FSITIFHTNF NKPKTSNYPH     60
FTFRFILDND PQDERISNLP THGPLAGMRI PIINEHGADE LRRELELLML ASEEDEEVSC    120
LITDALWYFA QSVADSLNLR RLVLMTSSLF NFHAHVSLPQ FDELGYLDPD DKTRLEEQAS    180
GFPMLKVKDI KSAYSNWQIL KEILGKMIKQ TKASSGVIWN SFKELEESEL ETVIREIPAP    240
SFLIPLPKHL TASSSSLLDH DRTVFQWLDQ QPPSSVLYVS FGSTSEVDEK DFLEIARGLV    300
DSKQSFLWVV RPGFVKGSTW VEPLPDGFLG ERGRIVKWVP QQEVLAHGAI GAFWTHSGWN    360
STLESVCEGV PMIFSDFGLD QPLNARYMSD VLKVGVYLEN GWERGEIANA IRRVMVDEEG    420
EYIRQNARVL KQKADVSLMK GGSSYESLES LVSYISSL                            458

SEQ ID NO: 4                 moltype = AA   length = 485
FEATURE                      Location/Qualifiers
source                       1..485
                             mol_type = protein
                             organism = Stevia rebaudiana
SEQUENCE: 4
MYNVTYHQNS KAMATSDSIV DDRKQLHVAT FPWLAFGHIL PFLQLSKLIA EKGHKVSFLS     60
TTRNIQRLSS HISPLINVVQ LTLPRVQELP EDAEATTDVH PEDIQYLKKA VDGLQPEVTR    120
FLEQHSPDWI IYDFTHYWLP SIAASLGISR AYFCVITPWT IAYLAPSSDA MINDSDGRTT    180
VEDLTTPPKW FPFPTKVCWR KHDLARMEPY EAPGISDGYR MGMVFKGSDC LLFKCYHEFG    240
TQWLPLLETL HQVPVVPVGL LPPEIPGDEK DETWVSIKKW LDGKQKGSVV YVALGSEALV    300
SQTEVVELAL GLELSGLPFV WAYRKPKGPA KSDSVELPDG FVERTRDRGL VWTSWAPQLR    360
ILSHESVCGF LTHCGSGSIV EGLMPGHPLI MLPIFCDQPL NARLLEDKQV GIEIPRNEED    420
GCLTKESVAR SLRSVVVENE GEIYKANARA LSKIYNDTKV EKEYVSQFVD YLEKNARAVA    480
IDHES                                                                485

SEQ ID NO: 5                 moltype = AA   length = 473
FEATURE                      Location/Qualifiers
source                       1..473
                             mol_type = protein
                             organism = Stevia rebaudiana
SEQUENCE: 5
MATSDSIVDD RKQLHVATFP WLAFGHILPY LQLSKLIAEK GHKVSFLSTT RNIQRLSSHI     60
SPLINVVQLT LPRVQELPED AEATTDVHPE DIPYLKKASD GLQPEVTRFL EQHSPDWIIY    120
DYTHYWLPSI AASLGISRAH FSVTTPWAIA YMGPSADAMI NGSDGRTTVE DLTTPPKWFP    180
FPTKVCWRKH DLARLVPYKA PGISDGYRMG LVLKGSDCLL SKCYHEFGTQ WLPLLETLHQ    240
VPVVPVGLLP PEVPGDEKDE TWVSIKKWLD GKQKGSVVYV ALGSEVLVSQ TEVVELALGL    300
ELSGLPFVWA YRKPKGPAKS DSVELPDGFV ERTRDRGLVW TSWAPQLRIL SHESVCGFLT    360
HCGSGSIVEG LMPGHPLIML PIFGDQPLNA RLLEDKQVGI EIPRNEEDGC LTKESVARSL    420
RSVVVEKEGE IYKANARELS KIYNDTKVEK EYVSQFVDYL EKNTRAVAID HES            473
```

```
SEQ ID NO: 6              moltype = AA   length = 473
FEATURE                   Location/Qualifiers
source                    1..473
                          mol_type = protein
                          organism = Stevia rebaudiana
SEQUENCE: 6
MATSDSIVDD RKQLHVATFP WLAFGHILPY LQLSKLIAEK GHKVSFLSTT RNIQRLSSHI    60
SPLINVVQLT LPRVQELPED AEATTDVHPE DIPYLKKASD GLQPEVTRFL EQHSPDWIIY   120
DYTHYWLPSI AASLGISRAH FSVTTPWAIA YMGPSADAMI NGSDGRTTVE DLTTPPKWFP   180
FPTKVCWRKH DLARLVPYKA PGISDGYRMG LVLKGSDCLL SKCYHEFGTQ WLPLLETLHQ   240
VPVVPVGLLP PEIPGDEKDE TWVSIKKWLD GKQKGSVVYV ALGSEVLVSQ TEVVELALGL   300
ELSGLPFVWA YRKPKGPAKS DSVELPDGFV ERTRDRGLVW TSWAPQLRIL SHESVCGFLT   360
HCGSGSIVEG LMFGHPLIML PIFGDQPLNA RLLEDKQVGI EIPRNEEDGC LTKESVARSL   420
RSVVVEKEGE IYKANARELS KIYNDTKVEK EYVSQFVDYL EKNARAVAID HES          473

SEQ ID NO: 7              moltype = AA   length = 462
FEATURE                   Location/Qualifiers
source                    1..462
                          mol_type = protein
                          organism = Oryza sativa
SEQUENCE: 7
MDSGYSSSYA AAAGMHVVIC PWLAFGHLLP CLDLAQRLAS RGHRVSFVST PRNISRLPPV    60
RPALAPLVAF VAPLPRVEG LPDGAESTND VPHDRPDMVE LHRRAFDGLA APFSEFLGTA    120
CADWVIVDVF HHWAAAAALE HKVPCAMMLL GSAHMIASIA DRRLERAETE SPAAAGQGRP   180
AAAPTFEVAR MKLIRTKGSS GMSLAERFSL TLSRSSLVVG RSCVEFEPET VPLLSTLRGK   240
PITFLGLMPP LHEGRREDGE DATVRWLDAQ PAKSVVYYAL GSEVPLGVEK VHELALGLEL   300
AGTRFLWALR KPTGVSDADL LPAGFEERTR GRGVVATRWV PQMSILAHAA VGAFLTHCGW   360
NSTIEGLMFG HPLIMLPIFG DQGPNARLIE AKNAGLQVAR NDGDGSFDRE GVAAAIRAVA   420
VEEESSKVFQ AKAKKLQEIV ADMACHERYI DGFIQQLRSY KD                      462

SEQ ID NO: 8              moltype = AA   length = 463
FEATURE                   Location/Qualifiers
source                    1..463
                          mol_type = protein
                          organism = synthetic construct
SEQUENCE: 8
MAECMNWLDD KPKESVVYVA FGSLVKHGPE QVEEITRALI DSDVNFLWVI KHKEEGKLPE    60
NLSEVIKTGK GLIVAWCKQL DVLAHESVGC FVTHCGFNST LEAISLGVPV VAMPQFSDQT   120
TNAKLLDEIL GVGVRVKADE NGIVRRGNLA SCIKMIMEEE RGVIIRKNAV KWKDLAKVAV   180
HEGGSSSDNDI VEFVSELIKA GSGEQQKIKK SPHVLLIPFP LQGHINPFIQ FGKRLISKGV   240
KTTLVTTIHT LNSTLNHSNT TTTSIEIQAI SDGCDEGGFM SAGESYLETF KQVGSKSLAD   300
LIKKLQSEGT TIDAIIYDSM TEWVLDVAIE FGIDGGSFFT QACVVNSLYY HVHKGLISLP   360
LGETVSVPGF PVLQRWETPL ILQNHEQIQS PWSQMLFGQF ANIDQARWVF TNSFYKLEEE   420
VIEWTRKIWN LKVIGPTLPS MYLDKRLDDD KDNGFNLYKA NHH                     463

SEQ ID NO: 9              moltype = AA   length = 463
FEATURE                   Location/Qualifiers
source                    1..463
                          mol_type = protein
                          organism = synthetic construct
SEQUENCE: 9
MAGSSGMSLA ERFSLTLSRS SLVVGRSCVE FEPETVPLLS TLRGKPITFL GLMPPLHEGR    60
REDGEDATVR WLDAQPAKSV VYVALGSEVP LGVEKVHELA LGLELAGTRF LWALRKPTGV   120
SDADLLPAGF EERTRGRGVV ATRWVPQMSI LAHAAVGAFL THCGWNSTIE GLMFGHPLIM   180
LPIFGDQGPN ARLIEAKNAG LQVARNDGDG SFDREGVAAA IRAVAVEEES SKVFQAKAKK   240
LQEIVADMAC HERYIDGFIQ QLRSYKDDSG YSSSYAAAAG MHVVICPWLA FGHLLPCLDL   300
AQRLASRGHR VSFVSTPRNI SRLPPVRPAL APLVAFVALP LPRVEGLPDG AESTNDVPHD   360
RPDMVELHRR AFDGLAAPFS EFLGTACADW VIVDVFHHWA AAAALEHKVP CAMMLLGSAH   420
MIASIADRRL ERAETESPAA AGQGRPAAAP TFEVARMKLI RTK                     463

SEQ ID NO: 10             moltype = AA   length = 459
FEATURE                   Location/Qualifiers
source                    1..459
                          mol_type = protein
                          organism = synthetic construct
SEQUENCE: 10
MANWQILKEI LGKMIKQTKA SSGVIWNSFK ELEESELETV IREIPAPSFL IPLPKHLTAS    60
SSSLLDHDRT VFQWLDQQPP SSVLYVSFGS TSEVDEKDPL EIARGLVDSK QSFLWVVRPG   120
FVKGSTWVEP LPDGFLGERG RIVKWVPQQE VLAHGAIGAF WTHSGWNSTL ESVCEGVPMI   180
FSDFGLDQPL NARYMSDVLK VGVYLENGWE RGEIANAIRR VMDEEGEYI RQNARVLKQK    240
ADVSLMKGGS SYESLESLVS YISSLENKTE TTVRRRRII LFPVPFQGHI NPILQLANVL    300
YSKGFSITIF HTNFNKPKTS NYPHFTFRFI LDNDPQDERI SNLPTHGPLA GMRIPIINEH   360
GADELRRELE LLMLASEEDE EVSCLITDAL WYFAQSVADS LNLRRVLMT SSLFNFHAHV    420
SLPQFDELGY LDPDDKTRLE EQASGFPMLK VKDIKSAYS                          459

SEQ ID NO: 11             moltype = AA   length = 392
FEATURE                   Location/Qualifiers
source                    1..392
                          mol_type = protein
```

```
                        organism = Taxus canadensis
SEQUENCE: 11
MYTAMAAGTQ  SLQLRTVASY  QECNSMRSCF  KLTPFKSFHG  VNFNVPSLGA  ANCEIMGHLK   60
LGSSLPYKQCS VSSKSTKTMA  QLVDLAETEK  AEGKDIEFDF  NEYMKSKAVA  VDAALDKAIP  120
LEYPEKIHES  MRYSLLAGGK  RVRPALCIAA  CELVGGSQDL  AMPTACAMEM  IHTMSLIHDD  180
LPCMDNDDFR  RGKPTNHKVF  GEDTAVLAGD  ALLSFAFEHI  AVATSKTVPS  DRTLRVISEL  240
GKTIGSQGLV  GGQVVDITSE  GDANVDLKTL  EWIHIHKTAV  LLECSVVSGG  ILGGATEDEI  300
ARIRRYARCV  GLLFQVVDDI  LDVTKSSEEL  GKTAGKDLLT  DKATYPKLMG  LEKAKEFAAE  360
LATRAKEELS  SFDQIKAAPL  LGLADYIAFR  QN                                 392

SEQ ID NO: 12           moltype = AA   length = 296
FEATURE                 Location/Qualifiers
source                  1..296
                        mol_type = protein
                        organism = Taxus canadensis
SEQUENCE: 12
MADFNEYMKS  KAVAVDAALD  KAIPLEYPEK  IHESMRYSLL  AGGKRVRPAL  CIAACELVGG   60
SQDLAMPTAC  AMEMIHTMSL  IHDDLPCMDN  DDFRRGKPTN  HKVFGEDTAV  LAGDALLSFA  120
FEHIAVATSK  TVPSDRTLRV  ICELGKTIGS  QGLVGGQVVD  ITSEGDANVD  LKTLEWIHIH  180
KTAVLLECSV  VSGGILGDAT  EDEIARIRRY  ARCVGLLFQV  VDDILDVTKS  SEELGKTAGK  240
DLLTDKATYP  KLMGLEKAKE  FAAELATRAK  EELSSFDQIK  VAPLLGLADY  IAFRQN      296

SEQ ID NO: 13           moltype = AA   length = 383
FEATURE                 Location/Qualifiers
source                  1..383
                        mol_type = protein
                        organism = Abies grandis
SEQUENCE: 13
MAYSGMATSY  HGLHFMNIAT  QECNLKRLSI  PSRRFHGVSP  SLWASNGFQG  HLKRELSANS   60
FLVSSSRYSN  TIAKFTNLPE  KVKEKVIEFD  FKEYLRSKAM  AVNEALDRAV  PLRYPERIHE  120
AMRYSLLAGG  KRVRPVLCIS  ACELVGGTEE  VAMPTACAME  MIHTMSLIHD  DLPCMDNDDF  180
RRGKPTNHKV  FGEGTAILAG  DALLSFAFEH  IAVSTSKSVG  TDRILRVVSE  LGRTIGSQGL  240
VGGQVADITS  EGDASVDLDT  LEWIHIHKTA  VLLECSVMCG  AIISGASDNE  IERIQRYARS  300
VGLLFQVVDD  ILDVTKSSKE  LGKTAGKDLI  SDKATYPKLM  GLEKAKQFAS  DLLIRAKEDL  360
SCFDPMKAAP  LLGLADYIAF  RQN                                            383

SEQ ID NO: 14           moltype = AA   length = 397
FEATURE                 Location/Qualifiers
source                  1..397
                        mol_type = protein
                        organism = synthetic construct
SEQUENCE: 14
MSPPLDSALE  PLSEYKETAF  PRTEKDPSQY  KEHDLVTPEK  EIQTGYFSPR  GSHSSHGSHD   60
SSASSNISLD  DARMSDVNNS  PNVFHDDPDT  IDEKLSMYWK  AANETVIREP  YDYIAGIPGK  120
EIRRKLLEAF  NHWYKVDEQS  CQAIATTVGM  AHNASLLIDD  IQDSSKLRRG  VPCAHEVFGI  180
AQTINSANYV  YFLAQNQLFR  LRSWPQAISV  FNEEMVNLHR  GQGMELFWRD  NLLPPSMDDY  240
LQMIANKTGG  LFRMIVRLLQ  TSSRQVIDVE  QLVDVLGLYF  QILDDYKNIR  EEKMAAQKGF  300
FEDLTEGKFS  FPICHAIGEG  AKNRTALLHM  LRLKTDDMKI  KQEAVCILDN  AGSLDYTREV  360
LYGLDRKARS  LLREFKTPNP  FMEALLDAML  SSLQACH                            397

SEQ ID NO: 15           moltype = AA   length = 359
FEATURE                 Location/Qualifiers
source                  1..359
                        mol_type = protein
                        organism = Streptomyces melanosporofaciens
SEQUENCE: 15
MTTPTLSPGR  LDADTVRKSV  DVVLEDFLTA  KAHTTPQHHL  PYLSGLLKDF  LSGGKRIRPL   60
LCVTGWQAVG  GGEDTEPVFR  VAACLEMFHA  FALIHDDVMD  DSDTRRGRPT  IHRTLAALCA  120
TDRRPEQIER  FGVSGAVLLG  DLALTWSDEL  LHSAGLTPVQ  FDAVLPLLSE  MRTEVMLGQY  180
LDLQATGELT  DDVEATLTVN  RYKTAKYTIE  RPLHVGAAIA  GAGPEAMEAF  TAYALPLGEA  240
FQLRDDLLGV  YGDPESTGKS  QLDDLRAGKN  TTLIALALRG  SDSTQAARLR  SLIGNPLLDE  300
RDAATIQEIF  AATTARDAVE  QMIDDRRTQA  LRALDDAPFT  ADAVNALKQI  ARLATVRNS   359

SEQ ID NO: 16           moltype = AA   length = 787
FEATURE                 Location/Qualifiers
source                  1..787
                        mol_type = protein
                        organism = Stevia rebaudiana
SEQUENCE: 16
MKTGFISPAT  VFHHRISPAT  TFRHHLSPAT  TNSTGIVALR  DINFRCKAVS  KEYSDLLQKD   60
EASFTKWDDD  KVKDHLDTNK  NLYPNDEIKE  FVESVKAMFG  SMNDGEINVS  AYDTAWVALV  120
QDVDGSGSPQ  FPSSLEWIAN  NQLSDGSWGD  HLLFSAHDRI  INTLACVIAL  TSWNVHPSKC  180
EKGLNFLREN  ICKLEDENAE  HMPIGFEVTF  PSLIDIAKKL  NIEVPEDTPA  LKEIYARRDI  240
KLTKIPMEVL  HKVPTTLLHS  LEGMPDLEWE  KLLKLQCKDG  SFLFSPSSTA  FALMQTKDEK  300
CLQYLTNIVT  KFNGGVPNVY  PVDLFEHIWV  VDRLQRLGIA  RYFKSEIKDC  VEYINKYWTK  360
NGICWARNTH  VQDIDDTAMG  FRVLRAHGYD  VTPDVFRQFE  KDGKFVCFAG  QSTQAVTGMF  420
NVYRASQMLF  PGERILEDAK  KFSYNYLKEK  QSTNELLDKW  IIAKDLPGEV  GYALDIPWYA  480
SLPRLETRYY  LEQYGGEDDV  WIGKTLYRMG  YVSNNTYLEM  AKLDYNNYVA  VLQLEWYTIQ  540
QWYVDIGIEK  FESDNIKSVL  VSYYLAAASI  FEPERSKERI  AWAKTTILVD  KITSIFDSSQ  600
```

```
SSKEDITAFI DKFRNKSSSK KHSINGEPWH EVMVALKKTL HGFALDALMT HSQDIHPQLH     660
QAWEMWLTKL QDGVDVTAEL MVQMINMTAG RWVSKELLTH PQYQRLSTVT NSVCHDITKL     720
HNFKENSTTV DSKVQELVQL VFSDTPDDLD QDMKQTFLTV MKTFYYKAWC DPNTINDHIS     780
KVFEIVI                                                               787

SEQ ID NO: 17            moltype = AA   length = 784
FEATURE                  Location/Qualifiers
source                   1..784
                         mol_type = protein
                         organism = Stevia rebaudiana
SEQUENCE: 17
MNLSLCIASP LLTKSNRPAA LSAIHTASTS HGGQTNPTNL IIDTTKERIQ KQFKNVEISV     60
SSYDTAWVAM VPSPNSPKSP CFPECLNWLI NNQLNDGSWG LVNHTHNHNH PLLKDSLSST     120
LACIVALKRW NVGEDQINKG LSFIESNLAS ATEKSQPSPI GFDIIFPGLL EYAKNLDINL     180
LSKQTDFSLM LHKRELEQKR CHSNEMDGYL AYISEGLGNL YDWNMVKKYQ MKNGSVFNSP     240
SATAAAFINH QNPGCLNYLN SLLDKFGNAV PTVYPHDLFI RLSMVDTIER LGISHHFRVE     300
IKNVLDETYR CWVERDEQIF MDVVTCALAF RLLRINGYEV SPDLAEITN ELALKDEYAA      360
LETYHASHIL YQEDLSSGKQ ILKSADFLKE IISTDSNRLS KLIHKEVENA LKFPINTGLE     420
RINTRRNIQL YNVDNTRILK TTYHSSNISN TDYLRLAVED FYTCQSIYRE ELKGLERWVV     480
ENKLDQLKFA RQKTAYCYFS VAATLSSPEL SDARISWAKN GILTTVVDDF FDIGGTIDEL     540
TNLIQCVEKW NVDVDKDCCS EHVRILFLAL KDAICWIGDE AFKWQARDVT SHVIQTWLEL     600
MNSMLREAIW TRDAYVPTLN EYMENAYVSF ALGPIVKPAI YFVGPKLSEE IVESSEYHNL     660
FKLMSTQGRL LNDIHSFKRE FKEGKLNAVA LHLSNGESGK VEEEVVEEMM MMIKNKRKEL     720
MKLIFEENGS IVPRACKDAF WNMCHVLNFF YANDDGFTGN TILDTVKDII YNPLVLVNEN     780
EEQR                                                                  784

SEQ ID NO: 18            moltype = AA   length = 952
FEATURE                  Location/Qualifiers
source                   1..952
                         mol_type = protein
                         organism = synthetic construct
SEQUENCE: 18
MPGKIENGTP KDLKTGNDFV SAAKSLLDRA FKSHHSYYGL CSTSCQVYDT AWVAMIPKTR     60
DNVKQWLFPE CFHYLLKTQA ADGSWGSLPT TQTAGILDTA SAVLALLCHA QEPLQILDVS     120
PDEMGLRIEH GVTSLKRQLA VWNDVEDTNH IGVEFIIPAL LSMLEKEDLV PSFEFPCRSI     180
LERMHGEKLG HFDLEQVYGK PSSLLHSLEA FLGKLDFDRL SHHLYHGSMM ASPSSTAAYL     240
IGATKWDDEA EDYLRHVMRN GAGHGNGGIS GTFPTTHFEC SWIIATLLKV GFTLKQIDGD     300
GLRGLSTILL EALRDENGVI GFAPRTADVD DTAKALLALS LVNQPVSPDI MIKVFEGKDH     360
FTTFGSERDP SLTSNLHVLL SLLKQSNLSQ YHPQILKTTL FTCRWWWGSD HCVKDKWNLS     420
HLYPTMLLVE AFTEVLHLID GGELSSLFDE SFKCKIGLSI FQAVLRIILT QDNDGSWRGY     480
REQTCYAILA LVQARHVCFF THMVDRLQSC VDRGFSWLKS CSFHSQDLTW TSKTAYEVGF     540
VAEAYKLAAL QSASLEVPAA TIGHSVTSAV PSSDLEKYMR LVRKTALFSP LDEWGLMASI     600
IESSFFVPLL QAQRVEIYPR DNIKVDEDKY LSIIPFTWVG CNNRSRTFAS NRWLYDMMYL     660
SLLGYQTDEY MEAVAGPVFG DVSLLHQTID KVIDNTMGNL ARANGTVHSG NGHQHESPNI     720
GQVEDTLTRF TNSVLNHKDV LNSSSSDQDT LRREFRTFMH AHITQIEDNS RFSKQASSDA     780
FSSPEQSYFQ WVNSTGGSHV ACAYSFAFSN CLMSANLLQG KDAFPSGTQK YLISSVMRHA     840
TNMCRMYNDF GSIARDNAER NVNSIHFPEF TLCNGTSQNL DERKERLLKI ATYEQGYLDR     900
ALEALERQSR DDAGDRAGSK DMRKLKIVKL FCDVTDLYDQ LYVIKDLSSS MK             952

SEQ ID NO: 19            moltype = AA   length = 881
FEATURE                  Location/Qualifiers
source                   1..881
                         mol_type = protein
                         organism = Physcomitrella patens
SEQUENCE: 19
MASSTLIQNR SCGVTSSMSS FQIFRGQPLR FPGTRTPAAV QCLKKRRCLR PTESVLESSP     60
GSGSYRIVTG PSGINPSSNG HLQEGSLTHR LPIPMEKSID NFQSTLYVSD IWSETLQRTE     120
CLLQVTENVQ MNEWIEEIRM YFRNMTLGEI SMSPYDTAWV ARVPALDGSH GPQFHRSLQW     180
IIDNQLPDGD WGEPSLFLGY DRVCNTLACV IALKTWGVGA QNVERGIQFL QSNIYKMEED     240
DANHMPIGFE IVFPAMMEDA KALGLDLPYD ATILQQISAE REKKMKKIPM AMVYKYPTTL     300
LHSLEGLHRE VDWNKLLQLQ SENGSFLYSP ASTACALMYT KDVKCFDYLN QLLIKFDHAC     360
PNVYPVDLFE RLWMVDRLQR LGISRYFERE IRDCLQYVYR YWKDCGIGWA SNSSVQDVDD     420
TAMAFRLLRT HGFDVKEDCF RQFFKDGEFF CFAGQSSQAV TGMFNLSRAS QTLFPGESLL     480
KKARTFSRNF LRTKHENNEC FDKWIITKDL AGEVEYNLTF PWYASLPRLE HRTYLDQYGI     540
DDIWIGKSLY KMPAVTNEVF LKLAKADFNM CQALHKKELE QVIKWNASCQ FRDLEFARQK     600
SVECYFAGAA TMFEPEMVQA RLVWARCCVL TTVLDDYFDH GTPVEELRVF VQAVRTWNPE     660
LINGLPEQAK ILFMGLYKTV NTIAEEAFMA QKRDVHHHLK HYWDKLITSA LKEAEWAESG     720
YVPTFDEYME VAEISVALEP IVCSTLFFAG HRLDEDVLDS YDYHLVMHLV NRVGRILNDI     780
QGMKREASQG KISSVQIYME EHPSVPSEAM AIAHLQELVD NSMQQLTYEV LRFTAVPKSC     840
KRIHLNMAKI MHAFYKDTDG FSSLTAMTGF VKKVLFEPVP E                        881

SEQ ID NO: 20            moltype = AA   length = 946
FEATURE                  Location/Qualifiers
source                   1..946
                         mol_type = protein
                         organism = Phaeosphaeria sp.
SEQUENCE: 20
MFAKFDMLEE EARALVRKVG NAVDPIYGFS TTSCQIYDTA WAAMISKEEH GDKVWLFPES     60
FKYLLEKQGE DGSWERHPRS KTVGVLNTAA ACLALLRHVK NPLQLQDIAA QDIELRIQRG     120
```

```
LRSLEEQLIA WDDVLDTNHI GVEMIVPALL DYLQAEDENV DFEFESHSLL MQMYKEKMAR    180
FSPESLYRAR PSSALHNLEA LIGKLDFDKV GHHLYNGSMM ASPSSTAAFL MHASPWSHEA    240
EAYLRHVFEA GTGKGSGGFP GTYPTTYFEL NWVLSTLMKS GFTLSDLECD ELSSIANTIA    300
EGFECDHGVI GFAPRAVDVD DTAKGLLTLT LLGMDEGVSP APMIAMFEAK DHFLTFLGER    360
DPSFTSNCHV LLSLLHRTDL LQYLPQIRKT TTFLCEAWWA CDGQIKDKWH LSHLYPTMLM    420
VQAFAEILLK SAEGEPLHDA FDAATLSRVS ICVFQACLRT LLAQSQDGSW HGQPEASCYA    480
VLTLAESGRL VLLQALQPQI AAAMEKAADV MQAGRWSCSD HDCDWTSKTA YRVDLVAAAY    540
RLAAMKASSN LTFTVDDNVS KRSNGFQQLV GRTDLFSGVP AWELQASFLE SALFVPLLRN    600
HRLDVFDRDD IKVSKDHYLD MIPFTWVGCN NRSRTYVSTS FLFDMMIISM LGYQIDEFFE    660
AEAAPAFAQC IGQLHQVVDK VVDEVIDEVV DKVVGKVVGK VVGKVVDERV DSPTHEAIAI    720
CNIEASLRRF VDHVLHHQHV LHASQQEQDI LWRELRAFLH AHVVQMADNS TLAPPGRTFF    780
DWVRTTAADH VACAYSFAFA CCITSATIGQ GQSMFATVNE LYLVQAAARH MTTMCRMCND    840
IGSVDRDFIE ANINSVHFPE FSTLSLVADK KKALARLAAY EKSCLTHTLD QFENEVLQSP    900
RVSSAASGDF RTRKVAVVRF FADVTDFYDQ LYILRDLSSS LKHVGT                  946

SEQ ID NO: 21         moltype = AA  length = 513
FEATURE               Location/Qualifiers
source                1..513
                      mol_type = protein
                      organism = Stevia rebaudiana
SEQUENCE: 21
MDAVTGLLTV PATAITIGGT AVALAVALIF WYLKSYTSAR RSQSNHLPRV PEVPGVPLLG     60
NLLQLKEKKP YMTFTRWAAT YGPIYSIKTG ATSMVVVSSN EIAKEALVTR FQSISTRNLS    120
KALKVLTADK TMVAMSDYDD YHKTVKRHIL TAVLGPNAQK KHRIHRDIMM DNISTQLHEF    180
VKNNPEQEEV DLRKIFQSEL FGLAMRQALG KDVESLYVED LKITMNRDEI FQVLVVDPMM    240
GAIDVDWRDF FPYLKWVPNK KFENTIQQMY IRREAVMKSL IKEHKKRIAS GEKLNSYIDY    300
LLSEAQTLTD QQLLMSLWEP IIESSDDTTM VTTEWAMYELA KNPKLQDRLY RDIKSVCGSE    360
KITEEHLSQL PYITAIFHET LRRHSPVPII PLRHVHEDTV LGGYHVPAGT ELAVNIYGCN    420
MDKNVWENPE EWNPERFMKE NETIDFQKTM AFGGGKRVCA GSLQALLTAS IGIGRMVQEF    480
EWKLKDMTQE EVNTIGLTTQ MLRPLRAIIK PRI                                513

SEQ ID NO: 22         moltype = AA  length = 501
FEATURE               Location/Qualifiers
source                1..501
                      mol_type = protein
                      organism = synthetic construct
SEQUENCE: 22
MALLLAVFAV ALAVALIFWY LKSYTSARRS QSNHLPRVPE VPGVPLLGNL LQLKEKKPYM     60
TFTRWAATYG PIYSIKTGAT SMVVVSSNEI AKEALVTRFQ SISTRNLSKA LKVLTADKTM    120
VAMSDYDDYH KTVKRHILTA VLGPNAQKKH RIHRDIMMDN ISTQLHEFVK NNPEQEEVDL    180
RKIFQSELFG LAMRQALGKD VESLYVEDLK ITMNRDEIFQ VLVVDPMMGA IDVDWRDFFP    240
YLKWVPNKKF ENTIQQMYIR REAVMKSLIK EHKKRIASGE KLNSYIDYLL SEAQTLTDQQ    300
LLMSLWEPII ESSDTTMVTT EWAMYELAKN PKLQDRLYRD IKSVCGSEKI TEEHLSQLPY    360
ITAIFHETLR RHSPVPIIPL RHVHEDTVLG GYHVPAGTEL AVNIYGCNMD KNVWENPEEW    420
NPERFMKENE TIDFQKTMAF GGGKRVCAGS LQALLTASIG IGRMVQEFEW KLKDMTQEEV    480
NTIGLTTQML RPLRAIIKPR I                                            501

SEQ ID NO: 23         moltype = AA  length = 509
FEATURE               Location/Qualifiers
source                1..509
                      mol_type = protein
                      organism = Arabidopsis thaliana
SEQUENCE: 23
MAFFSMISIL LGFVISSFIF IFFFKKLLSF SRKNMSEVST LPSVPVVPGF PVIGNLLQLK     60
EKKPHKTFTR WSEIYGPIYS IKMGSSSLIV LNSTETAKEA MVTRFSSIST RKLSNALTVL    120
TCDKSMVATS DYDDFHKLVK RCLLNGLLGA NAQKRKRHYR DALIENVSSK LHAHARDHPQ    180
EPVNFRAIFE HELFGVALKQ AFGKDVESIY VKELGVTLSK DEIFKVLVHD MMEGAIDVDW    240
RDFFPYLKWI PNKSFEARIQ QKHKRRLAVM NALIQDRLKQ NGSESDDDCY LNFLMSEAKT    300
LTKEQIAILV WETIIETADT TLVTTEWAIY ELAKHPSVQD RLCKEIQNVC GGEKFKEEQL    360
SQVPYLNGVF HETLRKYSPA PLVPIRYAHE DTQIGGYHVP AGSEIAINIY GCNMDKKRWE    420
RPEDWWPERF LDDGKYETSD LHKTMAFGAG KRVCAGALQA SLMAGIAIGR LVQEFEWKLR    480
DGEEENVDTY GLTSQKLYPL MAIINPRRS                                    509

SEQ ID NO: 24         moltype = AA  length = 546
FEATURE               Location/Qualifiers
source                1..546
                      mol_type = protein
                      organism = Physcomitrella patens
SEQUENCE: 24
MAKHLATQLL QQWNEALKTM PPGFRTAGKI LVWEELASNK VLITIALAWV LLFVARTCLR     60
NKKRLPPAIP GGLPVLGNLL QLTEKKPHRT FTAWSKEHGP IFTIKVGSVP QAVVNNSEIA    120
KEVLVTKFAS ISKRQMPMAL RVLTRDKTMV AMSDYGEEHR MLKKLVMTNL LGPTTQNKNR    180
SLRDDALIGM IEGVLAELKA SPTSPKVVNV RDYVQRSLFP FALQQVFGYI PDQVEVLELG    240
TCVSTWDMFD ALVVAPLSAV INVDWRDFFP ALRWIPNRSV EDLVRTVDFK RNSIMKALIR    300
AQRMRLANLK EPPRCYADIA LTEATHLTEK QLEMSLWEPI IESADTTLVT SEWAMYEIAK    360
NPDCQDRLYR EIVSVAGTER MVTEDDLPNM PYLGAIIKET LRKYTPVPLI PSRFVEEDIT    420
LGGYDIPKGY QILVNLFAIA NDPAVWSNPE KWDPERMLAN KKVDMGFRDF SLMPFGAGKR    480
MCAGITQAMF IIPMNVAALV QHCEWRLSPQ EISNINNKIE DVVYLTTHKL SPLSCEATPR    540
ISHRLP                                                              546
```

```
SEQ ID NO: 25          moltype = AA  length = 476
FEATURE                Location/Qualifiers
source                 1..476
                       mol_type = protein
                       organism = Stevia rebaudiana
SEQUENCE: 25
MIQVLTPILL FLIFFVFWKV YKHQKTKINL PPGSFGWPFL GETLALLRAG WDSEPERFVR   60
ERIKKHGSPL VFKTSLFGDR FAVLCGPAGN KFLFCNENKL VASWWPVPVR KLFGKSLLTI  120
RGDEAKWMRK MLLSYLGPDA FATHYAVTMD VVTRRHIDVH WRGKEEVNVF QTVKLYAFEL  180
ACRLFMNLDD PNHIAKLGSL FNIFLKGIIE LPIDVPGTRF YSSKKAAAAI RIELKKLIKA  240
RKLELKEGKA SSSQDLLSHL LTSPDENGMF LTEEEIVDNI LLLLFAGHDT SALSITLLMK  300
TLGEHSDVYD KVLKEQLEIS KTKEAWESLK WEDIQKMKYS WSVICEVMRL NPPVIGTYRE  360
ALVDIDYAGY TIPKGWKLHW SAVSTQRDEA NFEDVTRFDP SRFEGAGPTP FTFVPFGGGP  420
RMCLGKEFAR LEVLAFLHNI VTNFKWDLLI PDEKIEYDPM ATPAKGLPIR LHPHQV     476

SEQ ID NO: 26          moltype = AA  length = 522
FEATURE                Location/Qualifiers
source                 1..522
                       mol_type = protein
                       organism = Stevia rebaudiana
SEQUENCE: 26
MGLFPLEDSY ALVFEGLAIT LALYYLLSFI YKTSKKTCTP PKASGEHPIT GHLNLLSGSS   60
GLPHLALASL ADRCGPIFTI RLGIRRVLVV SNWEIAKEIF TTHDLIVSNR PKYLAAKILG  120
FNYVSFSFAP YGPYWVGIRK IIATKLMSSS RLQKLQFVRV FELENSMKSI RESWKEKKDE  180
EGKVLVEMKK WFWELNMNIV LRTVAGKQYT GTVDDADAKR ISELFREWFH YTGRFVVGDA  240
FPPFLGWLDLG GYKKTMELVA SRLDSMVSKW LDEHRKKQAN DDKKEDMDFM DIMISMTEAN  300
SPLEGYGTDT IIKTTCMTLI VSGVDTTSIV LTWALSLLLN NRDTLKKAQE ELDMCVGKGR  360
QVNESDLVNL IYLEAVLKEA LRLYPAAFLG GPRAFLEDCT VAGYRIPKGT CLLINMWKLH  420
RDPNIWSDPC EFKPERFLTP NQKDVDVIGM DFELIPFGAG RRYCPGTRLA LQMLHIVLAT  480
LLQNFEMSTP NDAPVDMTAS VGMTNAKASP LEVLLSPRVK WS                   522

SEQ ID NO: 27          moltype = AA  length = 525
FEATURE                Location/Qualifiers
source                 1..525
                       mol_type = protein
                       organism = Arabidopsis thaliana
SEQUENCE: 27
MESLVVHTVN AIWCIVIVGI FSVGYHVYGR AVVEQWRMRR SLKLQGVKGP PPSIFNGNVS   60
EMQRIQSEAK HCSGDNIISH DYSSSLFPHF DHWRKQYGRI YTYSTGLKQH LYINHPEMVK  120
ELSQTNTLNL GRITHITKRL NPILGNGIIT SNGPHWAHQR RIIAYEFTHD KIKGMVGLMV  180
ESAMPMLNKW EEMVKRGGEM GCDIRVDEDL KDVSADVIAK ACFGSSFSKG KAIFSMIRDL  240
LTAITKRSVL FRFNGFTDMV FGSKKHGDVD IDALEMELES SIWETVKERE IECKDTHKKD  300
LMQLILEGAM RSCDGNLWDK SAYRRFVVDN CKSIYFAGHD STAVSVSWCL MLLALNPSWQ  360
VKIRDEILSS CKNGIPDAES IPNLKTVTMV IQETMRLYPP APIVGREASK DIRLGDLVVP  420
KGVCIWTLIP ALHRDPEIWG PDANDFKPER FSEGISKACK YPQSYIPFGL GPRTCVGKNF  480
GMMEVKVLVS LIVSKFSFTL SPTYQHSPSH KLLVEPQHGV VIRVV                525

SEQ ID NO: 28          moltype = AA  length = 507
FEATURE                Location/Qualifiers
source                 1..507
                       mol_type = protein
                       organism = synthetic construct
SEQUENCE: 28
MALLLAVFVY GRAVVEQWRM RRSLKLQGVK GPPPSIFNGN VSEMQRIQSE AKHCSGDNII   60
SHDYSSSLFP HFDHWRKQYG RIYTYSTGLK QHLYINHPEM VKELSQTNTL NLGRITHITK  120
RLNPILGNGI ITSNGPHWAH QRRIIAYEFT HDKIKGMVGL MVESAMPMLN KWEEMVKRGG  180
EMGCDIRVDE DLKDVSADVI AKACFGSSFS KGKAIFSMIR DLLTAITKRS VLFRFNGFTD  240
MVFGSKKHGD VDIDALEMEL ESSIWETVKE REIECKDTHK KDLMQLILEG AMRSCDGNLW  300
DKSAYRRFVV DNCKSIYFAG HDSTAVSVSW CLMLLALNPS WQVKIRDEIL SSCKNGIPDA  360
ESIPNLKTVT MVIQETMRLY PPAPIVGREA SKDIRLGDLV VPKGVCIWTL IPALHRDPEI  420
WGPDANDFKP ERFSEGISKA CKYPQSYIPF GLGPRTCVGK NFGMMEVKVL VSLIVSKFSF  480
TLSPTYQHSP SHKLLVEPQH GVVIRVV                                    507

SEQ ID NO: 29          moltype = AA  length = 519
FEATURE                Location/Qualifiers
source                 1..519
                       mol_type = protein
                       organism = synthetic construct
SEQUENCE: 29
MALLLAVFIV IVGIFSVGYH VYGRAVVEQW RMRRSLKLQG VKGPPPSIFN GNVSEMQRIQ   60
SEAKHCSGDN IISHDYSSSL FPHFDHWRKQ YGRIYTYSTG LKQHLYINHP EMVKELSQTN  120
TLNLGRITHI TKRLNPILGN GIITSNGPHW AHQRRIIAYE FTHDKIKGMV GLMVESAMPM  180
LNKWEEMVKR GGEMGCDIRV DEDLKDVSAD VIAKACFGSS FSKGKAIFSM IRDLLTAITK  240
RSVLFRFNGF TDMVFGSKKH GDVDIDALEM ELESSIWETV KEREIECKDT HKKDLMQLIL  300
EGAMRSCDGN LWDKSAYRRF VVDNCKSIYF AGHDSTAVSV SWCLMLLALN PSWQVKIRDE  360
ILSSCKNGIP DAESIPNLKT VTMVIQETMR LYPPAPIVGR EASKDIRLGD LVVPKGVCIW  420
TLIPALHRDP EIWGPDANDF KPERFSEGIS KACKYPQSYI PFGLGPRTCV GKNFGMMEVK  480
VLVSLIVSKF SFTLSPTYQH SPSHKLLVEP QHGVVIRVV                       519
```

```
SEQ ID NO: 30              moltype = AA    length = 710
FEATURE                    Location/Qualifiers
source                     1..710
                           mol_type = protein
                           organism = Stevia rebaudiana
SEQUENCE: 30
MQSDSVKVSP FDLVSAAMNG KAMEKLNASE SEDPTTLPAL KMLVENRELL TLFTTSFAVL    60
IGCLVFLMWR RSSSKKLVQD PVPQVIVVKK KEKESEVDDG KKKVSIFYGT QTGTAEGFAK   120
ALVEEAKVRY EKTSFKVIDL DDYAADDDEY EEKLKKESLA FFFLATYGDG EPTDNAANFY   180
KWFTEGDDKG EWLKKLQYGV FGLGNRQYEH FNKIAIVVDD KLTEMGAKRL VPVGLGDDDQ   240
CIEDDFTAWK ELVWPELDQL LRDEDDTSVT TPYTAAVLEY RVVYHDKPAD SYAEDQTHTN   300
GHVVHDAQHP SRSNVAFKKE LHTSQSDRSC THLEFDISHT GLSYETGDHV GVYSENLSEV   360
VDEALKLLGL SPDTYFSVHA DKEDGTPIGG ASLPPPFPPC TLRDALTRYA DVLSSPKKVA   420
LLALAAHASD PSEADRLKFL ASPAGKDEYA QWIVANQRSL LEVMQSFPSA KPPLGVFFAA   480
VAPRLQPRYY SISSSPKMSP NRIHVTCALV YETTPAGRIH RGLCSTWMKN AVPLTESPDC   540
SQASIFVRTS NFRLPVDPKV PVIMIGPGTG LAPFRGFLQE RLALKESGTE LGSSIFFFGC   600
RNRKVDFIYE DELNNFVETG ALSELIVAFS REGTAKEYVQ HKMSQKASDI WKLLSEGAYL   660
YVCGDAKGMA KDVHRTLHTI VQEQGSLDSS KAELYVKNLQ MSGRYLRDVW              710

SEQ ID NO: 31              moltype = AA    length = 692
FEATURE                    Location/Qualifiers
source                     1..692
                           mol_type = protein
                           organism = Arabidopsis thaliana
SEQUENCE: 31
MTSALYASDL FKQLKSIMGT DSLSDDVVLV IATTSLALVA GFVVLLWKKT TADRSGELKP    60
LMIPKSLMAK DEDDDLDLGS GKTRVSIFFG TQTGTAEGFA KALSEEIKAR YEKAAVKVID   120
LDDYAADDDQ YEEKLKKETL AFFCVATYGD GEPTDNAARF SKWFTEENER DIKLQQLAYG   180
VFALGNRQYE HFNKIGIVLD EELCKKGAKR LIEVGLGDDD QSIEDDFNAW KESLWSELDK   240
LLKDEDDKSV ATPYTAVIPE YRVVTHDPRF TTQKSMESNV ANGNTTIDIH HPCRVDVAVQ   300
KELHTHESDR SCIHLEFDIS RTGITYETGD HVGVYAENHV EIVEEAGKLL GHSLDLVFSI   360
HADKEDGSPL ESAVPPPFPG PCTLGTGLAR YADLLNPPRK SALVALAAYA TEPSEAEKLK   420
HLTSPDGKDE YSQWIVASQR SLLEVMAAFP SAKPPLGVPF AAIAPRLQPR YYSISSCQDW   480
APSRVHVTSA LVYGPTPTGR IHKGVCSTWM KNAVPAEKSH ECSGAPIFIR ASNFKLPSNP   540
STPIVMVGPG TGLAPPRGFL QERMALKEDG EELGSSLLFF GCRNRQMDFI YEDELNNFVD   600
QGVISELIMA FSREGAQKEY VQHKMMEKAA QVWDLIKEEG YLYVCGDAKG MARDVHRTLH   660
TIVQEQEGVS SSEAEAIVKK LQTEGRYLRD VW                                  692

SEQ ID NO: 32              moltype = AA    length = 524
FEATURE                    Location/Qualifiers
source                     1..524
                           mol_type = protein
                           organism = synthetic construct
SEQUENCE: 32
MAHALAENIL TELNTLLSDM DDGGYVGPSV YDTAQLLRFH PNPPDRAGIY RWLIKQQHED    60
GGWGSPDFPL HRQVPTVAAI LALHEAQPQP EGAAAALAAA AVYLAQERDL YADTIPDDAP   120
IGAELILPQL CRQAAALFPH LAYPRYGALY EAEAARLGKV ESLTAVPSGH PLLHSWESWG   180
RSSTEVTPDV FGSIGISPSA TAVWLGRACA ENPACLPEHA TRYLHNASRA TGVGIDVVP    240
NVWPIDVFEP CWSLYSLHLA GLFSHPGLST VVQNIATNIQ AILTPLGLGP ALSFASDADD   300
TAIAAAVVQL SGHSLTCYPL HQFEKGDLFV TFPGERNPSL STTIHAVHAL SLLGTTAPDA   360
RAYIENSKSA DGVWKNEKWH ASWLYPTSHA VAALAHGMPS WRDNDVLYKI LEAQHLSGGW   420
GAGAAPTQEE TAYALFALHV MNDRVNAPLR EKLVSAVARA REWLLVRYQS NQLPITPLWI   480
GKELYCPQRV VRVTELTGLW LALNWNPSHS DVSDTRTETP GERI                   524

SEQ ID NO: 33              moltype = AA    length = 317
FEATURE                    Location/Qualifiers
source                     1..317
                           mol_type = protein
                           organism = synthetic construct
SEQUENCE: 33
MATSHDDACQ QVKVWGETLF GFLDEHAVEA VRGGQFILRH IRPELAAISA RTGRDPDDEA    60
RELAFYQEMA LLFWIDDCHD RGVMSPDDYA VVEGILVGRM PDAPTPSVGC SFLRHRLAQL   120
ASHKHDYSQL LADTQAYSTA LRNGKRLASD PDRWSYSEHL RNGVDSIGYQ NVFGCLSLLW   180
GLDMPRWRTE PAFQNALSFL CAIGRLQNDL HGLANDRTLG EADNLAVQLE RRYPTLDAVE   240
FLQTEITGYE RMLRPLLETA NFDPVWVRLM ETMLTVSDQY YATSTLRYRI DDTATTAPSC   300
DTRHASGAVT GSGNETE                                                  317

SEQ ID NO: 34              moltype = AA    length = 517
FEATURE                    Location/Qualifiers
source                     1..517
                           mol_type = protein
                           organism = synthetic construct
SEQUENCE: 34
MANALSEQIL FELRHLLSEM SDGGSVGPSV YDTARALQFG GNVTGRQDAY AWLLAQQQAD    60
GGWGSADFPL FRHAPTWAAL LALQRADPLP GAADAVQAAT RFLERQADPY AHAVPEDAPI   120
GAELILPQLC GEAASLLGGV AFPRHPALLP LRQACLVKLG AVATLPSGHP LLHSWEAWGT   180
WPTAACPDDD GSIGISPAAT AAWRAHAVTQ GSTPQVGRAD AYLQAASRAT RSGIEGVVPN   240
VWPINVFEPC WSLYTLHLAG LFAHPALDEA VRVIVAQLDA RLGVRGLGPA LHFAADADDT   300
```

```
AVALCVLRLA GRDPAVDALR HFEIGELFVT FPGERNASVS TNIHALHALR LLGKPAAGTS    360
AYVEANRNPH GLWDNEKWHV SWLYPTAHAV AALAQGKPQW RDERALAALL QAQRDDGGWG    420
AGRASTFEET AYALFALHVM DGSEEPTGRR RIAQAVARAL EWMLARHAAP ALPQMPLWIG    480
KELYCPIRVV RVAELAGLWL ALRWGPRVPA EGAGAAP                             517

SEQ ID NO: 35            moltype = AA  length = 302
FEATURE                  Location/Qualifiers
source                   1..302
                         mol_type = protein
                         organism = synthetic construct
SEQUENCE: 35
MAIPTERGLQ QVLEWGRSLT GFADEHAAEA VRGGQYILQR IHPSLRDTSA RTGRDPQDET     60
LIVAFYRELA LLFWLDDCND LDLIAPEQLA AVEQALGQGV PCALPGFEGC AVLRASLAAL    120
AYDRRDYAQL LDDTRCYCAA LRAGHAQAAG AAERWSYAEY LHNGIDSIAY ANVFCCLSLL    180
WGLDMATLRA RPAFRQVLRL ISAIGRLQND LHGRDKDRSA GEADNAAILL LERYPAMPVV    240
EFLNDELAGH TRMLHRVMAE ERFPAPWGPL IEAMAAIRAH YYQTSTSRYR SDAAGGGQHA    300
PA                                                                  302

SEQ ID NO: 36            moltype = AA  length = 295
FEATURE                  Location/Qualifiers
source                   1..295
                         mol_type = protein
                         organism = synthetic construct
SEQUENCE: 36
MAENGLLDCE QYLEEAMAEH ATAQCPPLLA QALNYAVFPG GARVRPKICK AVALANNSSD     60
VGLANAAASA IELLHCASLV HDDLPCFDDA TQRRGKPSVH AKFGERIAVL TGDALIVAAF    120
QTLATHAIHA VRTERVPLVT AIVARGVGAP HGICAGQAWE CERSVDLSRY HRAKTGALFV    180
AATCAGAAAA GVDPGPWVNL GASIGEAYQV ADDIKDAISD PETLGKPTGI DVKLDRPSAV    240
RELGLDGAVT RLKQCLEAGL DSMPACAGQD LLQKIVRAQA SRFVPEKIAQ VAAVD         295

SEQ ID NO: 37            moltype = AA  length = 296
FEATURE                  Location/Qualifiers
source                   1..296
                         mol_type = protein
                         organism = Paracoccus haeundaensis
SEQUENCE: 37
MARRDVNPIH ATLLQTRLEE IAQGFGAVSQ PLGAAMSHGA LSSGRRFRGM LMLLAAEASG     60
GVCDTIVDAA CAVEMVHAAS LIFDDLPCMD DAGLRRGRPA THVAHGESRA VLGGIALITE    120
AMALLAGARG ASGTVRAQLV RILSRSLGPQ GLCAGQDLDL HAAKNGAGVE QEQDLKTGVL    180
FIAGLEMLAV IKEFDAEEQT QMIDFGRQLG RVFQSYDDLL DVVGDQAALG KDTGRDAAAP    240
GPRRGLLAVS DLQNVSRHYE ASRAQLDAML RSKRLQAPEI AALLERVLPY AARAVD        296

SEQ ID NO: 38            moltype = AA  length = 335
FEATURE                  Location/Qualifiers
source                   1..335
                         mol_type = protein
                         organism = synthetic construct
SEQUENCE: 38
MASSPITQAQ VESKYRQYHA KINEALAACF PKEKPATLYD PARYILEGKG KRIRPFLTLL     60
AAEAVSGKSD NALGVALGIE VLHNFTLMHD DIMDQADLRH GRPTVHKQWN VNAAILSGDM    120
MIAYAYELAL KAISSRHAEI IHIFNDANIT ICEGQALDME LEQRKDVTIA DYLDMISKKT    180
GRLISAALEA GGVAGDGTPE QIAALVTFGE KIGRAFQIQD DYLDIMAGDG KSGKVPGGDV    240
INGKKTWLLL RSLELAEGAD RELLQSIFDN NGTSPDNVPA VKAIFEKCGV LNETRAKINE    300
DTEAALAALD ALPFEEGRGY LRGFANILMK RDFVD                               335

SEQ ID NO: 39            moltype = AA  length = 300
FEATURE                  Location/Qualifiers
source                   1..300
                         mol_type = protein
                         organism = synthetic construct
SEQUENCE: 39
MAVAQTFNLD TYLSQRQQQV EEALSAALVP AYPERIYEAM RYSLLAGGKR LRPILCLAAC     60
ELAGGSVEQA MPTACALEMI HTMSLIHDDL PAMDNDDFRR GKPTNHKVFG EDIAILAGDA    120
LLAYAFEHIA SQTRGVPPQL VLQVIARIGH AVAATGLVGG QVVDLESEGK AISLETLEYI    180
HSHKTGALLE ASVVSGGILA GADEELLARL SHYARDIGLA FQIVDDILDV TATSEQLGKT    240
AGKDQAAAKA TYPSLLGLEA SRQKAEELIQ SAKEALRPYG SQAEPLLALA DFITRRQHVD    300

SEQ ID NO: 40            moltype = AA  length = 305
FEATURE                  Location/Qualifiers
source                   1..305
                         mol_type = protein
                         organism = synthetic construct
SEQUENCE: 40
MAVAQQTRTD FDLAQYLQVK KGVVEAALDS SLAIARPEKI YEAMRYSLLA GGKRLRPILC     60
ITACELCGGD EALALPTACA LEMIHTMSLI HDDLPSMDND DFRRGKPTNH KVYGEDIAIL    120
AGDGLLAYAF EYVVTHPTQA DPQALLQVIA RLGRTVGAAG LVGGQVLDLE SEGRTDITPE    180
TLTFIHTHKT GALLEASVLT GAILAGATGE QQQRLARYAQ NIGLAFQVVD DILDITATQE    240
ELGKTAGKDV KAQKATYPSL LGLEASRAQA QSLIDQAIVA LEPFGPSAEP LQAIAEYIVA    300
RKYVD                                                               305
```

```
SEQ ID NO: 41            moltype = AA   length = 275
FEATURE                  Location/Qualifiers
source                   1..275
                         mol_type = protein
                         organism = synthetic construct
SEQUENCE: 41
MAKKEKVEER IREILRPGWD LLTEEAMLYS ATVGGKRIRP LLVLTLGEDL GVEEEKLLDV   60
AVAVELFHTA SLIHDDLPPI DNADFRRGKP SCHRTYGEDI ALLAGDGLFF LAFSQISKIG  120
NSKIFEEFSE TAYKLLLGEA MDVEFERRKM EVSQEMVERM YAFKTGALFA FCFSAPFILK  180
GKDHTKMKLL GEKFGVAFQI YDDLKDILGS FEKVGKDLGK DTEKVTLVKK VGIQKAREMA  240
DKYYEEVLKG IESEGLFRTL FLLKELKQMV EERVD                             275

SEQ ID NO: 42            moltype = AA   length = 374
FEATURE                  Location/Qualifiers
source                   1..374
                         mol_type = protein
                         organism = synthetic construct
SEQUENCE: 42
MAKDVSLSSF DAHDLDLDKF PEVVRDRLTQ FLDAQELTIA DIGAPVTDAV AHLRSFVLNG   60
GKRIRPLYAW AGFLAAQGHK NSSEKLESVL DAAASLEFIQ ACALIHDDII DSSDTRRGAP  120
TVHRAVEADH RANNFEGDPE HFGVSVSILA GDMALVWAED MLQDSGLSAE ALARTRDAWR  180
GMRTEVIGGQ LLDIYLESHA NESVELADSV NRFKTAAYTI ARPLHLGASI AGGSPQLIDA  240
LLHYGHDIGI AFQLRDDLLG VFGDPAITGK PAGDDIREGK RTVLLALALQ RADKQSPEAA  300
TAIRAGVGKV TSPEDIAVIT EHIRATGAEE EVEQRISQLT ESGLAHLDDV DIPDEVRAQL  360
RALAIRSTER RMVD                                                    374

SEQ ID NO: 43            moltype = AA   length = 333
FEATURE                  Location/Qualifiers
source                   1..333
                         mol_type = protein
                         organism = synthetic construct
SEQUENCE: 43
MAVPAPEAIR QALQERLLAR LDHPDPLYRD LLQDYPRRGG KMLRGLLTVY SALAHGAPLE   60
AGLEAATALE LFQNWVLVHD DIEDGSEERR GRPALHRLHP MPLALNAGDA MHAEMWGLLA  120
EGLARGLFPP EVLLEFHEVV RRTAYGQHLD LLWTLGGTFD LRPEDYFRMV AHKAAYYTAV  180
APLRLGALLA GKTPPAAYEE GGLRLGTAFQ IVDDVLNLEG GEAYGKERAG DLYEGKRTLI  240
LLRFLEEAPP EERARALALL ALPREAKPEA EVGWLLERLL ASRALAWAKA EAKRLQAEGL  300
ALLEAAFQDL PGKEALDHLR GLLAALVERR AVD                               333

SEQ ID NO: 44            moltype = AA   length = 335
FEATURE                  Location/Qualifiers
source                   1..335
                         mol_type = protein
                         organism = synthetic construct
SEQUENCE: 44
MADVVSRLHQ KYGAEVEKAL VRYLSIGLAE DFREAVLYQV KTGGKRLRPL LTLAAAEAVS   60
GQWRPALPAA AIVELIHNYS LIYDDIIDRG DVRRGLPTVR KAFGDNAAIL VGIWYREAIE  120
EAVLDTPKPT LFAKEVAEVI KAIDEGERLD ILFEAAGRSD PYFVQARWRE VTLDDYIKMV  180
SLKTGALIAA AAKWGVLSVS DDRGLAEAAW NFGMAAGVAF QIIDDVLDIY GDPKKFGKEI  240
GKDIKEHKRG NAVVAVALSH LGEGERRRLL EILAREVVEE ADVREAVALL DSVGAREEAL  300
RLAARYREEA ERHLAKIPNN GTLKELLDFI VAREY                             335

SEQ ID NO: 45            moltype = AA   length = 463
FEATURE                  Location/Qualifiers
source                   1..463
                         mol_type = protein
                         organism = synthetic construct
SEQUENCE: 45
MATKGSSGMS LAERFWLTLS RSSLVVGRSC VEFEPETVPL LSTLRGKPIT FLGLMPPLHE   60
GRREDGEDAT VRWLDAQPAK SVVYVALGSE VPLGVEKVHE LALGLELAGT RFLWALRKPT  120
GVSDADLLPA GFEERTRGRG VVATRWVPQM SILAHAAVGA FLTHCGWNST IEGLMFGHPL  180
IMLPIFGDQG PNARLIEAKN AGLQVARNDG DGSFDREGVA AAIRAVAVEE ESSKVFQAKA  240
KKLQEIVADM ACHERYIDGF IQQLRSYKDD SGYSSSYAAA AGMHVVICPW LAFGHLLPCL  300
DLAQRLASRG HRVSFVSTPR NISRLPPVRP ALAPLVAFVA LPLPRVEGLP DGAESTNDVP  360
HDRPDMVELH RRAFDGLAAP FSEFLGTACA DWVIVDVFHH WAAAAALEHK VPCAMMLLGS  420
AEMIASIADE RLEHAETESP AAAGQGRPAA APTFEVARMK LIR                    463

SEQ ID NO: 46            moltype = AA   length = 463
FEATURE                  Location/Qualifiers
source                   1..463
                         mol_type = protein
                         organism = synthetic construct
SEQUENCE: 46
MANHHECMNW LDDKPKESVV YVAFGSLVKH GPEQVEEITR ALIDSDVNFL WVIKHKEEGK   60
LPENLSEVIK TGKGLIVAWC KQLDVLAHES VGCFVTHCGF NSTLEAISLG VPVVAMPQFS  120
DQTTNAKLLD EILGVGVRVK ADENGIVRRG NLASCIKMIM EEERGVIIRK NAVKWKDLAK  180
VAVHEGGSSD NDIVEFVSEL IKAGSGEQQK IKKSPHVLLI PFPLQGHINP FIQFGKRLIS  240
KGVKTTLVTT IHTLNSTLNH SNTTTTSIEI QAISDGCDEG GFMSAGESYL ETFKQVGSKS  300
```

```
LADLIKKLQS EGTTIDAIIY DSMTEWVLDV AIEFGIDGGS FFTQACVVNS LYYHVHKGLI    360
SLPLGETVSV PGFPVLQRWE TPLILQNHEQ IQSPWSQMLF GQFANIDQAR WVFTNSFYKL    420
EEEVIEWTRK IWNLKVIGPT LPSMYLDKRL DDDKDNGFNL YKA                     463

SEQ ID NO: 47           moltype = AA   length = 8
FEATURE                 Location/Qualifiers
source                  1..8
                        mol_type = protein
                        organism = synthetic construct
SEQUENCE: 47
MALLLAVF                                                              8

SEQ ID NO: 48           moltype = AA   length = 17
FEATURE                 Location/Qualifiers
source                  1..17
                        mol_type = protein
                        organism = synthetic construct
SEQUENCE: 48
YKDDSGYSSS YAAAAGM                                                   17

SEQ ID NO: 49           moltype = AA   length = 7
FEATURE                 Location/Qualifiers
source                  1..7
                        mol_type = protein
                        organism = synthetic construct
SEQUENCE: 49
YKDAAGM                                                               7

SEQ ID NO: 50           moltype = AA   length = 5
FEATURE                 Location/Qualifiers
source                  1..5
                        mol_type = protein
                        organism = synthetic construct
SEQUENCE: 50
YGSGM                                                                 5

SEQ ID NO: 51           moltype = AA   length = 482
FEATURE                 Location/Qualifiers
source                  1..482
                        mol_type = protein
                        organism = synthetic construct
SEQUENCE: 51
MADAMATTEK KPHVIFIPFP AQSHIKAMLK LAQLLHHKGL QITFVNTDFI HNQFLESSGP     60
HCLDGAPGFR FETIPDGVSH SPEASIPIRE SLLRSIETNF LDRFIDLVTK LPDPPTCIIS    120
DGFLSVFTID AAKKLGIPVM MYWTLAACGF MGFYHIHSLI EKGFAPLKDA SYLTNGYLDT    180
VIDWVPGMEG IRLKDFPLDW STDLNDKVLM FTTEATQRSH KVSHHIFHTF DELEPSIIKT    240
LSLRYNHIYT IGPLQLLLDQ IPEEKKQTGI TSLHGYSLVK EEPECFQWLQ SKEPNSVVYV    300
NFGSTTVMSL EDMTEFGWGL ANSNHYFLWI IRSNLVIGEN AVLPPELEEH IKKRGFIASW    360
CSQEKVLKHP SVGGFLTHCG WGSTIESLSA GVPMICWPYS WDQLTNCRYI CKEWEVGLEM    420
GTKVKRDEVK RLVQELMGEG GHKMRNKAKD WKEKARIAIA PNGSSSLNID KMVKEITVLA    480
RN                                                                  482

SEQ ID NO: 52           moltype =   length =
SEQUENCE: 52
000

SEQ ID NO: 53           moltype = AA   length = 57
FEATURE                 Location/Qualifiers
source                  1..57
                        mol_type = protein
                        organism = synthetic construct
SEQUENCE: 53
MDAVTGLLTV PATAITIGGT AVALAVALIF WYLKSYTSAR RSQSNHLPRV PEVPGVP       57

SEQ ID NO: 54           moltype = AA   length = 61
FEATURE                 Location/Qualifiers
source                  1..61
                        mol_type = protein
                        organism = synthetic construct
SEQUENCE: 54
MALLLAVFTG LLTVPATAIT IGGTAVALAV ALIFWYLKSY TSARRSQSNH LPRVPEVPGV     60
P                                                                    61

SEQ ID NO: 55           moltype = AA   length = 37
FEATURE                 Location/Qualifiers
source                  1..37
                        mol_type = protein
                        organism = synthetic construct
SEQUENCE: 55
```

```
AVALAVALIF WYLKSYTSAR RSQSNHLPRV PEVPGVP                              37

SEQ ID NO: 56           moltype = AA   length = 18
FEATURE                 Location/Qualifiers
source                  1..18
                        mol_type = protein
                        organism = synthetic construct
SEQUENCE: 56
RRSQSNHLPR VPEVPGVP                                                   18

SEQ ID NO: 57           moltype = AA   length = 18
FEATURE                 Location/Qualifiers
source                  1..18
                        mol_type = protein
                        organism = synthetic construct
SEQUENCE: 57
RRSQSNHLPR VPEVPGVP                                                   18

SEQ ID NO: 58           moltype = AA   length = 480
FEATURE                 Location/Qualifiers
source                  1..480
                        mol_type = protein
                        organism = synthetic construct
SEQUENCE: 58
MEESKTPHVA IIPSPGMGHL IPLVEFAKRL VHLHGLTVTF VIAGEGPPSK AQRTVLDSLP     60
SSISSVFLPP VDLTDLSSST RIESRISLTV TRSNPELRKV FDSFVEGGRL PTALVVDLFG    120
TDAFDVAVEF HVPPYIFYPT TANVLSFFLH LPKLDETVSC EFRELTEPLM LPGCVPVAGK    180
DPLDPAQDRK DDAYKWLLHN TKRYKEAEGI LVNTFFELEP NAIKALQEPG LDKPPVYPVG    240
PLVNIGKQEA KQTEESECLK WLDNQPLGSV LYVSFGSGGT LTCEQLNELA LGLADSEQRF    300
LWVIRSPSGI ANSSYFDSHS QTDPLTFLPP GFLERTKKRG FVIPFWAPQA QVLAHPSTGG    360
FLTHCGWNST LESVVSGIPL IAWPLYAEQK MNAVLLSEDI RAALRPRAGD DGLVRREEVA    420
RVVKGLMEGE EGKGVRNKMK ELKEAACRVL KDDGTSTKAL SLVALKWKAH KKELEQNGNH    480

SEQ ID NO: 59           moltype = AA   length = 465
FEATURE                 Location/Qualifiers
source                  1..465
                        mol_type = protein
                        organism = synthetic construct
SEQUENCE: 59
MSMSDINKNS ELIFIPAPGI GHLASALEFA KLLTNHDKNL YITVFCIKFP GMPFADSYIK     60
SVLASQPQIQ LIDLPEVEPP PQELLKSPEF YILTFLESLI PHVKATIKTI LSNKVVGLVL    120
DFFCVSMIDV GNEFGIPSYL FLTSNVGFLS LMLSLKNRQI EEVFDDSDRD HQLLNIPGIS    180
NQVPSNVLPD ACFNKDGGYI AYYKLAERFR DTKGIIVNTF SDLEQSSIDA LYDHDEKIPP    240
IYAVGPLLDL KGQPNPKLDQ AQHDLILKWL DEQPDKSVVF LCFGSMGVSF GPSQIREIAL    300
GLKHSGVRFL WSNSAEKKVF PEGFLEWMEL EGKGMICGWA PQVEVLAHKA IGGFVSHCGW    360
NSILESMWFG VPILTWPIYA EQQLNAFRLV KEWGVGLGLR VDYRKGSDVV AAEEIEKGLK    420
DLMDKDSIVH KKVQEMKEMS RNAVVDGGSS LISVGKLIDD ITGSN                    465

SEQ ID NO: 60           moltype = AA   length = 456
FEATURE                 Location/Qualifiers
source                  1..456
                        mol_type = protein
                        organism = synthetic construct
SEQUENCE: 60
MSQTTTNPHV AVLAFPPFSTH AAPLLAVVRR LAAAAPHAVF SFFSTSQSNA SIFHDSMHTM    60
QCNIKSYDIS DGVPEGYVFA GRPQEDIELF TRAAPESFRQ GMVMAVAETG RPVSCLVADA   120
FIWFAADMAA EMGVAWLPFW TAGPNSLSTH VYIDEIREKI GVSGIQGRED ELLNFIPGMS   180
KVRFRDLQEG IVFGNLNSLF SRMLHRMGQV LPKATAVFIN SFEELDDSLT NDLKSKLKTY   240
LNIGPFNLIT PPPVVPNTTG CLQWLKERKP TSVVYISFGS VTTPPPAEVV ALSEALEASR   300
VPFIWSLRDK ARVHLPEGFL EKTRGYGMVV PWAPQAEVLA HEAVGAFVTH CGWNSLWESV   360
AGGVPLICRP FFGDQRLNGR MVEDVLEIGV RIEGGVFTKS GLMSCFDQIL SQEKGKKLRE   420
NLRALRETAD RAVGPKGSST ENFITLVDLV SKPKDV                             456

SEQ ID NO: 61           moltype = AA   length = 482
FEATURE                 Location/Qualifiers
source                  1..482
                        mol_type = protein
                        organism = synthetic construct
SEQUENCE: 61
MGNFANRKPH VVMIPYPVQG HINPLFKLAK LLHLRGFHIT FVNTEYNHKR LLKSRGPKAF     60
DGFTDFNFES IPDGLTPMEG DGDVSQDVPT LCQSVRKNFL KPYCELLTRL NHSTNVPPVT   120
CLVSDCCMSF TIQAAEEFEL PNVLYFSSSA CSLLNVMHFR SFVERGIIPF KDESYLTNGC   180
LETKVDWIPG LKNFRLRKDIV DFIRTTNPND IMLEFFIEVA DRVNKDTTIL LNTFNELESD   240
VINALSSTIP SIYPIGPLPS LLKQTPQIHQ LDSLDSNLWK EDTECLDWLE SKEPGSVVYV   300
NFGSTTVMTP EQLLEFAWGL ANCKKSFLWI IRPDLVIGGS VIFSSEFTNE IADRGLIASW   360
CPQDKVLNHP SIGGFLTHCG WNSTTESICA GVPMLCWPFF ADQPTDCRFI CNEWEIGMEI   420
DTNVKREELA KLINEVIAGD KGKKMKQKAM ELKKKAEENT RPGGCSYMNL NKVIKDVLLK   480
QN                                                                  482
```

```
SEQ ID NO: 62          moltype = AA  length = 454
FEATURE                Location/Qualifiers
source                 1..454
                       mol_type = protein
                       organism = synthetic construct
SEQUENCE: 62
MSTFKNEMNG NNLLHVAVLA FPFGTHAAPL LSLVKKIATE APKVTFSFFC TTTTNDTLFS   60
RSNEFLPNIK YYNVHDGLPK GYVSSGNPRE PIFLFIKAMQ ENFKHVIDEA VAETGKNITC  120
LVTDAFFWFG ADLAEEMHAK WVPLWTAGPH SLLTHVYTDL IREKTGSKEV HDVKSIDVLP  180
GFPELKASDL PEGVIKDIDV PFATMLHKMG LELPRANAVA INSFATIHPL IENELNSKFK  240
LLLNVGPFNL TTPQRKVSDE HGCLEWLDQH ENSSVVYISF GSVVTPPPHE LTALAESLEE  300
CGFPFIWSFR GDPKEKLPKG FLERTKTKGK IVAWAPQVEI LKHSSVGVFL THSGWNSVLE  360
CIVGGVPMIS RPFFGDQGLN TILTESVLEI GVGVDNGVLT KESIKKALEL TMSSEKGGIM  420
RQKIVKLKES AFKAVEQNGT SAMDFTTLIQ IVTS                              454

SEQ ID NO: 63          moltype = AA  length = 446
FEATURE                Location/Qualifiers
source                 1..446
                       mol_type = protein
                       organism = synthetic construct
SEQUENCE: 63
MKNKQHVAIF PFPFGSHLPP LLNLVLKLAH IAPNTSFSFI GTHSSNAFLF TKRHIPNNIR   60
VFTISDGIPE GHVPANNPIE KLDLFLSTGP DNLRKGIELA VAETKQSVTC IIADAFVTSS  120
LLVAQTLNVP WIAFWPNVSC SLSLYFNIDL IRDKCSKDAK NATLDFLPGL SKLRVEDVPQ  180
DMLDVGEKET LFSRTLNSLG VVLPQAKAVV VNFFAELDPP LFVKYMRSKL QSLLYVVPLP  240
CPQLLLPEID SNGCLSWLDS KSSRSVAYVC FGTVVSPPPQ EVVAVAEALE ESGFPFVWAL  300
KESLLSILPK GFVERTSTRG KVVSWVPQSH VLSHGSVGVF VTHCGANSVM ESVSNGVPMI  360
CRPFFGDQGI AARVIQDIWE VGVIVEGKVF TKNGFVKSLN LILVQEDGKK IRDNALKVKQ  420
IVQDAVGPHG QAAEDFNTLV EVISSS                                       446

SEQ ID NO: 64          moltype = AA  length = 4
FEATURE                Location/Qualifiers
source                 1..4
                       mol_type = protein
                       organism = synthetic construct
SEQUENCE: 64
PSPG                                                                 4

SEQ ID NO: 65          moltype =     length =
SEQUENCE: 65
000
```

URIDINE DIPHOSPHATE-DEPENDENT GLYCOSYLTRANSFERASE ENZYME

RELATED APPLICATIONS

This application is a continuation of U.S. patent application Ser. No. 16/862,214, filed Apr. 29, 2020 and is now U.S. Pat. No. 11,819,042, which is a continuation of U.S. patent application Ser. No. 16/251,993, filed Jan. 18, 2019 and is now U.S. Pat. No. 10,743,567, which is a divisional of U.S. patent application Ser. No. 15/524,015, filed May 3, 2017 and is now U.S. Pat. No. 10,463,062, which is a National Stage of PCT/US15/59273, filed Nov. 5, 2015, which claims priority to and the benefit of U.S. Provisional Application No. 62/075,644, filed Nov. 5, 2014, each of which is hereby incorporated by reference in its entirety.

TECHNICAL FIELD

The present disclosure relates to enzymes, including engineered enzymes, encoding polynucleotides, host cells, and methods for producing steviol glycosides.

SEQUENCE LISTING

The application contains a sequence listing, which has been submitted in XML format via EFS-Web. The contents of the XML copy named "MAN-003D3_Sequence Listing", which was created on Sep. 9, 2023 and is 81,920 bytes in size, the contents of which are 25 incorporated herein by reference in their entirety.

BACKGROUND

High intensity sweeteners possess a sweetness level that is many times greater than the sweetness level of sucrose. They are essentially non-caloric and are commonly used in diet and 30 reduced-calorie products, including foods and beverages. High intensity sweeteners do not elicit a glycemic response, making them suitable for use in products targeted to diabetics and others interested in controlling their intake of carbohydrates.

Steviol glycosides are a class of compounds found in the leaves of *Stevia rebaudiana* Bertoni, a perennial shrub of the Asteraceae (Compositae) family native to certain regions of 35 South America. They are characterized structurally by a single base, steviol, differing by the presence of carbohydrate residues at positions C13 and C19. They accumulate in *Stevia* leaves, composing approximately 10% to 20% of the total dry weight. On a dry weight basis, the four major glycosides found in the leaves of *Stevia* typically include stevioside (9.1%), rebaudioside A (3.8%), rebaudiogide C (0.6-1.0%) and dulcoside A (0.3%). Other known steviol glycosides include rebaudioside B, C, D, E, F and M, steviolbioside and rubusoside.

The minor glycosylation product rebaudioside M is estimated to be about 200-350 times more potent than sucrose, and is described as possessing a clean, sweet taste with a slightly bitter or licorice aftertaste. Prakash L et al., *Development of Next Generation Stevia Sweetener: Rebaudioside M*. Foods 3(1), 162-175 (2014). RebM is of great interest to the global food industry.

Although methods are known for preparing steviol glycosides from *Stevia rebaudlana*, many of these methods are unsuitable for use commercially and/or are not sustainable. Accordingly, there remains a need for simple, efficient, and economical methods for preparing compositions comprising steviol glycosides, including highly purified steviol glycoside compositions. Further, methods are needed for producing substantial amounts of the minor glycosylation products, including products having a plurality of glycosylations, such as Reb A, Reb D, Reb E, Reb I, RebM, and others.

SUMMARY OF THE INVENTION

In various aspects, the invention provides methods for making steviol glycosides, including Reb D and RebM and glycosylation products that are minor products in *stevia* leaves, and provides enzymes, encoding polynucleotides, and host cells for use in these methods. The invention provides engineered enzymes and engineered host cells for producing steviol glycosylation products, such as Reb D and RebM, at high purity and/or yield. The invention further provides methods of making products containing steviol glycosides, where the products include food products, beverages, oral care products, sweeteners, flavoring products, among others.

In various aspects and embodiments, the invention provides enzymes, encoding polynucleotides, host cells, and methods for producing steviol glycosides having a plurality of glycosylations at C13 and/or C19. The steviol glycosides may have 2, 3, 4, 5, 6, 7, 8 or more glycosylations. In various embodiments, the glycosylations are selected from: C13-0, C19-0, 1-2' (at C-13 and/or C19 of steviol), and 1-3' (at C13 and/or C19 of steviol). Exemplary enzymes to perform these glycosylations are listed in Table 8, and include enzymes that catalyze C13-0 glycosylations of steviol (e.g., SrUGT85C2), C19-O glycosylations of steviol (e.g., SrUGT74G1), 1-2' glycosylations of steviol glycosides (e.g., SrUGT91D1, SrUGT91D2, OsUGT1-2), and 1-3' glycosylations of steviol glycosides (e.g., SrUGT76G1). Numerous derivatives that can be used in various embodiments are disclosed herein, including enzymes identified herein as MbUGTc13 (SEQ ID NO:51), MbUGTc19 (SEQ ID NO:8), MbUGTc19-2 (SEQ ID NO:46), MbUGT1-2 (SEQ ID NO:9), MbUGT1,2-2 (SEQ ID NO:45), and MbUGT1-3 (SEQ ID NO:10), and derivatives thereof. In some embodiments, the invention provides host cells that express at least 2, 3, or 4 UGT enzymes for performing these glycosylations in vivo on the steviol substrate. Various steviol glycoside products that can be produced according to embodiments of the invention are shown in FIG. 28, FIG. 29, FIG. 30, FIG. 31 and Table 10, and these include Reb M, Reb D, Reb E, and Reb I. In accordance with embodiments of the invention, these steviol glycosides can be produced at high yields in bacterial host cells, such as *E. coli*, including at temperatures suitable for *E. coli* growth and metabolism.

In some aspects, the invention provides modified UGT enzymes having an increase in 1-2' glycosylating activity at C19 of Rebaudioside A (RebA) as compared to its parent UGT enzyme, and without substantial loss of 1-2' glycosylating activity at C13 of steviolmonoside. Such enzymes can provide for increased carbon flux to RebD. Further, the invention provides modified UGT enzymes having an increase in 1-3' glycosylating activity at C19 of Rebaudioside D (RebD) as compared to its parent UGT enzyme, without substantial loss of 1-3' glycosylating activity at C13 of stevioside. Such enzymes can provide for increased carbon flux to RebM.

In accordance with the present disclosure, production of steviol glycosides is engineered in host cells through the production of various pathway modules from glycolysis to steviol, and further to steviol glycosides, and which can be optimized and balanced to promote carbon flux to steviol and then to Reb D or RebM (or other glycosylation product) as the main glycosylation product.

In another aspect, the invention provides a method for making RebD. The method comprises providing a host cell producing RebD from steviol through a plurality of uridine diphosphate dependent glycosyltransferase enzymes (UGT), and culturing the host cell under conditions for producing the RebD. The UGT enzymes comprise a modified UGT enzyme having an increase in 1-2' glycosylating activity at C19 of Rebaudioside A (RebA) as compared to its parent UGT enzyme, without substantial loss of 1-2' glycosylating activity at C13 of steviolmonoside. In certain embodiments, the 1-2' glycosylating activity at C19 of Rebaudioside A (RebA) is equal to or better than the 1-2' glycosylating activity at C13 of steviolmonoside.

In another aspect, the invention provides a method for making RebM. The method comprises providing a host cell producing RebM from steviol through a plurality of uridine diphosphate dependent glycosyltransferase enzymes (UGT), and culturing the host cell under conditions for producing the RebM. The UGT enzymes comprise one or more of: (a) a modified UGT enzyme having an increase in 1-2' glycosylating activity at C19 of Rebaudioside A (RebA) as compared to its parent UGT enzyme, without substantial loss of 1-2' glycosylating activity at C13 of steviolmonoside; and (b) a modified UGT enzyme having an increase in 1-3' glycosylating activity at C19 of Rebaudioside D (RebD) as compared to its parent UGT enzyme, without substantial loss of 1-3' glycosylating activity at C13 of stevioside. In certain embodiments, the 1-2' glycosylating activity at C19 of Rebaudioside A (RebA) is equal to or better than the 1-2' glycosylating activity at C13 of steviolmonoside. Alternatively or in addition, the 1-3' glycosylating activity at C19 of Rebaudioside D (RebD) is equal to or better than the 1-3' glycosylating activity at C13 of stevioside.

In some embodiments, the invention provides modified SrUGT76G1 enzymes, which provide for 1-3' glycosylating activity of stevioside and RebD, including enzymes having an amino acid substitution at position 200 of the wild type enzyme (e.g., L200A or L200G), which exhibit substantial improvement in activity.

In other aspects and embodiments, the invention provides circular permutants of UGT enzymes (as well as encoding polynucleotides), which can provide novel substrate specificities, product profiles, and reaction kinetics over the wild-type enzymes. The circular permutants can be expressed in host cells for production of steviol glycosides as described herein. Thus, in various embodiments the microbial cell expresses at least one UGT enzyme that is a circular permutant of a wild-type or parent UGT enzyme. A circular permutant retains the same basic fold of the parent enzyme, but has a different position of the N-terminus (e.g., "cut-site"), with the original N- and C-termini connected, optionally by a linking sequence. For example, in the circular permutants, the N-terminal Methionine is positioned at a site in the protein other than the natural N-terminus. For example, the invention provides circular permutants of OsUGT1-2 and SrUGT74G1, which can be further modified as described herein for production of glycosylation products of steviol.

In another aspect, the invention provides a method for production of steviol glycosides having at least 4 glycosylations in *E. coli*. In accordance with the invention, the *E. coli* cell comprises a plurality of UGT enzymes, which may include one or more enzymes described herein, that together perform at least 4, at least 5, or at least 6, sequential glycosylation reactions. As disclosed herein, the glycosylation substrates and lower glycosylation products accumulate in the *E. coli* cell sufficiently to allow downstream reactions to proceed at an acceptable rate, with a high majority of the glycosylation products ultimately accumulating extracellularly. The steviol glycosides can be purified from media components. Thus, *E. coli* is a desirable host for production of steviol glycosides that require several glycosylation reactions of the steviol scaffold.

In still other aspects, the invention provides methods for production of steviol glycosides (including RebM, Reb D, Reb E, Reb I, and others) in *E. coli*. While many of the enzymes known for production of steviol in host cells are plant enzymes, which often have optimal temperatures in the range of 20-24° C., *E. coli* growth rate and metabolism are optimal at higher temperatures. The present disclosure enables production of steviol glycosides at high yield in *E. coli*, by enabling enzyme productivity at temperatures above 24° C., such as from 24° C. to 37° C., or from 27° C. to 37° C., or from 30° C. to 37° C. In various embodiments, the disclosure provides alternative or engineered GGPPS, KS, CPPS, KO, and KAH enzymes for production of steviol or steviol glycosides in *E. coli* or other microbial host.

Other aspects and embodiments of the invention will be apparent from the following detailed disclosure.

DESCRIPTION OF THE FIGURES

FIG. 4A and FIG. 4B are kaurene production from CPPS/KS enzymes selected from plant *Stevia rebaudiana* (SrCPPS and SrKS) and *Physcomitrella patens* (PpCK), respectively. FIG. 4C and FIG. 4D are strains constructed with enzymes selected from fungus species *Gibberella fujikuroi* (GfCK) and *Phaeosphaeria* sp. (PsCK), respectively.

FIG. 9A, FIG. 9B, and FIG. 9C show redesign and characterization of SrKO enzyme. FIG. 9A is the N-terminal transmembrane region analysis and truncations with modifications to SrKO. FIG. 9B shows schematics of designed SrKO/SrCPR enzyme constructs. FIG. 9C shows protein expression from different engineered constructs in *E. coli*: (1) WT, (2) WT+(MA)KO-O-CPR, (3) WT+(MA)KO-O-CPR, (4) WT+(MA)KO-L-CPR, (5) WT+(MA)KO-L-CPR, (6) WT+(8RP)KO-O-CPR, (7) WT+(8RP)KO-O-CPR, (8) WT+(8RP)KO-L-CPR, (9) WT+(8RP)KO-L-CPR.

FIG. 18A shows product titers of steviol glycoside from *E. coli* culture. FIG. 18B shows LC/MS trace showing RebM identification. Negative control strain has been modified to produce steviol and increased UDP-glucose pools, while 4UGT strain is the negative control strain plus four UGTs.

FIG. 20A shows YKDDSGYSSSYAAAAGM (SEQ ID NO:48) attaching the existing sequence, FIG. 20B shows YKDAAGM (SEQ ID NO:49), creating an intermediate-length loop, and FIG. 20C shows YGSGM (SEQ ID NO:50), creating a minimal loop.

FIG. 38A and FIG. 38B show UGT alignment and secondary structure, anchored to 2VCE which is an *Arabidopsis* UGT with a solved crystal structure. Q0DPB7-ORYSJ is OsUGT1-2. Boxed is the position of the 76G1-L200A point mutation, which promotes significantly improved activity. Also shown in boxes is the conserved PSPG motif.

FIG. 43A and FIG. 43B show the panel of mutants at 34° C., and FIG. 43C shows select mutations screened for steviolmonoside production at 22, 30, and 34° C.

FIG. 44A shows activity on Steviol, and FIG. 44B shows activity on steviolbioside.

FIG. 46A shows conversion of Reb A to Reb D. FIG. 46B shows conversion of Steviolmonoside to 13C Steviolbioside.

FIG. 51A shows conversion of Reb A to Reb D. FIG. 51B shows conversion of Steviolmonoside to 13C Steviolbioside.

DETAILED DESCRIPTION OF THE INVENTION

In various aspects, the invention provides methods for making steviol glycosides, including RebM, RebD, and glycosylation products that are minor products in *stevia* leaves, and provides enzymes, encoding polynucleotides, and host cells for use in these methods. The invention provides engineered enzymes and engineered host cells for producing steviol glycosylation products at high purity and/or yield. The invention further provides methods of making products containing steviol glycosides, such as RebM or RebD, including food products, beverages, oral care products, sweeteners, flavoring products, among others. Such steviol glycoside-containing products can be made at reduced cost by virtue of this disclosure.

Figure 1:
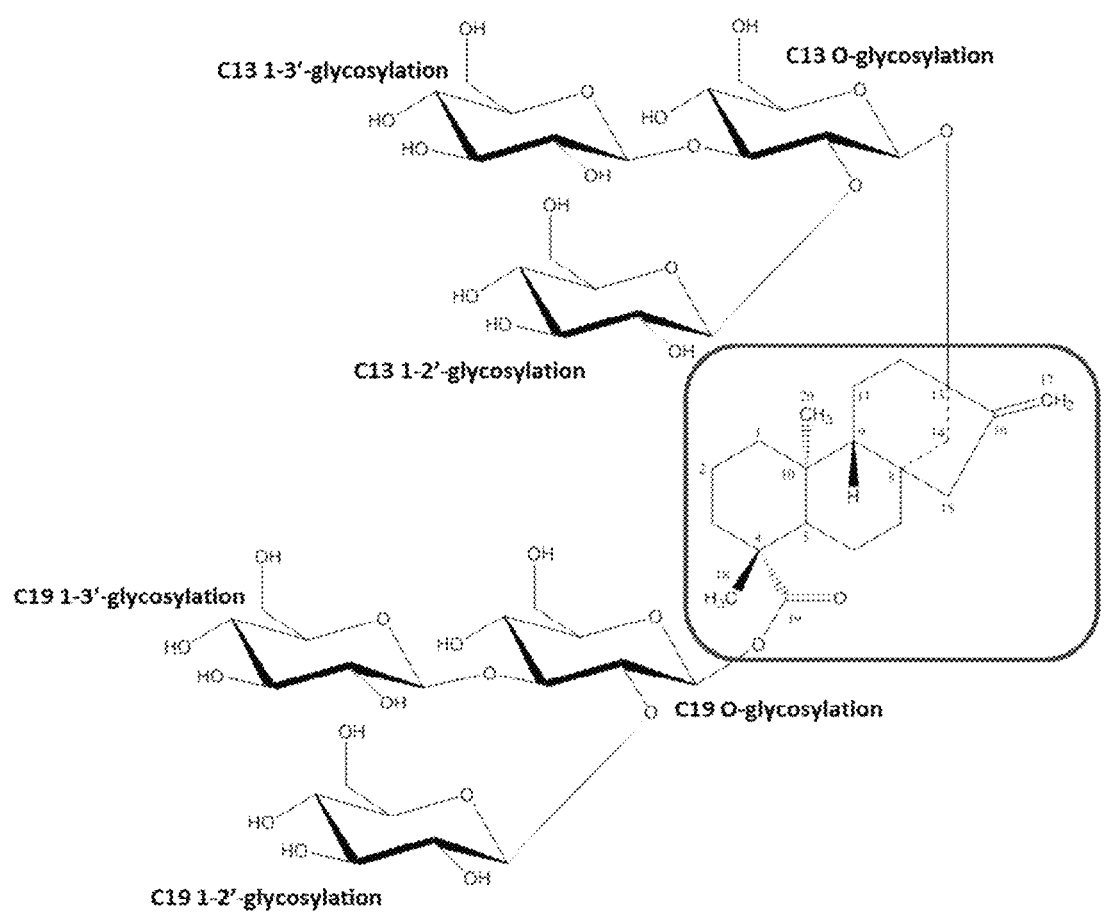
FIG. 1 shows the chemical structure of Rebaudioside M (RebM), a minor component of the steviol glycoside family, and which is a derivative of the diterpenoid steviol (box) with six glucosyl-modification groups.
Figure 3:
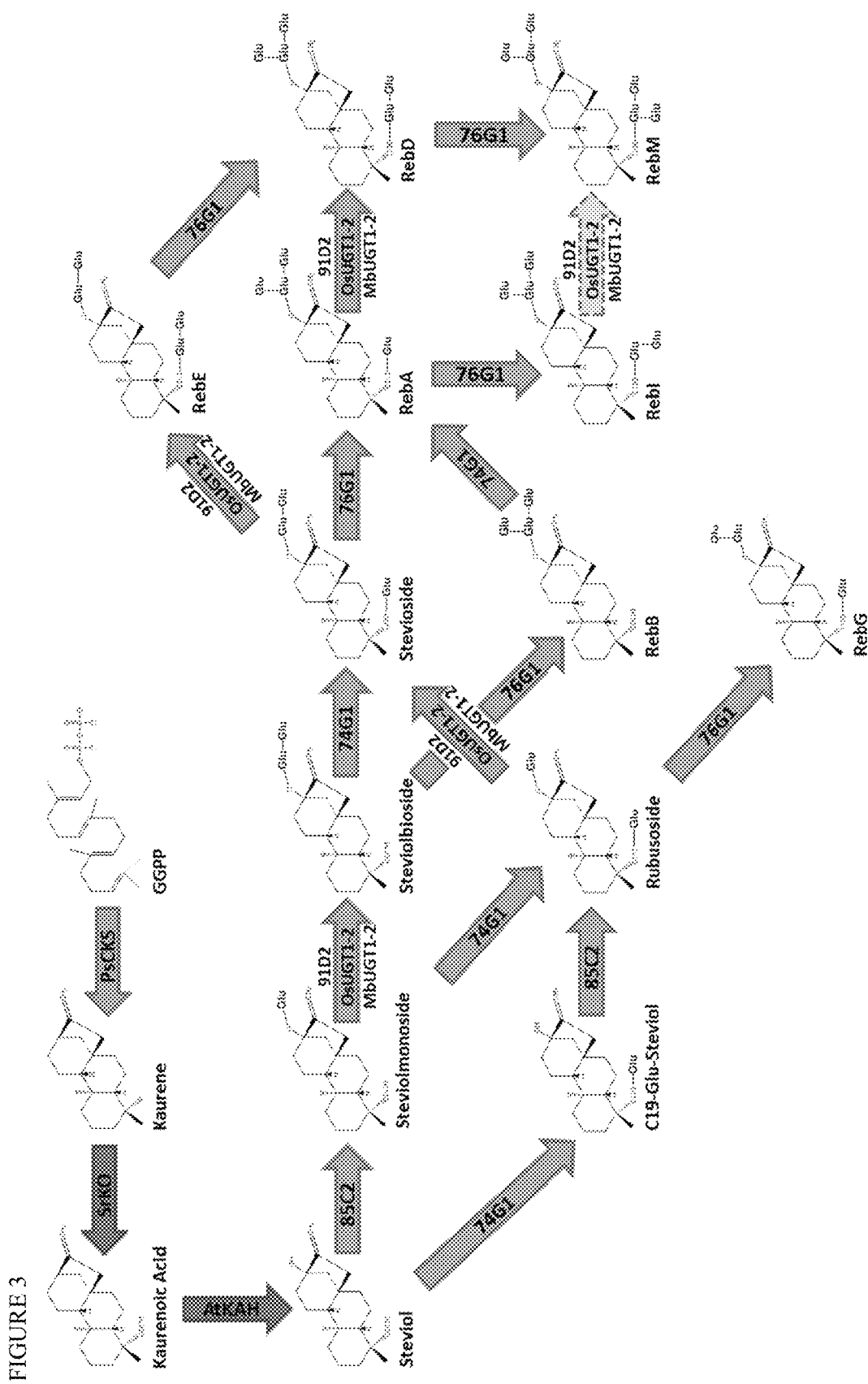
FIG. 3 shows an exemplary pathway for steviol glycoside production, including to RebM. PsCKS is a bifunctional copalyl diphosphate and kaurene synthase (from *Phaeosphaeria* sp.) which acts on geranylgeranyl diphosphate (synthesized from IPP and DMAPP by *Taxus canadensis* GGPP synthase, not shown). SrKO is *Stevia rebaudiana* kaurene oxidase and AtKAH is an *Arabidopsis thaliana* P450 with steviol monooxygenase activity. Solid arrows are known UGT activities. Arrows with dotted line borders are predicted reactions based on demonstrated activities on other substrates in vitro. MbUGT1-2 is a novel UGT enzyme designed in this disclosure.

RebM is illustrated in FIG. 1, with the steviol scaffold (a diterpenoid) shown boxed. RebM contains six glycosylations: (1) a C13 O-glycosylation, (2) a C13 1-2' glycosylation, (3) a C13 1-3' glycosylation, (4) a C19 O-glycosylation, (5) a C19 1-2' glycosylation, and (6) a C19 1-3' glycosylation. Pathways from geranylgeranyl pyrophosphate (GGPP) to RebM are illustrated in FIG. 3. GGPP produced from IPP and DMAPP (products of the MEP or MVA pathways), is converted to kaurene by the action of copalyl synthase and kaurene synthase, which can be present as a bifunctional enzyme in some embodiments. Steviol is produced from kaurene by the action of two P450 enzymes, kaurene oxidase and kaurenoic acid hydroxylase, which are regenerated by one or more P450 reductase enzymes. After production of steviol, a series of glycosylation reactions at C13 and C19 are capable of producing various steviol glycoside products, including the hexaglycosylated RebM. Various other glycosylation products are possible (as shown in FIG. 3), and as illustrated in FIG. 28, FIG. 29, FIG. 30, and FIG. 31 known UGT glycosylation enzymes are each capable of acting on a number of substrates. Thus the fidelity, relative reaction rates, expression levels, and availability of substrate will affect the relative yields of the glycosylation products. For example, both UGT91D2 and OsUGT1-2 are 1-2' glycosylating enzymes that can produce steviolbioside from steviolmonoside (by action at C13), as well as RebD from RebA (by action at C19). Further, UGT76G1 is a 1-3' glycosylating enzyme that can produce RebA from stevioside (by action at C13), as well as RebM from RebD (by action at C19). Tables 8, 9, and 10 show the various possible steviol glycosides that may result from the six glycosylation reactions, as well as enzymes for each reaction. Table 1 lists various enzymes that may be used for the production of steviol glycosides. Amino acid sequences are also provided herewith, each of which can optionally include an alanine inserted or substituted at position 2 to decrease turnover in the cell. Certain GGPPS sequences further contain two additional residues (VD) at the end of the sequence, which are not believed to have any deleterious effect, and may be omitted in certain embodiments.

Thus, in some aspects, the invention provides enzymes, encoding polynucleotides, and host cells engineered for maximizing the production of the desired steviol glycoside (e.g., RebM). For example, this disclosure provides modified UGT enzymes having an increase in 1-2' glycosylating activity at C19 of Rebaudioside A (RebA) as compared to the parent UGT enzyme, and without substantial loss of 1-2' glycosylating activity at C13 of steviolmonoside. Such enzymes may provide for increased carbon flux to RebD. Further, this disclosure provides modified UGT enzymes having an increase in 1-3' glycosylating activity at C19 of Rebaudioside D (RebD) as compared to the parent UGT enzyme, without substantial loss of 1-3' glycosylating activity at C13 of stevioside. Such enzymes may provide for increased carbon flux to RebM. In some aspects and embodiments, and without wishing to be bound by theory, the invention provides for modified UGT enzymes with substrate binding pockets that are better able to accommodate substrates (including larger substrates), thereby increasing the rate of activity (e.g., rate of substrate binding and turnover) with more highly glycosylated steviol substrates such as RebA or RebD.

The invention in some aspects provides for a controlled glycosylation pathway that produces largely RebM as a glycosylation product. For example, in some embodiments, the invention provides a method for making RebM in microbial cells, where the RebM:RebD ratio is greater than about 1:1, or greater than about 1:0.5, or greater than about 1:0.25, or greater than about 10:1, or greater than about 25:1, or greater than about 50:1. In some embodiments, RebD is produced at less than about 20%, or at less than about 10%, or at less than about 5%, or at less than about 1% of the RebM yield, or is not detectable in the isolated steviol glycosylation products. Because RebD can be difficult to separate from RebM, or can add significant purification costs if such separation is necessary, products with low levels of RebD are desirable in some embodiments. In some embodiments, RebM represents at least about 25% by weight of the steviol glycosylation products produced by the cell, or at least about 50% by weight of the glycosylation products, or at least about 75% by weight of the glycosylation products, or at least about 80% by weight of the glycosylation products, or at least about 85% by weight of the glycosylation products, or at least about 90% by weight of the glycosylation products, or at least about 95% by weight of the steviol glycosylation products.

The glycosylation pathways involve a 13-0 glycosylation, a 19-O glycosylation, as well as one or more 1-2' glycosylations and/or one or more 1-3' glycosylations at C13 and/or C19 of steviol. The term "steviol glycoside(s)" refers to a glycoside of steviol, including, but not limited to, steviolmonoside, steviolbioside, rubusoside, dulcoside B, dulcoside A, rebaudioside B, rebaudioside G, stevioside, rebaudioside C, rebaudioside F, rebaudioside A, rebaudioside E, rebaudioside H, rebaudioside L, rebaudioside K, rebaudioside J, rebaudioside M, rebaudioside D, rebaudioside N, rebaudioside O. The chemical identities of these steviol glycosides are known, and are described for example, in Table 10, as well as in WO 2014/122227, which is hereby incorporated by reference in its entirety.

Figure 2:
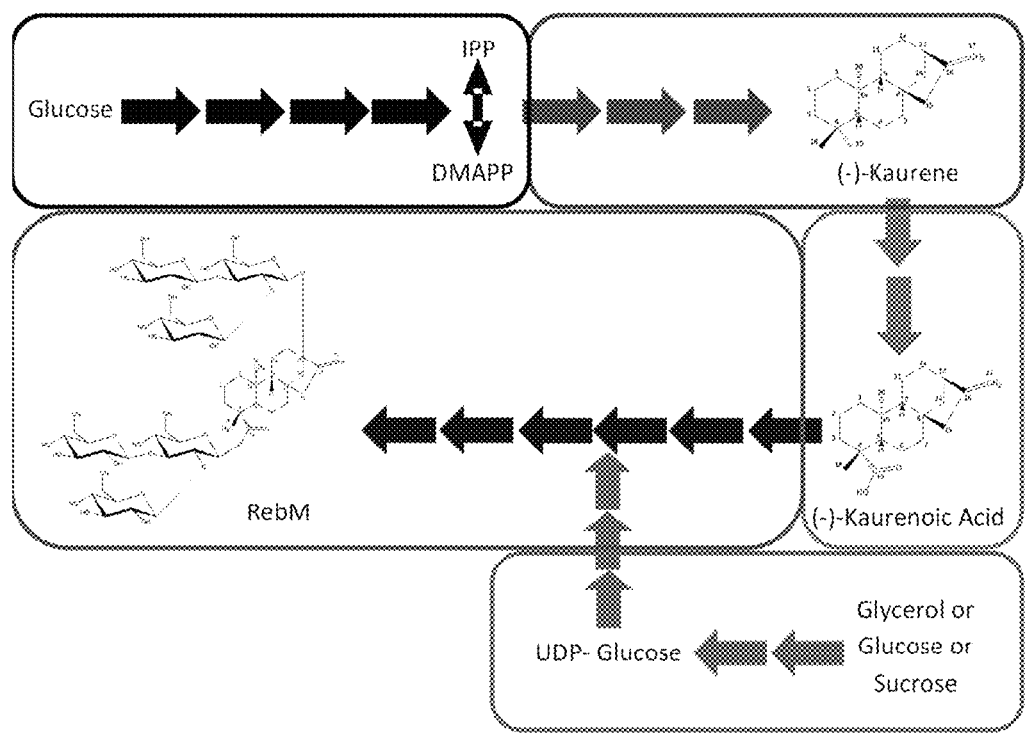
FIG. 2 shows pathway modules to RebM. Glycolysis and MEP pathways are treated as one module, and the downstream kaurene biosynthesis pathway is shown as the second module. Biosynthesis of steviol is shown as the third module. The fourth module is for the glycosylation of steviol and the RebM biosynthetic pathway. The fifth module to support enhanced UDP-glucose production is also shown.

In accordance with the present disclosure, production of steviol glycosides is engineered in host cells through the production of various pathway "modules," as illustrated in FIG. 2, and which can be optimized and balanced to promote carbon flux to steviol and then a desired glycosylation product (such as RebM or RebD) as the main glycosylation product. By grouping enzymes with similar turnovers into a subset, or module, and equalizing the turnover of the different subsets by adjusting concentrations/activities of enzymes, the ratio of pathway turnover to resource expenditure can be optimized.

The first pathway module comprises enzymes in the MEP or MVA pathways, which produce IPP and DMAPP. The MEP and MVA pathways may be endogenous to the organism, and these pathways may be increased and balanced with downstream pathways by providing duplicate copies of certain rate-limiting enzymes. IPP and DMAPP act as a substrate for the production of (−)-kaurene (e.g., by separate copalyl synthase and kaurene synthase enzymes, or a bifunctional enzyme), which is the second pathway module. A third pathway module converts (−)-kaurenoic acid to steviol by the action of two P450 enzymes (e.g., kaurene oxidase (KO) and kaurenoic acid hydroxylase (KAH)) and one or more P450 reductase enzymes. Exemplary enzymes that catalyze production of GGPP and its conversion through to steviol are listed in Table 1. Steviol is then glycosylated to the final product by a UDP enzyme module. An additional module includes genes that enhance production of the UDP-glucose substrate. In various embodiments of the invention, these modules are each present as mono- or poly-cistronic operons, which are each harbored on plasmids or are chromosomally integrated. In certain embodiments, the modules are configured for increased production of the desired end-product.

In one aspect, the invention provides a method for making a steviol glycoside, which is optionally RebM or RebD. The method comprises providing a host cell producing the steviol glycoside from steviol through a plurality of uridine diphosphate dependent glycosyltransferase enzymes (UGT), and culturing the host cell under conditions for producing the steviol glycoside. The UGT enzymes comprise one or more of: (a) a modified UGT enzyme having an increase in 1-2' glycosylating activity at C19 of Rebaudioside A (RebA) as compared to its parent UGT enzyme, without substantial loss of 1-2' glycosylating activity at C13 of steviolmonoside (e.g., when evaluated at 22° C., 27° C., or 30° C.); and (b) a modified UGT enzyme having an increase in 1-3' glycosylating activity at C19 of Rebaudioside D (RebD) as compared to its parent UGT enzyme, without substantial loss of 1-3' glycosylating activity at C13 of stevioside (e.g., when evaluated at 22° C., 27° C., or 30° C.).

In certain embodiments, the 1-2' glycosylating activity at C19 of Rebaudioside A (RebA) is equal to or better than the 1-2' glycosylating activity at C13 of steviolmonoside. Alternatively or in addition, the 1-3' glycosylating activity at C19 of Rebaudioside D (RebD) is equal to or better than the 1-3' glycosylating activity at C13 of stevioside.

In some embodiments, the modified UGT enzyme having 1-2' glycosylating activity and/or the UGT enzyme having 1-3' glycosylating activity does not exhibit a substantial loss of activity at C13, as compared to the parent enzyme. For example, the modified enzyme retains at least 50% of its activity at C13, or at least about 75% of its activity at C13, or at least about 80%, at least about 90%, or at least about 95% of its activity at C13 as compared to the parent (e.g., wild-type) enzyme (e.g., when evaluated at 22° C., 27° C., or 30° C.). In some embodiments, the enzyme has improved activity at C13, such as at least 2-fold or at least 3-fold improved activity at C13. The loss of, or improvement in, a glycosylation activity can be determined in vitro, for example in cell extracts with the substrate of interest added, or other in vitro or in vivo assay. For example, relative reaction rates may be determined in a strain that produces the steviol or steviol glycoside substrate(s) of interest. Exemplary assays for quantifying glycosylation activity are disclosed herein as well as in WO 2014/122227, which is hereby incorporated by reference.

While in some embodiments, the 1-2' and 1-3' glycosylation activities at C13 are sufficiently functional with the enzyme that performs these reactions at C19 (e.g., without any additional enzyme to perform these enzymatic steps), in other embodiments, the cell further expresses an enzyme to perform 1-2' and/or 1-3' glycosylation at C13. In some embodiments, a second enzyme is engineered to perform the 1-2' and/or 1-3' reactions at C13, even with loss of activity at C19.

In some embodiments, the cell expresses only one UGT enzyme having 1-2' glycosylating activity at C13 of steviolmonoside, and/or expresses only one UGT enzyme having 1-3' glycosylating activity at C13 of stevioside. In such embodiments, the enzyme can be engineered to enhance the reaction at C19, thereby pulling product toward C19 glycosylation products such as RebM, without the need for expression of additional enzymes that place a further metabolic burden on the cell.

In aspects and embodiments, the invention provides circular permutants of UGT enzymes (as well as encoding polynucleotides and methods of making circular permutants of UGT enzymes), which can provide novel substrate specificities, product profiles, and reaction kinetics over the parent (e.g., wild-type) enzymes. Without wishing to be bound by theory, circular permutants provide the opportunity to make the UGT binding pocket more open or accessible for larger substrates, such as steviol substrates having one or more glycosyl groups. In this manner, the invention allows for the glycosylation reactions on more glycosylated forms of steviol to proceed at rates similar to or even greater than reactions on less glycosylated (and thus smaller) substrates. The circular permutants can be expressed in host cells for production of steviol glycosides as described herein. Thus, in various embodiments the microbial cell producing the steviol glycoside (e.g., RebM or RebD) expresses at least one UGT enzyme that is a circular permutant of a parent (e.g., wild-type) UGT enzyme.

Figure 20A:
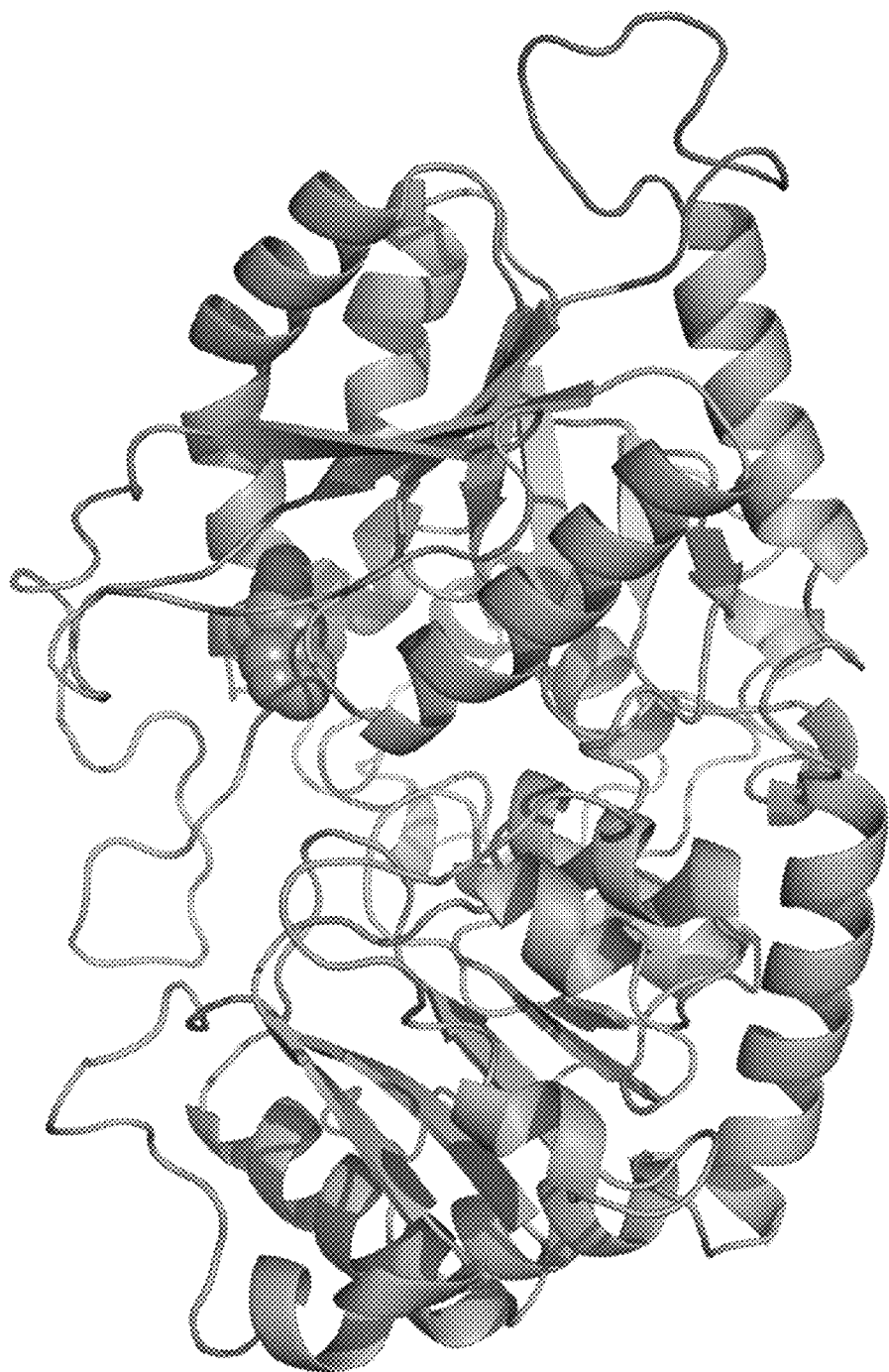
FIG. 20A, FIG. 20B, and FIG. 20C show linkers for UGT circular permutants, to connect the natural N and C-termini. Three different linkers are shown.
Figure 20B:
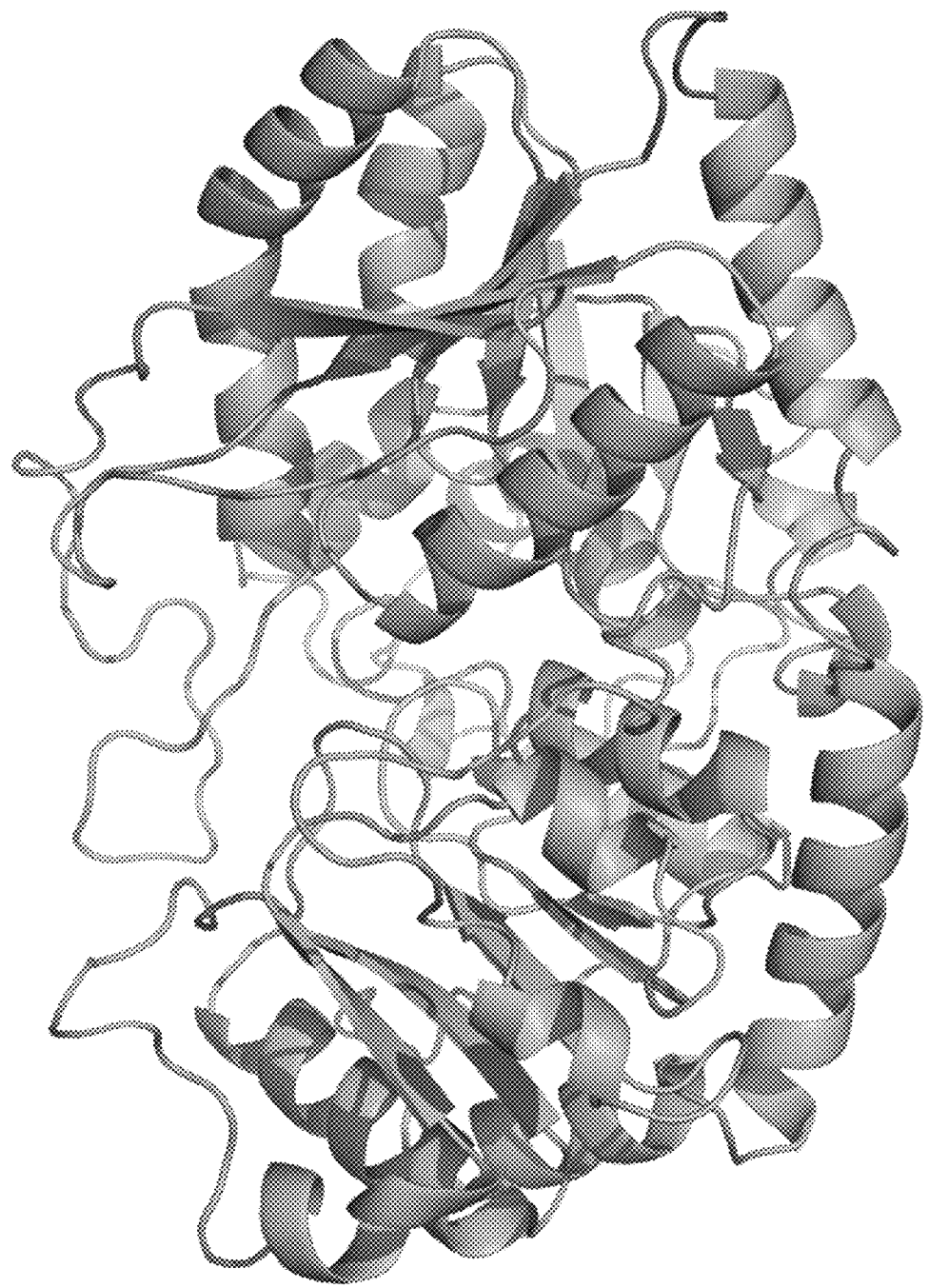
Figure 20C:
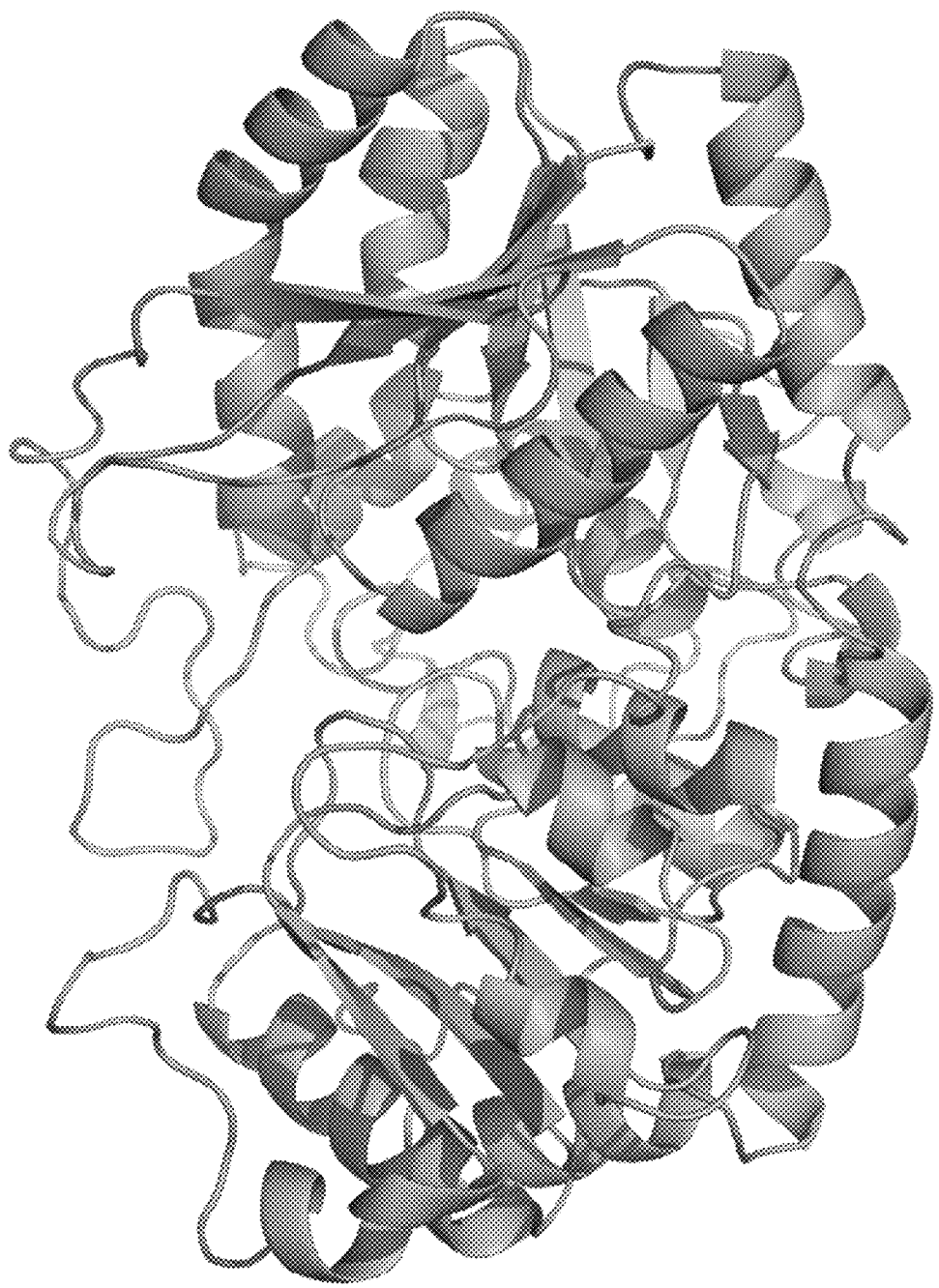
Figure 38A:
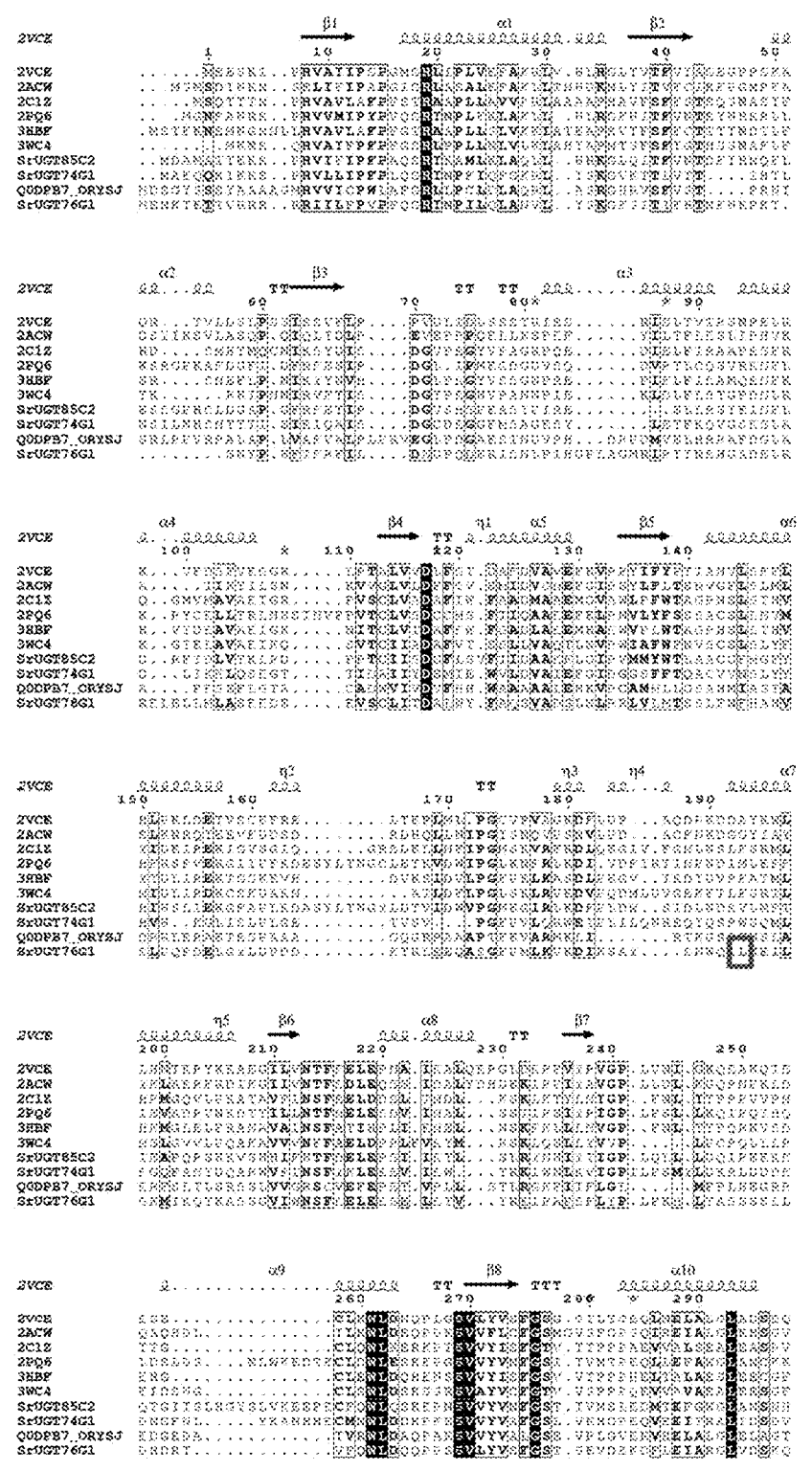
Figure 38B:
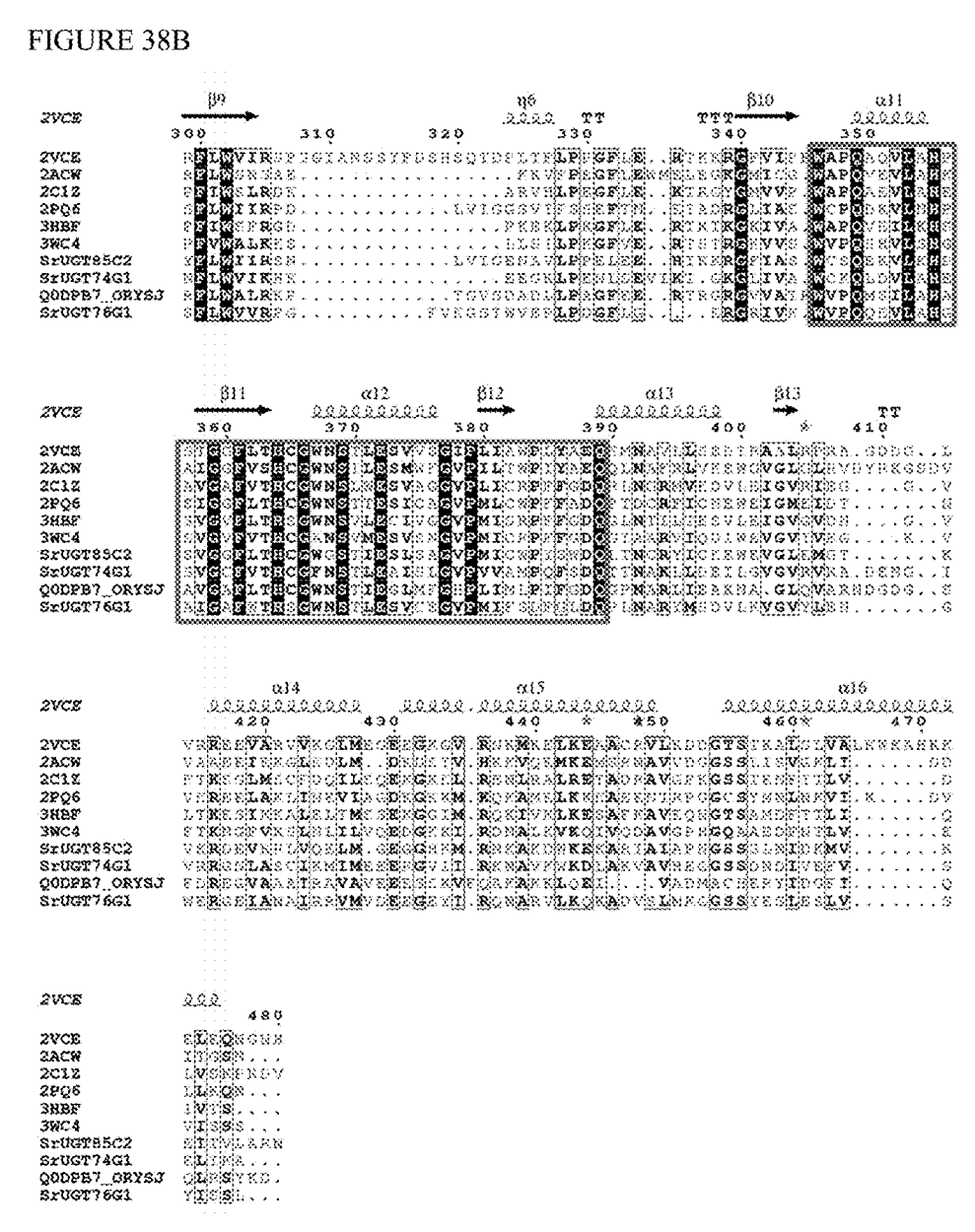

A circular permutant retains the same basic fold of the parent enzyme, but has a different position of the natural N-terminus (e.g., "cut-site"), with the original N- and C-termini connected, optionally by a linking sequence. An exemplary structure of a UGT enzyme (e.g., based on OsUGT1-2) is shown in FIG. 20A, FIG. 20B, and FIG. 20C. A UGT alignment and secondary structure elements are shown in FIG. 38A and FIG. 38B. For each circular permutant, the cut-site can be described with reference to the corresponding position of the parent sequence (e.g., wild-type sequence), by alignment of the permutant's N-terminal amino acids (e.g., N-terminal 50 or 100 amino acids) with the parent or wild-type sequence. As used herein, the "cut site" of a given circular permutant refers to the original position of the amino acid that is positioned at position 2 in the circular permutant (e.g., after the initiating Met), or position 3 of the circular permutant when an Alanine is inserted at position 2 to decrease protein turnover. Alignments for comparing global UGT sequences should be anchored around the conserved PSPG motif shown in FIG. 38A and FIG. 38B. The PSPG (plant secondary product glycosyltransferase) motif is a conserved region within plant UGTs that plays a role in binding the nucleotide-diphosphate-sugar donor molecule. Gachon et al., *Plant secondary metabolism glycosyltransferases: the emerging functional analysis Trends Plant Sci.* 10:542-549 (2005). The most conserved residues in this motif in the UDPGT family show the pattern: WXPQXXXLXHXXXXAFXXHXGXXXXXEXXXXGXP XXXXPXFXXQ, of which the underlined histidine makes a critical contact to the diphosphate region. Finn R D, et al. Pfam: the protein families database, *Nucleic Acids Res.* 42:D222-230 (2014). Further, alignment around this motif is useful for describing point mutations that translate to beneficial properties for the UGT proteins as a class. For example, anchoring alignments to the tryptophan at the beginning of the motif or the important histidine in the middle, may be used to describe point mutations relative to this sequence, which will be universal in plant GT1 UDP-glucose glycosyltransferases.

In some embodiments, the circular permutant is a circular permutant of UGT85C2 from *Stevia rebaudiana*. SrUGT85C2 is provided herein as SEQ ID NO:1. In some embodiments, the circular permutant is a circular permutant of OsUGT1-2 (SEQ ID NO:7). In some embodiments, the circular permutant is of UGT91D2 of *Stevia rebaudiana* (SEQ ID NO:5). In some embodiments, the circular permutant is of UGT74G1 of *Stevia rebaudiana* (SEQ ID NO:2). In some embodiments, the circular permutant is of UGT76G1 of *Stevia rebaudiana* (SEQ ID NO:3). In this manner, by changing the position of the N-terminus of the UGT enzyme, enzymes with novel substrate specificities and activity profiles can be created. For example, in some embodiments, the cut site is between amino acids 150 to 300, or in some embodiments between amino acids 190 and 260, or in some embodiments between residues 190 and 210, when the N-terminus of the circular permutant (e.g., N-terminal 50 amino acids) is aligned with the parent or wild-type enzyme. In other embodiments, the circular permutant has a cut site between amino acids 245 and 280 (e.g., position 272), or between amino acids 260 to 275, when the N-terminal 50 amino acids of the circular permutant are aligned with the parent or wild-type enzyme. In some embodiments, the new N-terminus is placed between local secondary structure elements (such as α-helices or β-sheets), and/or is placed at a loop structure of the wild-type enzyme. When selecting the desired position of the N-terminus, a Met is added to the cut-site as the initiating amino acid, and an Ala is optionally placed at the second position to decrease cellular turnover. The natural N and C-termini are linked, optionally with a linking sequence. Generally, the linking sequence is selected to provide flexibility (e.g., no defined secondary structure other than a potential loop), for example, using a sequence consisting predominately or essentially of Gly, Ser, and/or Ala. In some embodiments, the linking amino acid sequence is from about 2 to about 25 amino acids in length, which may form a loop. The circular permutant may further comprise from 1 to about 30, or from about 1 to about 20, or from 1 to about 10, or from 1 to about 5 amino acid substitutions, deletions, or insertions with respect to the corresponding position of the parent or wild-type enzyme (e.g., based on the highest score local alignment). In some embodiments, the natural N-terminal Met is maintained at its new position in the molecule, or in other embodiments is deleted.

In some embodiments, at least one UGT enzyme is a chimeric UGT enzyme, in which the N-terminal domain of one UGT is combined with the C-terminal domain of a different UGT enzyme. For example, the N-terminal and C-terminal domains are of two different enzymes selected from Table 9, and each domain may further comprise from one to ten amino acid substitutions, deletions, and/or insertions relative to the parent domain sequence. UGTs have two domains, a more variable N-terminal substrate binding (sugar acceptor) domain and a more conserved C-terminal UDP-glucose binding (sugar donor) domain. The N-terminal domain is mostly determinant of substrate specificity for the enzyme, but some specificity is controlled by the C-terminal domain. Each of these domains makes up roughly half of the protein.

In some embodiments, the UGT enzyme having 1-2' glycosylating activity is OsUGT1-2 (SEQ ID NO:7), SrUGT91D2 (SEQ ID NO:5), SrUGT91D1 (SEQ ID NO:4), SrUGT91D2e (SEQ ID NO:6) (see Table 9) or derivative thereof. In some embodiments, the derivative has increased glycosylating activity at C19 of RebA. The UGT enzyme may generally have a level of identity that is greater than about 50%, greater than about 60%, greater than about 70%, greater than about 80%, greater than about 90%, or greater than about 95%, or greater than about 96, 97, 98, or 99% to one or more of OsUGT1-2, SrUGT91D2, SrUGT91D1, and SrUGT91D2e.

The similarity or identity of nucleotide and amino acid sequences, i.e. the percentage of sequence identity, can be determined via sequence alignments. Such alignments can be carried out with several art-known algorithms, such as with the mathematical algorithm of Karlin and Altschul (Karlin & Altschul (1993) Proc. Natl. Acad. Sci. USA 90: 5873-5877), with hmmalign (HMMER package, http://hmmer.wustl.edu/) or with the CLUSTAL algorithm (Thompson, J. D., Higgins, D. G. & Gibson, T. J. (1994) Nucleic Acids Res. 22, 4673-80). The grade of sequence identity (sequence matching) may be calculated using e.g. BLAST, BLAT or BlastZ (or BlastX). A similar algorithm is incorporated into the BLASTN and BLASTP programs of Altschul et al (1990) J. Mol. Biol. 215: 403-410. BLAST polynucleotide searches can be performed with the BLASTN program, score=100, word length=12.

BLAST protein searches may be performed with the BLASTP program, score=50, word length=3. To obtain gapped alignments for comparative purposes, Gapped BLAST is utilized as described in Altschul et al (1997) Nucleic Acids Res. 25: 3389-3402. When utilizing BLAST and Gapped BLAST programs, the default parameters of the respective programs are used. Sequence matching analysis may be supplemented by established homology mapping techniques like Shuffle-LAGAN (Brudno M., Bioinformatics 2003b, 19 Suppl 1:154-162) or Markov random fields.

In some embodiments the UGT enzyme having 1-2' glycosylating activity is OsUGT1-2 or derivative thereof, and which is optionally a circular permutant of OsUGT1-2 comprising one or more amino acid substitutions, deletions, and/or insertions that increase 1-2' glycosylating activity at C19 of RebA. For example, the 1-2' glycosylating enzyme may have a cut site that aligns with or corresponds to a position within amino acids 190 to 210 of OsUGT1-2 (SEQ ID NO:7), and may be a position within amino acids 194 to 200 of SEQ ID NO:7 in some embodiments, such as position 195, 196, 197, or 199. The circular permutant may optionally have a linker sequence between the amino acids that correspond to the N-terminal and C-terminal residues of OsUGT1-2. The linker may vary in length, such as in the range of 2 to about 25 amino acids. For example, the linker may be from about 8 to about 20 amino acids in length, such as about 17 amino acids in some embodiments. In some embodiments, the circular permutant does not contain any linking sequence. The circular permutant may further contain from 1 to 20, or from 1 to 10, or from 1 to 5 amino acid substitutions, additions, or deletions from the wild-type sequence (determined by local alignment of the mutated sequence to OsUGT1-2). In some embodiments, an Ala is inserted or substituted at position 2 to decrease enzyme turnover in the cell. In some embodiments, the mutations collectively increase 1-2' glycosylating activity at C19 of RebA (e.g., when evaluated at 22° C., 27° C., or 30° C.).

In some embodiments, the UGT enzyme having 1-2' glycosylating activity is a circular permutant of OsUGT1-2, with a cut-site corresponding to position 195, 196, 197, 198, or 199 of OsUGT1-2. An exemplary circular permutant, named MbUGT1-2, is disclosed herein. The circular permutant may have amino acid substitutions at one or more of positions corresponding to positions 14, 16, 89, 185, 365, 366, 395, 396, 417, 420, 421, 422, 424, 427, 428, 430, 431, 432, 434 and/or 463 of the wild-type enzyme. In some embodiments, the circular permutant has an amino acid substitution at position 14, and such substitution may be an aromatic amino acid, such as Trp or Tyr. In these or other embodiments, the circular permutant has an amino acid substitution at position 366, and the substituted amino acid is optionally Pro. In these or other embodiments, the circular permutant has an amino acid substitution at position 420, and the substituted amino acid is optionally Glu. In these or other embodiments, the circular permutant has an amino acid substitution at position 421, and the substituted amino acid is optionally Phe. In these or other embodiments, the circular permutant has an amino acid substitution at position 424, and the substituted amino acid is optionally Asp. In these or other embodiments, the circular permutant has an amino acid substitution at position 427, and the substituted amino acid is optionally Glu. In these or other embodiments, the circular permutant has an amino acid substitution at position 428, and the substituted amino acid is optionally Glu. In these or other embodiments, the circular permutant has an amino acid substitution at position 432, and the substituted amino acid is optionally Tyr, His, Trp, Asp, or Glu. In some embodiments, the enzyme contains an insertion of from 2-5 amino acids between amino acids 424 and 427, such as the sequence Gly-Pro-Ser. In some embodiments, the UGT having 1-2' glycosylating activity comprises the amino acid sequence of SEQ ID NO:9 (MbUGT1-2), or an enzyme having at least about 50% identity, at least about 60% identity, at least about 70% identity, at least about 80% identity, at least about 85% identity, or at least about 90% identity, or at least about 95% identity, or at least 96%, 97%, 98% or 99% identity to SEQ ID NO:9, and having 1-2' glycosylating activity at one or more of C19 of RebA or C13 of steviolmonoside.

In some embodiments, the UGT enzyme having 1-2' glycosylating activity is a circular permutant of OsUGT1-2, with a cut site corresponding to position 196 of OsUGT1-2. An exemplary circular permutant, named MbUGT1,2-2 (SEQ ID NO:45), is disclosed herein. The circular permutant has amino acid substitutions at one or more of positions 16, 422, 430, and 434 of the wild-type enzyme. In some embodiments, the circular permutant has an amino acid substitution at position 16, and such substitution may be an aromatic amino acid, such as Trp. In these or other embodiments, the circular permutant has an amino acid substitution at position 422, and the substituted amino acid is optionally Glu. In these or other embodiments, the circular permutant has an amino acid substitution at position 430, and the substituted amino acid is optionally Glu. In these or other embodiments, the circular permutant has an amino acid substitution at position 434, and the substituted amino acid is optionally His. In some embodiments, the enzyme does not contain any linking sequence between the natural N- and C-termini amino acids, and the natural N-terminal Met may be optionally deleted. In some embodiments, the UGT having 1-2' glycosylating activity comprises the amino acid sequence of SEQ ID NO:45, or an enzyme having at least about 50% identity, at least about 60% identity, at least about 70% identity, at least about 80% identity, at least about 85% identity, or at least about 90% identity, or at least about 95% identity, or at least 96%, 97%, 98% or 99% identity to SEQ ID NO:45, and having 1-2' glycosylating activity at one or more of C19 of RebA or C13 of steviolmonoside.

In some embodiments, the UGT enzyme having 1-3' glycosylating activity is SrUGT76G1, or derivative thereof having the same or increased glycosylation activity at C19 of RebD or C13 of stevioside. In some embodiments, the UGT enzyme having 1-3' glycosylating activity is a derivative of SrUGT76G1 that includes an amino acid substitution at one or more of positions 77, 78, 81, 82, 93, 94, 155, 192, 200, 202, 205, 283, 284, 379, and 397 of SEQ ID NO: 3 (see Table 13). In some embodiments, the derivative has an amino acid substitution at position L200 (numbered according to the wild type enzyme), and which is optionally Ala or Gly. In these embodiments, the derivative may further have an amino acid substitution at position 284 (e.g., Ala) and/or 379 (e.g., Gly), and/or 192 (e.g., Ala). In some embodiments, an Ala is inserted or substituted at position 2 to decrease turnover in the cell. In some embodiments, the UGT enzyme has at least about 80% identity, at least about 85% identity, at least about 90% identity, or at least about 95%, 96%, 97%, 98%, or 99% identity to SEQ ID NO: 3, with the proviso that the amino acid corresponding to position 200 of SEQ ID NO:3 is Ala or Gly. As shown in Table 13, the substitution of L200A or L200G provides for large improvements in activity at both C19 and C13.

Additional modification to UGT76G1 include modification at one or more of positions 22, 25, 145, 154, 256, and 282, such as one or more of Q22G, Q22H, 125F, 125W, T145A, T145G, T145P, H154R, L256P, L256W, L256T, L256G, L256A, L256R, L256E, S281G and S282N. These modifications are disclosed in WO 2014/122227, which is hereby incorporated by reference. In some embodiments, these additional modifications to UGT76G1 exhibit superior properties in combination with the modifications at positions 77, 78, 81, 82, 83, 93, 94, 155, 192, 200, 202, 205, 283, 284, 378, 379, and 397.

In some embodiments, the UGT enzyme having 1-3' glycosylating activity is a circular permutant of SrUGT76G1, with a cut-site corresponding to a position within amino acids 170 to 290 (e.g, 190-210, 196-200 or 260-280) of SrUGT76G1. In some embodiments, the cut site corresponds to position 196 or 264 of the wild-type enzyme. The circular permutant (e.g., MbUGT1-3), may have from 1 to 30, or from 1 to 20, or from 1 to 10, or from 1 to 5 amino acid substitutions, deletions, and/or insertions with respect to the corresponding position of the wild-type sequence. In some embodiments, the UGT having 1-3' glycosylating activity comprises the amino acid sequence of SEQ ID NO: 10 (MbUGT1-3), or comprises an amino acid sequence having at least about 50% identity, at least about 60% identity, at least about 70% identity, at least about 80% identity, at least about 85% identity, or at least about 90% identity, or at least about 95% identity, or at least 96%, 97%, 98% or 99% identity to SEQ ID NO: 10, and having 1-3' glycosylating activity at one or more of C19 of RebD or C13 of stevioside. In some embodiments, Ala is substituted or inserted at position 2 to decrease turnover in the cell.

In various embodiments, the host cell or method of the invention further involves a UGT enzyme that converts steviol to steviolmonoside. In some embodiments, the UGT enzyme that converts steviol to steviolmonoside is SrUGT85C2, or derivative thereof. In some embodiments, the enzyme contains from 1 to about 50, or from 1 to about 20, or from 1 to about 10 amino acid substitutions, deletions, and/or insertions with respect to SEQ ID NO: 1. For example, the derivative may have at least about 65% identity, or at least about 70% identity, or at least about 80% identity to SEQ ID NO: 1, or at least 90% identity to SEQ ID NO: 1, or at least 95%, 96%, 97%, 98%, or 99% identity to SEQ ID NO: 1, while maintaining the same or similar activity for converting steviol to steviolmonoside (e.g., in vitro or in vivo). Exemplary amino acid modifications are shown in Table 11. In some embodiments, the enzyme that converts steviol to steviolmonoside is a derivative of SrUGT85C2 having an amino acid substitution at position 215 of the wild type enzyme. In some embodiments, the amino acid at the position corresponding to 215 of the wild type enzyme is threonine, serine, glycine, or alanine (the wild type amino acid is Proline). In some embodiments, the amino acid at said position 215 is threonine. In these or other embodiments, the derivative of SrUGT85C2 has a mutation at one or more of positions 308, 311, 316, 349, and/or 414 (numbered in accordance with the wild type enzyme. In some embodiments, the amino acid at position 308 is threonine, and/or the amino acid at position 311 is glutamine, and/or the amino acid at position 316 is alanine, and/or the amino acid at position 349 is glutamic acid, and/or the amino acid at position 414 is glycine. In some embodiments, an Ala is inserted or substituted at the second position to limit turnover in the cell.

In various embodiments, the host cell or method further involves a UGT enzyme that converts steviolbioside to stevioside, which in some embodiments is SrUGT74G1, or derivative thereof. In some embodiments, the enzyme contains from 1 to about 50, or from 1 to about 20, or from 1 to 10 amino acid substitutions, deletions, and/or insertions with respect to SEQ ID NO: 2. For example, the derivative may have at least 80% identity to SEQ ID NO: 2, at least 90% identity to SEQ ID NO: 2, or at least 95%, 96%, 97%, 98%, or 99% identity to SEQ ID NO: 2, while maintaining the same or similar activity for converting steviolbioside to stevioside (e.g., in vitro or in vivo).

In some embodiments, the UGT enzyme that converts steviolbioside to stevioside is a circular permutant of SrUGT74G1 (e.g., MbUGTC19). In some embodiments, the circular permutant has a cut site corresponding to an amino acid within positions 180 to 280 (e.g., 250 to 270) of SrUGT74G1. The circular permutant may have a linking sequence between the original N- and C-termini of from 1 to 10 amino acids (e.g., GSG). The circular permutant may have from 1 to 30, or from 1 to 20, or from 1 to 10, or from 1 to 5 amino acid substitutions, deletions, and/or insertions with respect to the corresponding position of the wild-type sequence. In some embodiments, the SrUGT7401 circular permutant comprises the amino acid sequence of SEQ ID NO: 8 (MbUGTC19) or SEQ ID NO: 46 (MbUGTC19-2), or comprises an amino acid sequence having at least about 50% identity, at least about 60% identity, at least about 70% identity, at least about 80% identity, at least about 85% identity, or at least about 90% identity, or at least about 95% identity, or at least 96%, 97%, 98% or 99% identity to SEQ ID NO: 8 or 46, and having activity for converting steviolbioside to stevioside.

In some embodiments, the host cell produces steviol substrate through one or more pathway modules comprising a kaurene synthase (KS), kaurene oxidase (KO), and a kaurenoic acid hydroxylase (KAH), the host cell further comprising a cytochrome P450 reductase (CPR) for regenerating one or more of the KO and KAH enzymes. In some embodiments, the KAH is KAH of *Stevia rebaudiana, Arabidopsis thaliana, Vitis vinifera*, or *Medicago trunculata*, or a derivative thereof (e.g., having at least 80%, or at least 90%, or at least 95%, or at least 97% sequence identity to the wild type sequence). In some embodiments, the KAH is an *Arabidopsis thaliana* KAH (AtKAH), or derivative thereof. The AtKAH may have one or more amino acid substitutions, insertions, and/or deletions that increase the rate of kaurenoic acid hydroxylase activity or otherwise improve enzyme productivity or expression, including for example an N-terminus engineered for functional expression in *E. coli*. In some embodiments, the AtKAH has an amino acid substitution at one or more positions (e.g., two-ten positions) of the parent sequence of SEQ ID NO:29 as shown in Table 6 that increases production of steviol or kaurenoic acid. Exemplary substitutions include substitutions corresponding to the following positions of SEQ ID NO:29: 25 (e.g., A25L), 79 (e.g., S79T), 119 (e.g., T119C), 137 (e.g., I137L), 142 (e.g., I142V), 155 (e.g., R155K), 180 (e.g., M180L), 193 (e.g., E193G), 196 (e.g. C196A), 197 (e.g., D197E), 226 (A226E), 235 (e.g., L235Q), 238 (e.g., I238M), 245 (F245L, F245V), 272 (e.g., L272I), 285 (e.g., I285R), 287 (e.g., C287S), 325 (e.g., C325I, C325M), 330 (e.g., F330L), 334 (e.g., D334E), 339 (e.g., S339T), 352 (e.g., S352E), 373 (e.g., E373D), 397 (e.g., 1397F), 470 (e.g., V470L), 499 (e.g., Q499V), 506 (e.g., L506M), 507 (e.g., L507I, L507T, L507V). In some embodiments, the AtKAH enzyme is a derivative having an amino acid substitution at position 331 (with respect to the wild type sequence), which in some embodiments, improves the productivity of the enzyme at higher temperatures (e.g., higher than 22° C.). In some embodiments, the amino acid at position 331 is Ile.

Figure 9A:
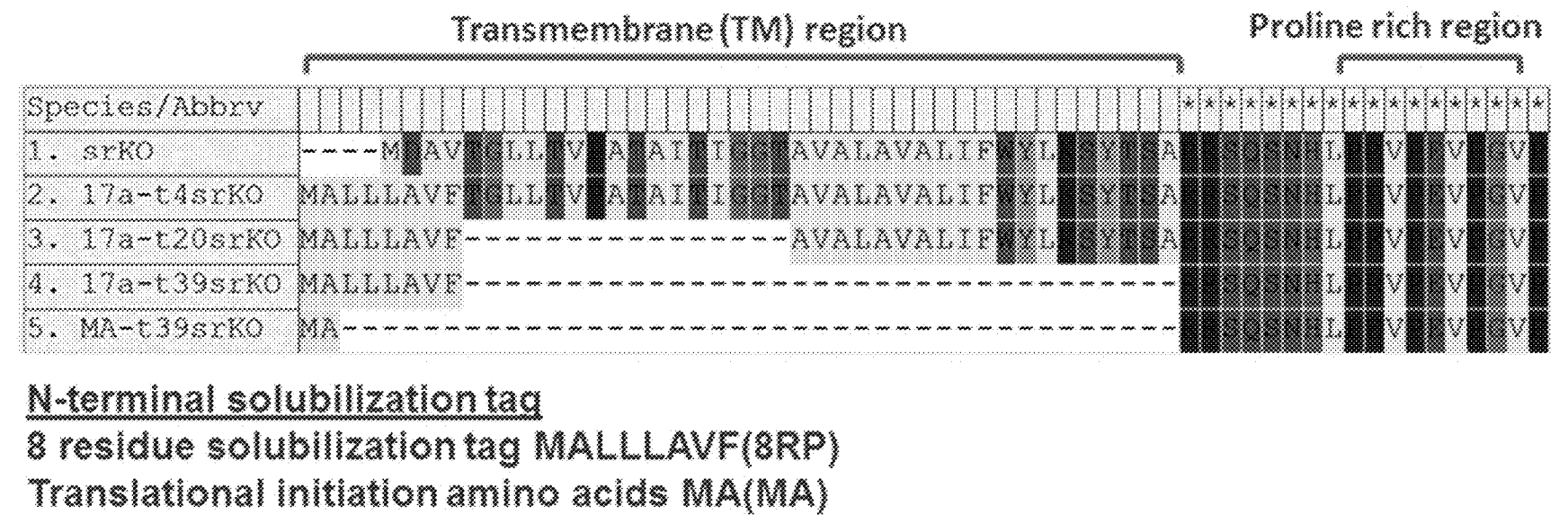
Figures 9B, 9C:
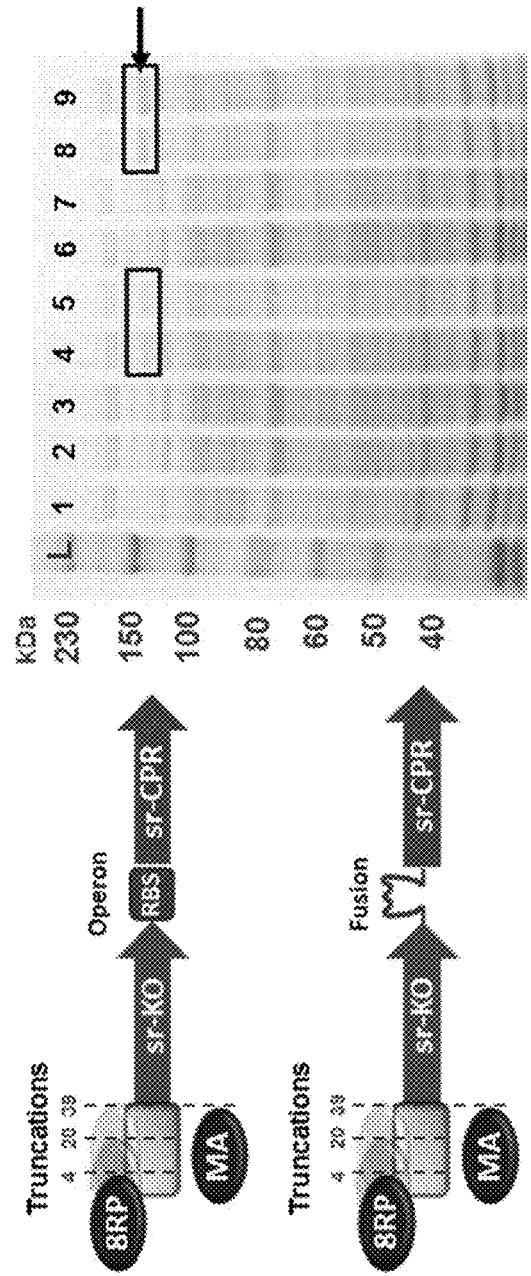

N-terminal modifications to achieve functional expression of the P450 enzyme SrKO are illustrated in FIG. 9A, FIG. 9B, and FIG. 9C. These modifications or similar modifications may be made to achieve functional expression of KAH, including AtKAH. For example, all or portions of the transmembrane region may be deleted, such as from 4 amino acids to about 39 amino acids, or in some embodiments, from about 6 amino acids to about 25 amino acids, or about 4 to about 20 amino acids, or about 29 amino acids, or about 39 amino acids. The deletions are preferably taken from the N-terminal portion of the transmembrane region. This portion is replaced with a solubilization tag of from about 4 to about 20 amino acid residues, such as from about 4 to about 12 residues (e.g., eight amino acid residues). The tag is constructed predominantly of hydrophobic amino acids, which are optionally selected from Ala, Leu, Ile, Val, and Phe. An exemplary sequence for the functional expression is the N-terminal tag: MALLLAVF (SEQ ID NO: 47). In some embodiments, the AtKAH has a truncation of 14 amino acids, with the addition of the N-terminal tag (e.g., SEQ ID NO: 29), optionally having the substitution C331I (position nomenclature based on the wild type enzyme).

Alternative N-terminal tag sequences for P450 enzymes are described in Provisional Application No. 62/208,166, filed Aug. 21, 2015, and which find use in certain embodiments of the present invention. For example, the transmembrane domain (or "N-terminal anchor") can be derived from an *E. coli* gene selected from waaA, ypfN, yhcB, yhbM, yhhm, zipA, ycgG, djlA, sohB, lpxK, F11O, motA, htpx, pgaC, ygdD, hemr, and ycls. These genes were identified as inner membrane, cytoplasmic C-terminus proteins through bioinformatic prediction as well as experimental validation. The invention may employ an N-terminal anchor sequence that is a derivative of the *E. coli* wild-type transmembrane domain, that is, having one or more mutations with respect to the wild-type sequence. In exemplary embodiments, the membrane anchor sequence is from about 8 to about 75 amino acids in length. For example, the membrane anchor may be from about 15 to about 50, or from about 15 to about 40, or from about 15 to about 30, or from about 20 to about 40, or from about 20 to about 30 amino acids in length.

In some embodiments, the Kaurene Synthase (KS) is from *Stevia rebaudiana, Zea mays, Populus trichocarpa, Arabidopsis thaliana, Erwina tracheiphila* or derivative thereof (e.g., having at least 80%, or at least 90%, or at least 95%, or at least 97% sequence identity to the wild type sequence). Further, the cell may express a copalyl diphosphate synthase (CPPS) from *Stevia rebaudiana, Streptomyces clavuligerus, Bradyrhizobium Japonicum, Zea mays, Arabidopsis thaliana, Erwina tracheiphila*, or derivative thereof (e.g., having at least 80%, or at least 90%, or at least 95%, or at least 97% sequence identity to the wild type sequence). In some embodiments, the host cell expresses a bifunctional CPPS and KS enzyme, which is optionally selected from *Phomopsis amygdali, Physcomitrella patens, Gibberella fujiauroi* enzyme, or derivative thereof. Such derivative may generally have at least about 75%, or at least about 80%, or at least about 85%, or at least about 90%, or at least about 95%, or at least 96%, 97%, 98%, or 99% identity to the parent sequence (e.g., see Table 1). In some embodiments, the cell expresses *Erwina tracheiphila* CPPS and KS enzymes, or derivatives thereof.

In some embodiments, the host cell expresses a Kaurene Oxidase from *Stevia rebaudiana* (SrKO), *Arabidopsis thaliana, Gibberella fujikoroi*, or *Trametes versicolor*, or a derivative thereof, which is optionally modified at the N-terminus for functional expression in *E. coli* (as described above and as shown in FIG. 9A, FIG. 9B, and FIG. 9C). In some embodiments, the CPR is an enzyme of *Stevia rebaudiana* (SrCPR), *Arabidopsis thaliana*, or *Giberella fujikaroi*, or a derivative thereof, which is optionally modified at the N-terminus for functional expression in *E. coli*.

The SrKO may have one or more amino acid modifications that improve its activity. Exemplary modifications are disclosed in U.S. Provisional Application No. 62/040,284, which is hereby incorporated by reference in its entirety. For example, the SrKO may comprise one or more amino acid modifications at positions (with respect to SEQ ID NO:22: 47 (e.g., L471), 59 (e.g., Y59H), 60 (e.g., M60K), 63 (e.g., T63A), 67 (e.g., A67E), 76 (e.g., K76R), 80 (e.g., T80C), 82 (e.g., M82V), 85 (e.g., V85L, V85I), 86 (e.g., S86N), 100 (e.g., Q100S), 106 (e.g., N106K), 112 (e.g., K112T), 116

(A116R), 119 (e.g., T119S), 123 (e.g., M123T, M123Q, M123F, M123T), 127 (e.g., D127G), 129 (e.g., Y129F), 140 (e.g., A140R), 149 (e.g., K149R), 150 (e.g., H150F), 171 (e.g., N171D), 180 (e.g., L180F), 183 (e.g., I183V), 208 (e.g., D208E), 232 (e.g., D232E), 267 (e.g., S267A), 272 (e.g., H272Q), 284 (e.g., S284C), 286 (e.g., I286L), 294 (e.g., Q294K), 299 (e.g., Q299E), 310 (e.g., I310T, I310V), 371 (e.g., R371K, R371I), 375 (e.g., V375T, V375I, V375L), 378 (e.g., I378V), 382 (e.g., H382Y), 388 (e.g., V388Q, V388M), 393 (e.g., H393D), 400 (e.g., L400I), 413 (e.g., V413K, V413D), 434 (e.g., F434L), 442 (e.g., G442A), 450 (e.g., S450A), 454 (e.g., L454M), 460 (e.g., G460A), 464 (e.g., M464L), 475 (e.g., M475G), 487 (e.g., T487N), 492 (e.g., P492K), and 497 (e.g., I497L). In some embodiments, the SrKO contains a truncation of about 20 amino acids of the N-terminal transmembrane domain, with addition of an N-terminal tag sequence (described above). The SrKO may contain an Ala at the 2nd position to decrease enzyme turnover in the cell.

In some embodiments, the P450 reductase partner(s) include *Stevia rebaudiana* (Sr)CPR, *Stevia rebaudiana* (Sr) CPR1, *Arabidopsis thaliana* (At)CPR, *Taxus cuspidata* (Tc) CPR, *Artemisia annua* (Aa)CPR, *Arabidopsis thaliana* (At) CPR1, *Arabidopsis thaliana* (At)CPR2, *Arabidopsis thaliana* (At)R2, *Stevia rebaudiana* (Sr)CPR2, *Stevia rebaudiana* (Sr)CPR3, or *Pelargonium graveolens* (Pg)CPR. Any of these P450s can be derivatized in some embodiments, for example, to introduce from 1 to about 20 mutations, or from about 1 to about 10 mutations. These CPR proteins are further described in PCT/US15/46369, which disclosure is hereby incorporated by reference.

In some embodiments, the host cell is an *E. coli* that contains a single CPR enzyme (e.g., SrCPR), and which is chromosomally integrated, and supports both the SrKO and AtKAH enzymes, for example.

In some embodiments, the host cell expresses a geranylgeranyl pyrophosphate synthase (GGPPS), which is optionally of *Taxus canadensis, Abies grandis, Aspergillus nidulans, Stevia rebaudiana, Gibberella fujikuroi, Mus musculus, Thalassiosira pseudonana, Streptomyces melanosporofaciens, Streptomyces clavuligerus, Sulfulubus acidocaldarius,* Synechococcus sp. (e.g., JA-3-3Ab), *Arabidopsis thaliana*, Marine bacterium 443, *Paracoccus haeundaensis, Chlorobium tepidum* TLS, Synechocystis sp. (PCC 6803), *Thermotoga maritima* HB8, *Corynebacterium glutamicum, Thermus thermophillus* HB27, *Pyrobaculum calidifontis* JCM 11548, or derivative thereof. See Table 1. Such derivative may generally have at least about 60%, or at least about 70%, or at least about 75%, or at least about 80%, or at least about 85%, or at least about 90%, or at least about 95%, or at least 96%, 97%, 98%, or 99% identity to the parent sequence (e.g., see Table 1). In some embodiments, the GGPPS is *Taxus canadensis* or derivative thereof. In some embodiments, the *Taxus* GGPPS is an N-terminal truncated sequence (e.g., with the N-terminal 70 to 110, such as about 98, amino acids truncated). The truncated sequence may further comprise from about 1 to about 10, such as from about 1 to about 5 amino acid substitutions, deletions, and/or insertions at the corresponding wild-type sequence. An exemplary truncated sequence is disclosed herein as SEQ ID NO: 12. In some embodiments, the GGPPS is from *Corynebacteria glutamicum* or derivative thereof, which can provide advantages in productivity at temperatures higher than 22° C.

In some embodiments, the host cell expresses a pathway producing iso-pentyl pyrophosphate (IPP) and dimethylallyl pyrophosphate (DMAPP). In some embodiments, the pathway is a methylerythritol phosphate (MEP) pathway and/or a mevalonic acid (MVA) pathway.

The MEP (2-C-methyl-D-erythritol 4-phosphate) pathway, also called the MEP/DOXP (2-C-methyl-D-erythritol 4-phosphate/1-deoxy-D-xylulose 5-phosphate) pathway or the non-mevalonate pathway or the mevalonic acid-independent pathway refers to the pathway that converts glyceraldehyde-3-phosphate and pyruvate to IPP and DMAPP. The pathway typically involves action of the following enzymes: 1-deoxy-D-xylulose-5-phosphate synthase (Dxs), 1-deoxy-D-xylulose-5-phosphate reductoisomerase (IspC), 4-diphosphocytidyl-2-C-methyl-D-erythritol synthase (IspD), 4-diphosphocytidyl-2-C-methyl-D-erythritol kinase (IspE), 2C-methyl-D-erythritol 2,4-cyclodiphosphate synthase (IspF), 1-hydroxy-2-methyl-2-(E)-butenyl 4-diphosphate synthase (IspG), and isopentenyl diphosphate isomerase (IspH). The MEP pathway, and the genes and enzymes that make up the MEP pathway, are described in U.S. Pat. No. 8,512,988, which is hereby incorporated by reference in its entirety. For example, genes that make up the MEP pathway include dxs, ispC, ispD, ispE, ispF, ispG, ispH, idi, and ispA. In some embodiments, steviol is produced at least in part by metabolic flux through an MEP pathway, and wherein the host cell has at least one additional copy of a dxs, ispD, ispF, and/or idi gene. As disclosed in U.S. Pat. No. 8,512,988, the level of the metabolite indole can be used as a surrogate marker for efficient production of terpenoid products in *E. coli* through the MEP pathway.

The MVA pathway refers to the biosynthetic pathway that converts acetyl-CoA to IPP. The mevalonate pathway typically comprises enzymes that catalyze the following steps: (a) condensing two molecules of acetyl-CoA to acetoacetyl-CoA (e.g., by action of acetoacetyl-CoA thiolase); (b) condensing acetoacetyl-CoA with acetyl-CoA to form hydroxymethylglutaryl-CoenzymeA (HMG-CoA) (e.g., by action of HMG-CoA synthase (HMGS)); (c) converting HMG-CoA to mevalonate (e.g., by action of HMG-CoA reductase (HMGR)); (d) phosphorylating mevalonate to mevalonate 5-phosphate (e.g., by action of mevalonate kinase (MK)); (e) converting mevalonate 5-phosphate to mevalonate 5-pyrophosphate (e.g., by action of phosphomevalonate kinase (PMK)); and (f) converting mevalonate 5-pyrophosphate to isopentenyl pyrophosphate (e.g., by action of mevalonate pyrophosphate decarboxylase (MPD)). The MVA pathway, and the genes and enzymes that make up the MEP pathway, are described in U.S. Pat. No. 7,667,017, which is hereby incorporated by reference in its entirety.

The host cell may be prokaryotic or eukaryotic. For example, the host cell may be a bacteria selected from *E. coli, Bacillus subtillus,* or *Pseudomonas putida*. In some embodiments, the host cell is a species of *Saccharomyces, Pichia,* or *Yarrowia,* including *Saccharomyces cerevisiae, Pichia pastoris,* and *Yarrowia lipolytica*. The host cell may be an *E. coli* having a duplication or overexpression of dxs, idi, IspD, and IspF increasing production of IPP and DMAPP.

In some embodiments, the host cell is an *E. coli* having one or more genetic modifications increasing the production of UDP-glucose, for example, increasing UDP-glucose substrate availability. To improve availability of UDP-glucose for steviol glycosylation, a series of gene knock-outs and gene insertions can be introduced to increase carbon flux to UDP-glucose and decrease flux in pathways away from UDP-glucose (e.g., glycogen synthesis and carbon storage). For example, genetic modifications can increase importation of sucrose into the cell and split it into fructose and glucose via the activity of sucrose phosphorylase. A subsequent series of knock-outs can alter primary metabolism so as to force biomass to be synthesized using only fructose as carbon source, leaving glucose to be funneled exclusively towards UDP-glucose biosynthesis. Exemplary modifications to an *E. coli* strain to enact this strategy are listed in Table 7. Modifications are further described in PCT/EP2011/061891, which is hereby incorporated by reference in its entirety. In some embodiments, the one or more genetic modifications include ΔgalE, ΔgalT, ΔgalK, ΔgalM, ΔushA, Δagp, Δpgm, duplication of *E. coli* GALU, and expression of *Bacillus substillus* UGPA, BaSP.

In an exemplary embodiment, the host cell is an *E. coli* that comprises the following heterologously expressed genes: *Taxus canadensis* GGPPS or derivative thereof, *Phaeosphaeria* sp. PsCK or derivative thereof, *Stevia rebaudiana* KO or derivative thereof, *Arabidopsis thaliana* KAH or derivative thereof, *Stevia rebaudiana* CPR or derivative thereof (and which is the only CPR enzyme expressed by the host cell), *Stevia rebaudiana* UGT85C2 or derivative thereof, *Stevia rebaudiana* UGT74G1 of derivative thereof, *Stevia rebaudiana* UGT76G1 or derivative thereof, and MbUGT1-2 or derivative thereof. Various derivatives of these enzymes are disclosed herein. In some embodiments, the *E. coli* contains a polycistronic expression module of KAH-KO, and contains a single copy of SrCPR (or derivative) that is chromosomally integrated. In some embodiments, the *E. coli* is modified to increase availability of UDP-glucose as described above. In some embodiments, the *E. coli* has an additional copy of dxs, idi, ispD, and ispF genes. In some embodiments, one or more expressed proteins contain an Alanine at position 2, to provide additional stability in vivo.

In other embodiments, the host cell is an *E. coli* that comprises the following heterologously expressed genes: *Cornybacterium glutamicum* GGPPS or derivative thereof; *Erwina tracheiphila* CPPS and KS or derivative of one or both; *Stevia rebaudiana* KO or derivative thereof; *Arabidopsis thaliana* KAH or derivative thereof; a *Stevia rebaudiana* CPR or derivative thereof; *Stevia rebaudiana* UGT85C2 or MbUGTc13 or derivative thereof, *Stevia rebaudiana* UGT74G1 or derivative thereof (or MbUGTC19, MbUGTC19-2, or derivative thereof); *Stevia rebaudiana* UGT76G1 or derivative thereof (or MbUGT1-3 of derivative thereof); and OsUGT1-2, SrUGT91D2, or derivative thereof, or MbUGT1-2 or MbUGT1,1-2 or derivative thereof. Various derivatives of these enzymes are disclosed herein. In some embodiments, the *E. coli* contains a polycistronic expression module of KAH-KO, and contains a single copy of SrCPR that is chromosomally integrated. In some embodiments, the *E. coli* is modified to increase availability of UDP-glucose as described above. In some embodiments, the *E. coli* has an additional copy of one or more (or all) of dxs, idi, ispD, and ispF genes. In some embodiments, one or more expressed proteins contain an Alanine at position 2, to provide additional stability in vivo. In some embodiments, the *E. coli* provides increased productivity of Reb M or Reb D at temperatures above about 24° C., such as about 27° C. or more, or about 30° C. or more, or about 32° C. or more, or about 34° C. or more, or about 37° C.

In some embodiments, the method further comprises recovering the desired steviol glycoside(s) (e.g., RebM or RebD) from culture media. In some embodiments, the desired steviol glycoside (e.g., RebM or RebD) is produced in the culture media at a concentration of at least about 10 mg/L, or at least about 100 mg/L, or at least about 200 mg/L, or at least about 500 mg/L, or at least about 1 g/L, or at least about 10 g/L.

Optionally, the method of the present invention further comprises separating the target steviol glycoside from the starting composition. The target steviol glycoside can be separated by any suitable method, such as, for example, crystallization, separation by membranes, centrifugation, extraction, chromatographic separation or a combination of such methods. Fractions containing different glycoside fractions can be blended to prepare defined products. Alternatively, RebM and RebD, for example, can be prepared and purified from separate cultures, and blended at a predetermined ratio.

In another aspect, the invention provides a method for production of steviol glycosides having at least 4 glycosylations in *E. coli*. In accordance with the invention, the *E. coli* cell comprises a plurality of UGT enzymes, which may include one or more enzymes described herein, that together perform at least 4, at least 5, or at least 6 (including 7 or 8), sequential glycosylation reactions. As disclosed herein, the glycosylation substrates and lower glycosylation products accumulate in the *E. coli* cell sufficiently to allow downstream reactions to proceed at an acceptable rate, with a high majority of the glycosylation products ultimately accumulating extracellularly, most likely through the action of a membrane transporter. The steviol glycosides can be purified from media components. Thus, in some embodiments, the methods comprise separating growth media from the *E. coli* cells, for example using batch, continuous, or semi-continuous bioreactor processes, and isolating the desired glycosylation products (e.g, Reb M) from the growth media.

In still other aspects, the invention provides methods for production of steviol glycosides (including Reb D, Reb M, Reb E, Reb I and other glycosylation products) in *E. coli*. Generally, the desired steviol glycoside has at least 2 glycosylations, such as 2, 3, 4, 5, 6, 7, or 8 glycosylations. In some embodiments, the steviol glycoside is RebM or RebD. While many of the enzymes known for production of steviol in host cells are plant enzymes, which often have optimal temperatures in the range of 20-24° C., *E. coli* growth rate and metabolism are optimal at higher temperatures. The present disclosure enables production of steviol glycosides at high yield in *E. coli*, by enabling enzyme productivity at temperatures above 24° C., such as from 24° C. to 37° C., or from 27° C. to 37° C., or from 30° C. to 37° C.

While commercial biosynthesis in *E. coli* can often be limited by the temperature at which overexpressed and/or foreign enzymes are stable, the present disclosure in some embodiments allows for cultures to be maintained at higher temperatures, resulting in higher yields and higher overall productivity. In some embodiments, the culturing is conducted at about 30° C. or greater, or about 31° C. or greater, or about 32° C. or greater, or about 33° C. or greater, or about 34° C. or greater, or about 35° C. or greater, or about 36° C. or greater, or about 37° C.

The host cells and methods are further suitable for commercial production of steviol glycosides, that is, the cells and methods can be productive at commercial scale. In some embodiments, the size of the culture is at least about 100 L, at least about 200 L, at least about 500 L, at least about 1,000 L, or at least about 10,000 L. In an embodiment, the culturing may be conducted in batch culture, continuous culture, or semi-continuous culture.

In some aspects, the invention provides methods for making a product comprising a steviol glycoside ingredient, which is RebM or RebD in some embodiments. The method comprises culturing a strain described herein that produces the steviol glycoside, recovering the steviol glycoside, and incorporating the steviol glycoside into a product, such as a food, beverage, oral care product, sweetener, flavoring agent, or other product.

Purified steviol glycosides, prepared in accordance with the present invention, may be used in a variety of products including, but not limited to, foods, beverages, texturants (e.g., starches, fibers, gums, fats and fat mimetics, and emulsifiers), pharmaceutical compositions, tobacco products, nutraceutical compositions, oral hygiene compositions, and cosmetic compositions. Non-limiting examples of flavors for which RebM can be used in combination include lime, lemon, orange, fruit, banana, grape, pear, pineapple, mango, bitter almond, cola, cinnamon, sugar, cotton candy and vanilla flavors. Non-limiting examples of other food ingredients include flavors, acidulants, and amino acids, coloring agents, bulking agents, modified starches, gums, texturizers, preservatives, antioxidants, emulsifiers, stabilizers, thickeners and gelling agents.

Highly purified target steviol glycoside(s) obtained according to this invention may be incorporated as a high intensity natural sweetener in foodstuffs, beverages, pharmaceutical compositions, cosmetics, chewing gums, table top products, cereals, dairy products, toothpastes and other oral cavity compositions, etc.

Highly purified target steviol glycoside(s) obtained according to this invention can be used in combination with various physiologically active substances or functional ingredients. Functional ingredients generally are classified into categories such as carotenoids, dietary fiber, fatty acids, saponins, antioxidants, nutraceuticals, flavonoids, isothiocyanates, phenols, plant sterols and stanols (phytosterols and phytostanols); polyols; prebiotics, probiotics; phytoestrogens; soy protein; sulfides/thiols; amino acids; proteins; vitamins; and minerals. Functional ingredients also may be classified based on their health benefits, such as cardiovascular, cholesterol-reducing, and anti-inflammatory.

Highly purified target steviol glycoside(s) obtained according to this invention may be applied as a high intensity sweetener to produce zero calorie, reduced calorie or diabetic (beverages and food products with improved taste characteristics. It may also be used in drinks, foodstuffs, pharmaceuticals, and other products in which sugar cannot be used. In addition, highly purified target steviol glycoside(s), particularly, RebM can be used as a sweetener not only for drinks, foodstuffs, and other products dedicated for human consumption, but also in animal feed and fodder with improved characteristics.

Examples of products in which highly purified target steviol glycoside(s) may be used as a sweetening compound include, but are not limited to, alcoholic beverages such as vodka, wine, beer, liquor, and sake, etc.; natural juices; refreshing drinks; carbonated soft drinks; diet drinks; zero calorie drinks; reduced calorie drinks and foods; yogurt drinks; instant juices; instant coffee; powdered types of instant beverages; canned products; syrups; fermented soybean paste; soy sauce; vinegar; dressings; mayonnaise; ketchups; curry; soup; instant bouillon; powdered soy sauce; powdered vinegar, types of biscuits; rice biscuit; crackers; bread; chocolates; caramel; candy; chewing gum; jelly; pudding; preserved fruits and vegetables; fresh cream; jam; marmalade; flower paste; powdered milk; ice cream; sorbet; vegetables and fruits packed in bottles; canned and boiled beans; meat and foods boiled in sweetened sauce; agricultural vegetable food products; seafood; ham; sausage; fish ham; fish sausage; fish paste; deep fried fish products; dried seafood products; frozen food products; preserved seaweed; preserved meat; tobacco; medicinal products; and many others. In principle it can have unlimited applications.

During the manufacturing of products such as foodstuffs, drinks, pharmaceuticals, cosmetics, table top products, and chewing gum, the conventional methods such as mixing, kneading, dissolution, pickling, permeation, percolation, sprinkling, atomizing, infusing and other methods may be used.

EXAMPLES

Steviol glycosides are the natural constituents of the plant *Stevia rebaudiana*, known commonly as *Stevia*. Steviol glycoside Rebaudioside M (RebM)(FIG. 1), whose taste profile drastically improves upon that of other steviol glycosides, is an ideal candidate to replace currently used steviol glycosides such Rebaudioside A, but hasn't fulfilled that promise because of its low levels in the *Stevia* plant (<0.01%). Steviol is a diterpenoid that forms the core chemical structure of steviol glycosides like RebM (1).

Terpenoid biosynthesis has been engineered in both prokaryotic (e.g., *E. coli*) and eukaryotic (e.g., yeast) cells for heterologous production of complex terpenoid molecules (2,3). The *E. coli* MEP-pathway is stoichiometrically superior and less byproduct accumulating compared to the yeast MVA-pathway (4,5). A new metabolic engineering approach, multivariate modular metabolic engineering (MMME), and a platform *E. coli* strain capable of overproducing terpenoid precursors has been described (4,6). MMME facilitates assessment and elimination of regulatory and pathway bottlenecks by re-defining the metabolic network as a collection of distinct modules (7). By grouping enzymes with similar turnovers into a subset, or module, and later equalizing the turnover of the different subsets by adjusting concentrations/activities, one can maximize the ratio of pathway turnover to resource expenditure.

MMME pathway engineering was applied in *E coli* for the biosynthesis of kaurene, the unfunctionalized terpene scaffold precursor for steviol and steviol glycosides. Next, the downstream CYP450-mediated oxidation chemistry was engineered to demonstrate that the diterpenoid scaffold steviol can be biosynthesized in *E. coli*. Further, glycosylation chemistry for the conversion of steviol to steviol glycosides in *E. coli* was engineered to develop a technology platform for producing glycosylated natural products. Further still, *E. coli* were engineered to produce improved levels of UDP-glucose to support high levels of steviol glycoside production. This work provides for a economical, commercially-viable source for RebM (and other steviol glycosides described herein) in microbial systems from renewable resources.

Example 1: Biosynthesis of Steviol and Steviol Glycosides

Steviol glycosides are diterpenoid derivatives and their early biosynthetic pathways share common intermediates with gibberellic acid biosynthesis (8). The overall linear pathway is modularized into four parts: (1) the formation of starting precursor IPP and DMAPP from the central carbon metabolites derived from glucose, (2) the production of the first dedicated intermediate, kaurene; (3) biosynthesis of the key intermediate, steviol; and (4) the formation of various steviol glycosides. A further module (5) is independently engineered to support the increased production of UDP-glucose, the second substrate necessary for glycosylation of steviol. The five modules are shown in FIG. 2.

In plants, the formation of common isoprenoid precursors IPP and DMAPP can be derived from two biosynthetic routes; either the mevalonic acid (MVA) pathway or methylerythritol-phosphate (MEP) pathway (9). The first step in steviol diterpenoid biosynthesis is conversion of IPP and DMAPP into geranyl-geranyl diphosphate (GGPP). GGPP is the four subunit precursor for all diterpenoid molecules. Next, protonation-initiated cyclization of GGPP to copalyl diphosphate (CPP) is catalyzed by CPP synthase (CPPS). Kaurene is then produced from CPP by an ionization-dependant cyclization catalyzed by kaurene synthase (KS). These enzymes have been identified and characterized from the native biosynthetic pathway in Stevia. In addition to this, there are bi-functional enzymes characterized from the basal plant (*Physcomitrella patens*) and fungal species (e.g., *Gibberella fujikuroi* and *Phaeosphaeria* sp.) for conversion of GGPP into kaurene (10,11). Kaurene is then oxidized in a three-step reaction to kaurenoic acid, by kaurene oxidase (KO) a P450 monooxygenase. A full length KO cDNA was expressed in yeast and demonstrated that it could convert kaurene to kaurenoic acid (12). The next step in the pathway is the hydroxylation of kaurenoic acid by kaurenoic acid 13-hydroxylase (KAH). KAH, a cytochrome P450, was expressed in yeast and converted kaurenoic acid to steviol (13).

With the core steviol molecule assembled, a series of six glycosylations attach six glucose moieties to the steviol core. The glycosyltransferase enzymes (EC 2.4.1.17) responsible for these activities catalyze the transfer of the glucose component of UDP-glucose to a small hydrophobic molecule, in this case the steviol molecule (14). O-glycosylations occur at the C13 and C19 positions of steviol (FIG. 1), followed by 1-2' glycosylations and 1-3' glycosylations at both these O-glucosyls to result in six glycosylations in total. The order of glycosylations can be quite complex, with various intermediate products forming given variation in the order of C13 or C19 glycosylations, as well as 1-2' or 1-3' glycosylations (FIG. 3). Given the intermediate product pools accumulating in Stevia rebaudiana, a potential pathway for the production of RebM is Steviol>Steviolmonoside>Steviolbioside>Stevioside>Rebaudioside A>Rebaudioside D>Rebaudioside M. However, this does not preclude an alternate pathway in microbial biosynthetic systems (FIG. 3).

Detailed understanding and characterization of biochemical pathways for steviol glycosides and advancements in engineering of the upstream isoprenoid pathway to reroute the IPP and DMAPP through heterologous biosynthetic pathway engineering provides the basis for directed, sustainable production of purified and high quality steviol glycosides in a convenient microbial-based bioprocess. The current plant-based production and purification schemes present significant challenges to reducing costs. The microbial route described herein using plant pathways that have been reconstructed in microbial hosts offers superior opportunities for improving current processes and to generate superior quality steviol glycosides that are of very low abundance in nature.

(A) Engineering Kaurene Biosynthesis in *E. coli*

Kaurene is the cyclic diterpenoid precursor for steviol and plant growth hormone gibberellic acid. The biosynthesis of kaurene consists of three steps from the universal terpenoid precursor IPP and DMAPP. The three step reaction from IPP and DMAPP is catalyzed by enzymes GPPS, CPS and KS or bifunctional CPPS/KS enzymes. The overall pathway up to kaurene is grouped as two modules (FIG. 2). There have been several enzymes from different organisms characterized for the conversion of IPP and DMAPP to GGPP (15-18) and GGPP to kaurene (9-12,18) and kaurene to steviol (12,19-24) (Table 1). In higher plants, such as *stevia*, GGPP to kaurene biosynthesis is carried out as two step reaction mediated by enzymes called copalyl pyrophosphate synthase (CPPS) and kaurene synthase (KS). In the basal plant (*Physcomitrella patens*) and fungal (e.g., *Gibberella fujikuroi* and *Phaeosphaeria* sp.) species, the GGPP to kaurene biosynthesis is carried out by bi-functional enzymes characterized in these organisms. Similarly, there are multiple enzymes cloned and characterized as converting IPP and DMAPP to make GGPP. The first step towards engineering kaurene biosynthesis is therefore selection of enzymes. Enzymes from different species were selected to test for biosynthesis of kaurene (Table 1). Studies on MMME optimization of taxadiene biosynthesis show that the kinetics of TcGPPS are capable of supporting ~1 g/L production of taxadiene and therefore other diterpenes. To identify the best kaurene synthase ortholog, TcGPPS was selected as the upstream candidate enzyme. Operons were then selected containing KS-CPS-GGPPS (KCG) or bi-functional PsCK-GGPPS (CKG) to test the pathway in the upstream pathway engineered strains. To modulate the expression of the downstream kaurene pathway, the KS-CPPS-GGPPS (KCG) and CK-GGPPS (CKG) operons were cloned to a plasmid system with varying copy number and promoter strength (p5Trc, p10Trc, p20Trc and p5T7). Additionally, one copy of each kaurene operon was integrated into the *E. coli* chromosome under varying promoter strength, coupled with varying upstream pathway expression levels.

Figure 4A:
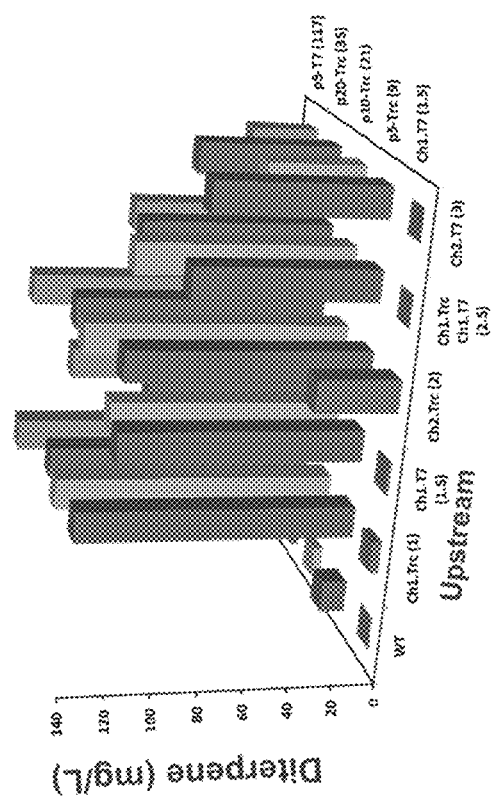
FIG. 4A, FIG. 4B, FIG. 4C, and FIG. 4D show kaurene production profiles from engineered *E. coli* cells.
Figure 4B:
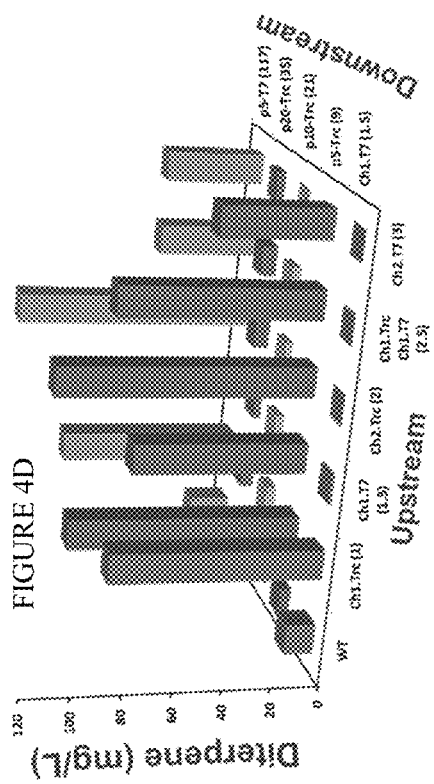
Figure 4C:
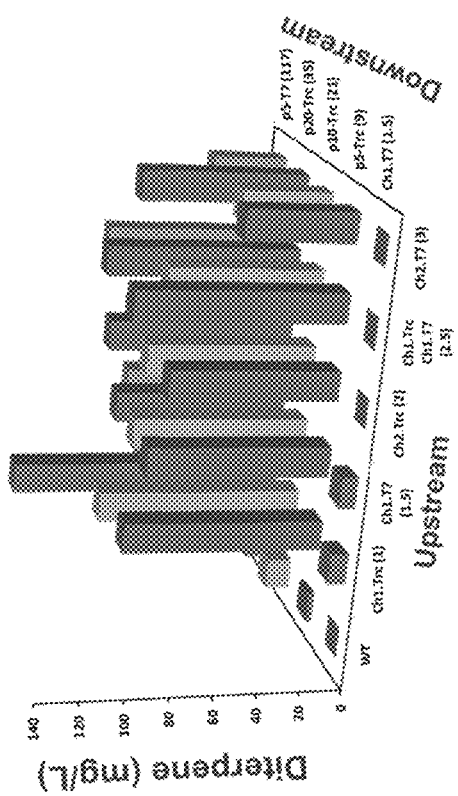
Figure 4D:
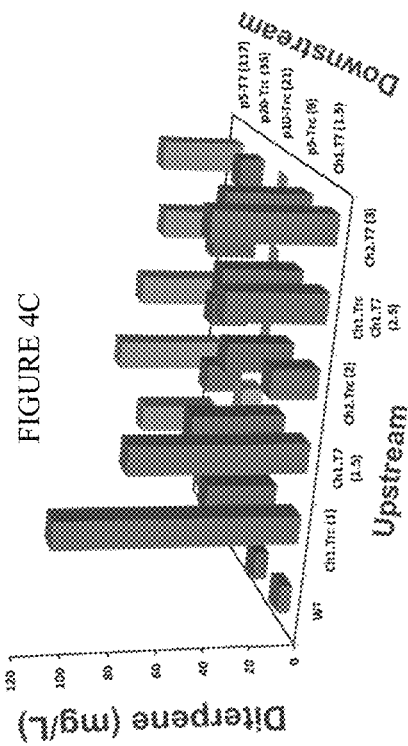
Figure 5:
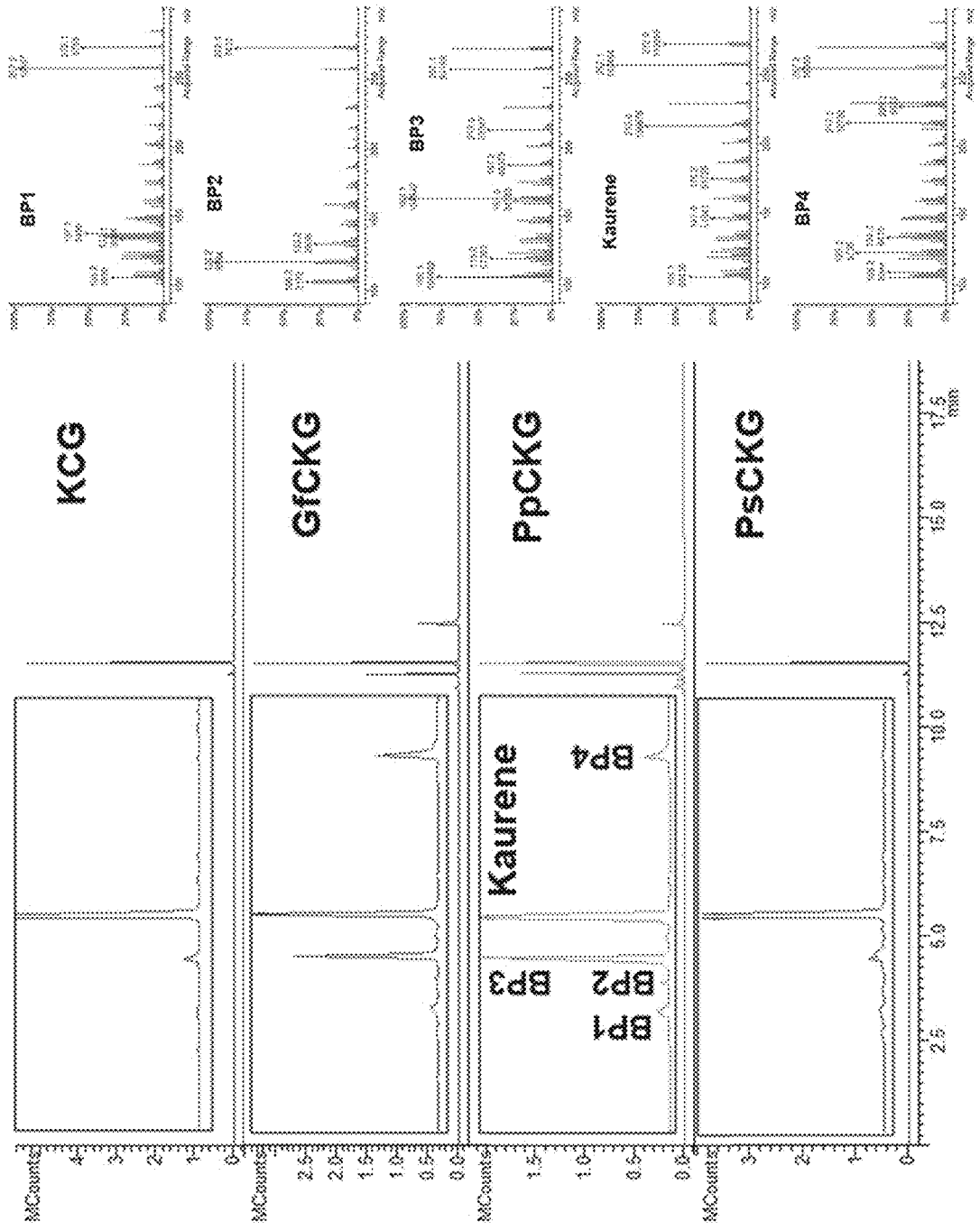
FIG. 5 shows GC profiles from strains constructed from different KS enzymes. The pathway is shown in FIG. 2. The figure in the box (left inset) is the magnified chromatograph to show the byproduct accumulation. The GC profile and corresponding MS spectra show that the KS enzymes can be non-specific vis-à-vis product profile. Other terpenoid byproducts were produced with similar MS characteristics as kaurene. In all three pathways the major product is kaurene. The authenticity of kaurene is confirmed by comparison to MS spectra and NMR data reported in previously published literature. The MS spectra from all the byproduct show a characteristic 272 molecular ion.
Figures 6A, 6B:
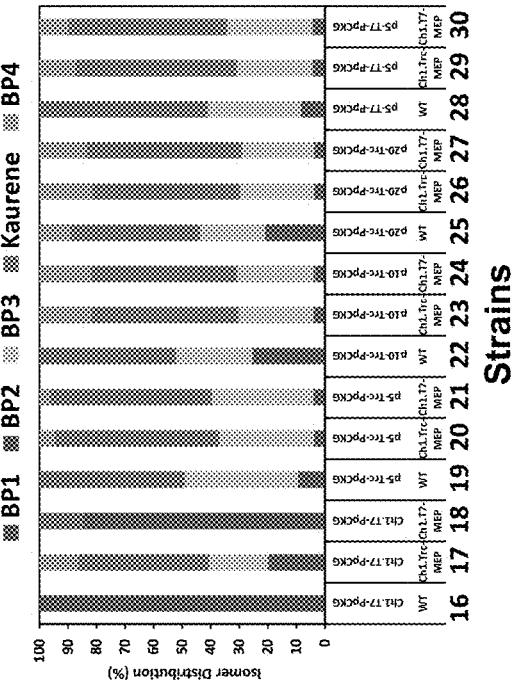
FIG. 6A, FIG. 6B, FIG. 6C, and FIG. 6D show the product profile from engineered strains. Shown are the production profiles from different downstream pathway expression levels under different upstream pathway modulation. The byproducts are the same as those shown in FIG. 5. Genotype details of each strain are in Table 2.

Strains were selected with varying upstream and downstream expression to modulate the pathway and test the productivity of the various combinations. These strains were subjected to small scale (2 mL) Hungate tube fermentation to characterize the phenotypic characteristics and kaurene productivity. As shown in FIG. 4A, FIG. 4B, FIG. 4C, and FIG. 4D, a complex non-linear accumulation of kaurene was observed. Interestingly, KS from plant species (SrCPPS, SrKS and PpCK) showed similar profiles (FIG. 4A, and FIG. 4B), whereas the pathways constructed with fungal enzymes (GfCK and PsCK) showed very similar patterns of product accumulation (FIG. 4C, and FIG. 4D). Interestingly, the low-copy expression of pathways incorporating fungal enzymes showed relatively high productivity compared to the plant enzyme pathways. The global maximum in product titer (~140 mg/L) comes from a construct with exclusively plant enzymes (FIG. 4A, strain constructed with *Stevia rebaudiana* genes with upstream under Trc promoter and downstream in plasmid p20Trc). However, the completely chromosomally-integrated fungal pathway enzyme (PsCK) (FIG. 4D, strain with upstream Trc and downstream T7-PsCKG) produced ~100 mg/L of kaurene. Comparing the expression of the downstream components of these two strains, the Ch1T7PsCKG pathway is 23-fold less (1.5 au.) compared to the p20TrcSrKCG (35 a.u.)under the same upstream pathway Ch1TrcMEP strength (4). The key performance driver of a multistep/multi-module pathway is optimal balance in the flux. Here in the strain constructed with Ch1TrcMEP and Ch1T7PsCKG, with very low downstream expression we achieved kaurene production up to 100 mg/L. This demonstrated that the PsCK enzyme can support high flux under balanced pathway expression. In addition, this study also provided insights about the complex non-linear behavior on diterpene product profile under different pathway balance (FIG. 5 and FIG. 6A, FIG. 6B, FIG.

Figures 6C, 6D:
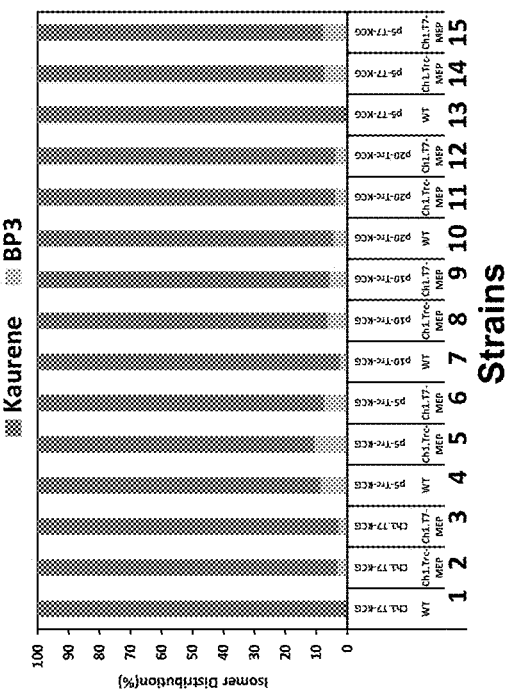
Figure 7:
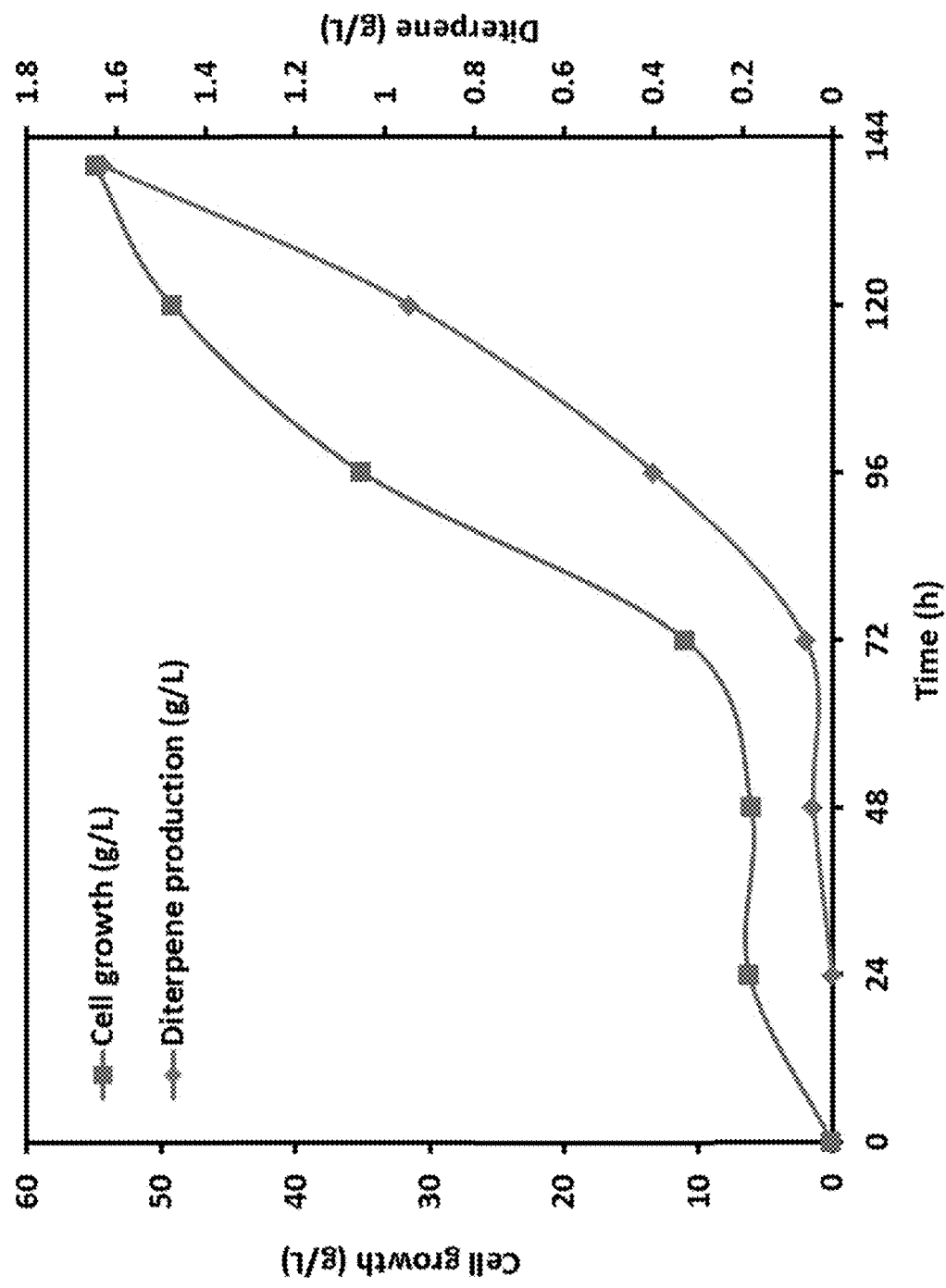
FIG. 7 shows that a strain (Strain 47 in table 2, Ch1TrcMEP-Ch1T7PsCKG) with properly balanced modules enabling kaurene biosynthesis, is capable of multigram-per-liter scale productivity of kaurene in a 2 L bioreactor.
Figure 8:
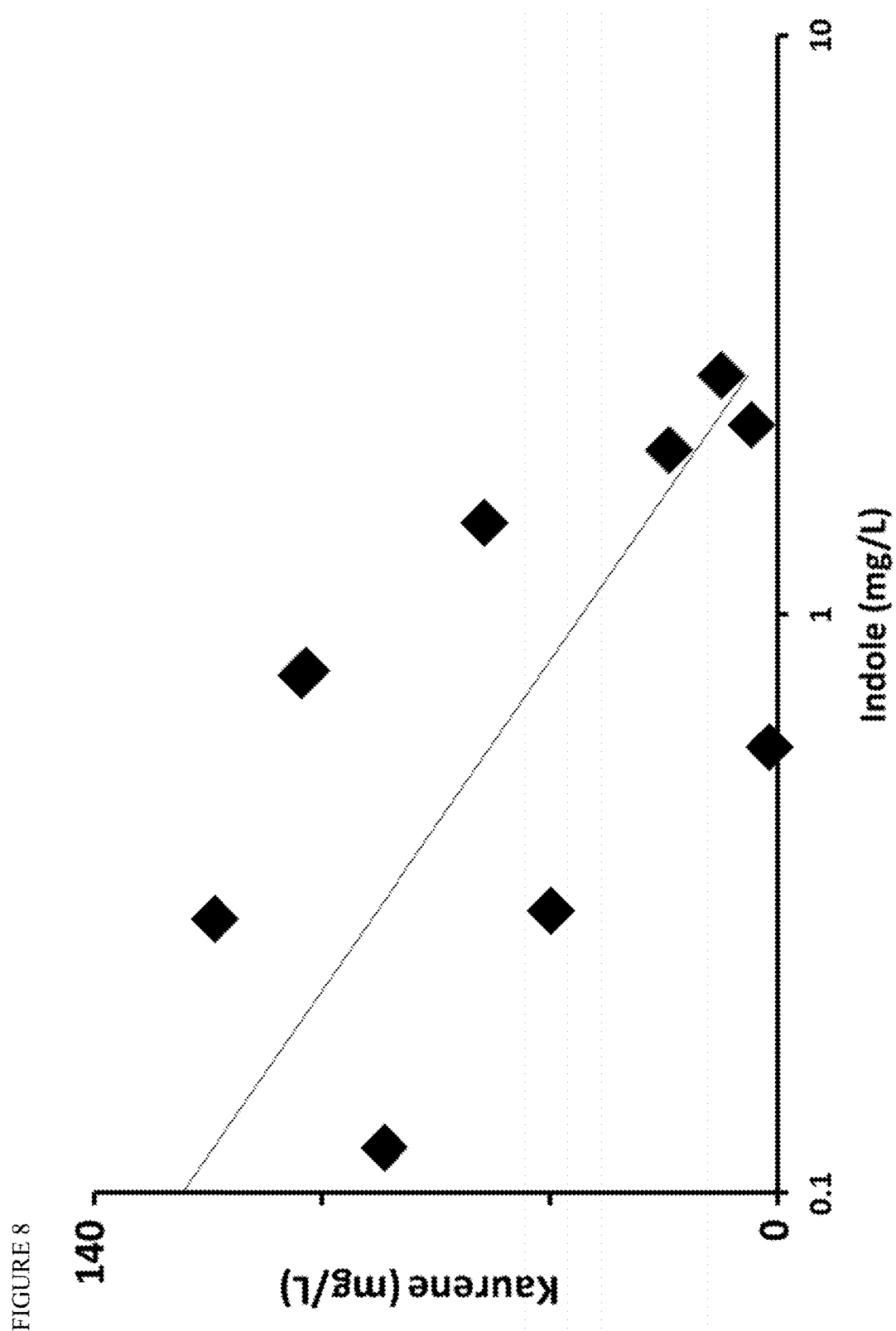
FIG. 8 shows that indole accumulation is inversely correlated to kaurene production across engineered strains.

6C, and FIG. 6D, Table 2). Such complex behavior on product selectivity of a pathway under varying flux modulations clearly demonstrates the power of multivariate-modular pathway optimization. Under optimal balance a strain can show high selectivity in product profile (FIG. 6D, strain 47). In addition, the multivariate-modular search allowed selection of the best variant kaurene enzyme (PsCK) to further engineer hyper-producing strains. When this optimal strain (i.e., Strain 47) was grown in a bioreactor system, we were able to—with minimal media or process improvements—generate a strain capable of 1.6 g/L production of kaurene (FIG. 7). MMME also provides insight towards further optimization of the pathway and helps identify the best variant of GGPPS enzyme (Table 1) using a similar approach. Furthermore, as observed in pathway engineering on taxadiene-producing strains, kaurene production also inversely correlated to the production of the inhibitory molecule indole (FIG. 8).

(B) Engineering Steviol Biosynthesis in E. coli

The biosynthesis of steviol involves two key oxidation reactions mediated by cytochrome P450 enzymes (FIG. 3). P450s are important oxidizing enzymes involved in the metabolic pathways of thousands of natural products (25). Until recently, the scientific community believed that when compared to native eukaryotic hosts (e.g. plants or yeast), bacterial hosts, such as E. coli, were not an ideal system for performing this important natural product chemistry. However, while optimizing taxol biochemistry in E. coli, an understanding was developed of the mechanistic structure-function relationships responsible for the biochemistry of P450 enzymes, specifically related to their use in E. coli. Optimal engineering of N-terminal membrane region and construction of optimal combinations of CYP450 and the co-factor P450 reductase (CPR) enzymes is key for functional expression. Several enzyme/pathway optimization techniques were developed for the functional expression CYP450 enzymes and in vivo oxidation of complex natural terpenoid natural products such as taxadiene, valencene, limonene or kaurene.

Steviol biosynthesis is mediated by two different CYP450 enzymes, kaurene oxidase (KO) and kaurenoic acid hydroxylase (KAH) with a CYP450 reductase (CPR). Several candidate genes/enzymes were identified and annotated as P450 enzymes for oxidation and hydroxylation reactions in steviol biosynthesis (Table 1). The functional expression of the enzymes KO and KAH for carboxylation and hydroxylation requires protein redesign and engineering. We started with redesigning and cloning the SrKO enzyme for improved functional expression in E. coli. After a thorough bioinformatics analysis, several N-terminal truncated and modified KO enzymes were constructed (FIG. 9A). Constructs were created that incorporate SrKO and co-factor cytochrome P450 reductase enzyme (SrCPR) as a fusion protein ("linker" constructs) or as a polycistronic modules ("operon" constructs) (FIG. 9B) in the pET45d expression vector. The production and relative solubility of the protein in these constructs in E. coli was assessed using SDS-PAGE analysis (FIG. 9C).

These constructs were then transferred into our production vector p5Trc to test the in vivo functional activity of the pathway. These constructs were transformed into kaurene producing strains 3, 9 and 11 (Table 2) to test the conversion of kaurene to kaurenoic acid (Table 3). The designed chimeric enzymes were functionally active, but the incomplete reactivity of the enzymes resulted in the production of kaurenol and kaurenal. Among all various N-terminal truncated KO constructs, the 39AA truncation of KO was more functionally active compared to 4 and 20 amino acid truncated constructs. Additionally, the SrKO and SrCPR expressed as operons showed similar activity as fusion enzyme constructed from SrKO and SrCPR. Subsequent to this initial work, we further optimized the SrKO enzyme as part of a three-gene KAH-KO-CPR module, see below, and in this construct the optimal SrKO construct has 20 amino acid residues truncated from the N-terminus, resulting in complete conversion of kaurene to kaurenoic acid (see below).

Figure 10:
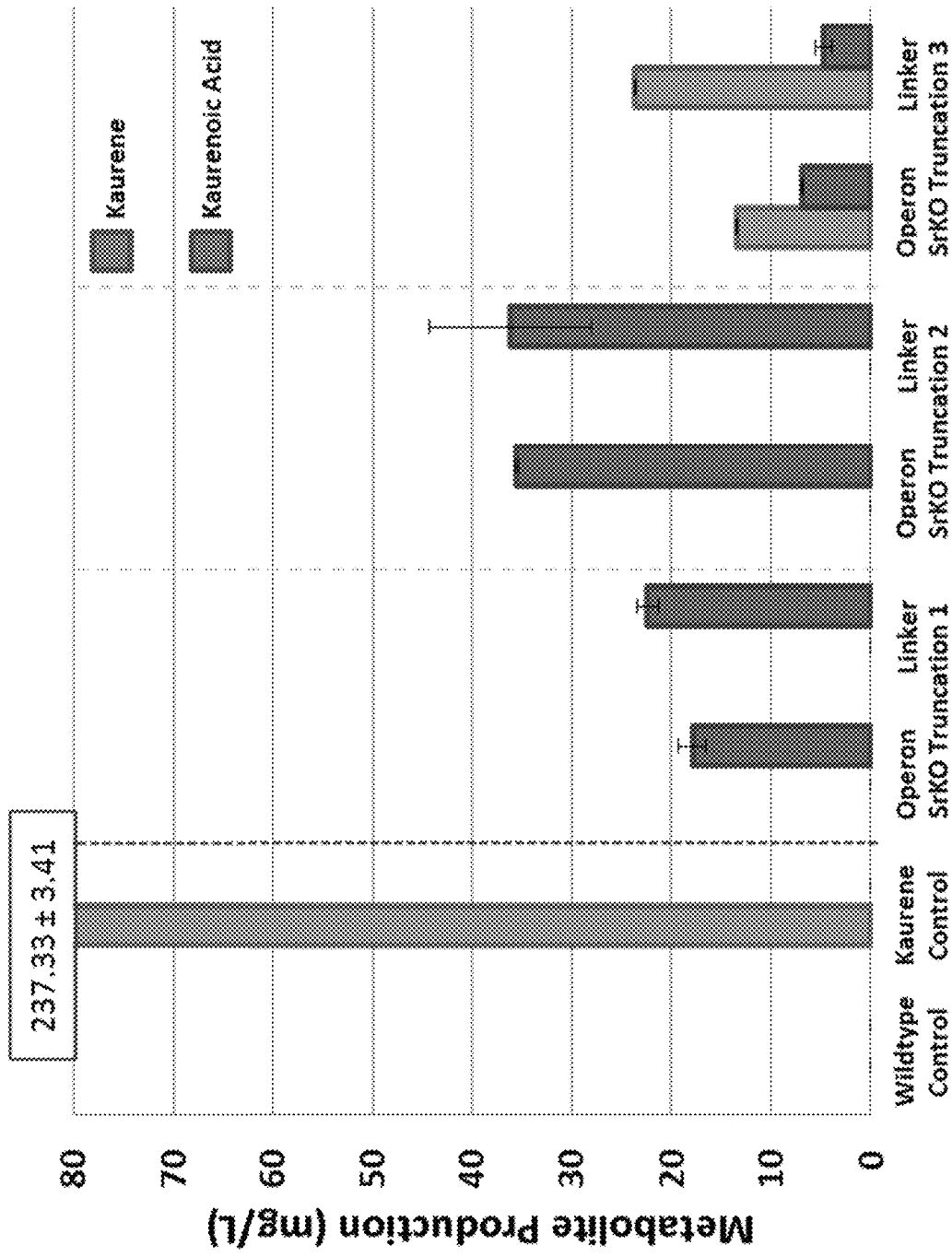
FIG. 10 shows the kaurenoic acid productivity of SrKO in linker or operon configuration with SrCPR in strain 47 background.
Figure 11A:
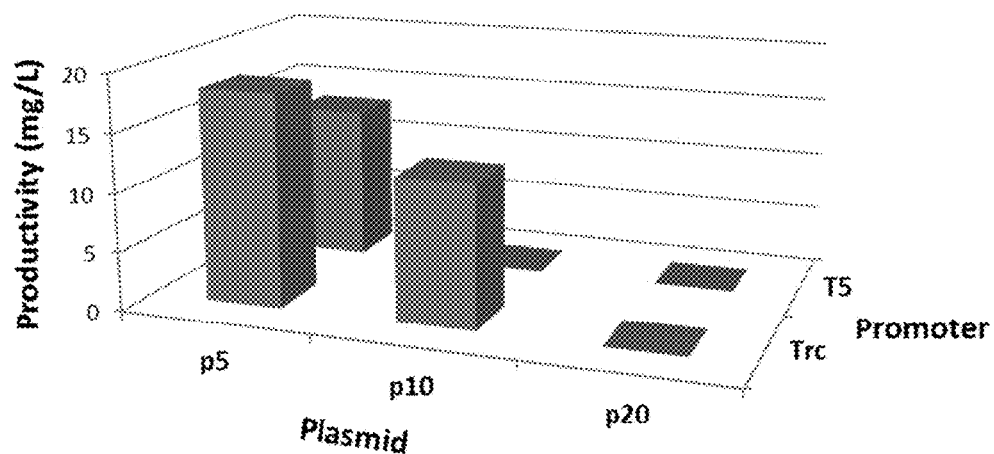
FIG. 11A and FIG. 11B illustrates the MMME landscape exploration of SrKO constructs under varying plasmid copy numbers and promoter strength. Imbalanced modules show less or no kaurenoic acid accumulation, with an associated increase in upstream kaurene accumulation instead.
Figure 11B:
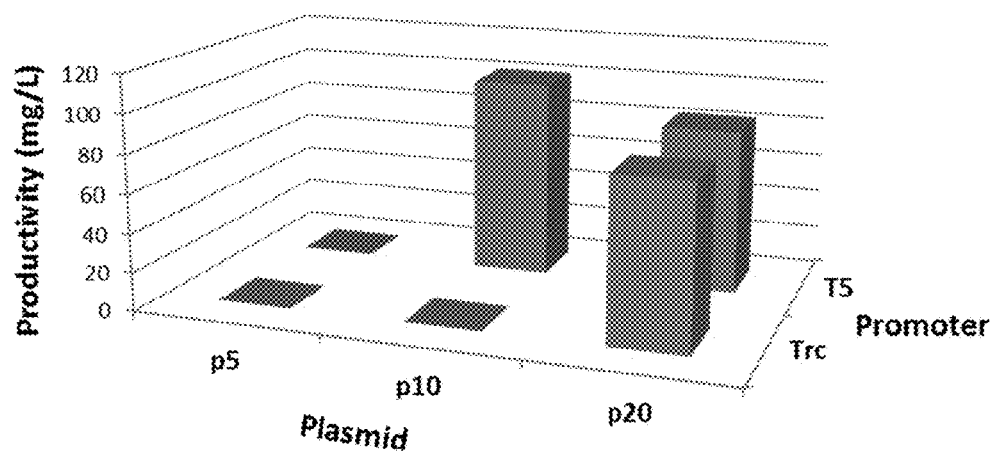

In the initial screening of the above SrKO strains, it was found that the availability of substrate pool for subsequent conversion to kaurenoic acid is important. When a high substrate (kaurene) pool was available (strain 9) the oxidation pathway converted kaurene to ~60 mg/L of oxygenated kaurene compounds. Previous in vitro studies on the enzymatic activity of the Arabidopsis thaliana KO enzyme demonstrated that the enzyme produces the alcohol, diol, and aldehyde derivatives of kaurene (12). Similar product diversity is seen with taxol P450 enzymes, however, in that work rebalancing of the entire pathway changed the product profile and produced the hydroxylated taxanes exclusively. Therefore, strain engineering studies were initiated to rebalance the KO P450 module and upstream modules. In order to rebalance the modules, the KO pathway was transferred into the high kaurene-producing chromosomally-integrated strain (Strain 47) and tested for activity and productivity (FIG. 10). Orthologous KO enzymes from different organisms were also designed, synthesized and tested (Table 1) to identify the best variant enzymes. Multivariate pathway optimization was performed, as with the kaurene pathway, to identify the best variant enzyme and their non-linear product profiles and product distributions under varying flux balances (FIG. 11A and FIG. 11B). SrKO activity was subsequently improved by designing and testing a collection of point mutants in the wild-type background (Table 4).

Upon successful production of kaurenoic acid, the final enzymatic step in the biosynthetic pathway was incorporated and tested, hydroxylation at the C13 carbon of kaurenoic acid by the enzyme KAH to yield steviol (FIG. 1 and FIG. 2). Studies on the polycistronic expression of SrKO and SrCPR proved that this enzymes can be expressed as independent components and remain functionally active. It was determined whether both KO and KAH could be functionally active with a single SrCPR enzyme. In order to limit the number of plasmids and balance the expression of KO and KAH, a single copy SrCPR was chromosomally integrated into a kaurene engineered strain. The KO and KAH was constructed as polycistronic expression under p5Trc plasmid. Detectable levels of steviol were detected in GC-MS analysis of all strains (Table 5) after four days fermentation and extraction with ethyl acetate.

Figure 12:
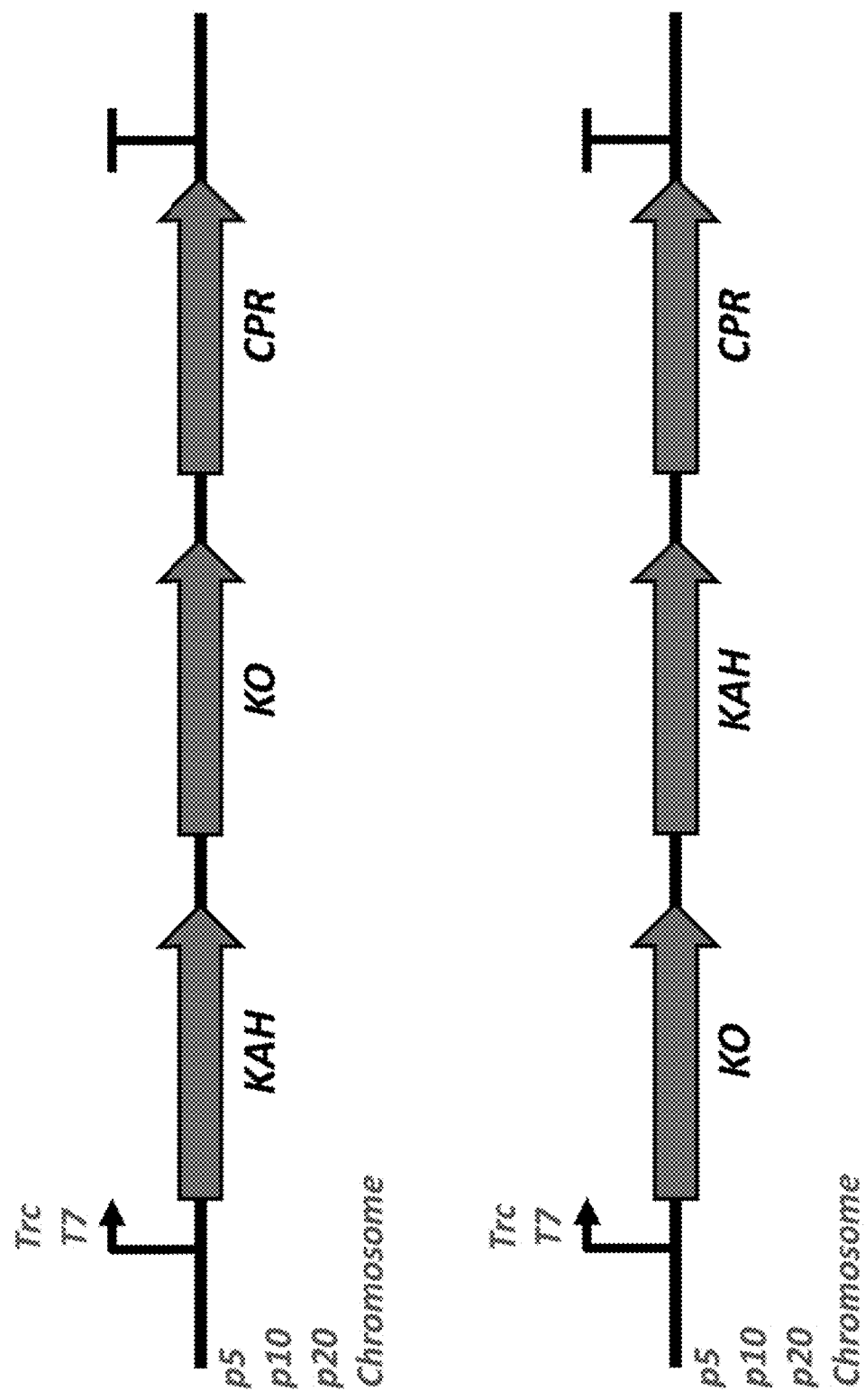
FIG. 12 shows design of a CYP450 expression module to screen for optimum enzyme variants, N-terminal truncations, and point mutations of KO, KAH, or CPR genes. The two P450s and the CPR enzyme are expressed in a polycistronic operon under various promoter strengths in either plasmid or chromosomally-integrated format.
Figure 13A:
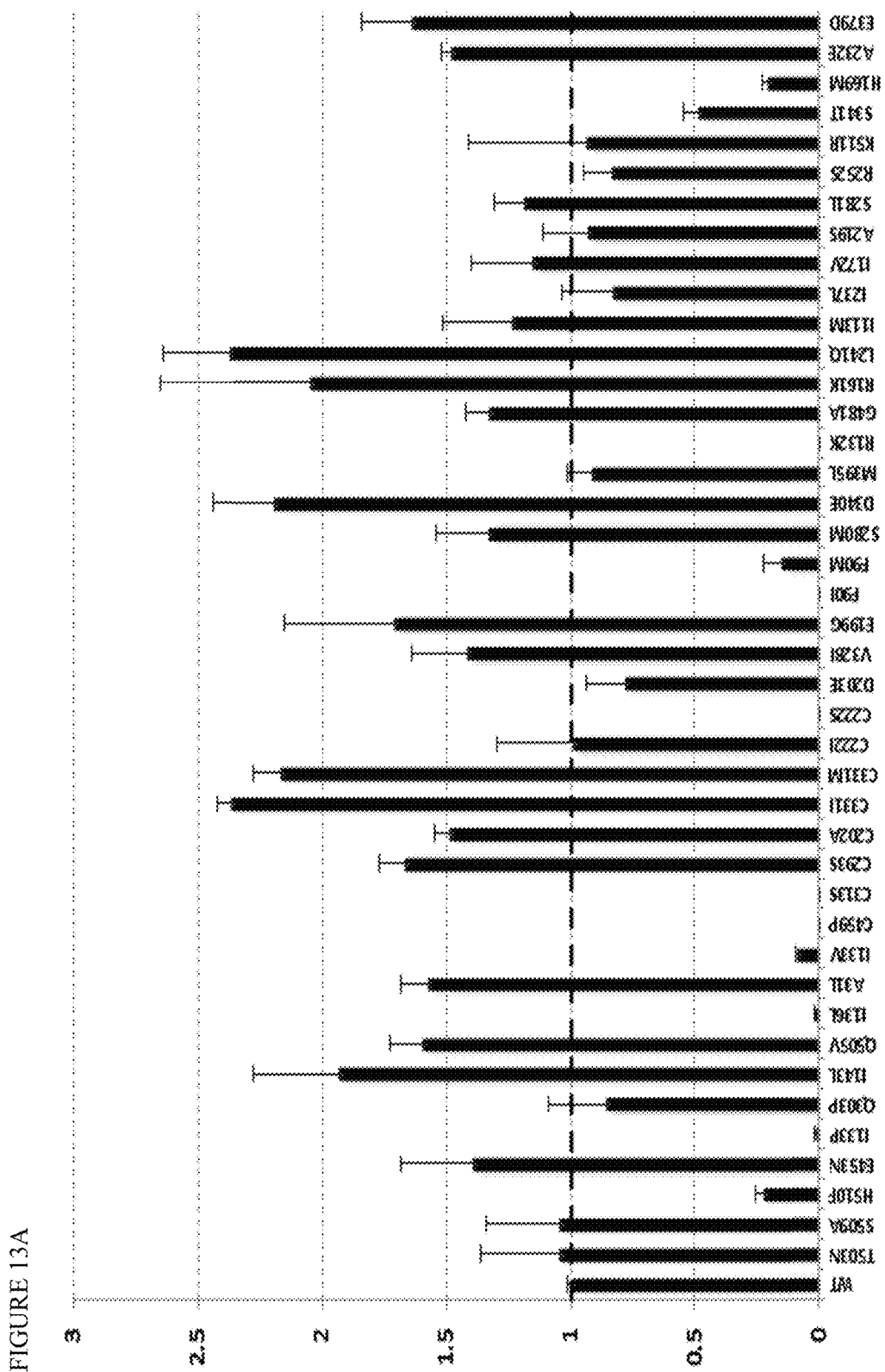
FIG. 13A and FIG. 13B show point mutants of AtKAH enzyme, as represented by fold-change in kaurenoic acid hydroxylase activity relative to wild-type AtKAH.
Figure 13B:
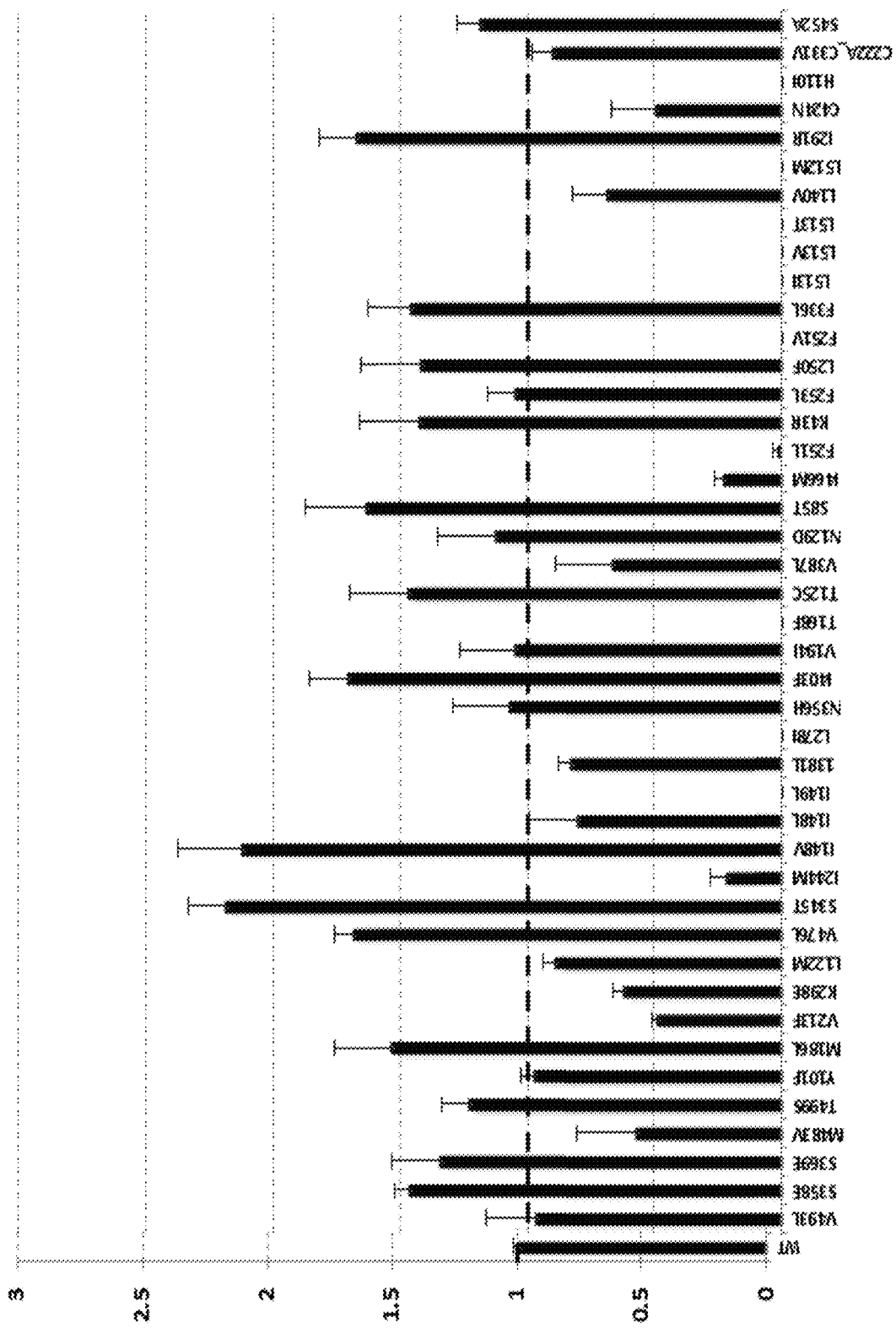
Figure 14:
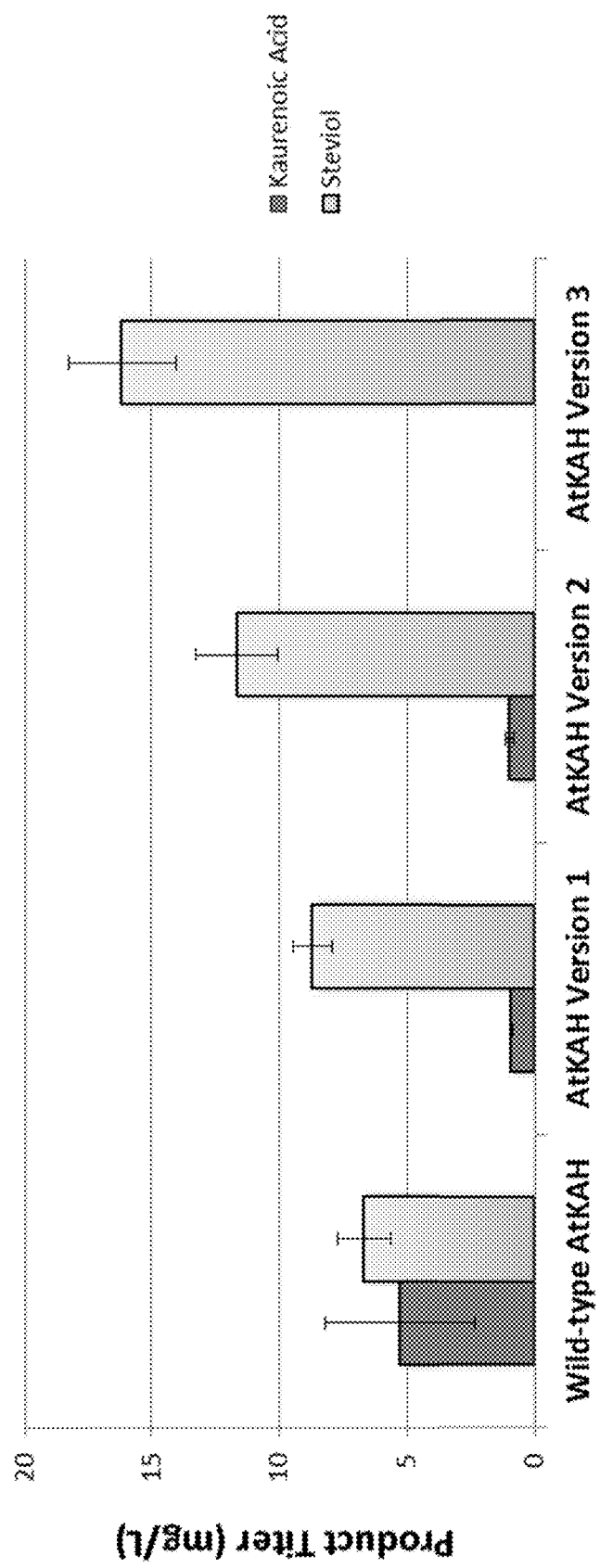
FIG. 14 shows a series of engineered AtKAH that demonstrate improved steviol productivity and eventual complete conversion of kaurenoic acid to steviol.
Figure 15:
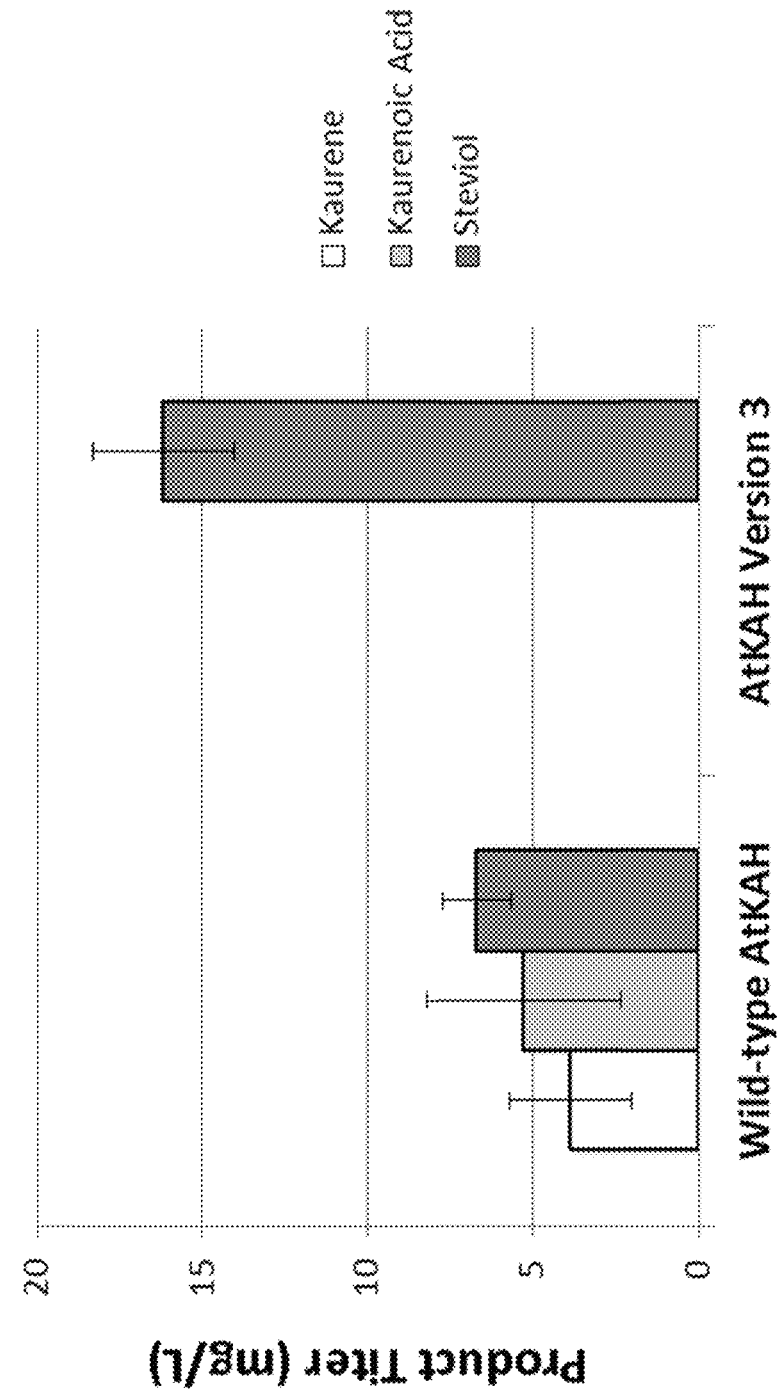
FIG. 15 shows that, in a properly balanced module, the two P450s (AtKAH and SrKO) and the co-factor CYP450 reductase (SrCPR) are capable of complete conversion of kaurene through kaurenoic acid through to steviol.

With this promising initial result in hand, the optimal enzymes for assembly into a biosynthetic pathway in E. coli were identified by in vivo expression of different engineered versions of both a KO and KAH candidate in a polycistronic operon with a CPR co-factor enzyme (FIG. 12). The AtKAH enzyme was further enhanced with a campaign of point mutations. A rational approach was used to design a collection of single point mutations in the AtKAH sequence, aimed at increasing stability, solubility, or activity of the wild-type enzyme for improved conversion of kaurenoic acid to steviol. The point mutations and corresponding fold-change improvements over wild-type AtKAH are summarized in Table 6, and are visualized in FIG. 13A and FIG. 13B. Some of these point mutations were then recombined in the AtKAH enzyme, and a recombinant enzyme was identified that was capable of complete conversion of kaurenoic acid to steviol (FIG. 14). When expressed in an operon with optimal SrKO and SrCPR, complete conversion of kaurene to steviol was demonstrated (FIG. 15), further highlighting the importance of careful balancing of pathway components.

(C) Engineering Small Molecule Glucosylation in *E. coli*

Figure 16:
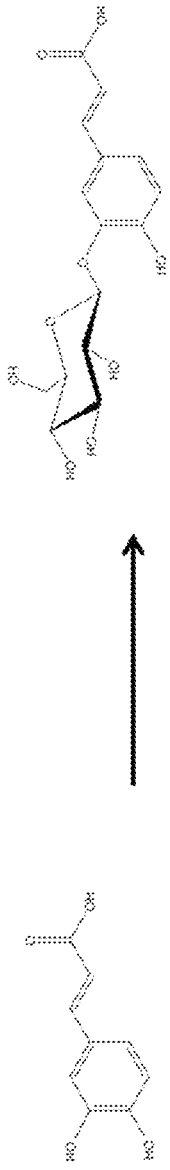
FIG. 16 demonstrates increased UDP-glucose production in *E. coli* using a model system: glycosylation of a small molecule caffeic acid with terpene producing *E. coli* strains engineered for increased UDP-glucose production, producing caffeic acid 3-glucoside using *Vitis vinifera* glycosyltransferase 2 (VvGT2) overexpressed from a pET plasmid. The improvement in glycosylated caffeic acid titers compared to the unmodified background strain shows an increase in the UDP-glucose substrate pool to support glycosylation. Strain 1 is Strain 47 (Table 2) with knock-outs of the galactose catabolic module (galETKM), UDP-sugar pyrophosphatase (ushA), phosphoglucomutase (pgm), glycose-1 phosphatase (agp), β-galactosidase (lacZ), and overexpressing sucrose phosphorylase (spl) under the Trc promoter (see Table 7). Strain 2 is Strain 47 (Table 2) with knock-outs of the galactose catabolic module (gaLETKM), UDP-sugar pyrophosphatase (ushA), phosphoglucomutase (pgm), glycose-1 phosphatase (agp), β-galactosidase (lacZ), and overexpressing and sucrose phosphorylase (spl) under the T7 promoter (see Table 7).
Figure 16:
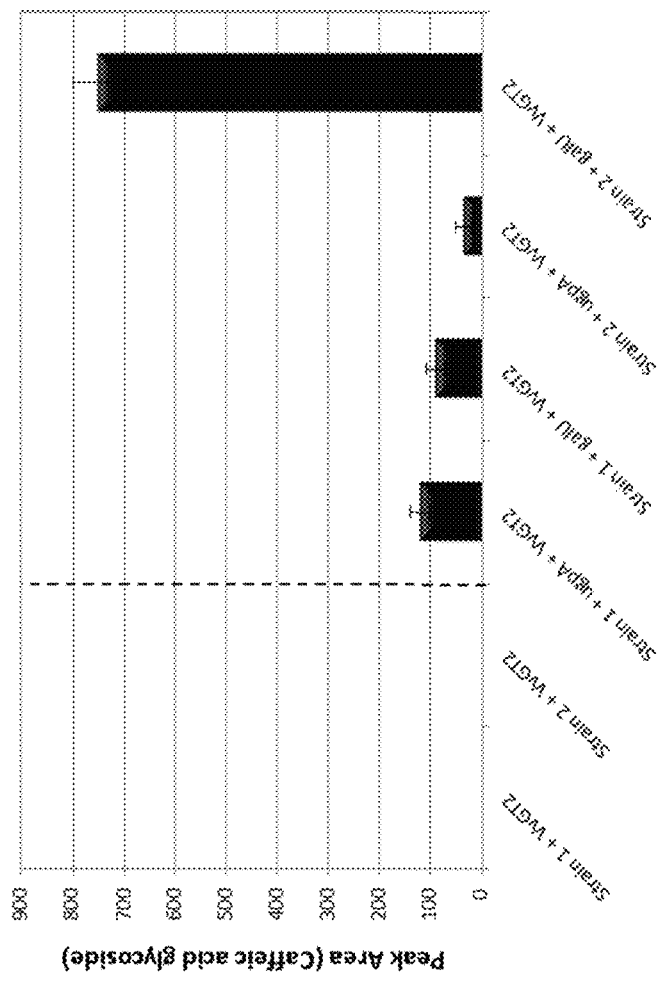

To support multiple glycosylation of steviol to rebaudioside M and all intermediate steviol glycosides, a series of modifications were introduced to the background *E. coli* strain intended to increase the amount of UDP-glucose available. A series of gene knock-outs and gene insertions were made aimed at increasing carbon flux to UDP-glucose and decreasing flux in pathways away from UDP-glucose not in keeping with small molecule glycosylation (i.e., glycogen synthesis and carbon storage). The design enables the import of sucrose into the cell and its splitting into fructose and glucose via the activity of sucrose phosphorylase. A subsequent series of knock-outs have altered primary metabolism so as to force biomass to be synthesized using only fructose as carbon source, leaving glucose to be funneled exclusively towards UDP-glucose biosynthesis when the cells are grown using sucrose as a carbon source. However, the cells are still capable of growth and improved UDP-glucose availability when grown on either glycerol or glucose as the carbon source. The specific modifications applied to the *E. coli* strain to enact this strategy are listed in Table 7. These modifications were tested to determine whether they enabled enhanced glycosylation of small molecules, and demonstrated that they indeed do by showing enhanced in vivo glycosylation of caffeic acid (supplemented in the media) by the engineered strains (FIG. 16).

Figure 17:
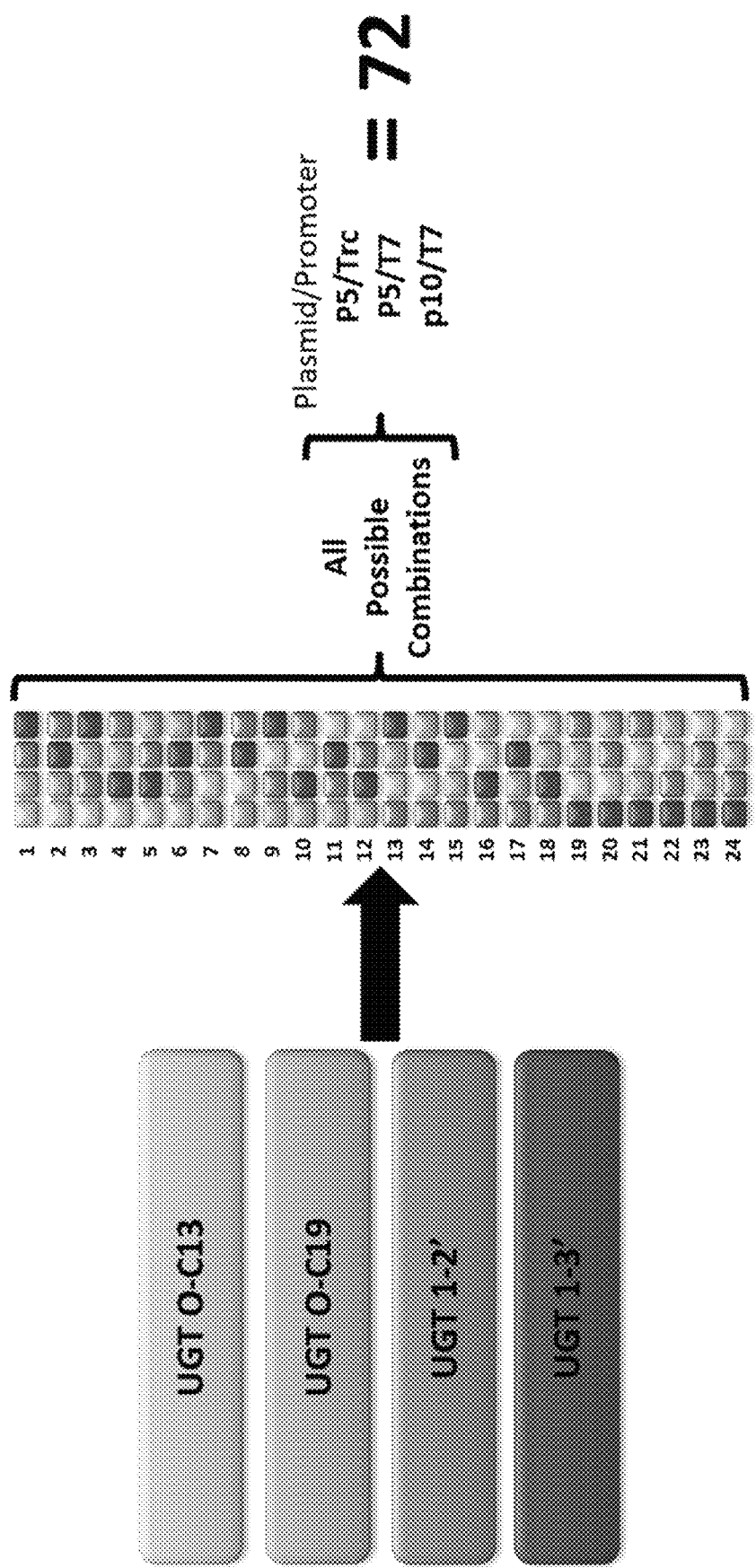
FIG. 17 shows the process for identification of an optimum glycosylation module incorporating all four UGT activities. All 24 possible combinations are rapidly assembled in three different plasmids, enabling expression at three different levels, for a total of 72 potential constructs.
Figure 18A:
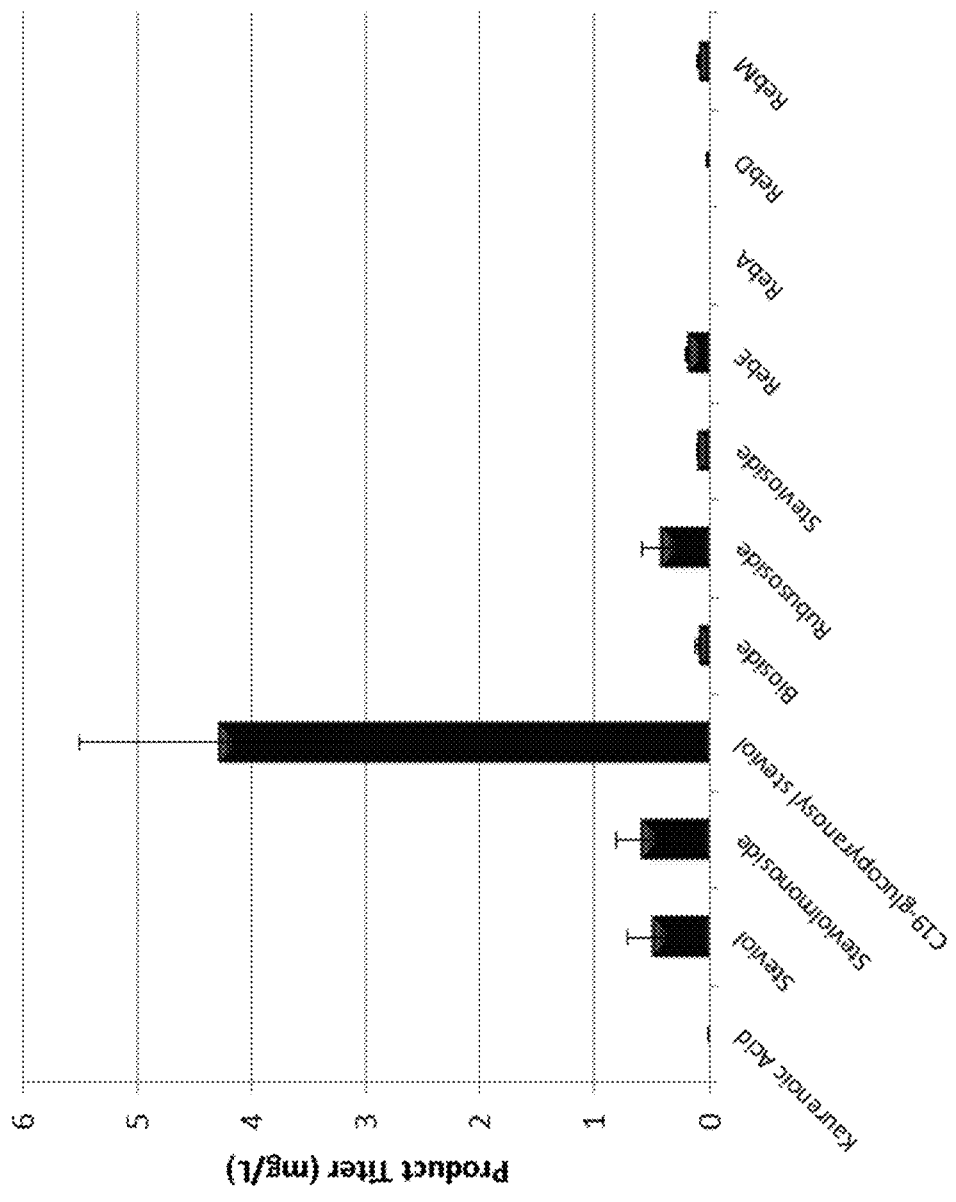
FIG. 18A and FIG. 18B show in vivo production of RebM.
Figure 18B:
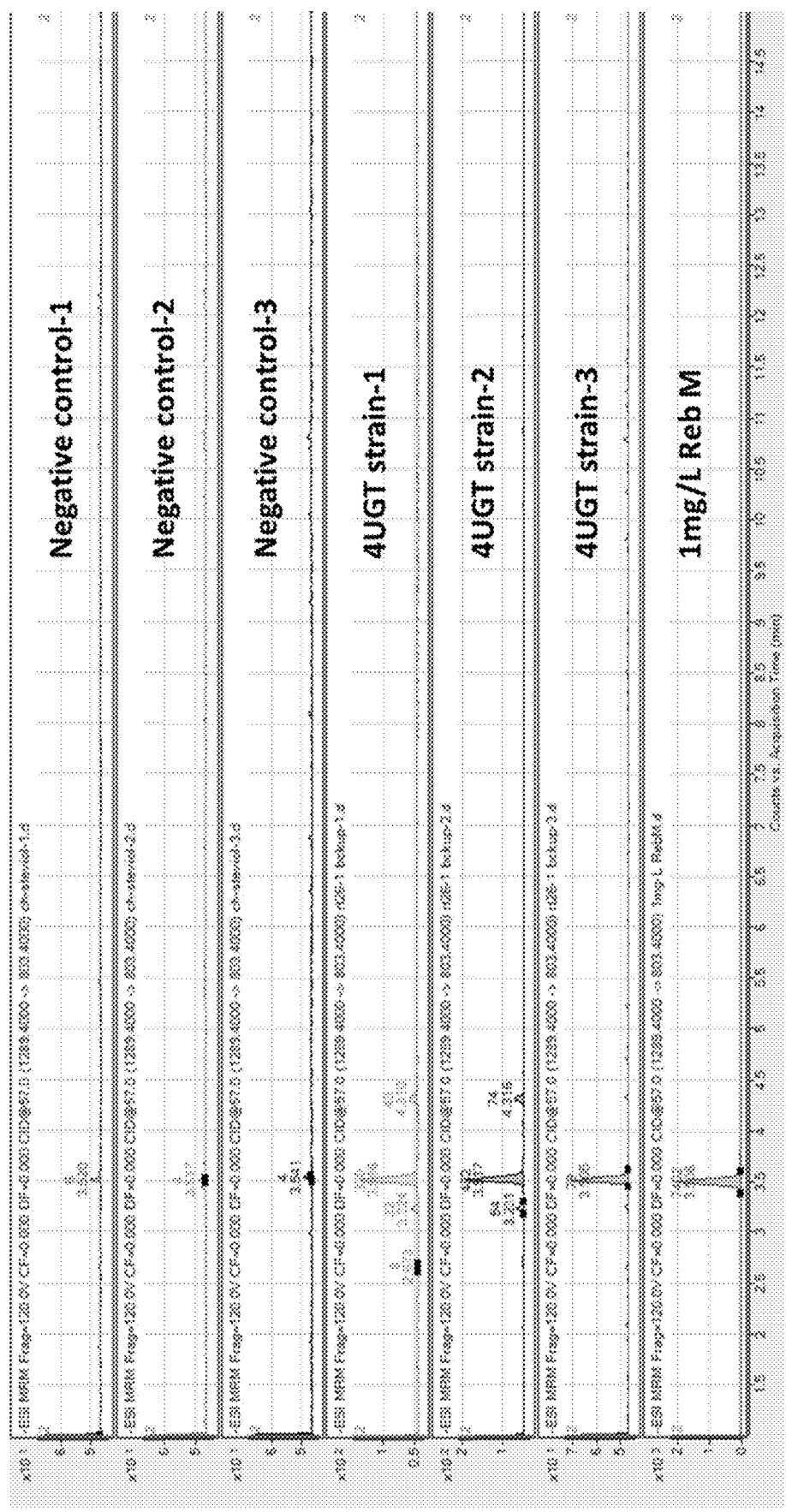

Having constructed the steviol core molecule, the core was glycosylated with UDP-glucose using an assembly of four UGTs, each capable of different glycosylation chemistries (Tables 8 and 9). These chemistries include (1) O-glycosylation at C13 of steviol, (2) 0-glycosylation at C19 of steviol, (3) 1-2'-glycosylation at either the C13 or C19 O-glucose, and (4) 1-3'-glycosylation at either the C13 or C19 O-glucose (see FIG. 1 for an example incorporating all the above chemistries). Once one or both of the C13 and/or C19 oxygens are glycosylated, further glycosylations can be added to the O-glucose via 1-2' or 1-3' additions. As described below, these UGTs have been fundamentally modified by the shuffling of their domains, and further enhanced by point mutations aimed and enhancing flux through to the desired end product of RebM. The MMME approach was applied to rapidly combine the four UGTs in all possible combinations and screen the resulting constructs in vivo in a steviol-producing strain background (FIG. 17). The improved UGTs assembled in the optimum polycistronic configuration were combined with the four other modules in a single *E. coli* strain. We cultured the strain and demonstrated in vivo production of steviol glycosides leading to rebaudioside M (FIG. 18A and FIG. 18B). The strain is capable of producing 5.7 mg/L of total steviol glycosides, which includes 100 μL of RebM. By generating all possible constructs and expressing them either in plasmids or integrated into the chromosome, under a variety of promoter strengths, steviol glycoside product profiles were obtained with RebD:RebM ratios ranging from 1:1 all the way to 0:1 (no RebD remaining).

To our knowledge, this is the first time two cytochrome P450 monooxygenases have been functionally expressed in *E. coli* for the production of a bifunctional oxygenated terpenoid molecule such as steviol. Additionally, a single CPR enzyme acted as co-factor for both P450 enzymes (KO and KAH) for converting kaurene to steviol. This is another significant leap in the engineering of P450 mediated oxidation chemistry in *E. coli* system. Moreover, to our knowledge, this is the first time four UGTs have been combined in a single *E. coli* strain and demonstrated to be capable of performing six sequential glycosylations of a terpenoid core molecule to produce rebaudioside M, let alone the intermediate steviol glycosides. This is a significant leap forward in the engineering of UGTs and the establishment of a platform for sustainable production of rare steviol glycosides.

Example 2: Construction of Circular Permutants of Glycotransferase Enzymes

Natural selection acting on an enzyme tends to select for sufficient stability and activity for the biological function. This process sends an enzyme down a specific evolutionary path that may make it not readily compatible with the stability and activity gains needed for industrial applications. As an example, enzymes specialized for a specific substrate tend to be more challenging to engineer for new substrates than enzymes that have not been specialized. Thus, 'shaking up' an enzyme by swapping domain connections might create an enzyme with the same protein fold, yet with novel folding and folded interactions that would make it newly-amenable to selection and evolution. In other words, we might be able to 'jump' a protein fold to another point in evolutionary space simply by shuffling the sequence, moving the enzyme away from its original evolutionary path without introducing any amino acid mutations.

UGTs (UDP-glucose glycosyltransferases) have two domains, a more variable N-terminal substrate binding (sugar acceptor) domain and a more conserved C-terminal UDP-glucose binding (sugar donor) domain. The N-terminal domain is mostly determinant of substrate specificity for the enzyme, but some specificity is controlled by the C-terminal domain. Each of these domains makes up roughly half of the protein. Given this two-domain structure, we hypothesized that cutting the protein in half to create new N- and C-termini and attaching the originals together (e.g., circular 'permutization') would 'shuffle' the enzyme and create new opportunities for engineering improved activity (since the resulting enzyme would not be the result of selective pressure).

Figure 19:
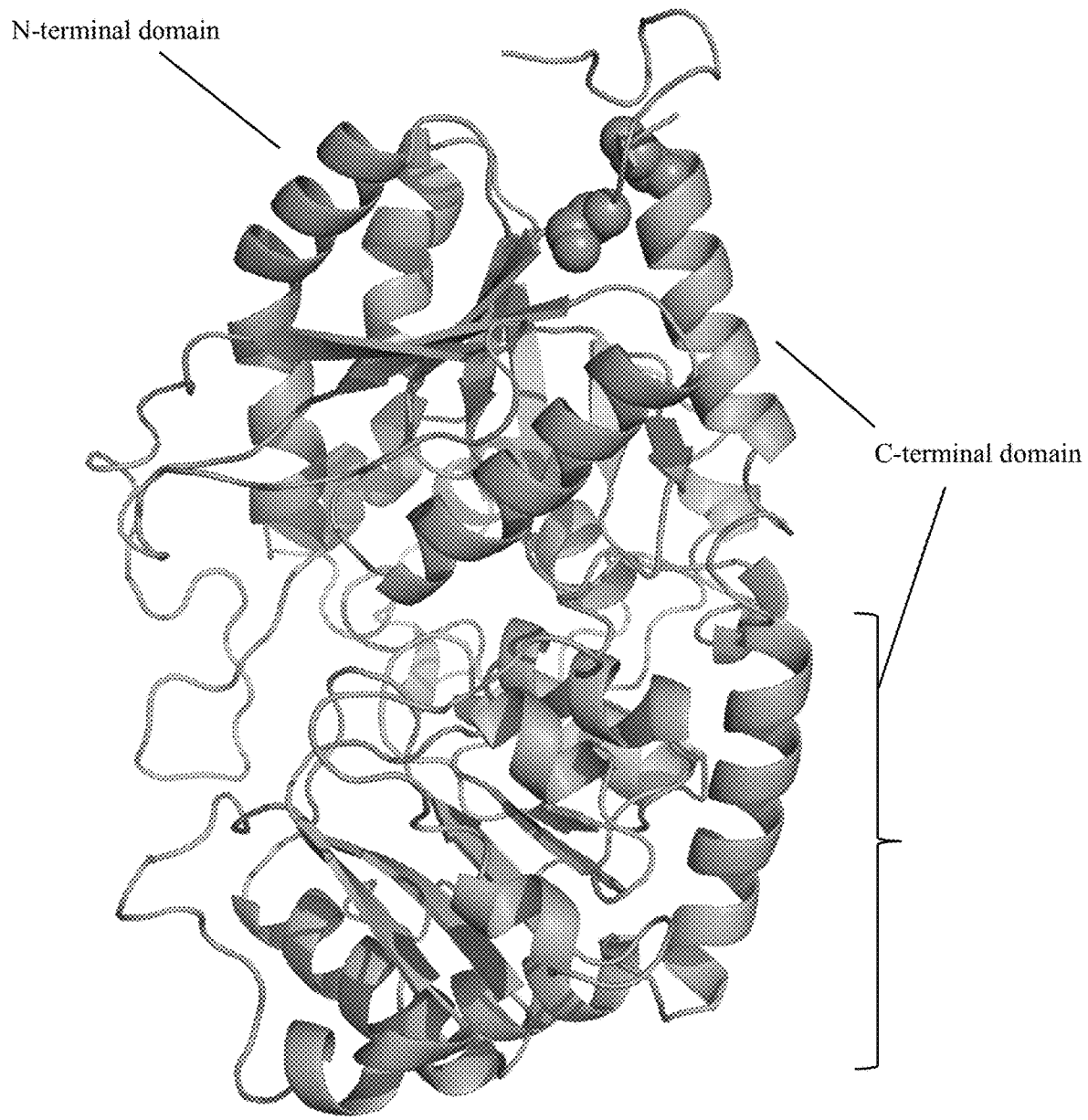
FIG. 19 shows a homology model of OsUGT1-2 (1-2' glycosylating enzyme from rice, *Oryza sativa*), as a starting point for circular permutant design.
Figure 21:
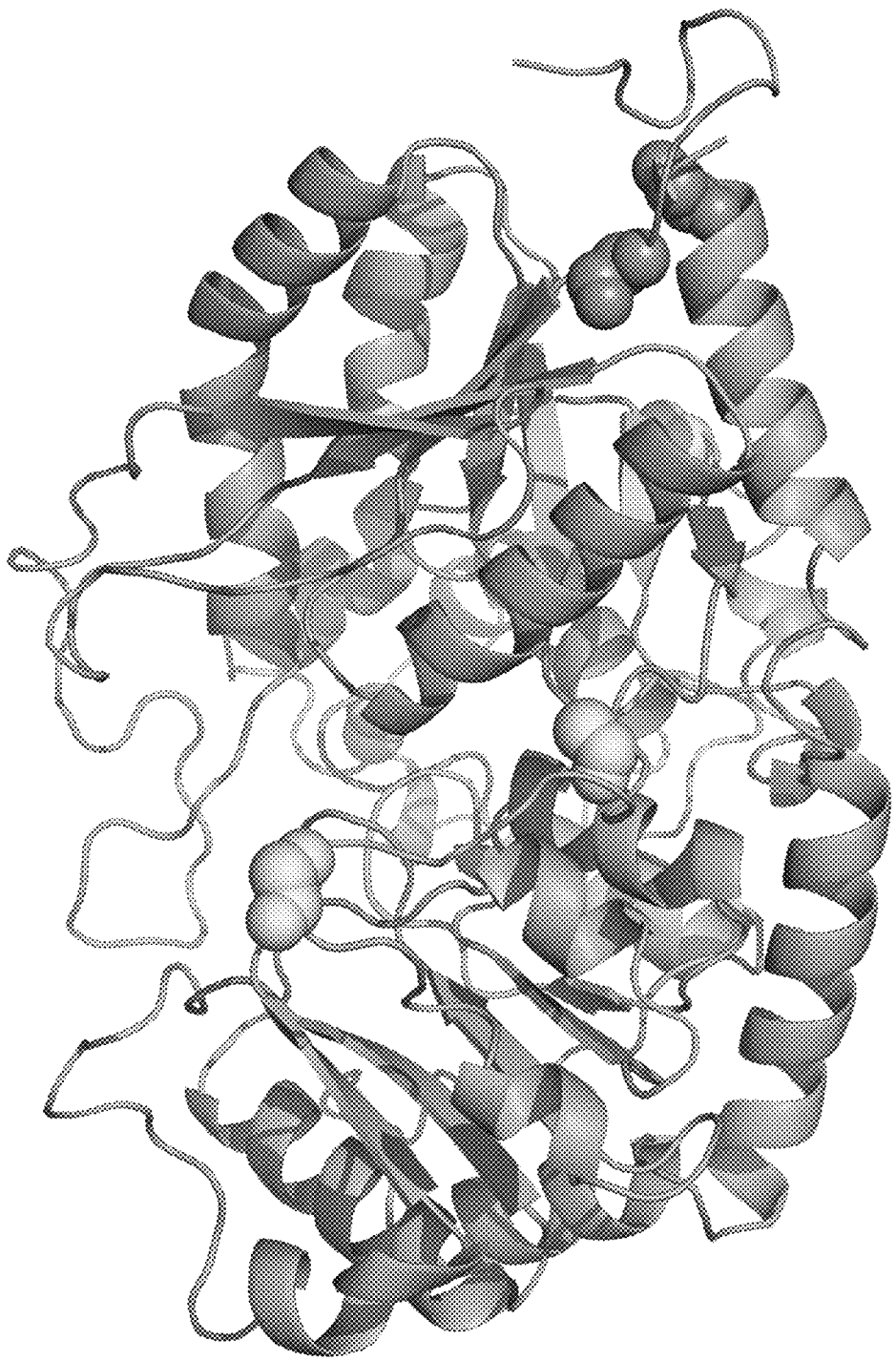
FIG. 21 illustrates criteria for selection of new N- and C-termini for the UGT circular permutant. Positions for new termini should be: (1) solvent exposed and away from the active site to minimize perturbation, (2) close to the middle of the sequence to maximize difference with the parental sequence, and (3) have amino acids often found at existing circular permutant division points (Lo, et al., 2012, PLoS One 7(2):e31791). New N-termini at G198, K240, G250, and G259 fit these criteria.

As a description of general procedure, designing a shuffled enzyme involves the following steps: (i) create a homology model to a known UGT with desired glycosylation activity (FIG. 19); (ii) using the homology model, estimate distance between N- and C-terminal residues; (iii) design linkers of various lengths to connect the existing N- and C-termini; (iv) select positions in the enzyme to become the new N- and C-termini; (v) synthesize the resulting sequences; (vi) express in vivo and in vitro and identify any shuffled enzymes that retain parent activity; (vii) modify designs via rational engineering, informed by a new homology model of the shuffled enzyme; and (viii) repeat step vii until desired activity improvement is achieved. When creating linkers (step iii), identify the N- and C-termini residues closest to ends, but predicted to be directly interacting with the rest of the protein based on the structure in the homology model (FIG. 20A, FIG. 20B, and FIG. 20C). When choosing cut sites for new N- and C-termini (step iv) (FIG. 21), choose a loop region between secondary structure elements, which maintains domain structure, is close to the middle of the sequence as possible, and which is solvent exposed and away from the active site.

Figure 22:
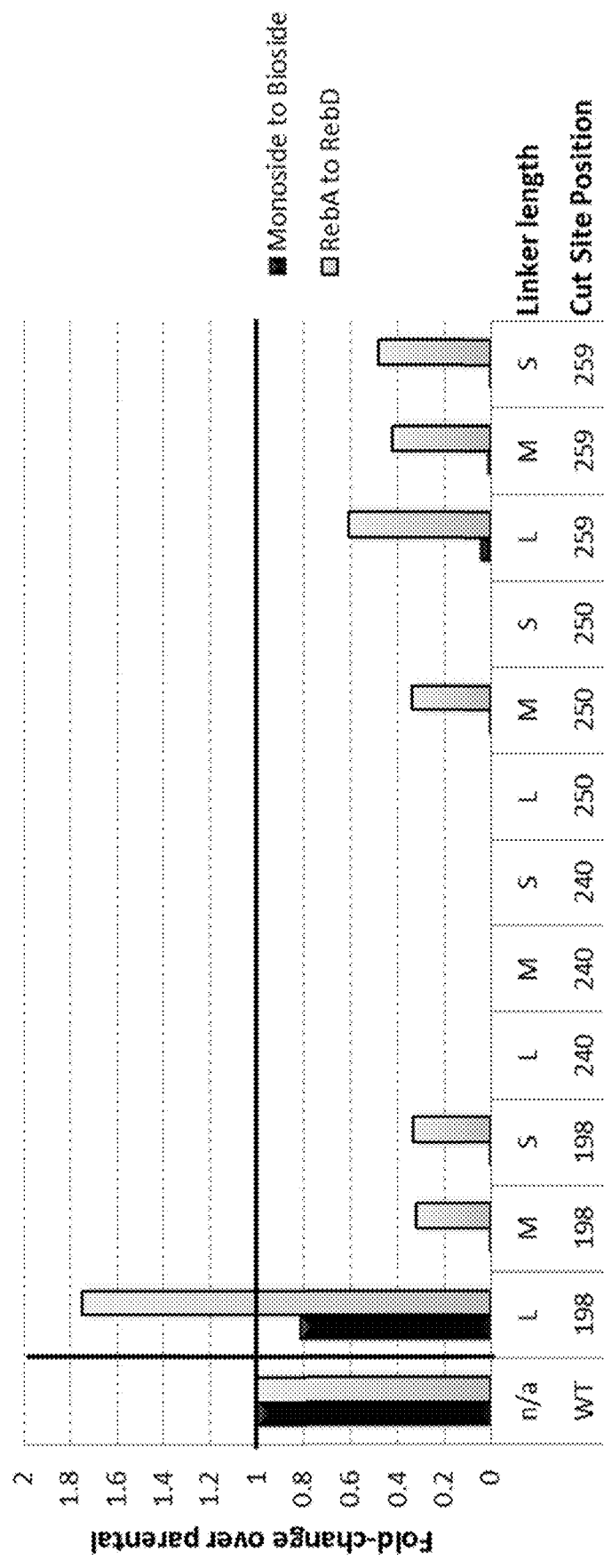
FIG. 22 shows 1-2' glycosylating activity for the first round of circular permutants of OsUGT1-2. The numbers indicate the location of the cut site in the parental sequence used to generate novel positions for N- and C-termini, while the L/M/S designation describes the long/medium/short linkers (which are described in FIG. 20A, FIG. 20B, and FIG. 20C).
Figure 23A:
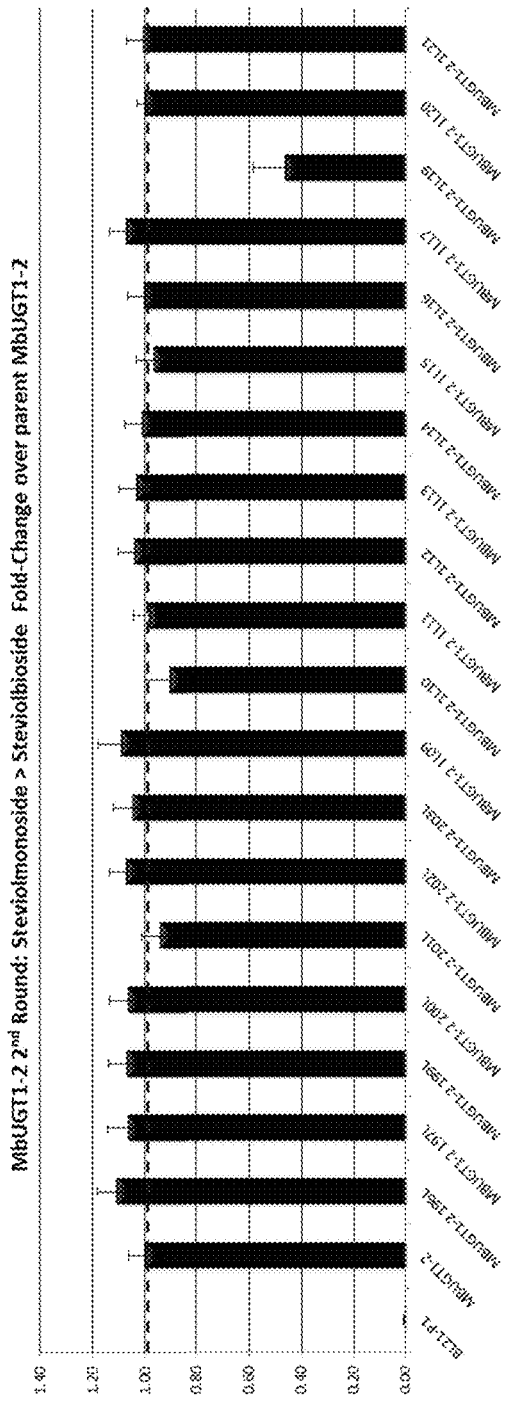
FIG. 23A and FIG. 23B show refinement of the 1-2' UGT circular permutant (MbUGT1-2). Modifications to the cut site and linker length demonstrate significantly enhanced activity on at least one of the substrates possible for this enzyme. Number before L (eg. xxxL) indicates new cut site position, while number after L (eg. 1Lxx) indicates a new linker length in background with the 198 cut site [BL21=negative no UGT control].
Figure 23B:
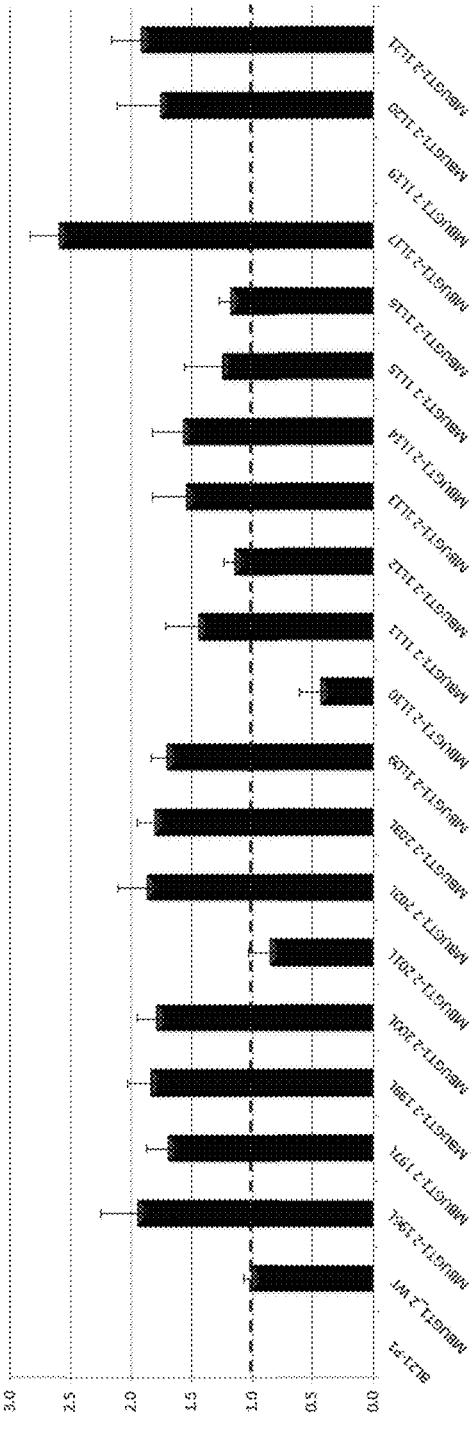

Circular permutants were designed, synthesized, and incorporated for each of the C13, C19, 1-2' and 1-3' glycosylating activities (parent enzymes are SrUGT85C2, SrUGT74G1, OsUGT1-2 (Q0DPB7_ORYSJ) (28), and SrUGT76G1, respectively). All four activities resulted in working circular permutants. As an example, data demonstrating the first round of circular permutant engineering resulting in the novel enzyme MbUGT1-2, showing equivalent activity with the parent enzyme OsUGT1-2 (FIG. 22). A subsequent round of refinement to the shuffled enzyme has generated enzymes with enhanced activities compared to the original parent sequence, demonstrating the potential for this shuffling approach to generate improved enzymes (FIG. 23A and FIG. 23B). These refinements focus on finer-scale modifications to the position and specific residues forming the novel N and C-termini of the shuffled enzyme, as well as refining the length and amino acid sequence of the linker connecting the parental N and C-termini.

Figure 25:
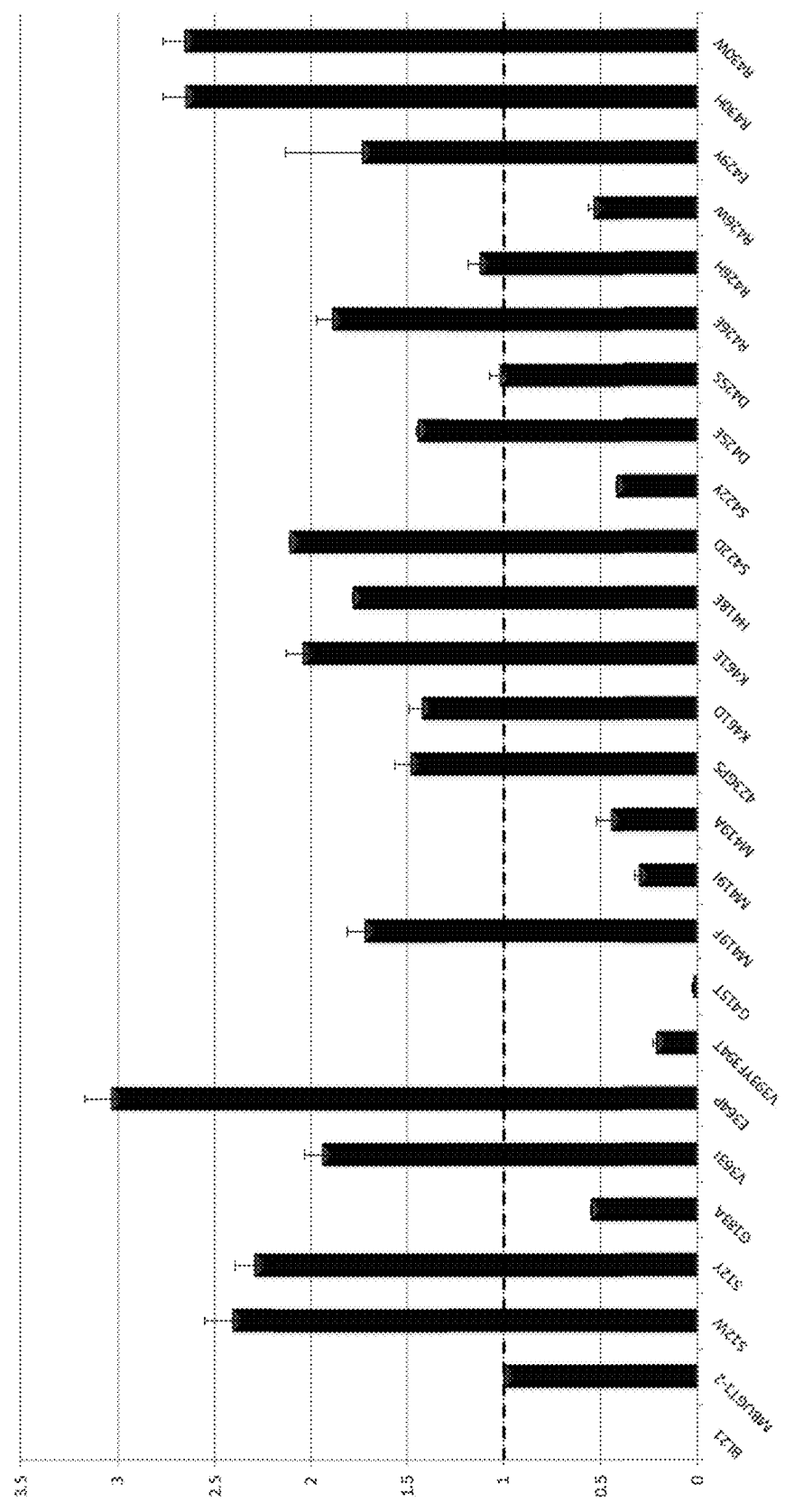
FIG. 25 shows point mutations in the MbUGT1-2 enzyme. Point mutations show increased activity on substrate rebaudioside A, demonstrating the potential for improving UGT enzymes generated by circular permutization. [BL21=negative no UGT control].
Figure 26:
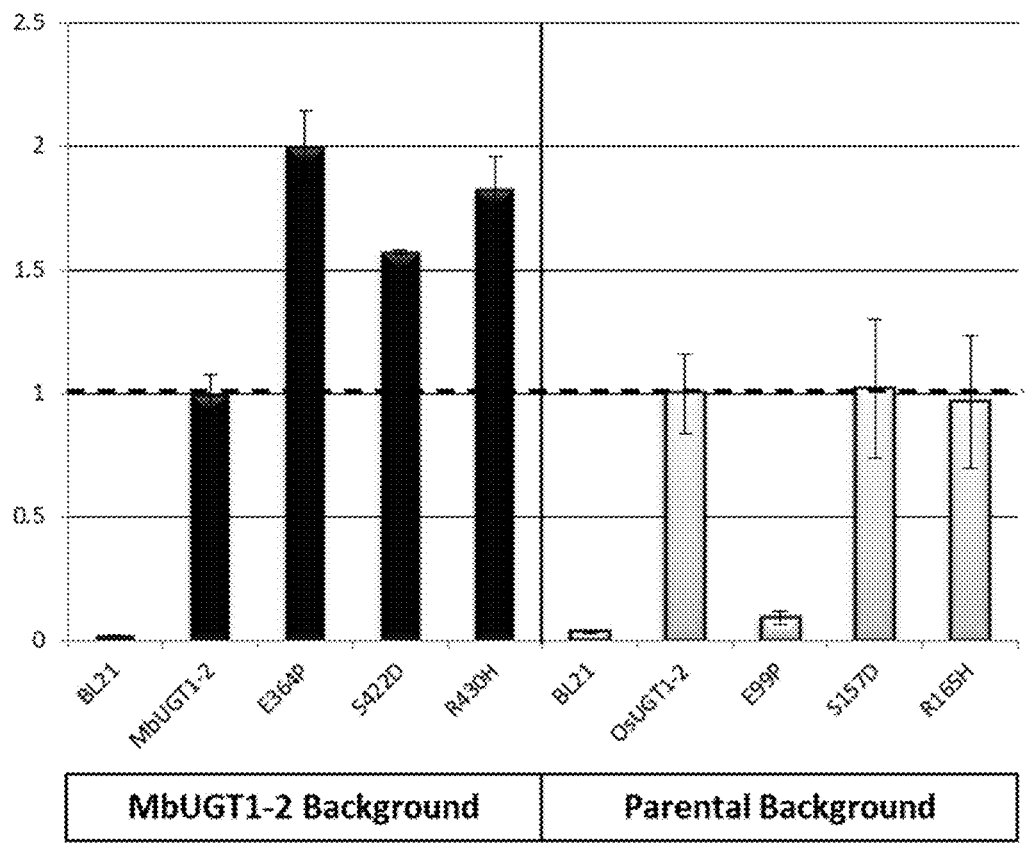
FIG. 26 shows that point mutations that are beneficial to the MbUGT1-2 enzyme do not, when translated to the appropriate amino acid residue in the parental UGT enzyme, result in neutral or even deleterious effects on activity. This demonstrates that circular permutants have the potential for unique improvements and evolution compared to the parent enzyme, brought about by shuffling of the sequence into a novel arrangement not previously selected for by natural selection. [BL21=negative no UGT control].

A series of point mutations to the MbUGT1-2 enzyme has resulted in further improvement to this novel sequence (FIG. 24 and FIG. 25), confirming that the process has created opportunities for significant improvement by shuffling the enzyme sequence. However, when these point mutations conferring improved activity in MbUGT1-2 were tested in the parent OsUGT1-2 background, they were found to be either neutral or deleterious to activity (FIG. 26). The lack of transferability of point mutations between the novel enzyme and the parent sequence confirms that circular permutization is a valuable and general approach for creating opportunities for UGT enzyme improvement.

Example 3: Chimeric Fusions of Distinct Glycotransferases

Figure 27:
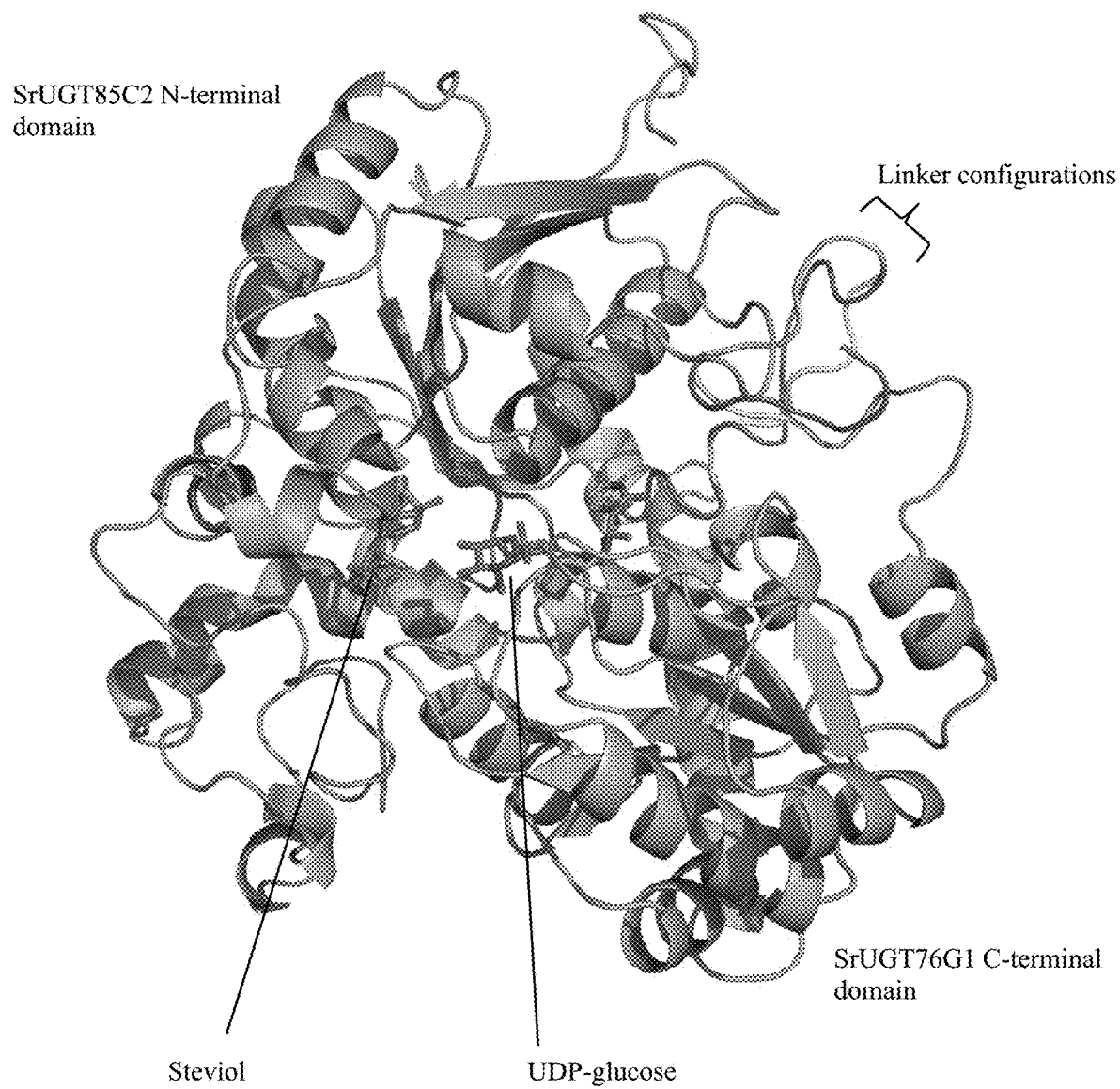
FIG. 27 shows a chimeric UGT with C3-O-glycosylating activity, created by fusing the N-terminus of SrUGT85C2 and the C-terminus of SrUGT76G1.
Figure 28:
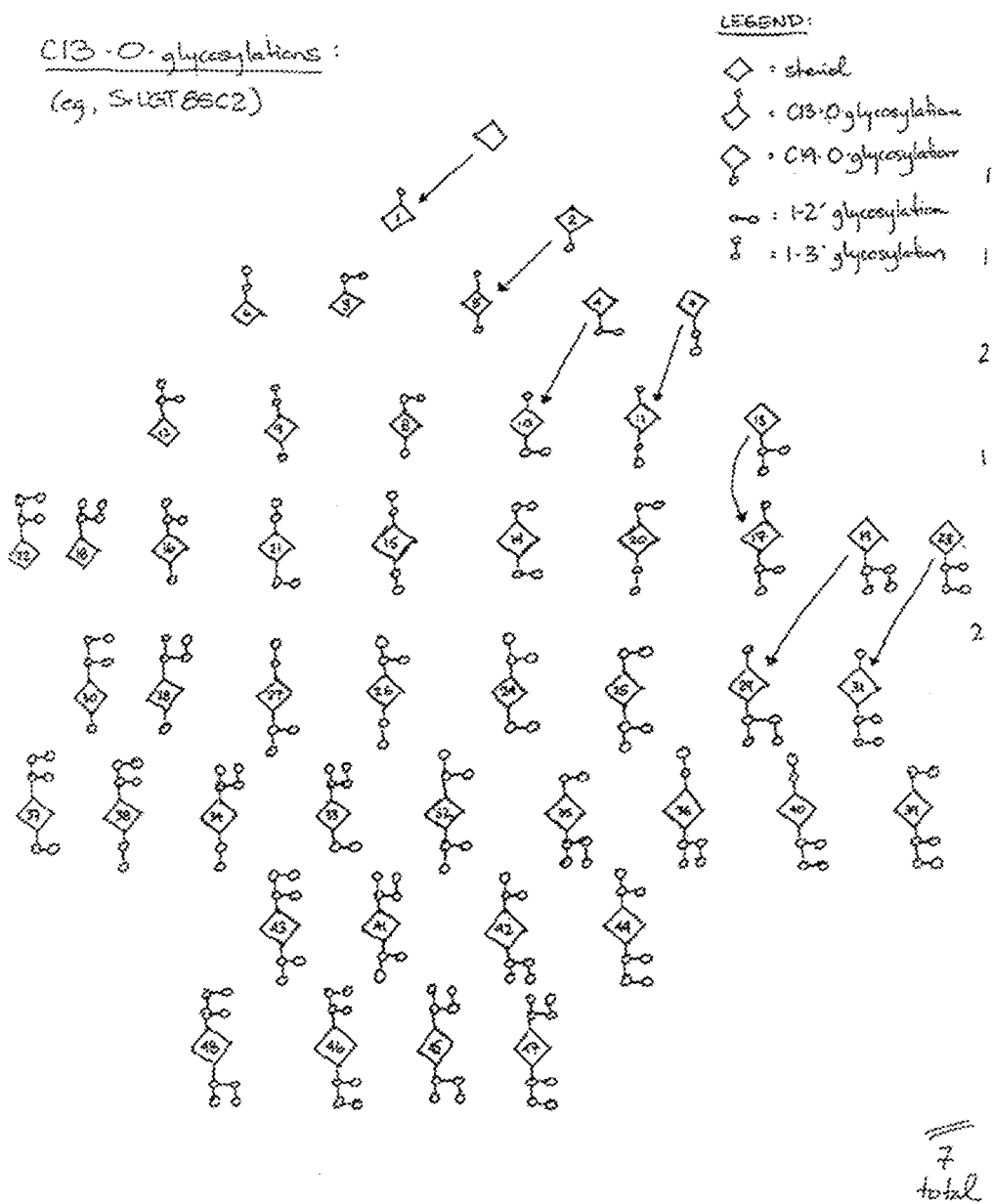
FIG. 28 is a summary of possible reactions (marked by arrows) catalyzed by SrUGT85C2 (i.e., C13-O-glycosylations).
Figure 29:
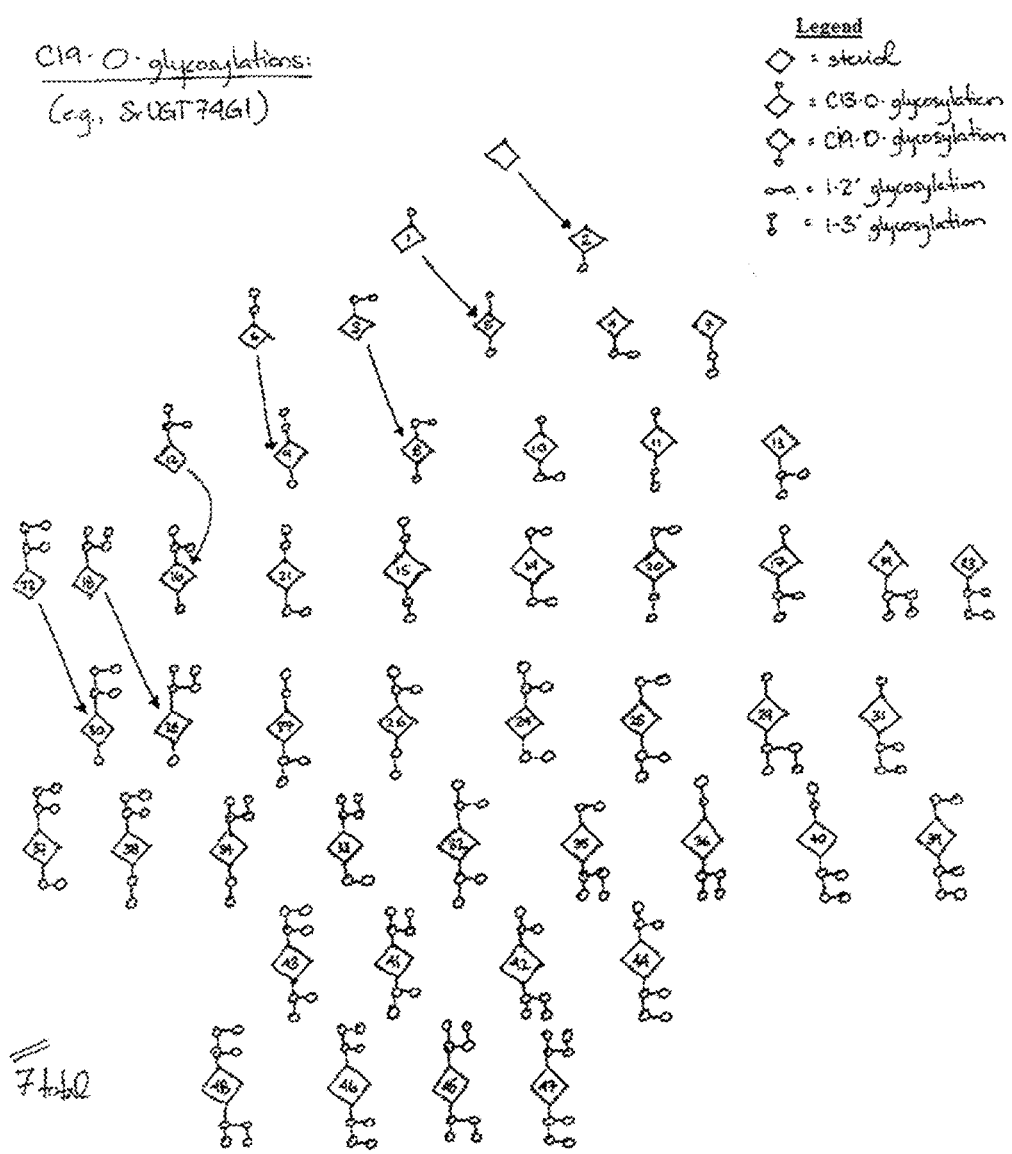
FIG. 29 is a summary of possible reactions (marked by arrows) catalyzed by SrUGT74G1 (i.e., C19-O-glycosylations).
Figure 30:
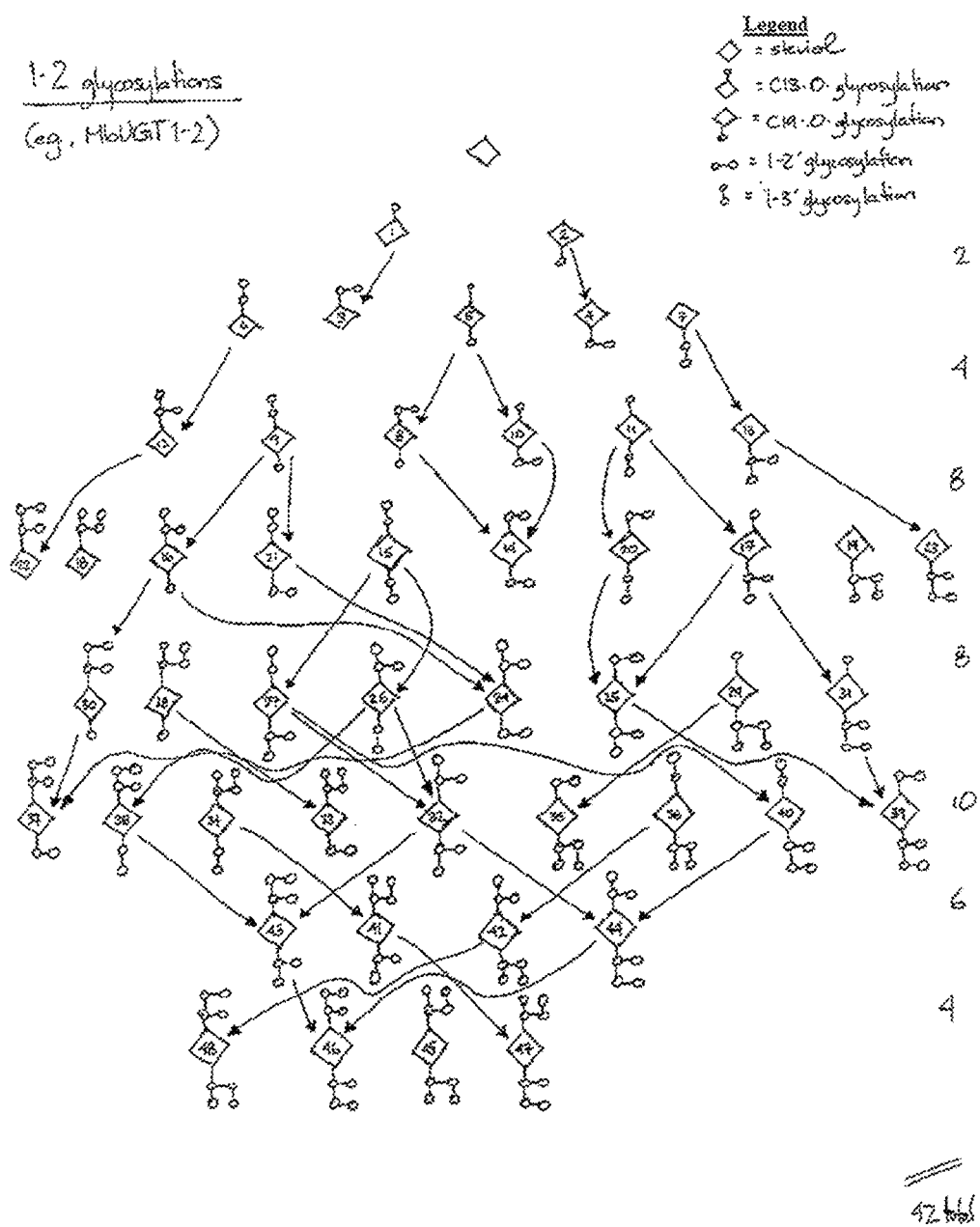
FIG. 30 is a summary of possible reactions (marked by arrows) catalyzed by MbUGT1-2 (i.e., 1-2-glycosylations).
Figure 31:
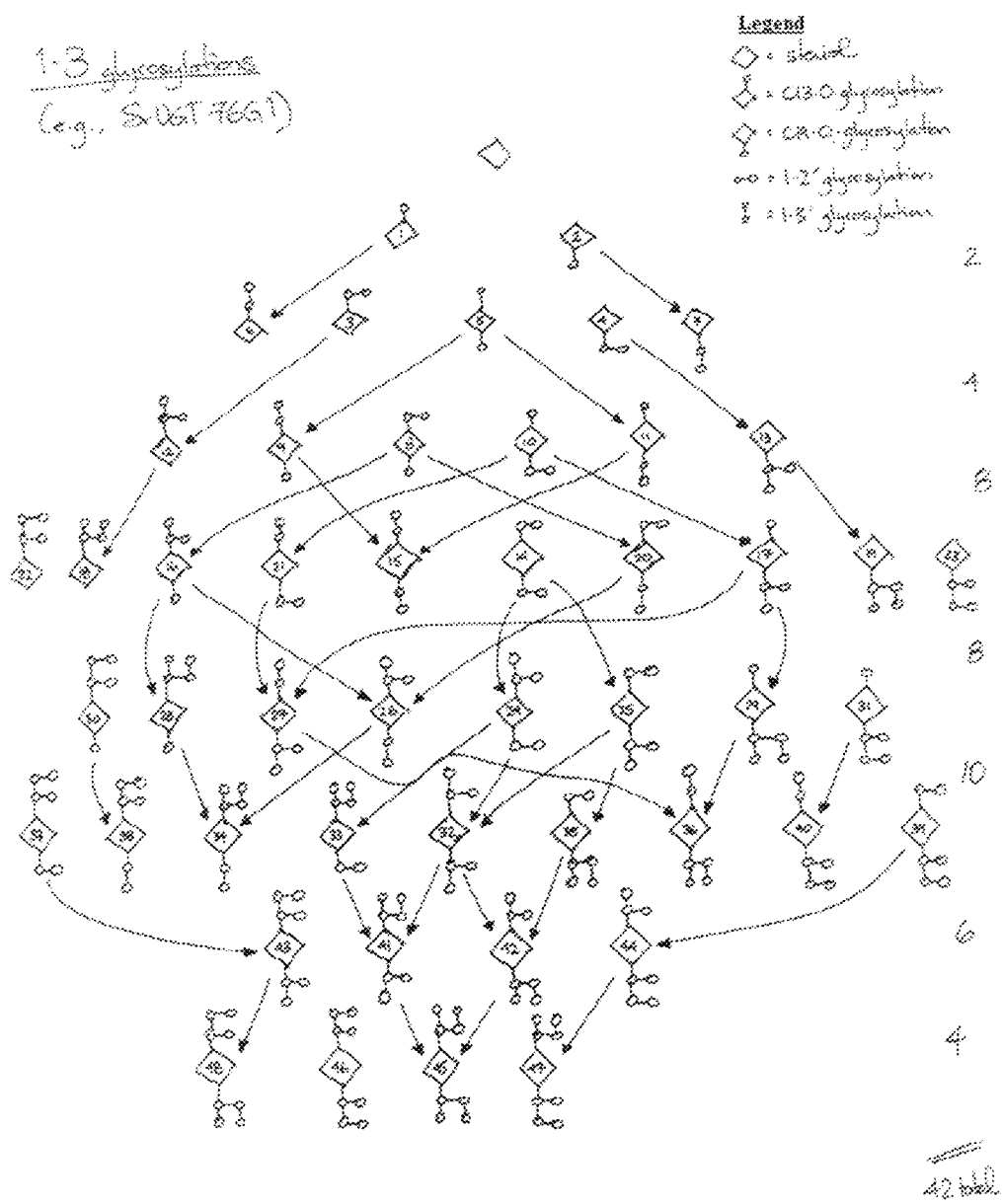
FIG. 31 is a summary of possible reactions (marked by arrows) catalyzed by SrUGT76G1 (i.e., 1-3-glycosylations).
Figure 32A:
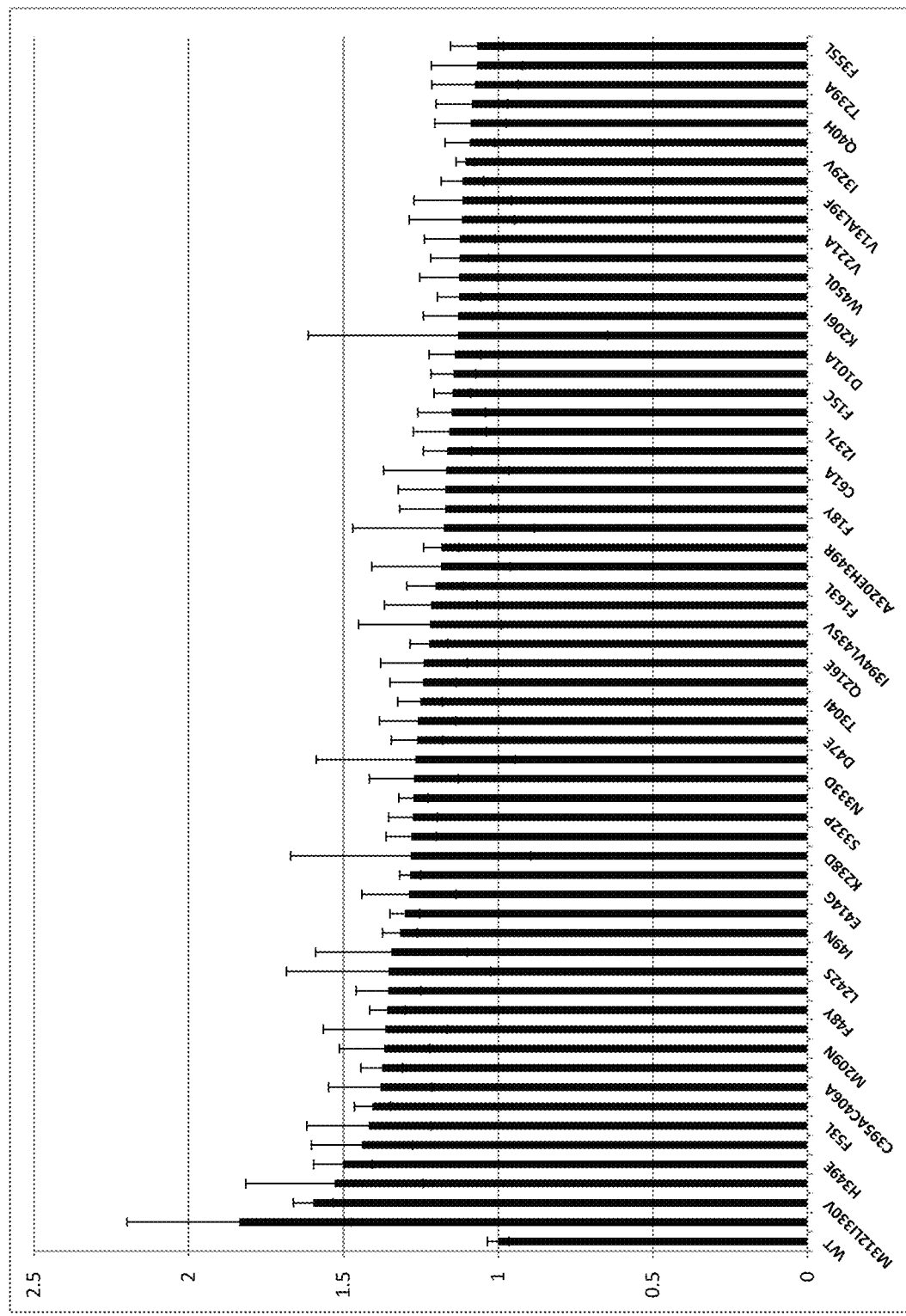
FIG. 32A, FIG. 32B, and FIG. 32C show point mutations in SrUGT85C2 enzyme versus altered activity on steviol substrate. [BL21=negative no UGT control].
Figure 32B:
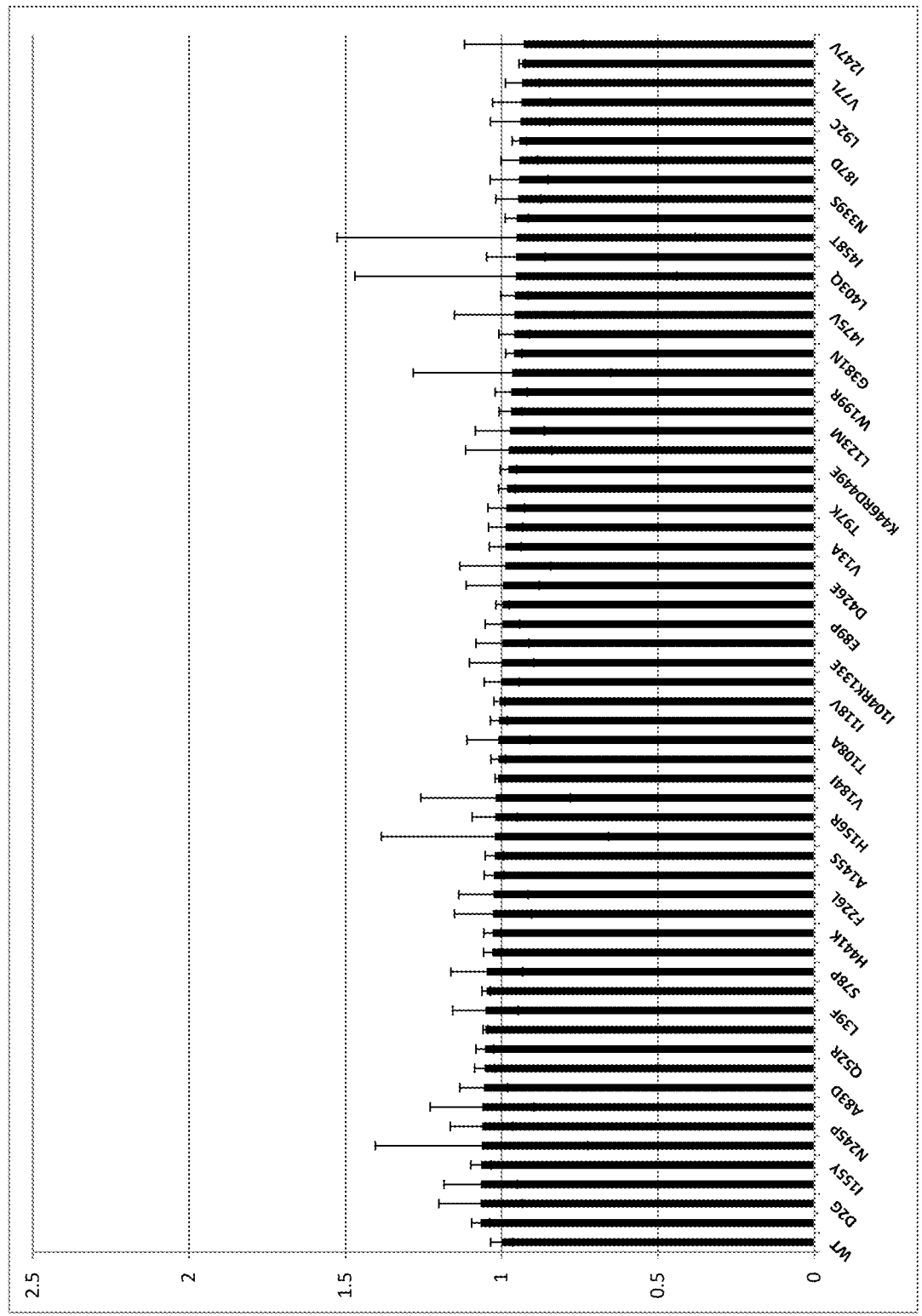
Figure 32C:
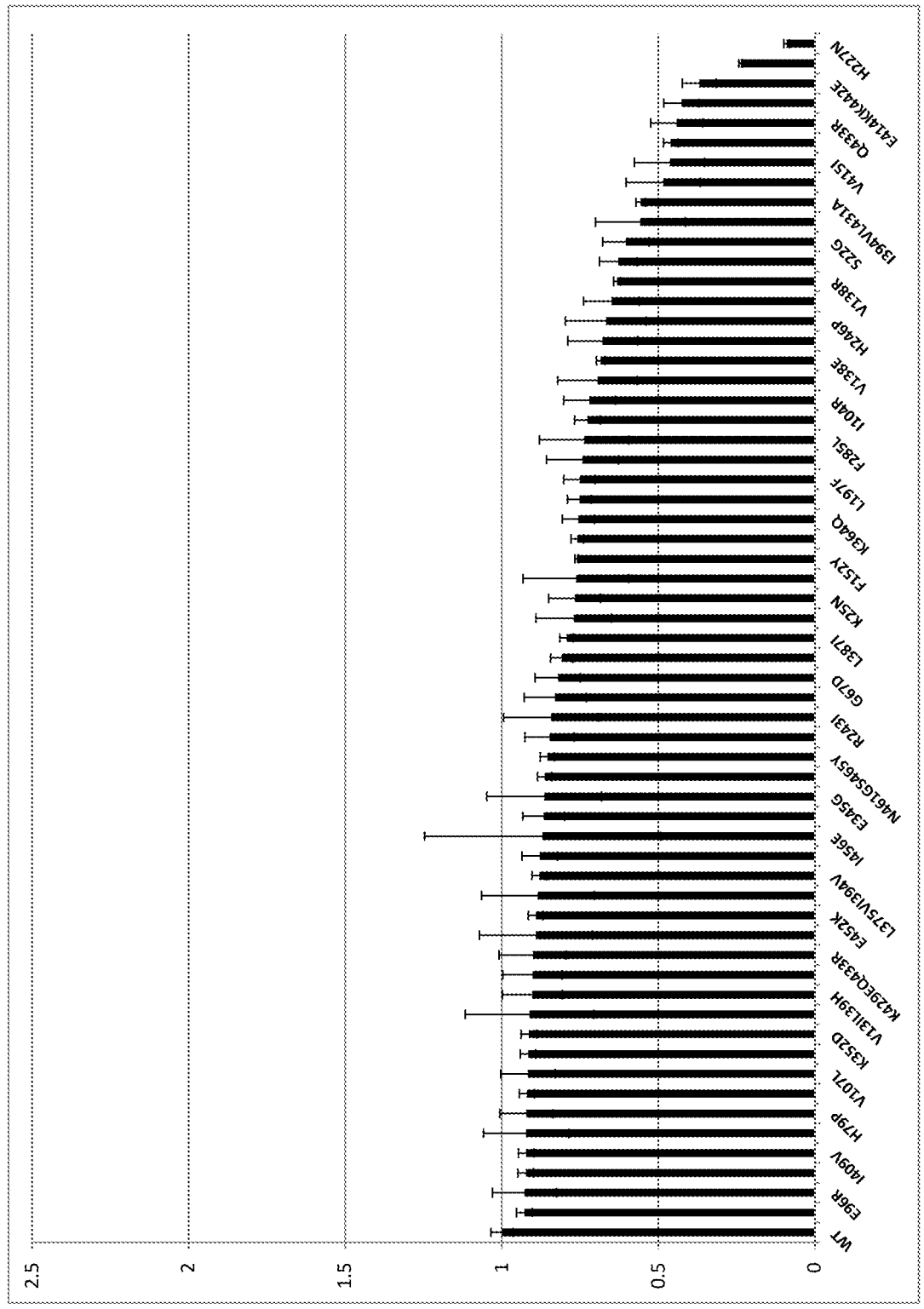
Figure 33A:
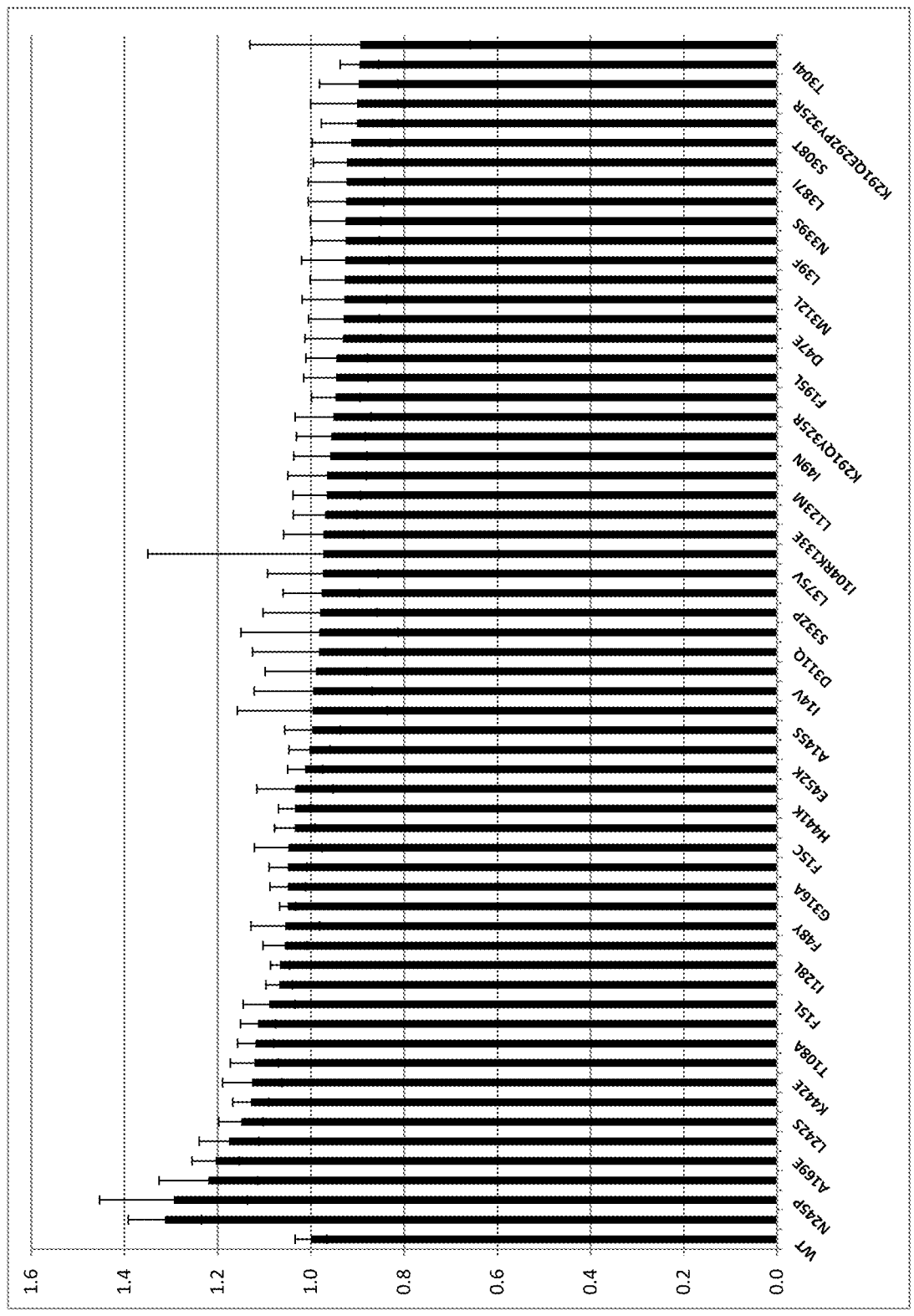
FIG. 33A, FIG. 33B, and FIG. 33C show point mutations in SrUGT85C2 enzyme versus altered activity on C19-glucopyranosyl steviol substrate. [BL21=negative no UGT control].
Figure 33B:
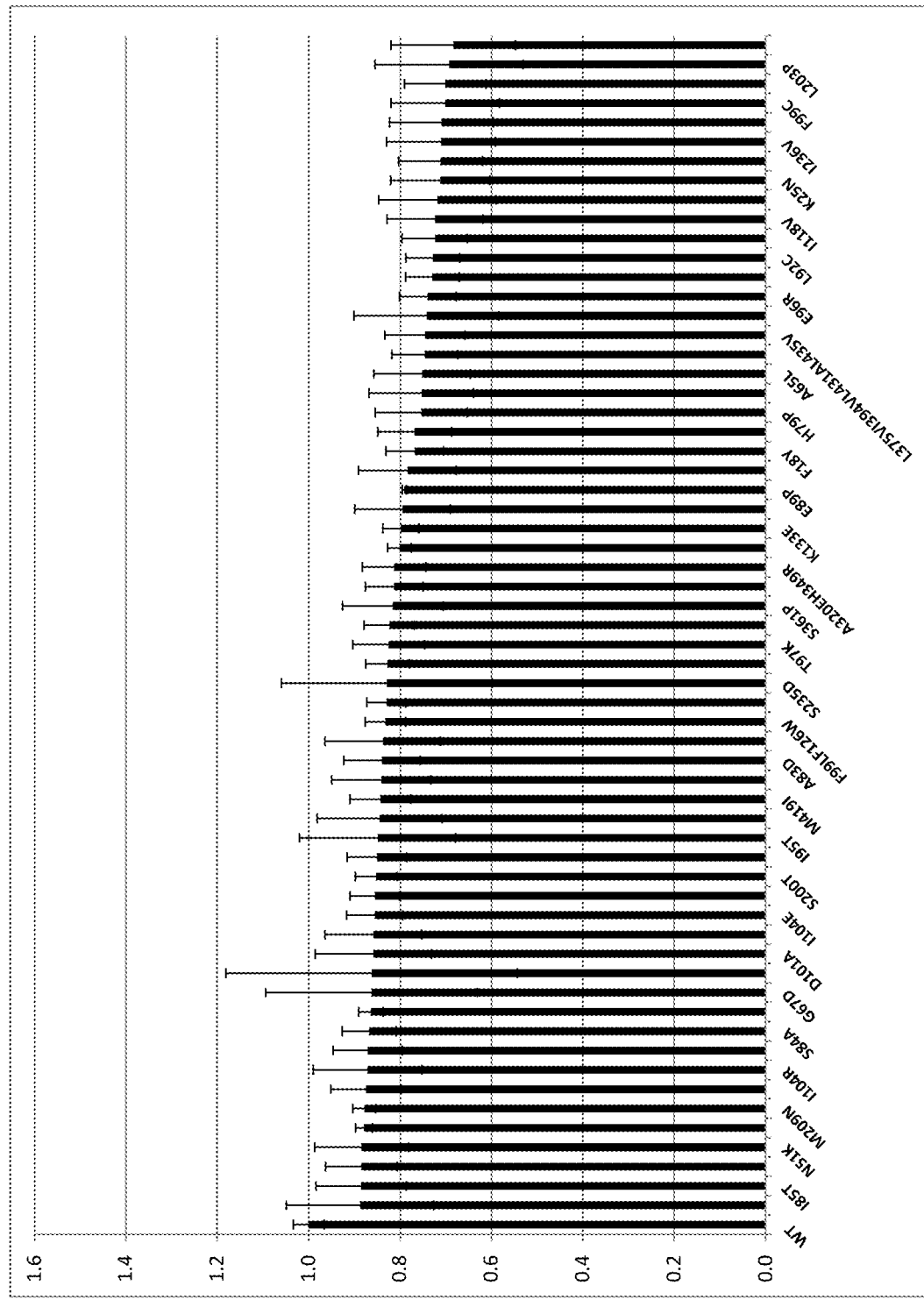
Figure 33C:
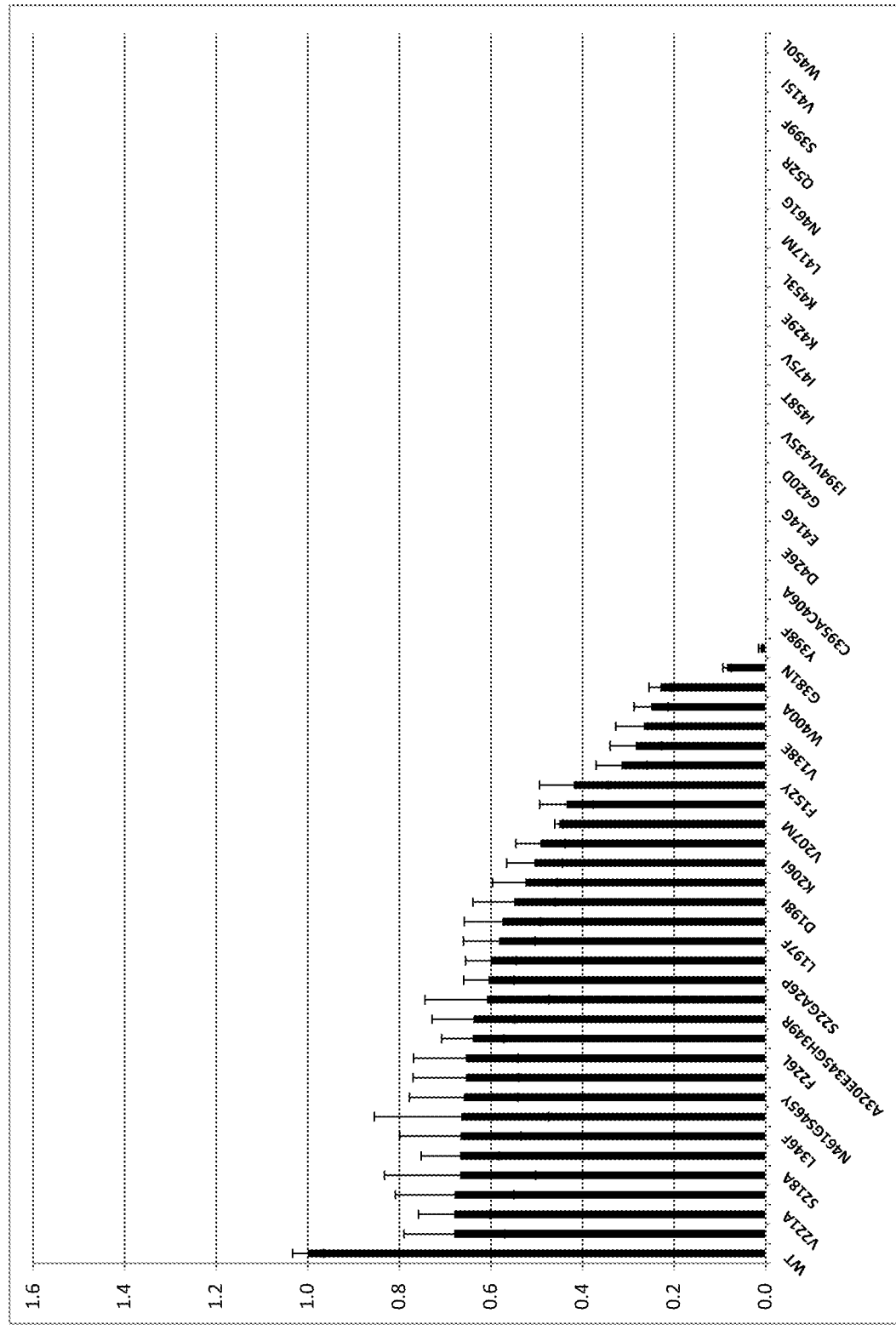
Figure 34A:
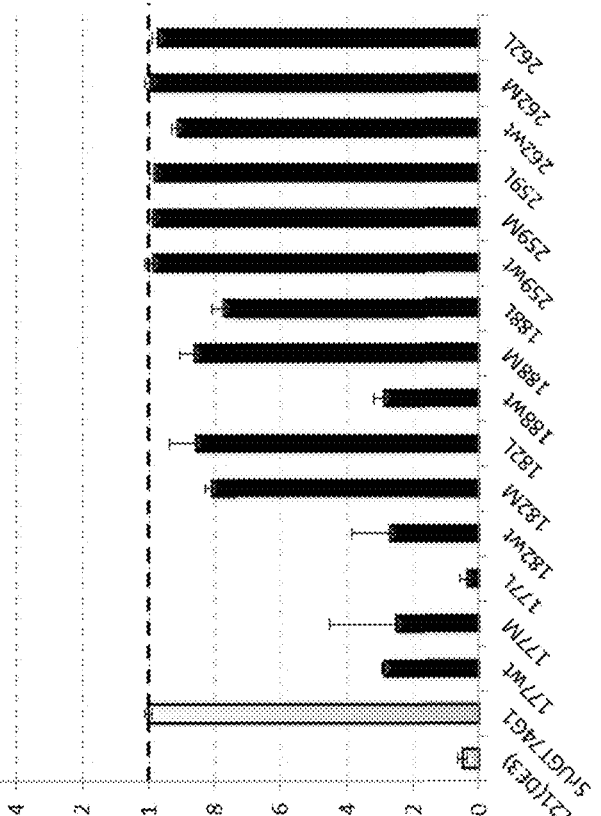
FIG. 34A and FIG. 34B show C19-O-glycosylating activity for the first round of circular permutants of SrUGT74G1. The numbers indicate the location of the cut site in the parental sequence used to generate novel N- and C-termini, while the wt/US designation describes wild-type/long/short linkers (where 'wt' indicates a simple fusion of existing N- and C-termini sequences with no alteration).
Figure 34B:
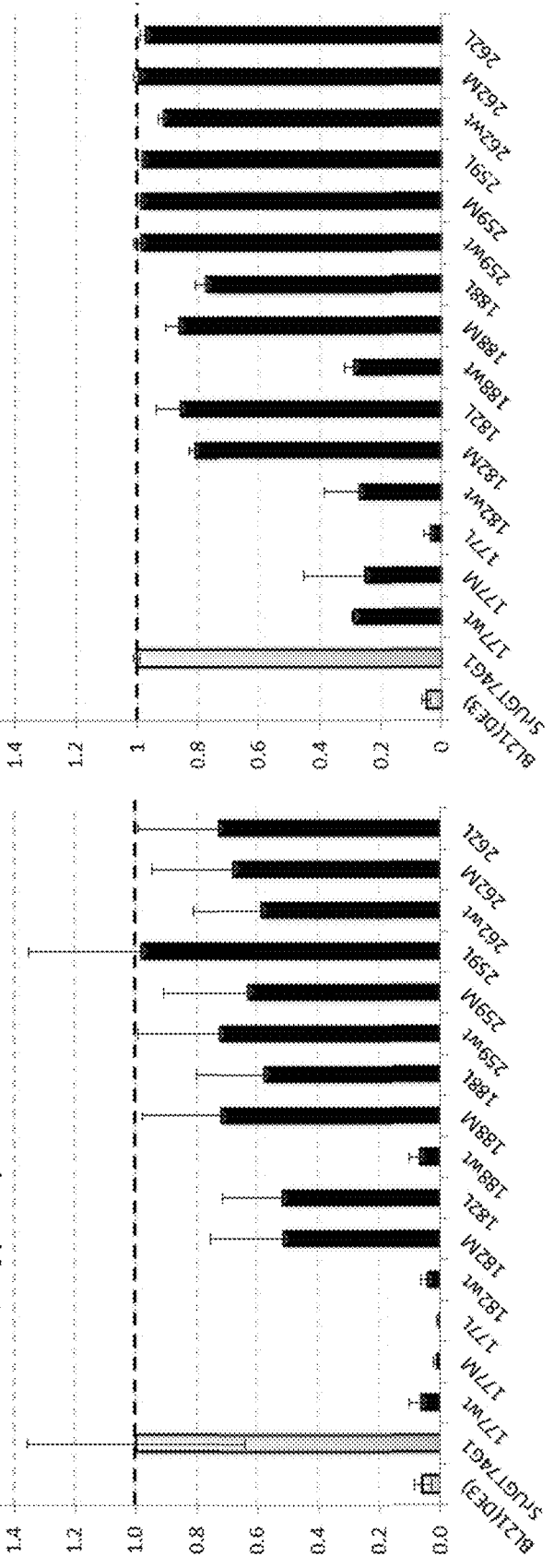

In a similar vein to the shuffling of enzymes engendered by circular permutization, an alternate method to shuffle glycosyltransferase enzymes was created by swapping the N-terminal small molecule sugar acceptor binding domain or the C-terminal sugar-donor binding domain between known UGTs. For example, a chimeric enzyme composed of the N-terminal domain of SrUGT85C2 and the C-terminal domain of SrUGT76G1 was created (FIG. 27). The rationale behind this approach rests on the concept of shuffling the domains of a UGT enzyme, only this time we add the nuance of shuffling domains between UGTs. The intent is to generate a non-optimized enzyme with a novel sequence, capable of further evolution away from the point in the energy landscape occupied by the parent enzyme, and towards a new optimum enzyme configuration in the production strain. Again, given that this enzyme is not a result of natural selection per se, the shuffled enzyme resulting from this chimeric approach should have increased evolutionary potential/greater potential to benefit positively from point mutations (i.e., with increased activity). Moreover, this approach can be used to generate chimeric protein with enhanced folding and/or stability.

In brief, this approach employs four broad steps: (1) identify two candidate UGTs; (2) select crossover positions for making a chimera between the two UGTs (i.e., select the point at which to join the two sequences); (3) mutate the C-terminal domain (the nucleotide-carbohydrate binding domain, e.g. UDP-glucose binding domain) to improve interaction with the small molecule substrate or the N-terminal small-molecule binding domain, based on structural considerations; (4) create and test chimeric constructs for activity. This approach is generalizable and applicable for improving the functional performance of potentially any UGT. Given the conserved domain structure of UGTs, domains from any two UGTs could be recombined.

Example 4: Modifying Glycosyltransferase Enzymes for Improved Activity and Biosynthesis of Rare Glycosides Although only around 20 steviol glycosides occur in sufficient quantities to have been characterized from *stevia* plants, there are several more possible steviol glycosides with different glycosylation patterns that can be created biosynthetically. Table 10 and FIG. 29, FIG. 30, FIG. 31 and FIG. 32A, FIG. 32B, and FIG. 32C summarize the known and potential steviol glycosides described in this section, which are abbreviated with the symbol SG #. Some of these glycosides exist in nature, and others are biosynthetically possible using UGTs that catalyze the four glycosylation chemistries described herein (i.e., C13-O-glycosylation, C19-O-glycosylation, 1,2'-glycosylation, and 1,3'-glycosylation).

A rational design approach was used to design a collection of single, double, and triple point mutations in the SrUGT85C2 sequence (possessing C13-O-glycosylating activity), aimed at increasing stability, solubility, or activity of the wild-type enzyme for improved conversion of steviol to steviolmonoside (SG1), and/or C19-glucopyranosyl steviol (SG2) to rubusoside (SG5), and/or SG4 to SG10, and/or SG7 to SG11, and/or SG13 to SG17, and/or SG19 to SG29, and/or SG23 to SG31. The point mutations and corresponding fold-change improvements over wild-type SrUGT85C2 are summarized in Table 11, and are visualized in FIG. 32A, FIG. 32B, FIG. 32C, and FIG. 33A, FIG. 33B, and FIG. 33C.

A rational design approach was used to design a collection of single, double, and triple point mutations in the SrUGT74G1 sequence (possessing C19-O-glycosylating activity), aimed at increasing stability, solubility, or activity of the wild-type enzyme for improved conversion of steviol to C19-glucopyranosyl steviol (SG2), and/or steviolmonoside (SG1) to rubusoside (SG5), and/or steviolbioside (SG3) to stevioside (SG8), and/or SG6 to rebaudioside G (SG9), and/or rebaudioside B (SG12) to rebaudioside A (SG16), and/or SG18 to SG28, and/or SG22 to SG30.

Figure 24:
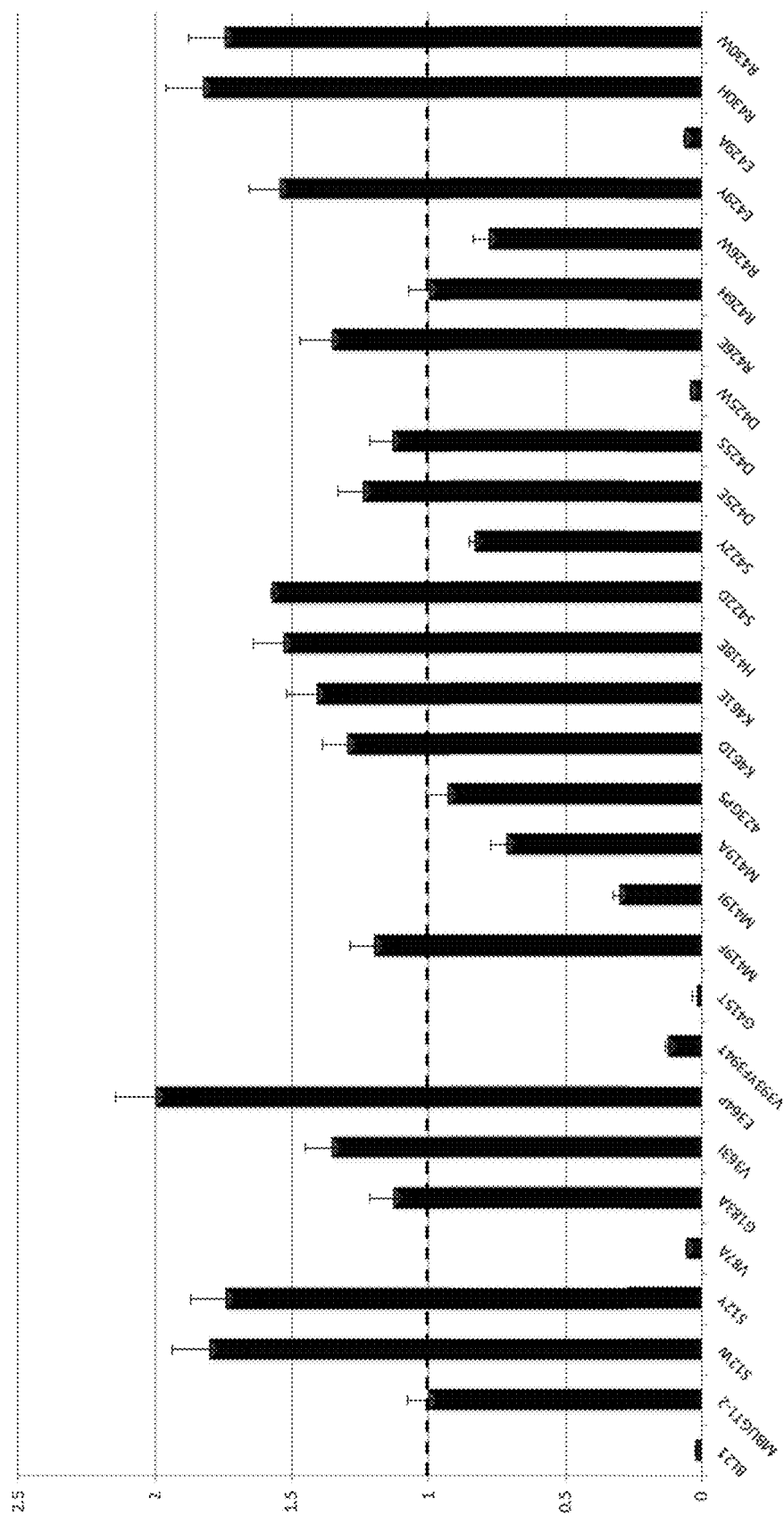
FIG. 24 shows point mutations in the MbUGT1-2 enzyme. Point mutations show increased activity on substrate steviolmonoside, demonstrating the potential for improving UGT enzymes generated by circular permutization [BL21=negative no UGT control].

A rational design approach was used to design a collection of single, double, and triple point mutations in the MbUGT1-2 sequence (possessing 1-2' glycosylating activity), aimed at increasing stability, solubility, or activity of the wild-type enzyme for improved conversion of steviolmonoside (SG1) to steviolbioside (SG3), and/or C19-glucopyranosyl steviol (SG2) to SG4, and/or rubusoside (SG5) to stevioside (SG8), and/or rubusoside (SG5) to SG10, and/or rubusoside (SG5) to rebaudioside E (SG14), and/or SG6 to rebaudioside B (SG12), and/or SG7 to SG13, and/or stevioside (SG8) to rebaudioside E (SG14), and/or SG10 to rebaudioside E (SG14), and/or rebaudioside G (SG9) to rebaudioside A (SG16), and/or rebaudioside G (SG9) to SG21, and/or SG11 to SG17, and/or SG11 to SG20, and/or rebaudioside B (SG12) to SG22, and/or SG13 to SG23, and/or SG15 to rebaudioside I (SG26), and/or SG15 to SG27, and/or rebaudioside A. (SG16) to rebaudioside D (SG24), and/or rebaudioside A (SG16) to SG30, and/or SG17 to SG25, and/or SG17 to SG31, and/or SG20 to SG25, and/or SG21 to rebaudioside D (SG24), and/or rebaudioside D (SG24) to SG37, and/or SG25 to SG39, and/or rebaudioside I (SG26) to rebaudioside M (SG32), and/or rebaudioside I (SG26) to SG38, and/or SG27 to rebaudioside M (SG32), and/or SG27 to SG40, and/or SG28 to SG33, and/or SG29 to SG35, and/or SG30 to SG37, and/or SG31 to SG39, and/or rebaudioside M (SG32) to SG43, and/or rebaudioside M (SG32) to SG44, and/or SG34 to SG41, and/or SG36 to SG42, and/or SG38 to SG43, and/or SG40 to SG44, and/or SG41 to SG47, and/or SG42 to SG48, and/or SG43 to SG46, and/or SG44 to SG46. The point mutations and corresponding fold-change improvements over wild-type MbUGT1-2 are summarized in Table 12, and representative reactions are shown in FIG. 24 and FIG. 25.

Figure 35:
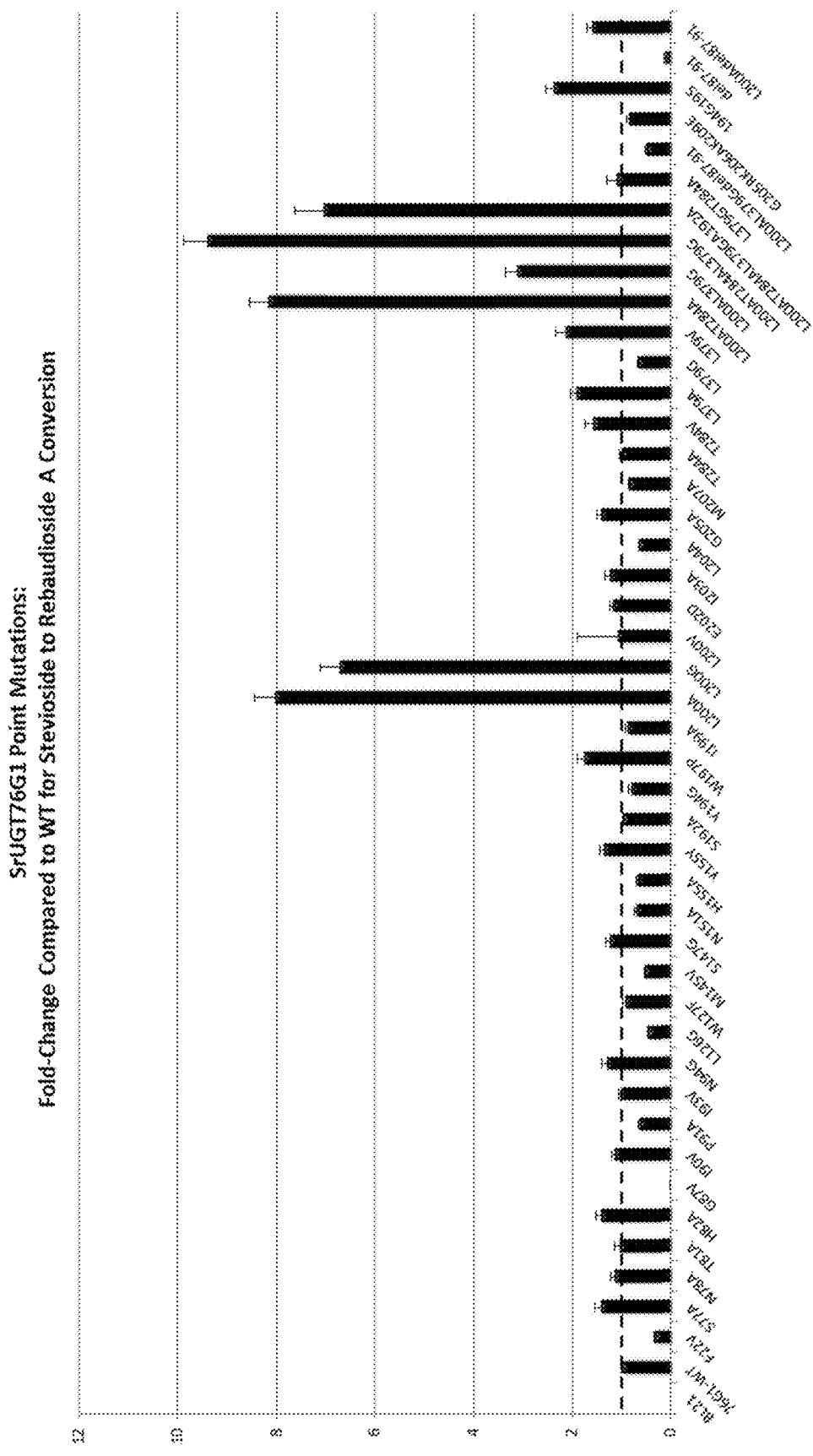
FIG. 35 shows point mutations in SrUGT76G1 enzyme versus altered activity on stevioside substrate. [BL21=negative no UGT control].
Figure 36:
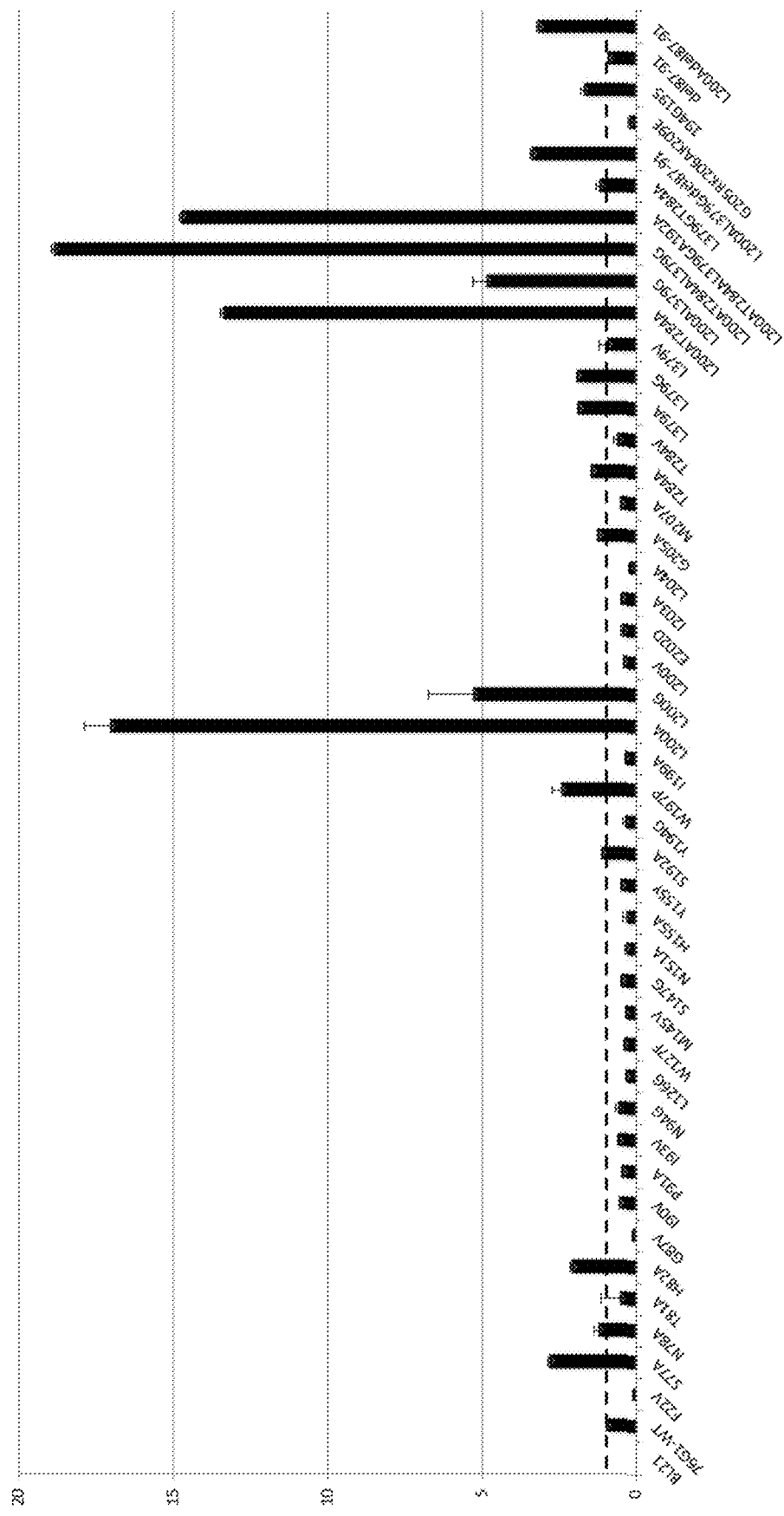
FIG. 36 shows point mutations in SrUGT76G1 enzyme versus altered activity on rebaudioside D substrate. [BL21=negative no UGT control].
Figures 37A, 37B:
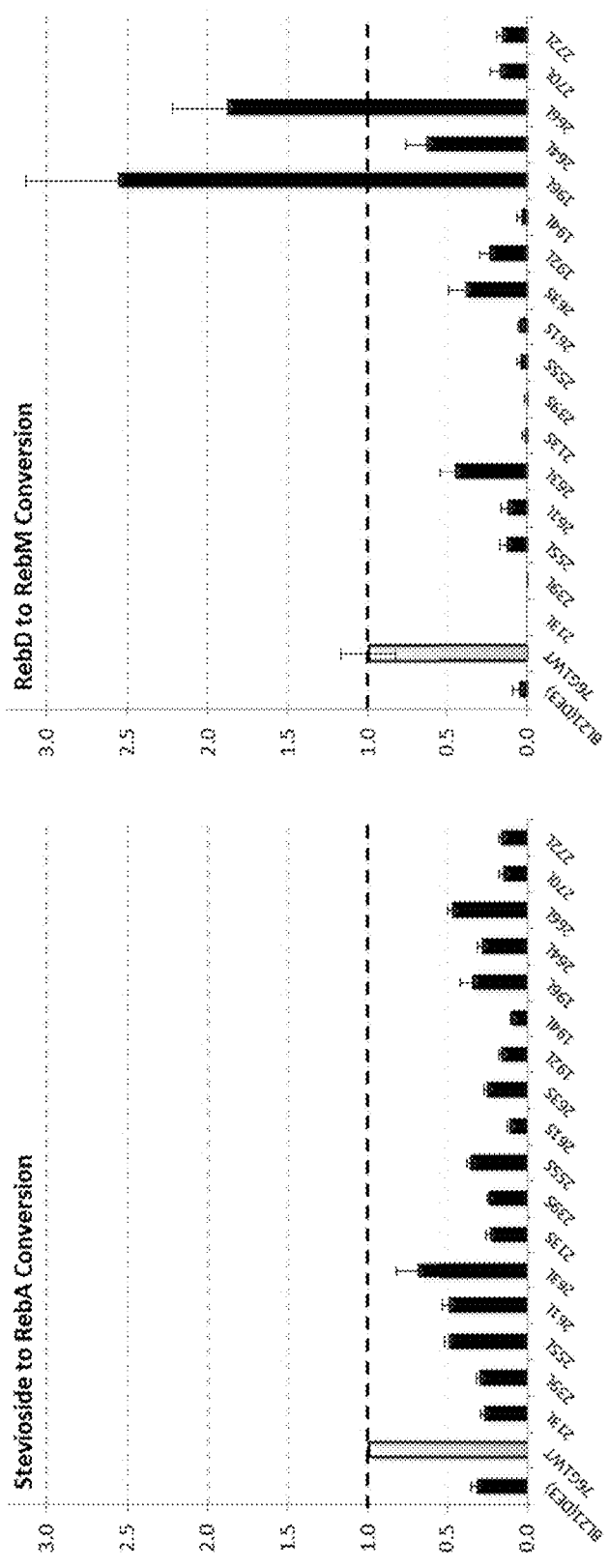
FIG. 37A and FIG. 37B show 1-3' glycosylating activity for the first round of circular permutants of SrUGT76G1. The numbers indicate the location of the cut site in the parental sequence used to generate novel N- and C-termini, while the US designation describes long/short linkers.

A rational design approach was used to design a collection of single, double, triple, or quadruple point mutations in the SrUGT76G1 sequence (possessing 1-3' glycosylating activity), aimed at increasing stability, solubility, or activity of the wild-type enzyme for improved conversion of steviolmonoside (SG1) to SG6, and/or C19-glucopyranosyl steviol (SG2) to SG7, and/or steviolbioside ($G3) to rebaudioside B (SG12), and/or SG4 to SG13, and/or rubusoside (SG5) to rebaudioside G (SG9), and/or rubusoside (SG5) to SG11, and/or rubusoside (SG5) to SG15, and/or stevioside (SG8) to rebaudioside A (SG16), and/or stevioside (SG8) to SG20, and/or rebaudioside G (SG9) to SG15, and/or SG10 to SG17, and/or SG10 to SG21, and/or SG11 to SG15, and/or rebaudioside B (SG12) to SG18, and/or SG13 to SG19, and/or rebaudioside E (SG14) to rebaudioside D (SG24), and/or rebaudioside E (SG14) to SG25, and/or rebaudioside E (SG14) to rebaudioside M (SG32), and/or rebaudioside A (SG16) to rebaudioside I (SG26), and/or rebaudioside A (SG16) to SG28, and/or SG17 to SG27, and/or SG17 to SG29, and/or SG20 to rebaudioside I (SG26), and/or SG21 to SG27, and/or rebaudioside D (SG24) to rebaudioside M (SG32), and/or rebaudioside D (SG24) to SG33, and/or SG25 to rebaudioside M (SG32), and/or SG25 to SG35, and/or rebaudioside I (SG26) to SG34, and/or SG27 to SG36, and/or SG28 to SG34, and/or SG29 to SG36, and/or SG30 to SG38, and/or SG31 to SG40, and/or rebaudioside M (SG32) to SG41, and/or rebaudioside M (SG32) to SG42, and/or SG33 to SG41, and/or SG35 to SG42, and/or SG37 to SG43, and/or SG39 to SG44, and/or SG41 to SG45, and/or SG42 to SG45, and/or SG43 to SG48, and/or SG44 to SG47. The point mutations and corresponding fold-change improvements over wild-type SrUGT76G1 are summarized in Table 13, and representative reactions are shown in FIG. 35 and FIG. 36.

Example 5: Improving Yield and Performance Above 22° C.

The performances of the enzymes in the kaurene module were determined to be suboptimal at temperatures above 22° C. A cluster of alternative enzymes were identified for the GGPPS (geranylgeranyl diphosphate) synthase enzyme and the bi-functional copalyl diphosphate (CPP)/kaurene synthase enzymes used in the previous examples. In particular, alternate enzymes from bacterial sources were considered, reasoning that these may function better in *E. coli* than plant and fungal enzymes. Enzymes from thermophilic bacteria were considered where possible. For the CPP synthase and kaurene synthase activities, genes from bacteria in the rhizosphere were identified, since they are often kaurene-producing due to their symbiotic lifestyle.

Figure 39:
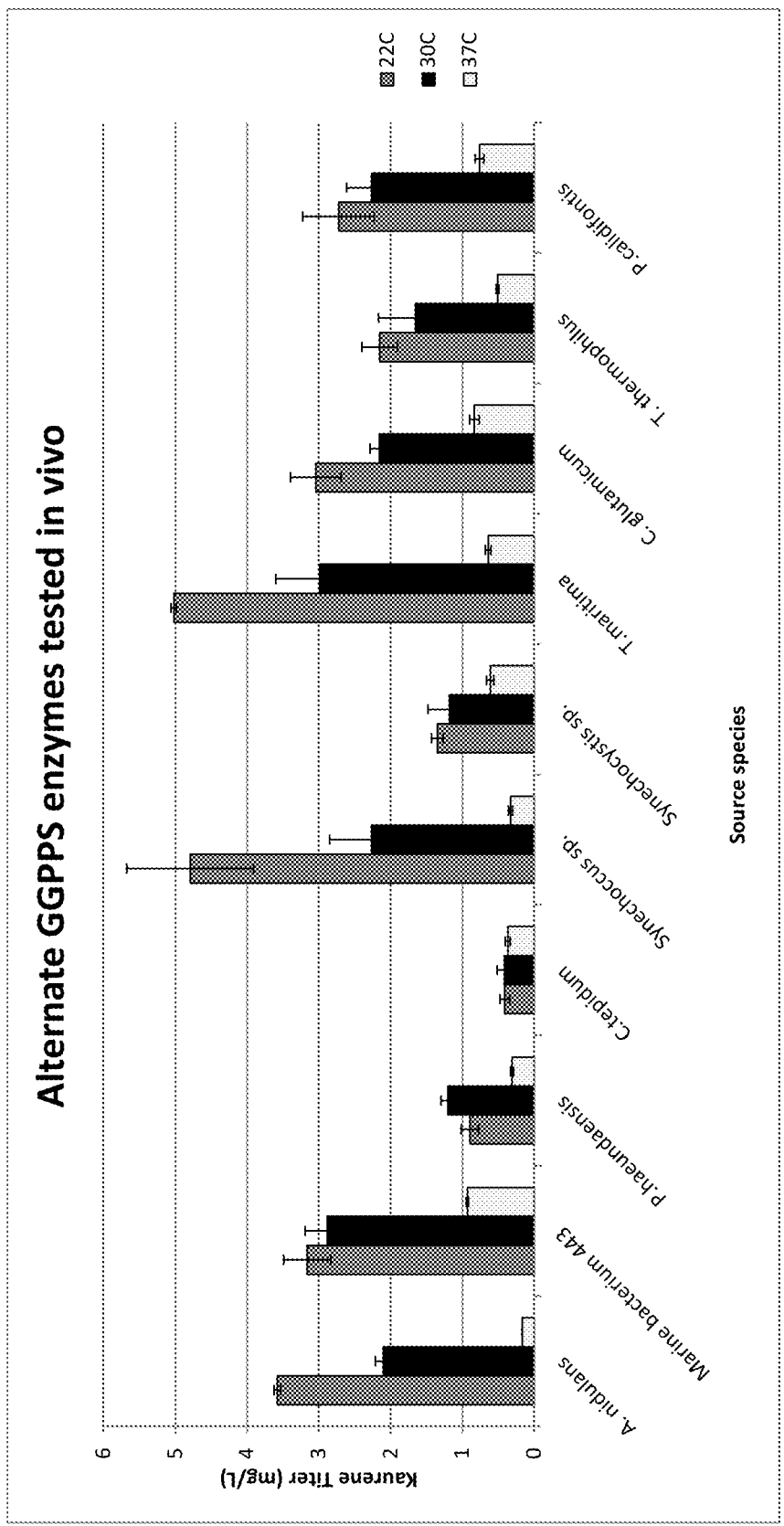
FIG. 39 shows alternate GGPPS enzymes tested in vivo for performance at 22° C., 30° C., and 37° C.

FIG. 39 shows the results for alternate GGPPS enzymes. Several enzymes show improved performance at higher temperatures, including Marine bacterium 443, *Synechoccus* sp., *Thermotoga maritima, Cornybacteriwn glutamicum*, and *Pyrobaculum calidifonti*.

Figure 40:
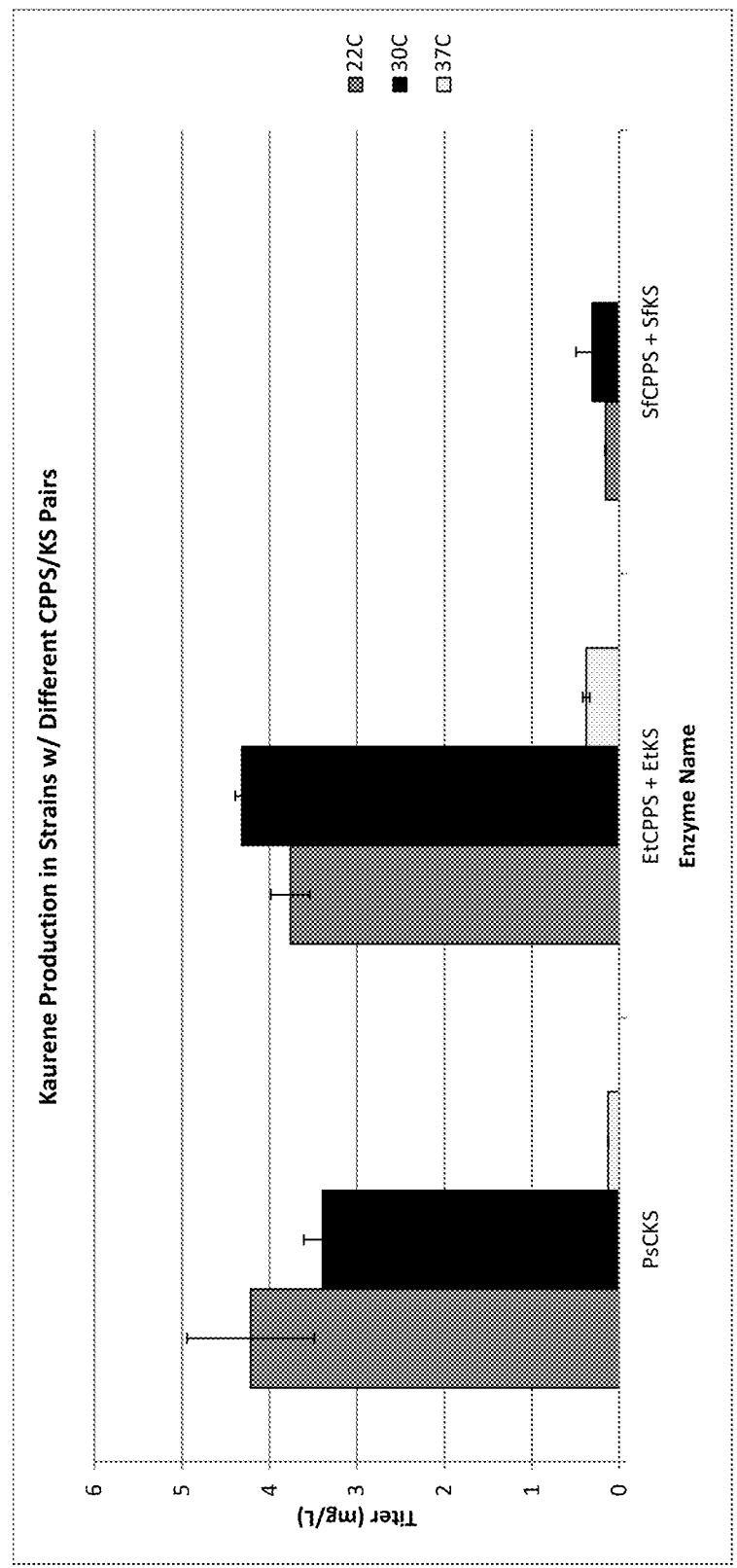
FIG. 40 shows alternate CPPS/KS pairs tested in vivo for performance at 22° C., 30° C., and 37° C.

FIG. 40 shows the results for alternate CPPS and KS enzymes. *Erwina tracheiphila* (Et)CPPS and EtKS showed improved activity at higher temperatures.

Figure 41:
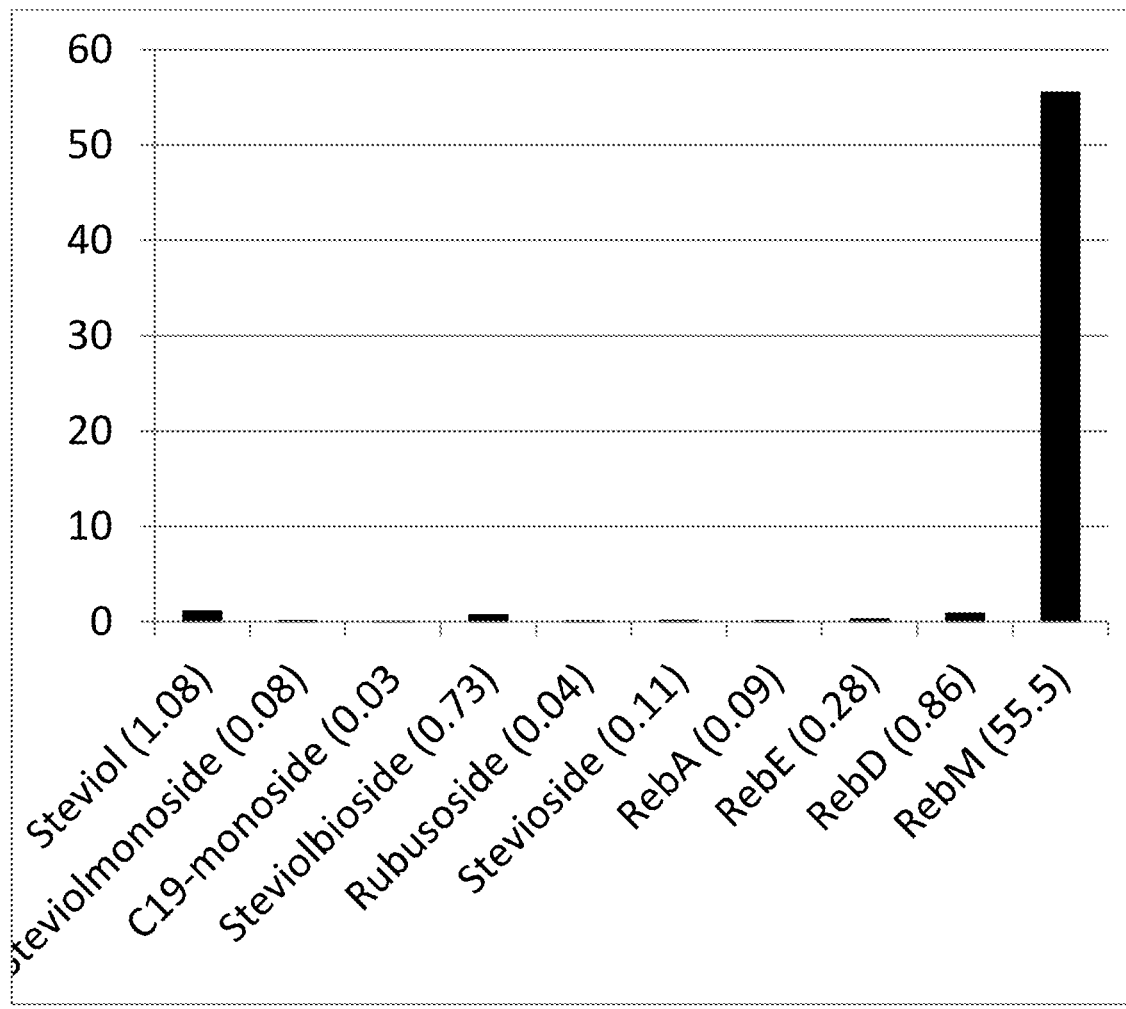
FIG. 41 shows the titer of Reb M in comparison to steviol and other glycosylation products, using a selected strain at 22° C.

Production of various steviol glycosides (including Reb M) was tested at 22° C. in a select strain. The strain was *E. coli* K12 with a pBAC single-copy chromosome containing FAB46-MEP, T7-PsCKS-AnGGPPS, T7-AtKAH-SrKO-SrCPR, T7-MbUGT1,3-MbUGT1,2-MbUGTc13-MbUGTc19. As shown in FIG. 41, Reb M titer was 55.5 mg/L with a total steviol glycoside titer of 58.3 mg/L, which is equal to 94.4% Reb M. The Reb M:Reb D ratio was 64.5:1 (in grams).

| Statistic | Quantity |
| --- | --- |
| Titer, Total Steviol Glycosides (mg/L) | 58.3 mg/L |
| Titer, Rebaudioside M (mg/L) | 55.5 mg/L |
| % Reb M (of total glycosides) | 94.4% |
| Reb M:Reb D (g/g) | 64.5:1 |

Figure 42:
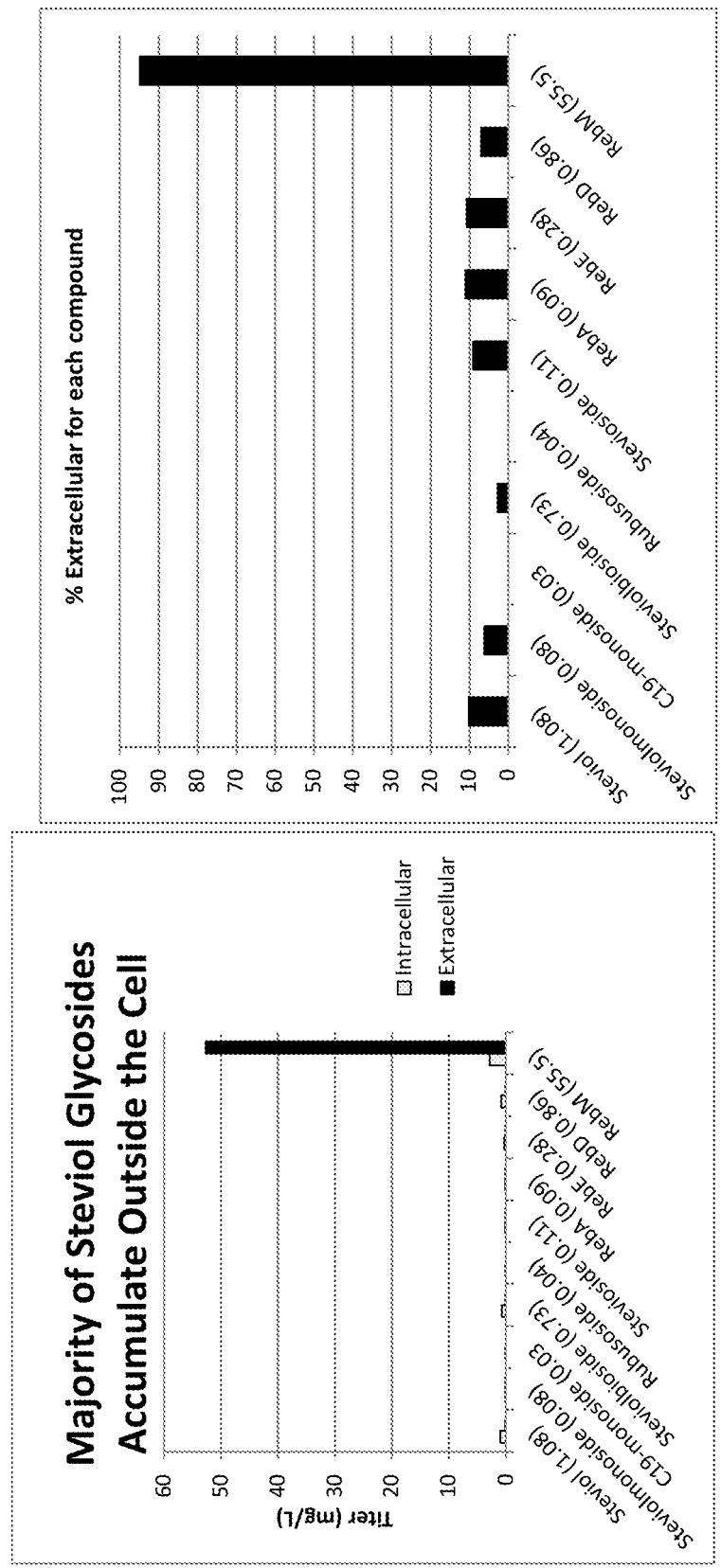
FIG. 42 shows that the majority of Reb M accumulates extracellularly. Left Panel shows the titer of Reb M and steviol glycosides inside and outside of the cell. Right Panel shows the same data as the percent of each compound observed extracellularly.

The intracelllar accumulation of steviol glycosides was investigated. As shown in FIG. 42, the majority of the steviol glycosides are excreted from the cell. FIG. 42 shows the combined intracellular and extracellular material, as a percentage of product accumulating inside the cell versus outside. This was in contrast to initial studies having substantially less yield of steviol glycosides, which saw mostly intracellular accumulation. It s possible that the initial studies were of such low titer that accumulated product pools were insufficient for the active transport mechanisms required to pump the product out of the cells. Indeed, as the titer increased, a greater proportion of the product accumulated outside the cell, indicating that once above the threshold concentration for the putative pump activity, the rest of the products get moved out. These data are very promising from a strain engineering perspective and commercial production in *E. coli*, since if intermediate product pools are maintained below the Kb of the transporter, we can effectively push C-flux through to the end product without losing carbon to the outside (e.g., once a steviol glycoside intermediate is pumped out, it can no longer be further glycosylated to the desired product, such as RebM).

Figure 43A:
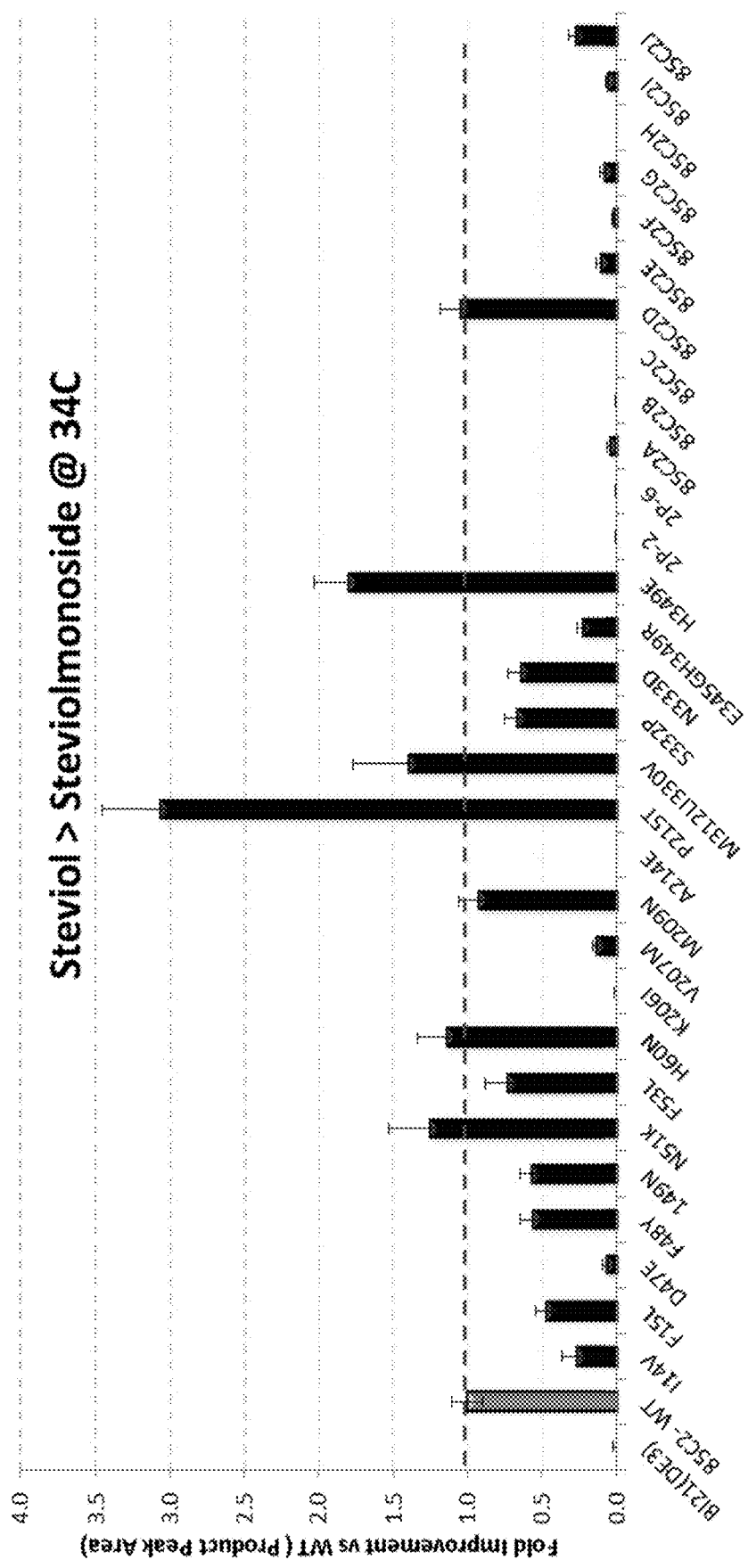
FIG. 43A, FIG. 43B, and FIG. 43C show screening of UGT85C2 mutants at 22, 30, and 34° C., based on production of steviolmonoside.
Figure 43B:
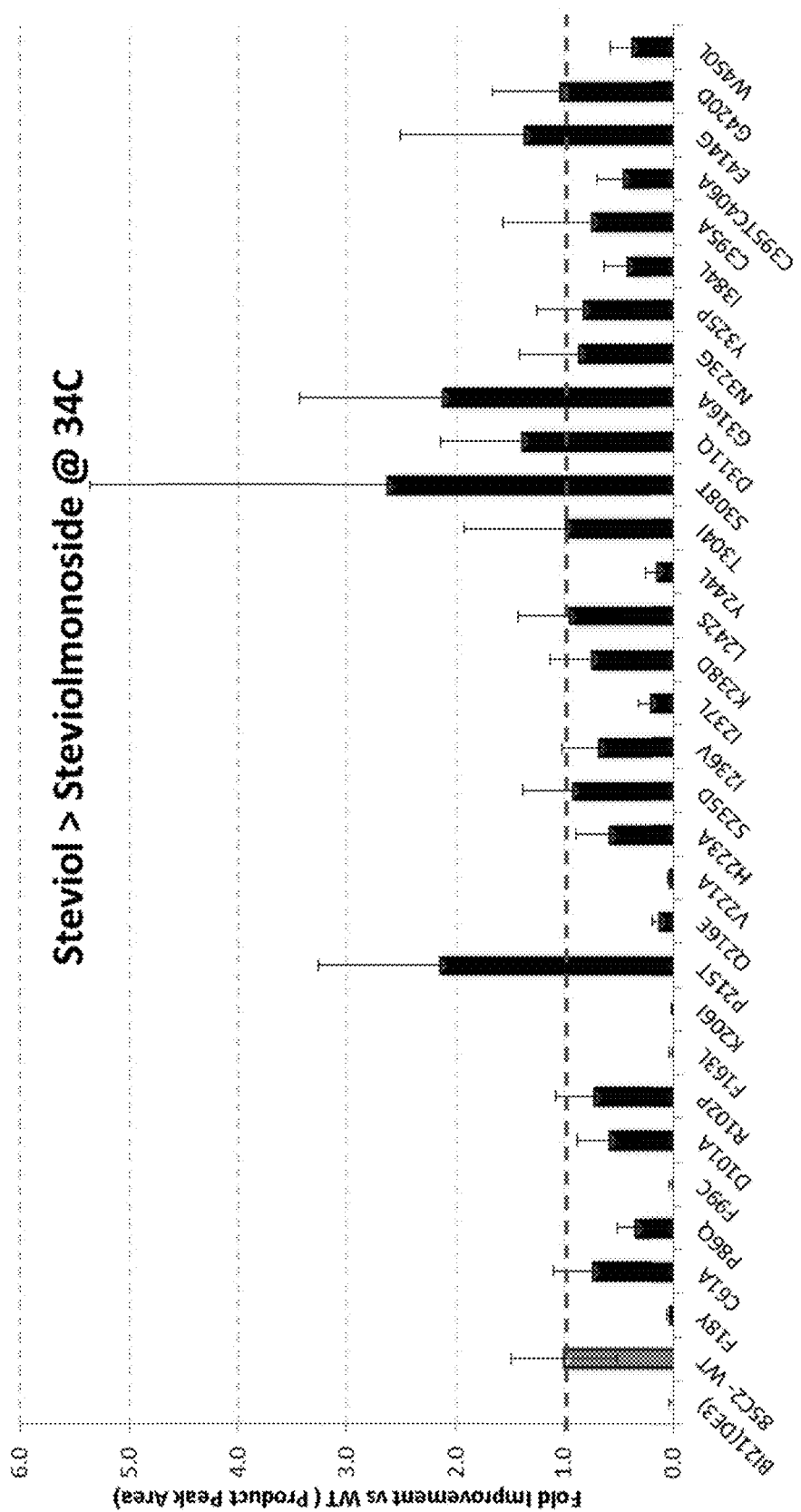
Figure 43C:
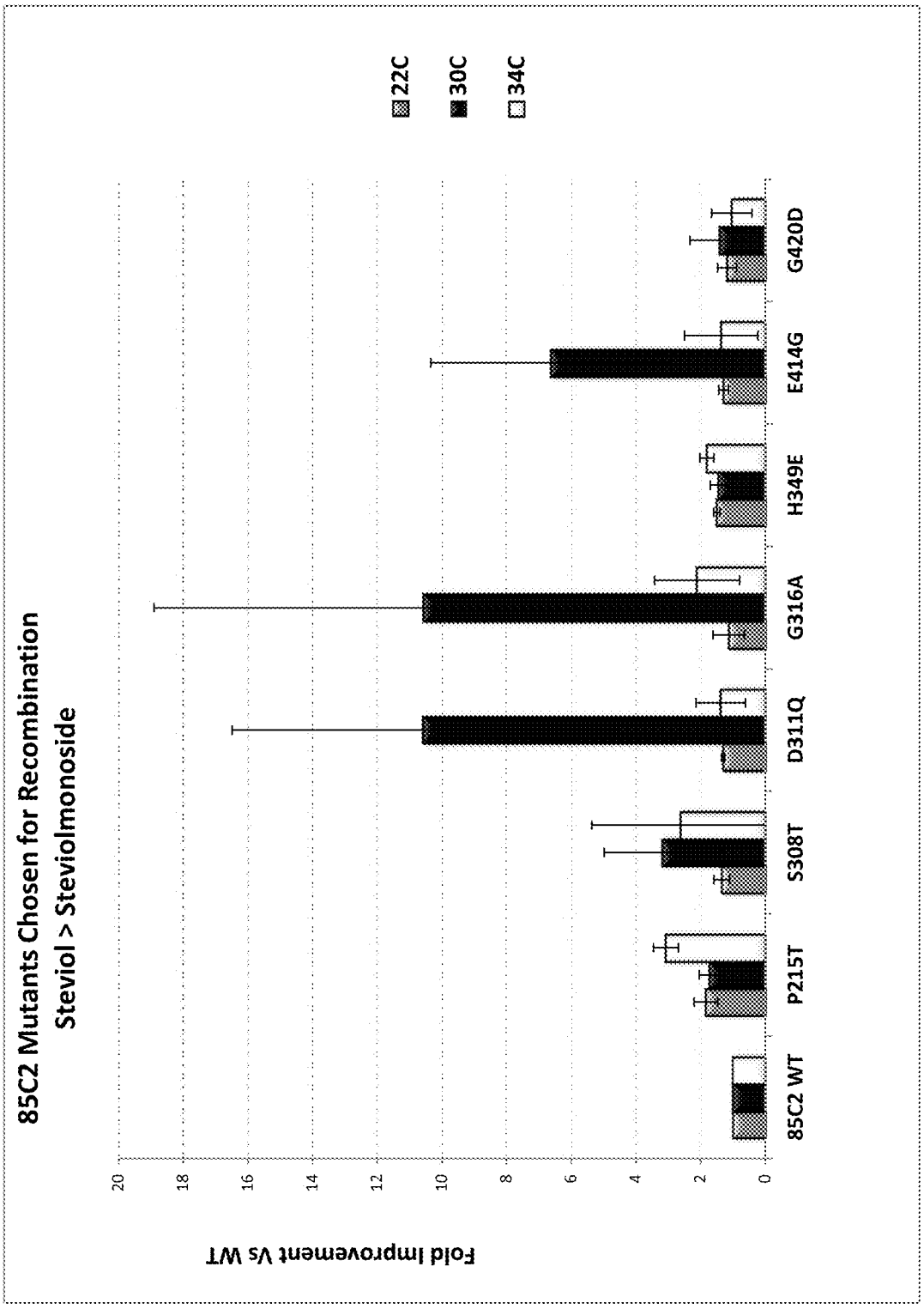

Point mutants of UGT85C2 were generated, and tested at 22, 30, and 34° C. FIG. 43A, and FIG. 43B show steviol monoside production at 34° C. FIG. 43C shows production of steviolmonoside with selected mutants at 22, 30, and 34° C. Several-mutations showed higher production of steviolmonoside at 34° C., with P215T being the highest producing mutation.

Figure 44A:
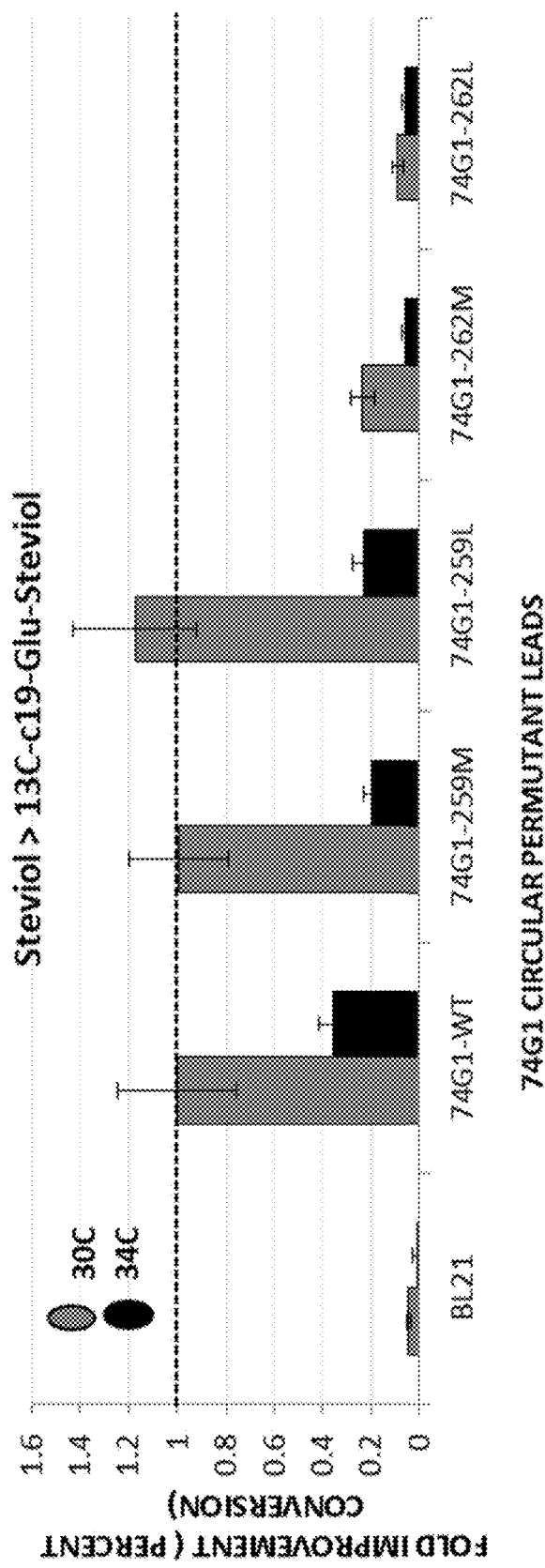
FIG. 44A and FIG. 44B show screening of 74G1 circular permutants for activity at 30 and 34° C.
Figure 44B:
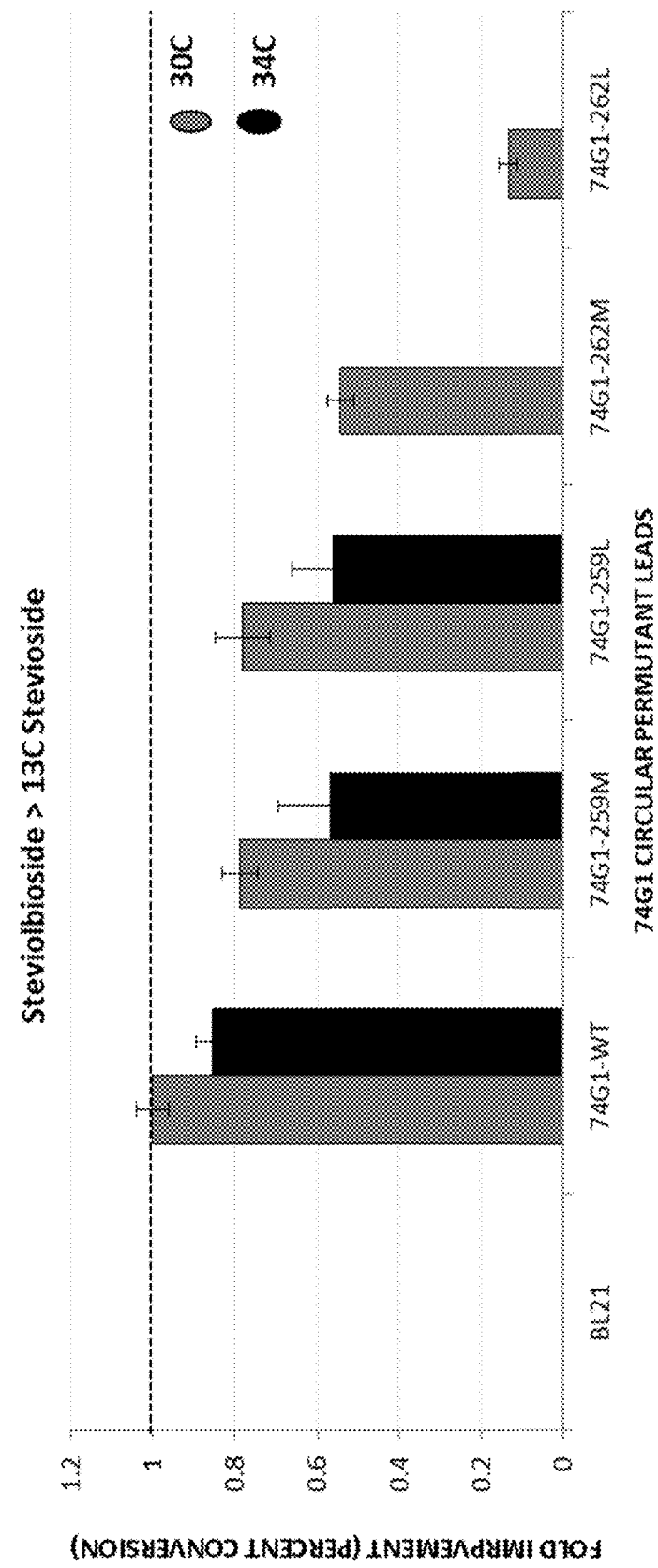

Circular permutants of 74G1 were also tested for activity at 30 and 34° C. FIG. 44A and FIG. 44B show conversion of steviol to 13C-c19-Glu-Steviol (FIG. 44A) and steviolbioside to 13C Stevioside (FIG. 44B).

Figure 45:
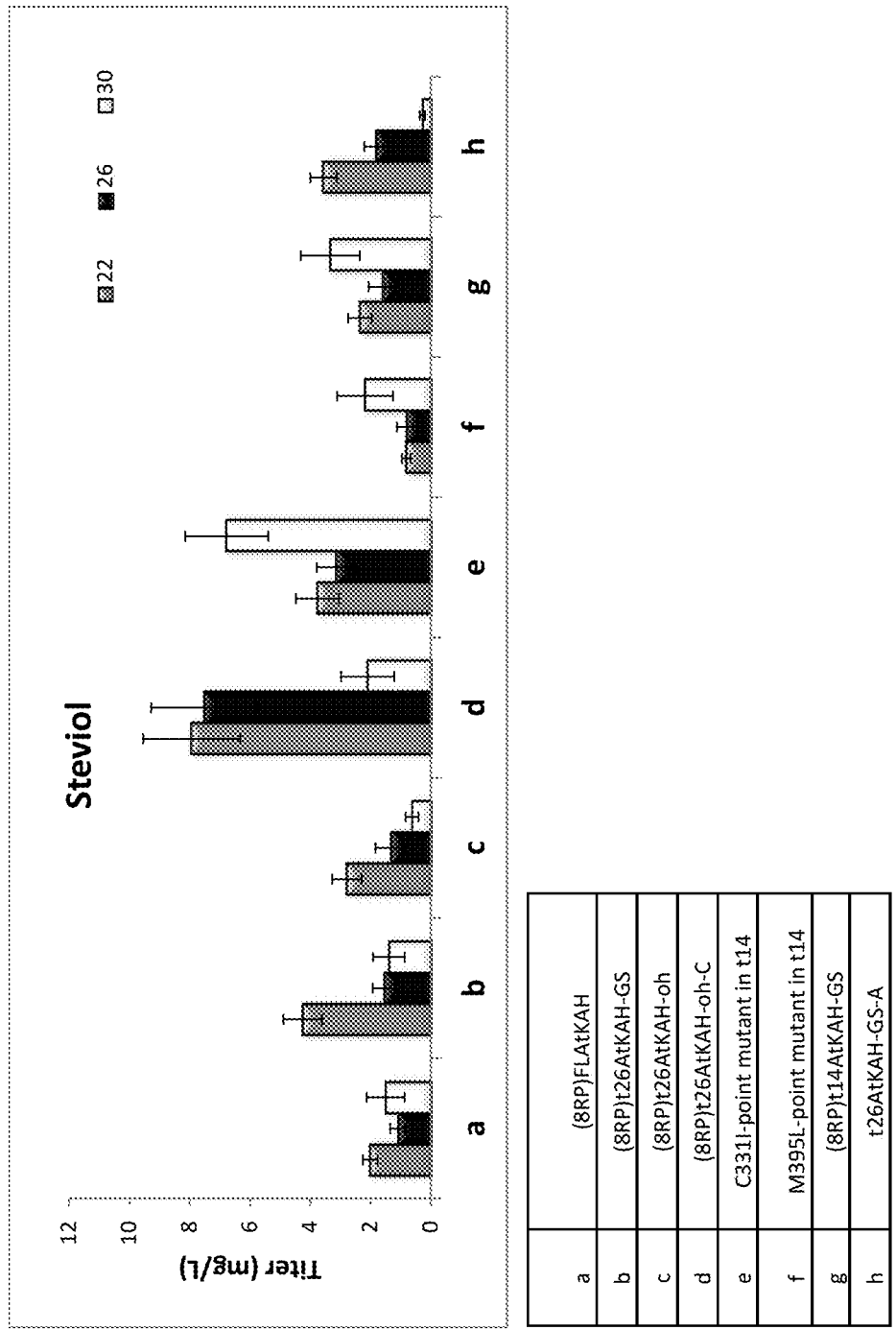
FIG. 45 shows screening of AtKAH point mutants for activity at 22, 26, and 30° C.

Mutations in AtKAH were screened for activity at 22, 26, and 30° C. C331I provided substantial thermostability, as shown in FIG. 45. C331I was made in the t14 background.

Figure 46A:
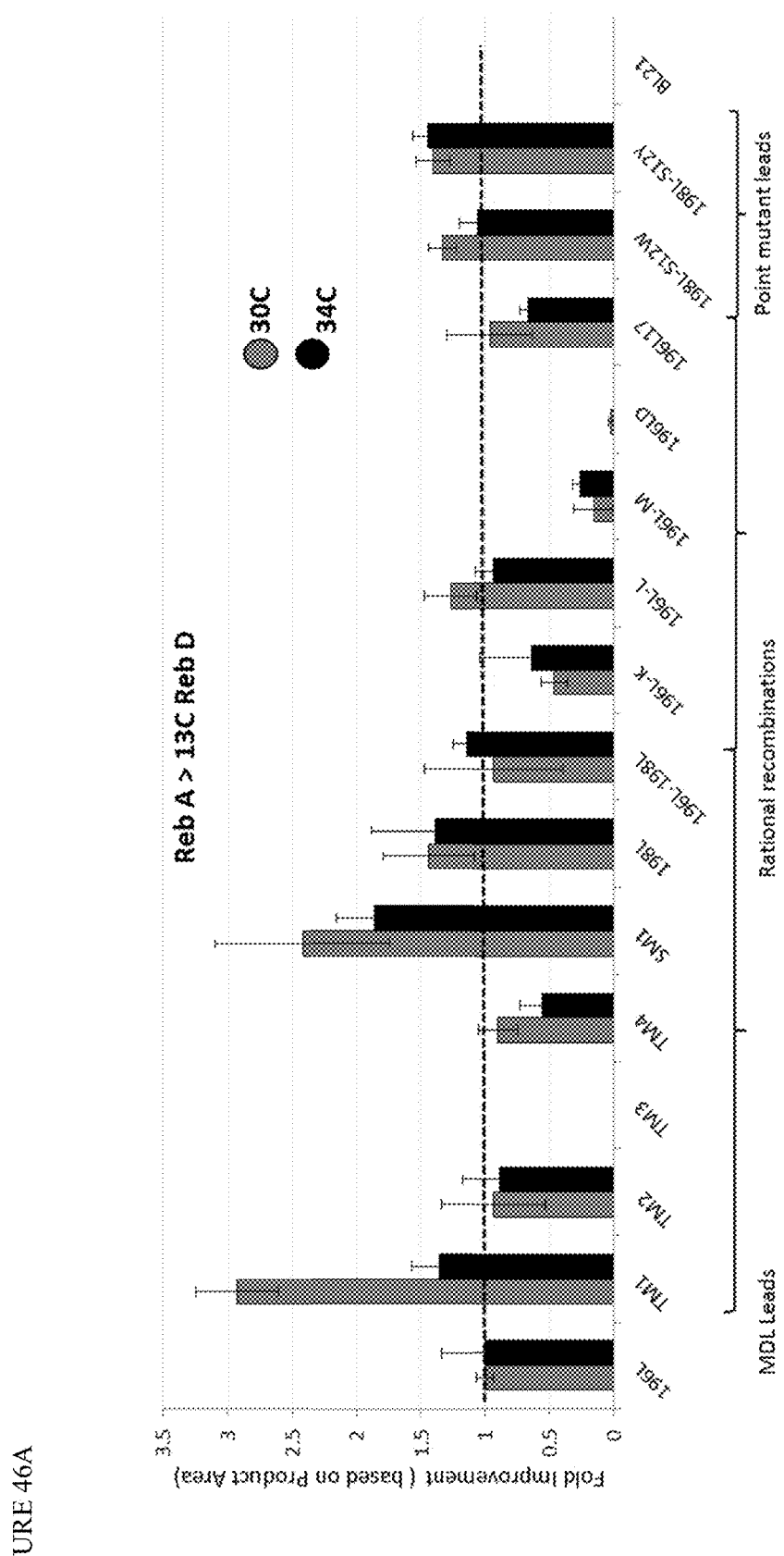
FIG. 46A and FIG. 46B show in vitro screening of MbUGT1-2 recombination mutants at 30 and 34° C.
Figure 46B:
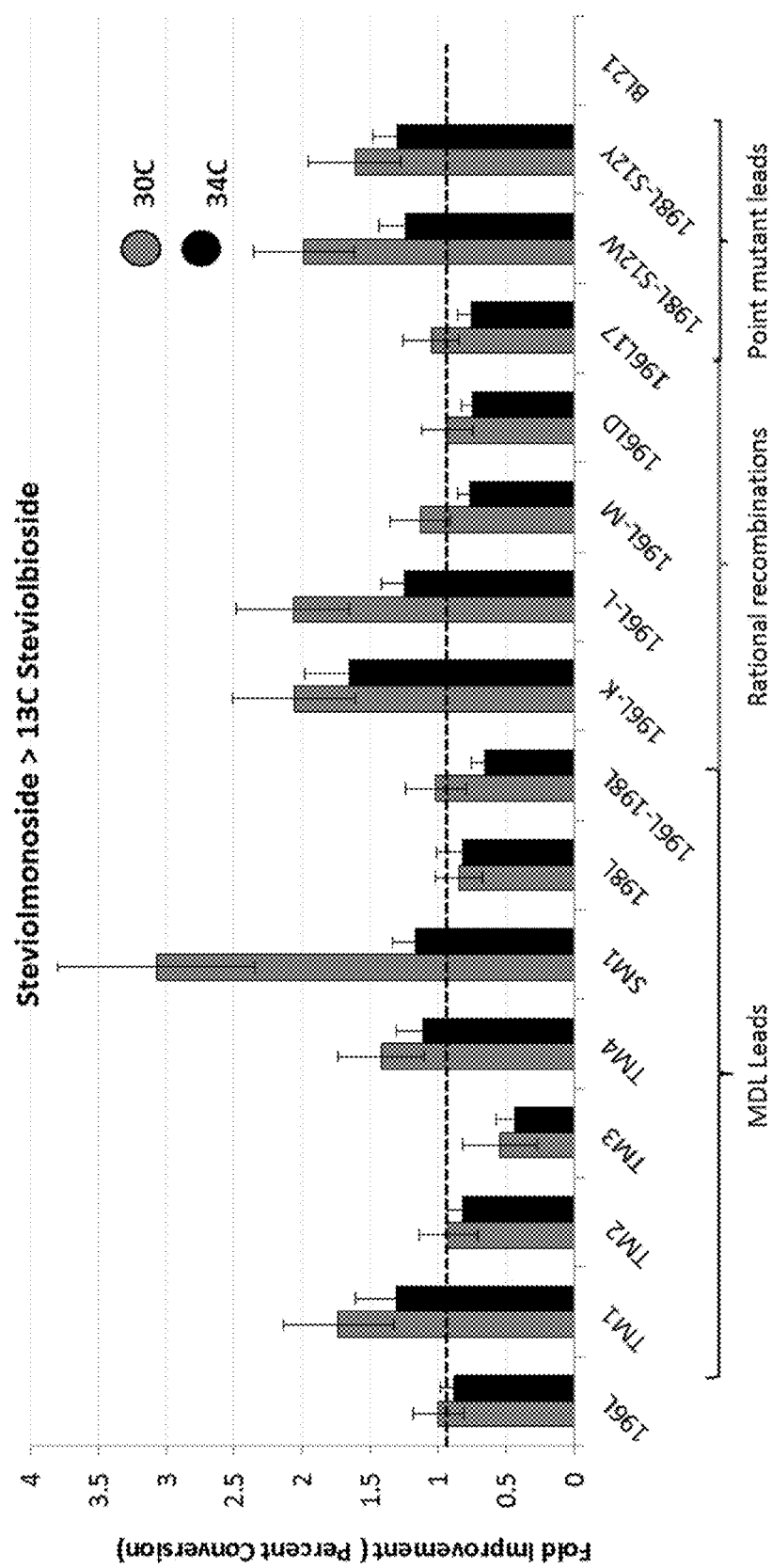

MbUGT1,2 rational recombinations were made, and screened at 30 and 34° C. for conversion of Reb A to Reb D (FIG. 46A), as well as for conversion of Steviolmonoside to 13c Steviolbioside (FIG. 46B). These studies resulted in a circular permutant truncated to create a new N-terminus at residue 196, with mutations introduced at S16W, H422E, R430E, R434H (MbUGT1,2-2). In these studies, cells producing these enzymes were induced for 4 hours of protein production at the listed temperature, extracted, and assayed in vitro overnight. Substrate concentration is 1 mM.

Figure 47:
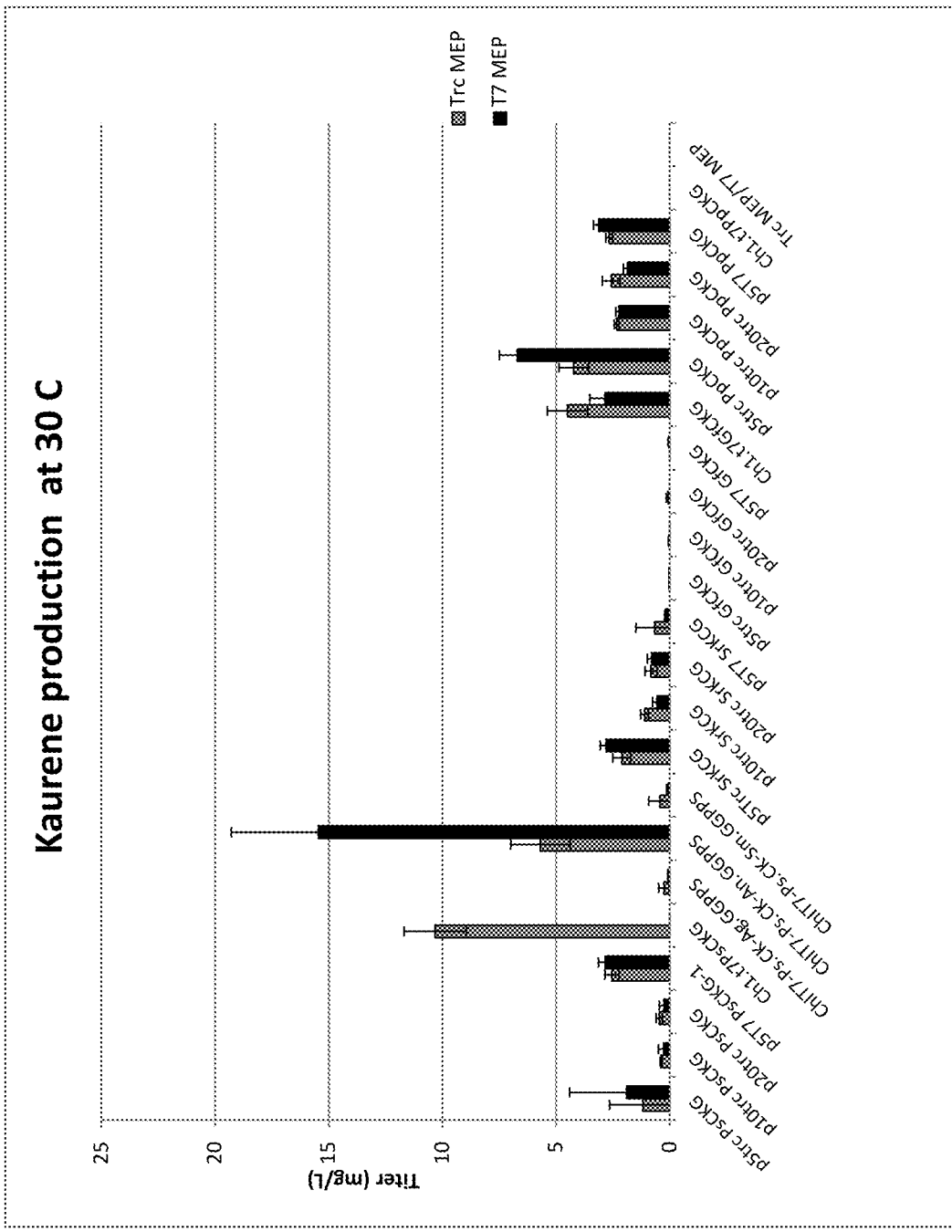
FIG. 47 shows kaurene production at 30° C. across various module constructs.
Figure 48:
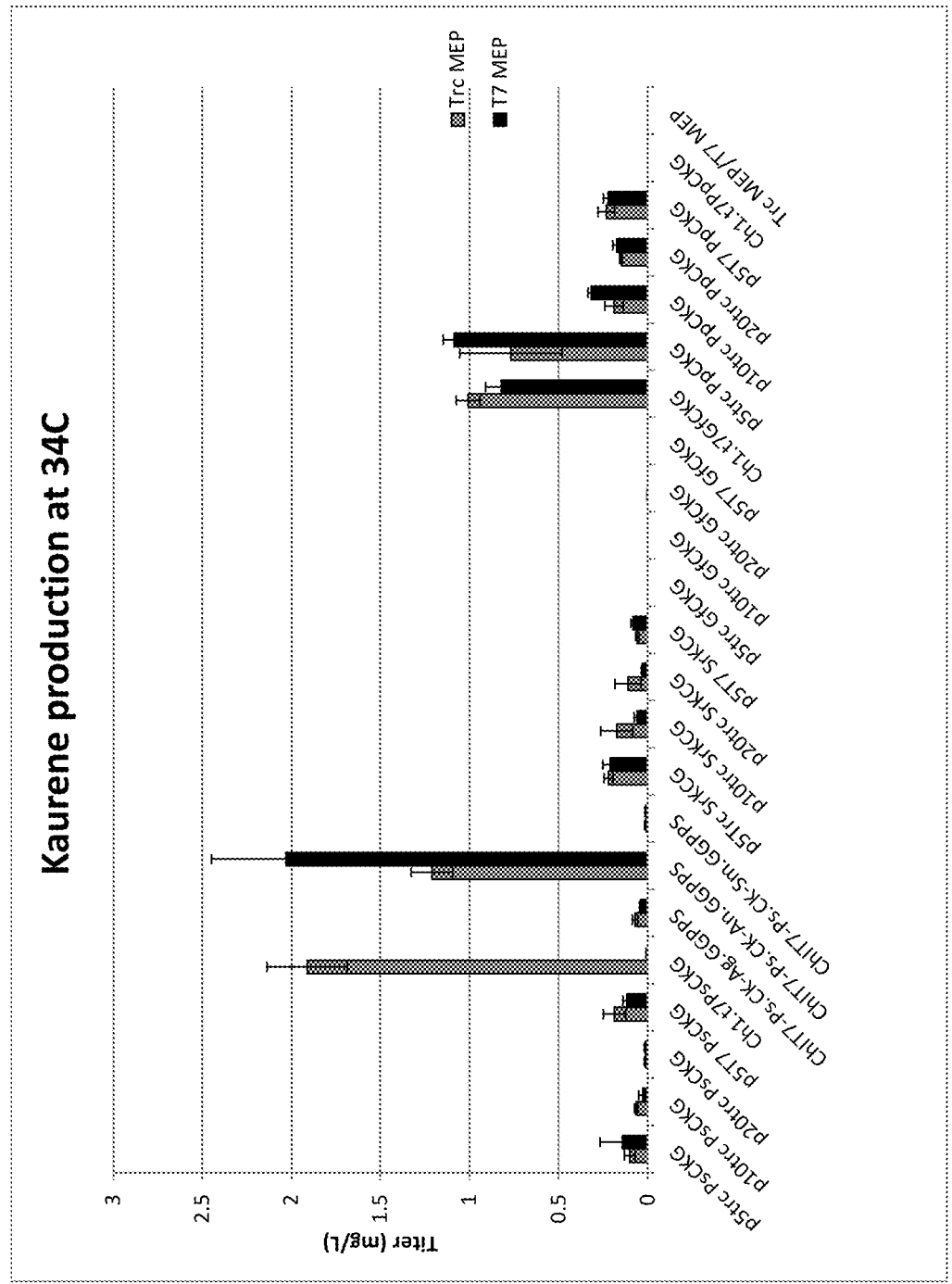
FIG. 48 shows kaurene production at 34° C. across various module constructs.

The effect of temperature on kaurene substrate production at 30 and 34° C. was tested. FIG. 47 shows kaurene production at 30° C. across various module constructs and FIG. 48 shows kaurene production at 34° C. across various module constructs. At 30° C., Ch1.T7-PsCK-AnGGPPS in T7MEP background gave highest kaurene titers (~15 mg/L). At 34° C., Ch1.T7-PsCK-AnGGPPS in T7MEP background showed the highest kaurene titers (~2 mg/L).

Figure 49:
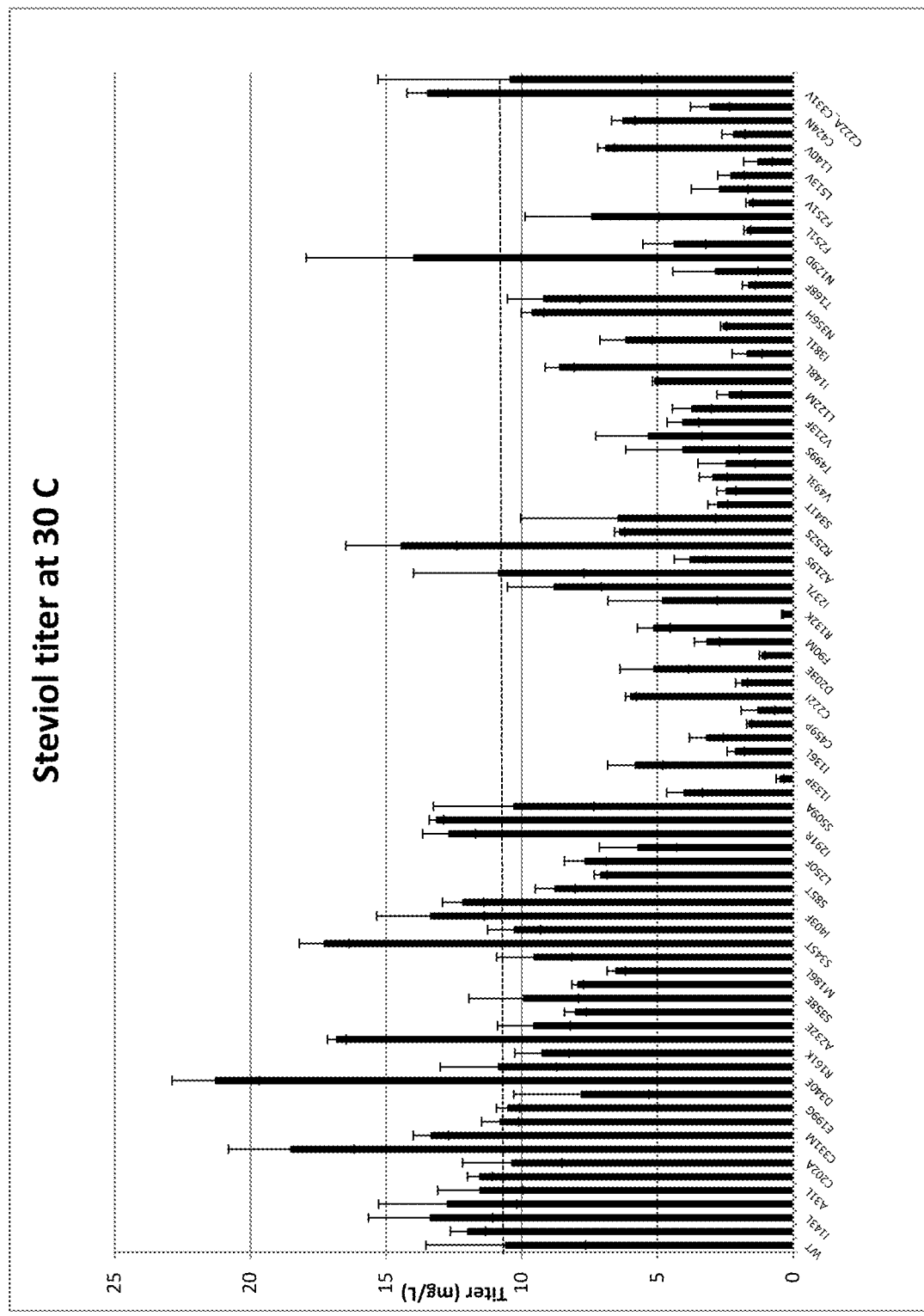
FIG. 49 shows production of Steviol at 30° C. across a library of AtKAH point mutations.
Figure 50:
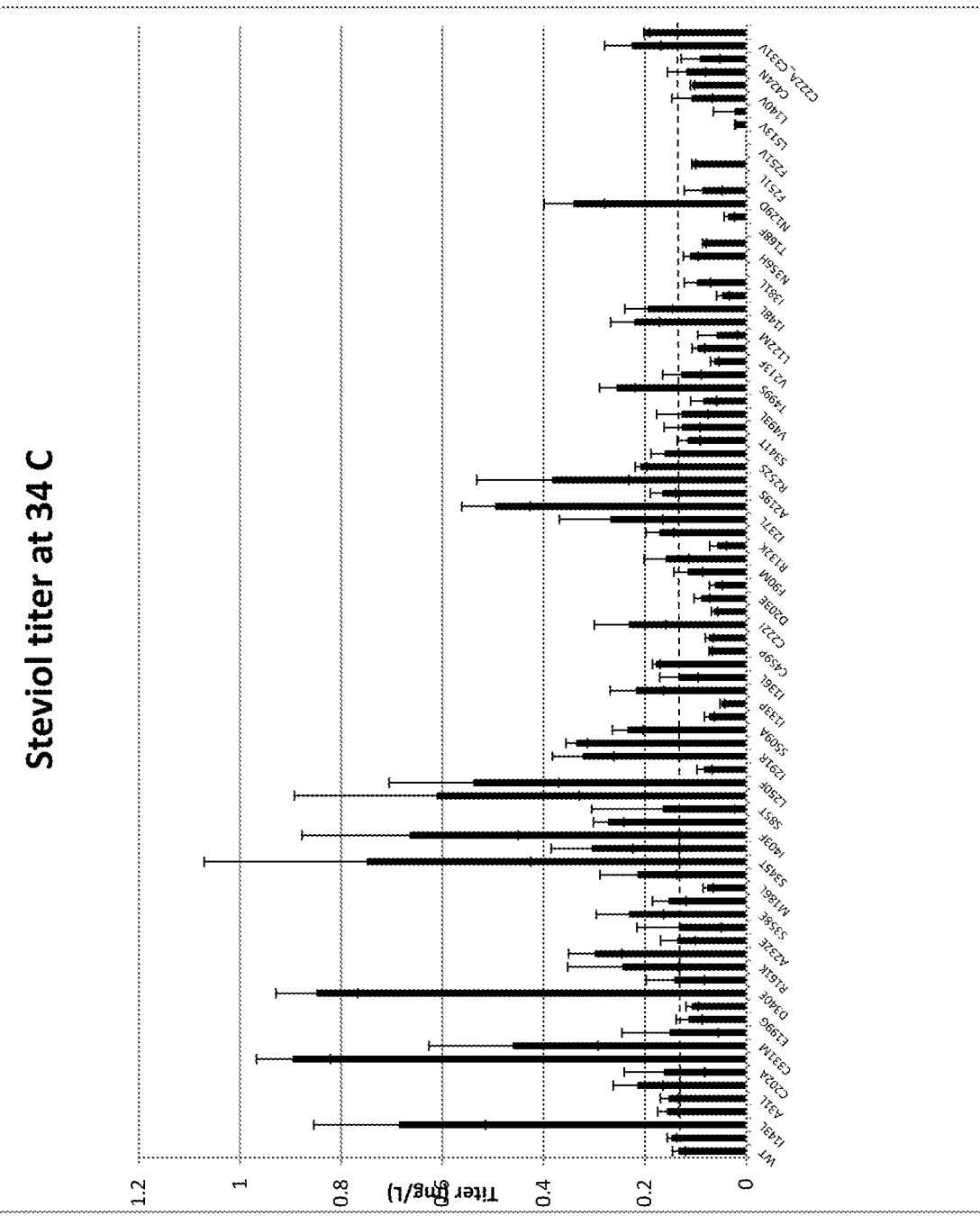
FIG. 50 shows production of Steviol at 34° C. across a library of AtKAH point mutations.

To investigate the thermotolerance of AtKAH, AtKAH point mutants were tested at 30° C. and 34° C. Conditions were: R media+glucose, 96 deep well plate, 3 days at 30° C. or 34° C. The strain background was p5Trc-(8RP)t14AtKAH-O-(8RP)t20SrKO-O-FLSrCPR. FIG. 49 shows production of Steviol at 30° C. across a library of AtKAH point mutations. FIG. 50 shows production of Steviol at 34° C. across a library of AtKAH point mutations. Various point mutations show improved thermotolerance that wild type, as shown by higher titers of steviol at 30 or 34° C.

Figure 51A:
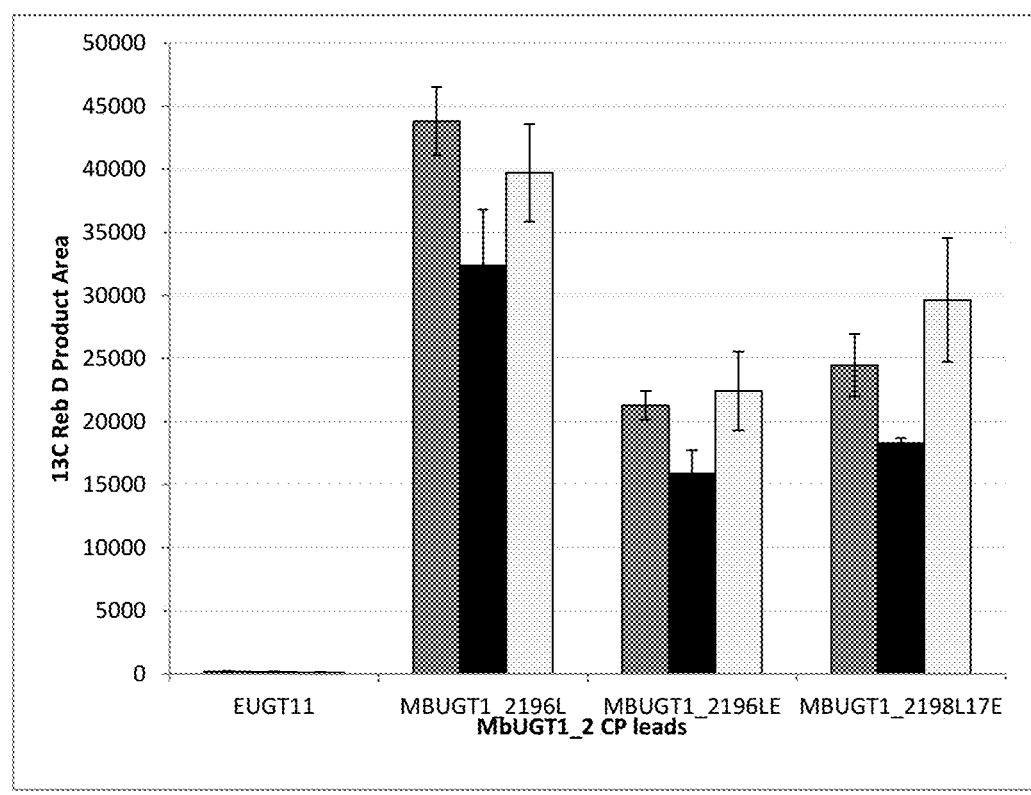
FIG. 51A and FIG. 51B show activities of MbUGT1-2 circular permutants at 30° C., 34° C., and 37° C.
Figure 51B:
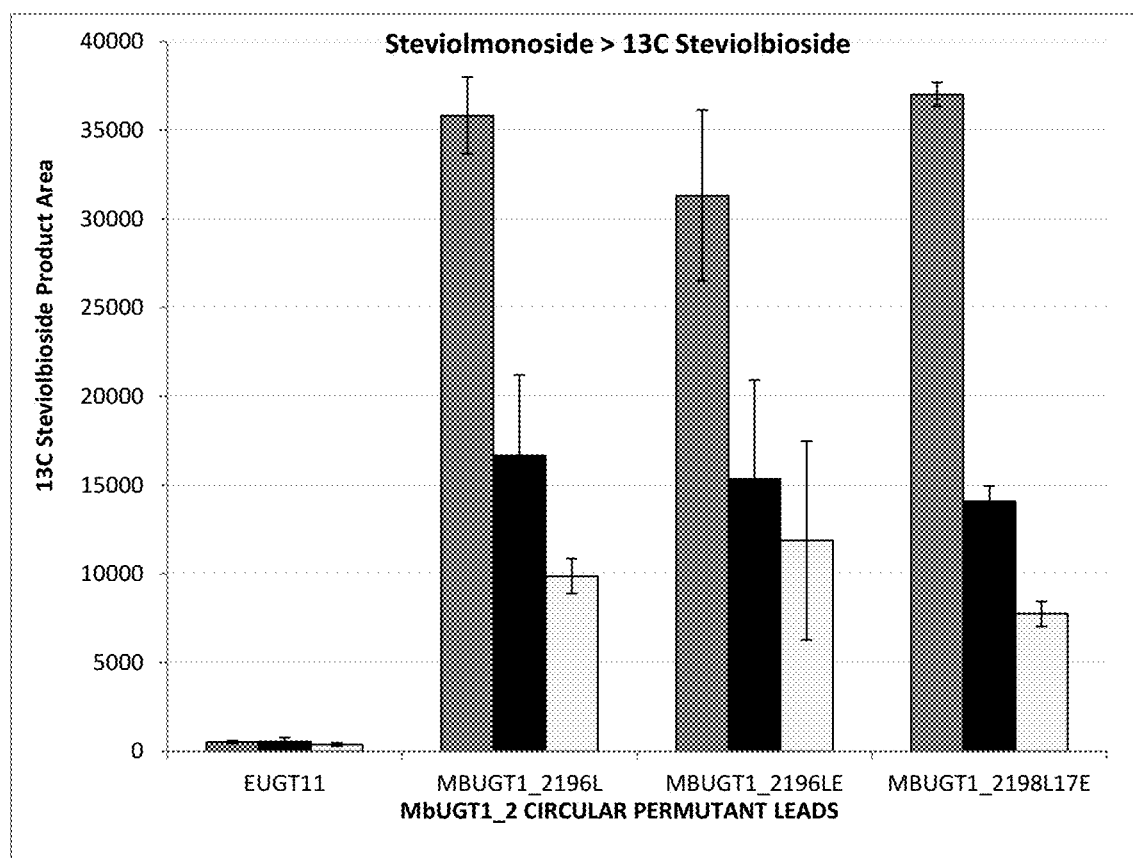

MbUGT1_2 curcular permutants were tested for activity at 30, 33, and 37° C. FIG. 51A and FIG. 51B shows activities of MbUGT1_2 circular permutants at 30° C., 34° C., and 37° C. Panel (A) shows conversion of Reb A to Reb D, while Panel (B) shows conversion of Steviolmonoside to 13C Steviolbioside. For both, expression of circular permutants was induced, followed by a four hour incubation period. As shown, EUGT11 lost its activity when induced at and above 30° C. In contrast, lead circular permutants seem to be most active at 30° C. MbUGT1_2 196L retains highest activity on both substrates.

Figure 52:
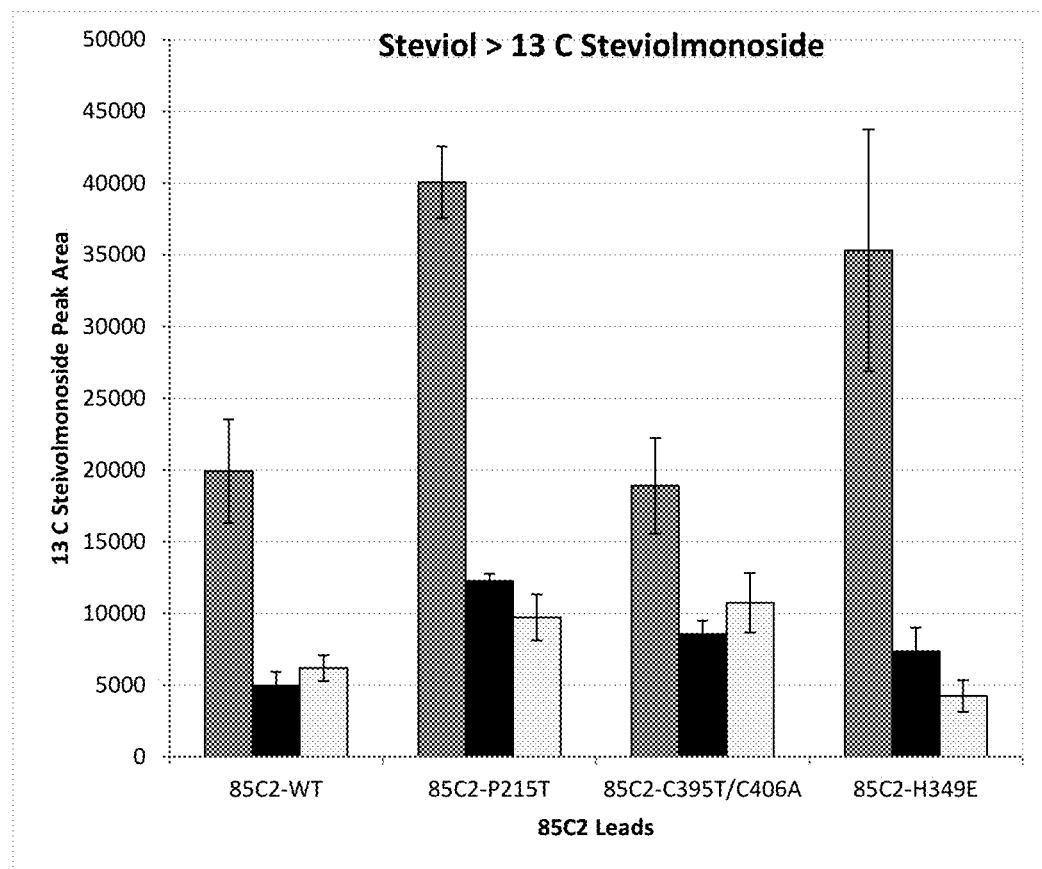
FIG. 52 shows activities of UGT85C2 mutants for conversion of Steviol to 13C Steviolmonoside at 30° C., 34° C., and 37° C.

FIG. 52 shows activities of UGT85C2 mutants for conversion of Steviol to 13C Steviolmonoside at 30° C., 34° C., and 37° C. Expression was induced, followed by a four hour incubation period. As shown, 85C2-WT and the leads retain comparable activity at 34° C. and 37° C., maintaining highest activity at 30° C.

Figure 53:
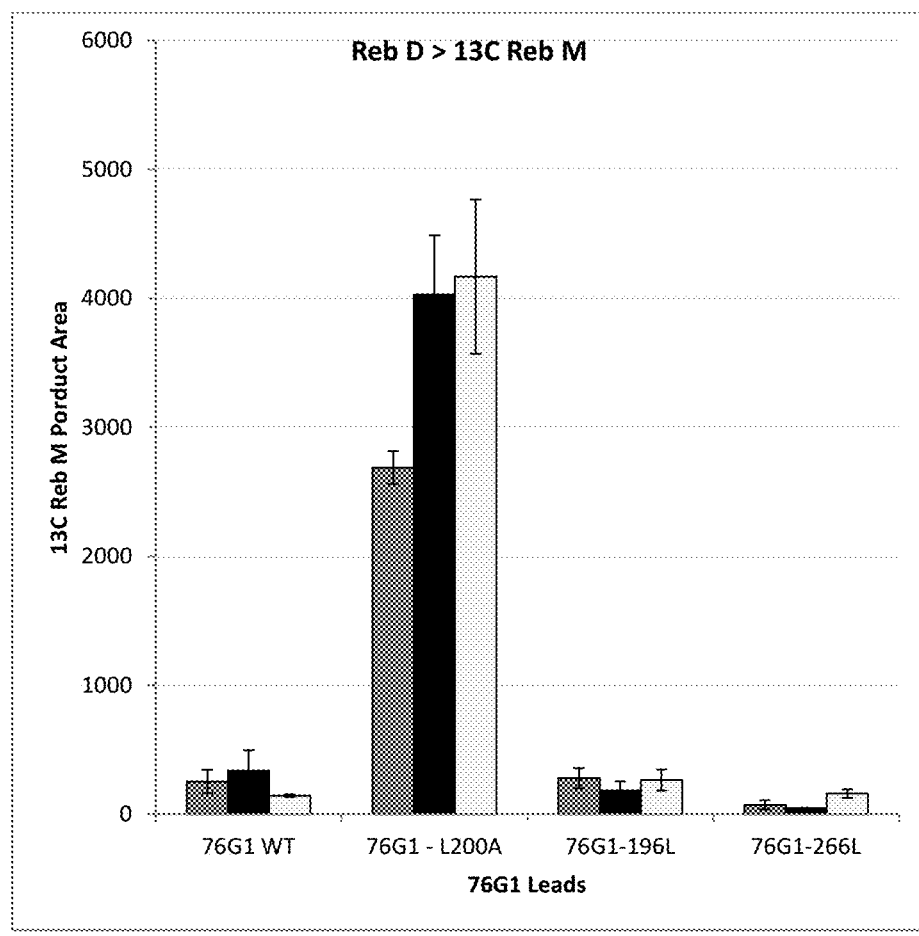
FIG. 53 shows activities of UGT76G1 mutants for conversion of Reb D to 13C Reb M at 30° C., 34° C., and 37° C.

FIG. 53 shows activities of UGT76G1 mutants for conversion of Reb D to 13C Reb M at 30° C., 34° C., and 37° C. Expression was induced, followed by a four hour incubation period. 76G1-L200A is particularly active when induced and assayed at the higher temperatures, possibly due to a greater amount of protein.

Figure 54:
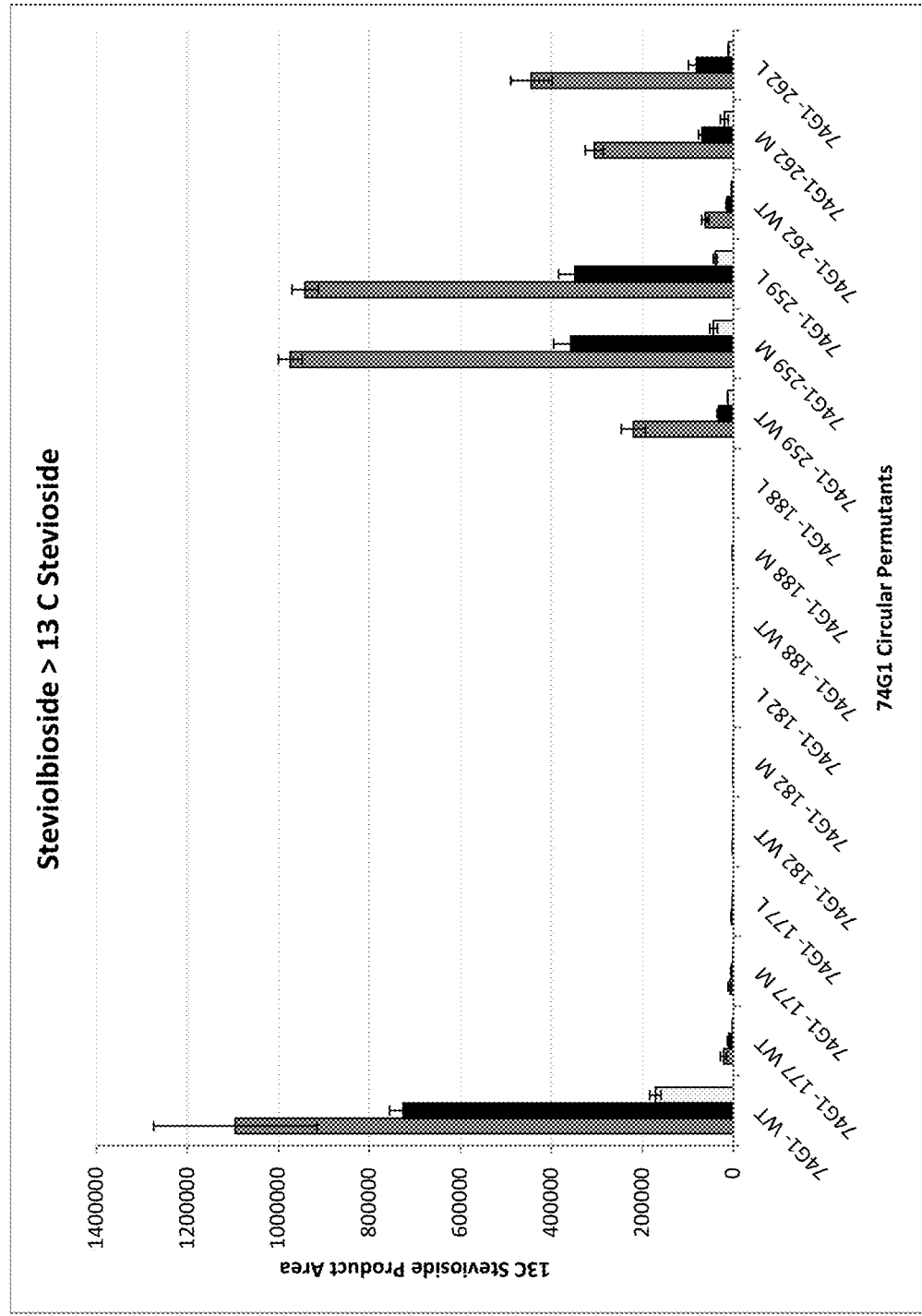
FIG. 54 shows activities of UGT74G1 circular permutants for conversion of Steviolbioside to 13C Stevioside at 30° C., 34° C., and 37° C.

FIG. 54 shows activities of UGT74G1 circular permutants for conversion of Steviolbioside to 13C Stevioside at 30° C., 34° C., and 37° C. 74G1-WT retains activity on Steviolbioside even when induced and assayed at 37 C. The circular permutants 74G1-259M and 74G1-259L show a significant drop in activity at higher temperatures.

REFERENCES

1. Sharma M, Thakral N K, & Thakral S (2009) *Chemistry and in vivo profile of ent-kaurene glycosides of Stevia rebaudiana Bertoni: An overview. Natural Product Radiance* 8(2):181-189.
2. Chang M C Y & Keasling J D (2006) *Production of isoprenoid pharmaceuticals by engineered microbes. Nature chemical biology* 2(12):674-681.
3. Ajikumar P K, et al. (2008) *Terpenoids: opportunities for biosynthesis of natural Product drugs using engineered microorganisms. Molecular pharmaceutics* 5(2):167-190.
4. Ajikumar P K, et al. (2010) *Isoprenoid pathway optimization for Taxol precursor overproduction in Escherichia coli. Science* 330(6000):70-74.
5. Dugar D & Stephanopoulos G (2011) *Relative potential of biosynthetic pathways for biofuels and bio-based products, Nature Biotechnology* 29(12):1074-1078.
6. Leonard E, et al. (2010) *Combining metabolic and protein engineering of a terpenoid biosynthetic pathway for overproduction and selectivity control. Proceedings of the National Academy of Sciences* 107(31):13654-13659.
7. Yadav V G, De Mey M, Giaw Lim C, Kumaran Ajikumar P, & Stephanopoulos G (2012) *The future of metabolic engineering and synthetic biology: Towards a systematic practice. Metabolic Engineering.*
8. Yadav S K & Guleria P (2012) *Steviol glycosides from Stevia Biosynthesis pathway review and their application in foods and medicine. Critical Reviews in Food Science and Nutrition* 52(11):988-998.
9. Richman A S, Gijzen M, Starratt A N, Yang Z,& Brandle J E (1999) *Diterpene synthesis in Stevia rebaudiana: recruitment and up-regulation of key enzymes from the gibberellin biosynthetic pathway. The Plant Journal* 19(4):411-421.
10. Hayashi K, et al. (2006) *Identification and functional analysis of bifunctional ent-kaurene synthase from the moss Physcomitrella patens. FEBS letters* 580(26):6175-6181.
11. Toyomasu T, et al. (2000) *Cloning of a full-length cDNA encoding ent-kaurene synthase from Gibberella fujikuroi: functional analysis of a bifunctional diterpene cyclase. Bioscience, biotechnology, and biochemistry* 64(3):660-664.
12. Helliwell C A, Poole A, Peacock W J, & Dennis E S (1999) *Arabidopsis ent-kaurene oxidase catalyzes three steps of gibberellin biosynthesis. Plant Physiology* 119 (2):507-510.
13. Brandle J & Telmer P (2007) *Steviol glycoside biosynthesis. Phytochemistry* 68(14):1855-1863.
14. Richman A, Swanson A, Humphrey T, Chapman R, McGarvey B, Pocs R & Brandle J. (2005) *Functional genomics uncovers three glucosyltransferases involved in the synthesis of the major sweet glucosides of Stevia rebaudiana. The Plant Journal* 41(1):56-67.
15. Hefner J, Ketchum R E B, & Croteau R (1998) *Cloning and Functional Expression of a cDNA Encoding Gera-* nylgeranyl Diphosphate Synthase from Taxus canadensis and Assessment of the Role of this Prenyltransferases in Cells Induced for Taxol Production. Archives of biochemistry and biophysics 360(1):62-74.
16. Burke C & Croteau R (2002) Interaction with the small subunit of geranyl diphosphate synthase modifies the chain length specificity of geranylgeranyl diphosphate synthase to produce geranyl diphosphate. Journal of Biological Chemistry 277(5):3141-3149.
17. Galagan J E, et al. (2005) Sequencing of Aspergillus nidulans and comparative analysis with A. fumigatus and A. oryzae. Nature 438(7071):1105-1115.
18. Kim S Y, et al. (2009) Cloning and heterologous expression of the cyclooctatin biosynthetic gene cluster afford a diterpene cyclase and two P450 hydroxylases. Chemistry & biology 16(7):736-743.
19. Kawaide H, Imai R, Sassa T, & Kamiya Y (1997) ent-Kaurene Synthase from the Fungus Phaeosphaeria sp. L487. Journal of Biological Chemistry 272(35):21706-21712.
20. Humphrey T V, Richman A S, Menassa R, & Brandle J E (2006) Spatial organisation of four enzymes from Stevia rebaudiana that are involved in steviol glycoside synthesis. Plant molecular biology 61(1):47-62.
21. Miyazaki S, Katsumata T, Natsume M, & Kawaide H (2011) The CYP701B1 of Physcomitrella patens is an ent-kaurene oxidase that resists inhibition by uniconazole-P. FEBS letters 585(12):1879-1883.
22. Mizutani M & Ohta D (1998) Two Isoforms of NADPH: Cytochrome P450 Reductase in Arabidopsis thaliana: Gene Structure. Heterologous Expression in Insect Cells. and Differential Regulation. Plant Physiology 116(1): 357-367.
23. Yamaguchi S, Nomura T, Magome H, Kamiya Y (2008) Method for producing steviol synthetase gene and steviol. US Patent Application Publication No. 2008/0271205.
24. Kim K K, Sawa Y, & Shibata H (1996) Hydroxylation of ent-Kaurenoic Acid to Steviol in Stevia rebaudiana Bertoni-Purification and Partial Characterization of the Enzyme. Archives of biochemistry and biophysics 332(2): 223-230.
25. Schuler M A (1996) Plant cytochrome P450 monooxyenases. Critical reviews in plant sciences 15(3):235-284.
26. Heinemann U & Hahn M. (1995) Circular permutation of polypeptide chains: implications for protein folding and stability. Prog. Biophys. Molec. Biol. 64(2-3):121-143.
27. Yu Y, Lutz S (2011) Circular permutation: a different way to engineer enzyme structure and function. Trends Biotechnol 29(1):18-25.
28. Houghton-Larsen J, et al. Recombinant production of steviol glycosides. PCT Publication No. WO 2013/022989.

TABLE 1

Summary of enzyme/gene sequences enabling biosynthesis of steviol.

| No. | Enzyme | Species | Gene ID | Protein ID |
|---|---|---|---|---|
| 1 | TcGGPPS | Taxus canadensis | AF081514.1 | AAD16018.1 |
| 2 | AgGGPPS | Abies grandis | AF425235.2 | AAL17614.2 |
| 3 | AnGGPPS | Aspergillus nidulans | XM_654104.1 | XP_659196.1 |
| 4 | SmGGPPS | Streptomyces melanosporofaciens | AB448947.1 | BAI44337.1 |
| 5 | MbGGPPS | Marine bacterium 443 | n/a | AAR37858.1 |
| 6 | PhGGPPS | Paracoccus haeundaensis | n/a | AAY28422.1 |
| 7 | CtGGPPS | Chlorobium tepidum TLS | NC_002932.3 | NP_661160.1 |
| 8 | SsGGPPS | Synechococcus sp. JA-3-3Ab | n/a | ABC98596.1 |
| 9 | Ss2GGPPS | Synechocystis sp. PCC 6803 | n/a | BAA16690.1 |
| 10 | TmGGPPS | Thermotoga maritima HB8 | n/a | NP_227976.1 |
| 11 | CgGGPPS | Corynebacterium glutamicum | n/a | NP_601376.2 |
| 12 | TtGGPPS | Thermus thermophillus HB27 | n/a | YP_143279.1 |
| 13 | PcGGPPS | Pyrobaculum calidifontis JCM 11548 | n/a | WP_011848845.1 |
| 14 | SrCPPS | Stevia rebaudiana | AF034545.1 | AAB87091.1 |
| 15 | EtCPPS | Erwina tracheiphila | n/a | WP_020322919.1 |
| 16 | SfCPPS | Sinorhizobium fredii | n/a | WP_010875301.1 |
| 17 | SrKS | Stevia rebaudiana | AF097311.1 | AAD34295.1 |
| 18 | EtKS | Erwina tracheiphila | n/a | WP_020322918.1 |
| 19 | SfKS | Sinorhizobium fredii | n/a | WP_010875302.1 |
| 20 | GfCPPS/KS | Gibberella fujikuroi | AB013295.1 | Q9UVY5.1 |
| 21 | PpCPPS/KS | Physcomitrella patens | AB302933.1 | BAF61135.1 |
| 22 | PsCPPS/KS | Phaeosphaeria sp. L487 | AB003395.1 | O13284.1 |
| 23 | AtKO | Arabidopsis thaliana | NM_122491.2 | NP_197962.1 |
| 24 | SrKO | Stevia rebaudiana | AY364317.1 | AAQ63464.1 |
| 25 | PpKO | Physcomitrella patens | AB618673.1 | BAK19917.1 |
| 26 | AtCPR | Arabidopsis thaliana | X66016.1 | CAA46814.1 |
| 27 | SrCPR | Stevia rebaudiana | DQ269454.4 | ABB88839.2 |
| 28 | AtKAH | Arabidopsis thaliana | NM_122399.2 | NP_197872.1 |
| 29 | SrKAH1 | Stevia rebaudiana | DQ398871.3 | ABD60225.1 |
| 30 | SrKAH2 | Stevia rebaudiana | n/a | n/a |

TABLE 2

Strains constructed to evaluate pathways for kaurene biosynthesis.

| Strain # | Upstream | Downstream |
|---|---|---|
| 1 | WT | Ch1.T7-KCG |
| 2 | Ch1.Trc-MEP | Ch1.T7-KCG |
| 3 | Ch1.T7-MEP | Ch1.T7-KCG |
| 4 | WT | p5-Trc-KCG |
| 5 | Ch1.Trc-MEP | p5-Trc-KCG |
| 6 | Ch1.T7-MEP | p5-Trc-KCG |
| 7 | WT | p10-Trc-KCG |
| 8 | Ch1.Trc-MEP | p10-Trc-KCG |
| 9 | Ch1.T7-MEP | p10-Trc-KCG |
| 10 | WT | p20-Trc-KCG |
| 11 | Ch1.Trc-MEP | p20-Trc-KCG |
| 12 | Ch1.T7-MEP | p20-Trc-KCG |
| 13 | WT | p5-T7-KCG |
| 14 | Ch1.Trc-MEP | p5-T7-KCG |
| 15 | Ch1.T7-MEP | p5-T7-KCG |
| 16 | WT | Ch1.T7-PpCKG |
| 17 | Ch1.Trc-MEP | Ch1.T7-PpCKG |
| 18 | Ch1.T7-MEP | Ch1.T7-PpCKG |
| 19 | WT | p5-Trc-PpCKG |
| 20 | Ch1.Trc-MEP | p5-Trc-PpCKG |
| 21 | Ch1.T7-MEP | p5-Trc-PpCKG |
| 22 | WT | p10-Trc-PpCKG |
| 23 | Ch1.Trc-MEP | p10-Trc-PpCKG |
| 24 | Ch1.T7-MEP | p10-Trc-PpCKG |
| 25 | WT | p20-Trc-PpCKG |
| 26 | Ch1.Trc-MEP | p20-Trc-PpCKG |
| 27 | Ch1.T7-MEP | p20-Trc-PpCKG |
| 28 | WT | p5-T7-PpCKG |
| 29 | Ch1.Trc-MEP | p5-T7-PpCKG |
| 30 | Ch1.T7-MEP | p5-T7-PpCKG |
| 31 | WT | Ch1.T7-GfCKG |
| 32 | Ch1.Trc-MEP | Ch1.T7-GfCKG |
| 33 | Ch1.T7-MEP | Ch1.T7-GfCKG |
| 34 | WT | p5-Trc-GfCKG |
| 35 | Ch1.Trc-MEP | p5-Trc-GfCKG |
| 36 | Ch1.T7-MEP | p5-Trc-GfCKG |
| 37 | WT | p10-Trc-GfCKG |
| 38 | Ch1.Trc-MEP | p10-Trc-GfCKG |
| 39 | Ch1.T7-MEP | p10-Trc-GfCKG |
| 40 | WT | p20-Trc-GfCKG |
| 41 | Ch1.Trc-MEP | p20-Trc-GfCKG |
| 42 | Ch1.T7-MEP | p20-Trc-GfCKG |
| 43 | WT | p5-T7-GfCKG |
| 44 | Ch1.Trc-MEP | p5-T7-GfCKG |
| 45 | Ch1.T7-MEP | p5-T7-GfCKG |
| 46 | WT | Ch1.T7-PsCKG |
| 47 | Ch1.Trc-MEP | Ch1.T7-PsCKG |
| 48 | Ch1.T7-MEP | Ch1.T7-PsCKG |
| 49 | WT | p5-Trc-PsCKG |
| 50 | Ch1.Trc-MEP | p5-Trc-PsCKG |
| 51 | Ch1.T7-MEP | p5-Trc-PsCKG |
| 52 | WT | p10-Trc-PsCKG |
| 53 | Ch1.Trc-MEP | p10-Trc-PsCKG |
| 54 | Ch1.T7-MEP | p10-Trc-PsCKG |
| 55 | WT | p20-Trc-PsCKG |
| 56 | Ch1.Trc-MEP | p20-Trc-PsCKG |
| 57 | Ch1.T7-MEP | p20-Trc-PsCKG |
| 58 | WT | p5-T7-PsCKG |
| 59 | Ch1.Trc-MEP | p5-T7-PsCKG |
| 60 | Ch1.T7-MEP | p5-T7-PsCKG |

TABLE 3

Combinations of upstream and downstream pathway configurations tested for KO activity and kaurenoic acid biosynthesis. Ch1 = 1 copy chromosomally integrated, p5/p10/p20 = plasmids of increasing copy number, Trc/T7 = promoters of increasing transcriptional strength.

| | Upstream/Downstream | | |
|---|---|---|---|
| | Ch1.T7-MEP Ch1.T7-SrKCG | Ch1.T7-MEP p10Trc-SrKCG | Ch1.T7-MEP p20Trc-SrKCG |
| p5Trc-(8RP)t4SrKO-L-t69SrCPR | ✓ | ✓ | ✓ |
| p5Trc-(8RP)t20SrKO-L-t69SrCPR | ✓ | ✓ | ✓ |
| p5Trc-(8RP)t39SrKO-L-t69SrCPR | ✓ | ✓ | ✓ |
| p5Trc-(8RP)t39SrKO-(8RP)t69SrCPR | ✓ | ✓ | ✓ |
| p5Trc-(MA)t39SrKO-(8RP)t69SrCPR | ✓ | ✓ | ✓ |

TABLE 4

Fold-change in in vivo activity over parental enzyme for point mutants of SrKO. The fold increases describe the change in kaurene remaining in this strain, or the change in kaurenoic acid produced, both relative to the wild-type (non-mutated) enzyme-bearing parental strain.

| Wild-type residue | Position | Mutation | Fold increase in kaurene | Fold increase in kaurenoic acid |
|---|---|---|---|---|
| A | 116 | R | 1.0 | 1.8 |
| T | 119 | S | 0.9 | 1.9 |
| I | 183 | V | 1.0 | 1.7 |
| H | 382 | Y | 1.0 | 1.8 |

TABLE 5

Combinations of upstream and downstream pathway configurations tested for KO/KAH activity and steviol biosynthesis. Ch1 = 1 copy chromosomally integrated, p5 and p10 = plasmids of increasing copy number, Trc/T7 = promoters of increasing transcriptional strength.

| | Expression module | Steviol Detected |
|---|---|---|
| Ch1.T7-MEP | p5Trc-(8RP)t39SrKO-(8RP)t7SrKAH | ++ |
| Ch1.T7-(8RP)t69SrCPR | p5Trc-(8RP)t39SrKO-(8RP)t21SrKAH | ++ |
| p10Trc-SrKCG | p5Trc-(8RP)t39SrKO-(8RP)t29SrKAH | + |

TABLE 6

Fold-change in activity over parental enzyme for point mutants of AtKAH. The fold increases describe the change in kaurenoic acid remaining in this strain, or the change in steviol produced, both relative to the wild-type (non-mutated) enzyme-bearing parental strain.

| Wild-type residue | Position | Mutation | Wild-type residue | Position | Mutation | Fold increase kaurenoic acid | Fold increase steviol |
|---|---|---|---|---|---|---|---|
| A | 25 | L | | | | 0.7 | 1.6 |
| K | 37 | R | | | | 0.8 | 1.4 |
| S | 79 | T | | | | 0.7 | 1.6 |
| F | 84 | I | | | | 1.3 | 0.0 |
| F | 84 | M | | | | 1.2 | 0.2 |
| Y | 95 | F | | | | 1.1 | 1.0 |
| H | 104 | I | | | | 1.4 | 0.0 |
| I | 107 | M | | | | 1.0 | 1.2 |
| L | 116 | M | | | | 1.4 | 0.9 |
| T | 119 | C | | | | 0.7 | 1.5 |
| N | 123 | D | | | | 0.9 | 1.1 |
| R | 126 | K | | | | 1.4 | 0.0 |
| I | 127 | P | | | | 1.1 | 0.0 |
| I | 127 | V | | | | 1.1 | 0.1 |
| I | 130 | L | | | | 1.0 | 0.0 |
| L | 134 | V | | | | 1.3 | 0.7 |
| I | 137 | L | | | | 0.3 | 1.9 |
| I | 142 | L | | | | 1.2 | 0.8 |
| I | 142 | V | | | | 0.5 | 2.1 |
| I | 143 | L | | | | 1.7 | 0.0 |
| R | 155 | K | | | | 0.9 | 2.0 |
| T | 162 | F | | | | 1.4 | 0.0 |
| H | 163 | M | | | | 1.2 | 0.2 |
| I | 166 | V | | | | 0.3 | 1.2 |
| M | 180 | L | | | | 1.3 | 1.5 |
| V | 188 | I | | | | 1.0 | 1.1 |
| E | 193 | G | | | | 1.1 | 1.7 |
| C | 196 | A | | | | 0.9 | 1.5 |
| D | 197 | E | | | | 1.7 | 0.8 |
| V | 207 | F | | | | 1.4 | 0.5 |
| A | 213 | S | | | | 0.7 | 0.9 |
| C | 216 | A | C | 325 | V | 0.8 | 0.9 |
| C | 216 | I | | | | 1.1 | 1.0 |
| C | 216 | S | | | | 1.3 | 0.0 |
| A | 226 | E | | | | 0.9 | 1.5 |
| I | 231 | L | | | | 0.3 | 0.8 |
| L | 235 | Q | | | | 0.3 | 2.4 |
| I | 238 | M | | | | 1.5 | 0.2 |
| L | 244 | F | | | | 0.9 | 1.4 |
| F | 245 | L | | | | 1.6 | 0.0 |
| F | 245 | V | | | | 1.5 | 0.0 |
| R | 246 | S | | | | 1.1 | 0.8 |
| F | 247 | L | | | | 1.0 | 1.1 |
| L | 272 | I | | | | 1.7 | 0.0 |
| S | 274 | D | | | | 1.0 | 1.3 |
| S | 275 | L | | | | 0.6 | 1.2 |
| I | 285 | R | | | | 0.6 | 1.7 |
| C | 287 | S | | | | 0.7 | 1.7 |
| K | 292 | E | | | | 1.2 | 0.6 |
| Q | 297 | E | | | | 1.0 | 0.9 |
| C | 307 | S | | | | 0.6 | 0.0 |
| V | 322 | I | | | | 1.1 | 1.4 |

TABLE 6-continued

Fold-change in activity over parental enzyme for point mutants of AtKAH. The fold increases describe the change in kaurenoic acid remaining in this strain, or the change in steviol produced, both relative to the wild-type (non-mutated) enzyme-bearing parental strain.

| Wild-type residue | Position | Mutation | Wild-type residue | Position | Mutation | Fold increase kaurenoic acid | Fold increase steviol |
|---|---|---|---|---|---|---|---|
| C | 325 | I | | | | 0.5 | 2.4 |
| C | 325 | M | | | | 0.6 | 2.2 |
| F | 330 | L | | | | 1.0 | 1.5 |
| D | 334 | E | | | | 0.3 | 2.2 |
| S | 335 | T | | | | 0.7 | 0.5 |
| S | 339 | T | | | | 0.2 | 2.2 |
| N | 350 | H | | | | 0.9 | 1.1 |
| S | 352 | E | | | | 0.7 | 1.5 |
| S | 363 | E | | | | 0.8 | 1.3 |
| E | 373 | D | | | | 1.1 | 1.6 |
| I | 375 | L | | | | 1.2 | 0.8 |
| V | 381 | L | | | | 1.3 | 0.7 |
| M | 389 | L | | | | 1.2 | 0.9 |
| I | 397 | F | | | | 0.8 | 1.7 |
| C | 418 | N | | | | 1.4 | 0.5 |
| S | 446 | A | | | | 0.6 | 1.2 |
| E | 447 | N | | | | 0.8 | 1.4 |
| C | 453 | P | | | | 0.7 | 0.0 |
| I | 460 | M | | | | 1.3 | 0.2 |
| V | 470 | L | | | | 0.7 | 1.7 |
| G | 475 | A | | | | 1.1 | 1.3 |
| M | 477 | V | | | | 0.8 | 0.6 |
| V | 487 | L | | | | 1.3 | 1.0 |
| T | 493 | S | | | | 1.1 | 1.2 |
| T | 497 | N | | | | 0.5 | 1.0 |
| Q | 499 | V | | | | 0.6 | 1.6 |
| S | 503 | A | | | | 0.3 | 1.0 |
| H | 504 | F | | | | 1.1 | 0.2 |
| K | 505 | R | | | | 0.5 | 0.9 |
| L | 506 | M | | | | 1.6 | 0.0 |
| L | 507 | I | | | | 1.5 | 0.0 |
| L | 507 | T | | | | 1.6 | 0.0 |
| L | 507 | V | | | | 1.5 | 0.0 |

TABLE 7

Modifications to *E. coli* strain to improve UDP-glucose substrate pools and support high-titer production of steviol glycosides.

| Modification | Type | Gene ID (BioCyc) |
|---|---|---|
| ΔgalE | Deletion | EG10362 |
| ΔgalT | Deletion | EG10366 |
| ΔgalK | Deletion | EG10363 |
| ΔgalM | Deletion | EG11698 |
| ΔushA | Deletion | EG11060 |
| Δagp | Deletion | EG10033 |
| Δpgm | Deletion | EG12144 |
| galU (*Escherichia coli* K-12 substr. MG1655) | Insertion | EG11319 |
| ugpA (*Bifidobacterium bifidum* PRL2010) | Insertion | BBPR_0976 |
| spl (*Bifidobacterium adolescentis* ATCC 15703) | Insertion | BAD_0078 |

TABLE 8

Enzymes known to catalyze reactions required for steviol glycoside biosynthesis [to RebM].

| Substrate | Product | Type of glycosylation | Enzyme 1 | Enzyme 2 | Enzyme 3 | Enzyme 4 |
|---|---|---|---|---|---|---|
| Steviol | Steviolmonoside | C13 | SrUGT85C2 | | | |
| Steviol | C19-Glu-Steviol | C19 | SrUGT74G1 | MbUGTc19 | | |
| Steviolmonoside | Steviolbioside | 1-2' | SrUGT91D1 | SrUGT91D2 | OsUGT1-2 | MbUGT1-2 |
| Steviolmonoside | Rubusoside | C19 | SrUGT74G1 | MbUGTc19 | | |
| C19-Glu-Steviol | Rubusoside | C13 | SrUGT85C2 | | | |
| Steviolbioside | Stevioside | C19 | SrUGT74G1 | MbUGTc19 | | |
| Steviolbioside | RebB | 1-3' | SrUGT76G1 | | | |
| Stevioside | RebE | 1-2' | SrUGT91D1 | SrUGT91D2 | OsUGT1-2 | MbUGT1-2 |
| Stevioside | RebA | 1-3' | SrUGT76G1 | | | |
| RebB | RebA | C19 | SrUGT74G1 | MbUGTc19 | | |
| RebE | RebD | 1-3' | SrUGT76G1 | | | |

TABLE 8-continued

Enzymes known to catalyze reactions required for steviol glycoside biosynthesis [to RebM].

| Substrate | Product | Type of glycosylation | Enzyme 1 | Enzyme 2 | Enzyme 3 | Enzyme 4 |
|---|---|---|---|---|---|---|
| RebA | RebD | 1-2' | SrUGT91D1 | SrUGT91D2 | OsUGT1-2 | MbUGT1-2 |
| RebD | RebM | 1-3' | SrUGT76G1 | | | |

TABLE 9

Summary of enzyme/gene sequences for biosynthesis of steviol glycosides, including RebM.

| Type of glycosylation | Enzyme | Gene ID | Protein ID | Description |
|---|---|---|---|---|
| C13 | SrUGT85C2 | AY345978.1 | AAR06916.1 | |
| C19 | SrUGT74G1 | AY345982.1 | AAR06920.1 | |
| | MbUGTc19 | — | — | circular permutant of SrUGT74G1 |
| 1-2' | SrUGT91D1 | AY345980.1 | AAR06918.1 | |
| | SrUGT91D2 | ACE87855.1 | ACE87855.1 | |
| | SrUGT91D2e | | | US2011/038967 |
| | OsUGT1-2 | NM_001057542.1 | NP_001051007.2 | WO 2013/022989 |
| | MbUGT1-2 | — | — | circular permutant of OsUGT1-2 |
| 1-3' | SrUGT76G1 | FB917645.1 | CAX02464.1 | |

TABLE 10

Summary of steviol glycoside structures.

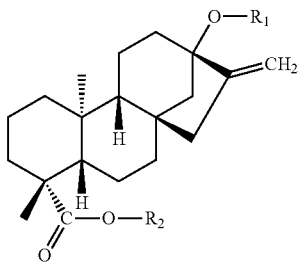

| Symbol | Common Name | R1 | R2 | Glycosylations |
|---|---|---|---|---|
| SG1 | Steviolmonoside | Glcβ1- | H— | 1 |
| SG2 | C19-glucopyranosyl steviol | H— | Glcβ1- | 1 |
| SG3 | Steviolbioside | Glcβ1-2Glcβ1- | H— | 2 |
| SG4 | — | H— | Glcβ1-2Glcβ1- | 2 |
| SG5 | Rubusoside | Glcβ1- | Glcβ1- | 2 |
| SG6 | — | Glcβ1-3Glcβ1- | H— | 2 |
| SG7 | — | H— | Glcβ1-3Glcβ1- | 2 |
| SG8 | Stevioside | Glcβ1-2Glcβ1- | Glcβ1- | 3 |
| SG9 | Rebaudioside G | Glcβ1-3Glcβ1- | Glcβ1- | 3 |
| SG10 | — | Glcβ1- | Glcβ1-2Glcβ1- | 3 |
| SG11 | — | Glcβ1- | Glcβ1-3Glcβ1- | 3 |
| SG12 | Rebaudioside B | Glcβ1-2(Glcβ1-3)Glcβ1- | H— | 3 |
| SG13 | — | H— | Glcβ1-2(Glcβ1-3)Glcβ1- | 3 |
| SG14 | Rebaudioside E | Glcβ1-2Glcβ1- | Glcβ1-2Glcβ1- | 4 |
| SG15 | — | Glcβ1-3Glcβ1- | Glcβ1-3Glcβ1- | 4 |
| SG16 | Rebaudioside A | Glcβ1-2(Glcβ1-3)Glcβ1- | Glcβ1- | 4 |
| SG17 | — | Glcβ1- | Glcβ1-2(Glcβ1-3)Glcβ1- | 4 |
| SG18 | — | Glcβ1-3Glcβ1-2(Glcβ1-3)Glcβ1- | H— | 4 |
| SG19 | — | H— | Glcβ1-3Glcβ1-2(Glcβ1-3)Glcβ1- | 4 |
| SG20 | — | Glcβ1-2Glcβ1- | Glcβ1-3Glcβ1- | 4 |
| SG21 | — | Glcβ1-3Glcβ1- | Glcβ1-2Glcβ1- | 4 |
| SG22 | — | Glcβ1-2(Glcb1-2Glcβ1-3)Glcβ1- | H— | 4 |

TABLE 10-continued

Summary of steviol glycoside structures.

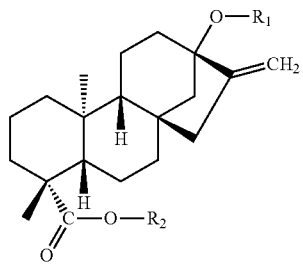

| Symbol | Common Name | R1 | R2 | Glycosylations |
|---|---|---|---|---|
| SG23 | — | H— | Glcβ1-2(Glcb1-2Glcβ1-3)Glcβ1- | 4 |
| SG24 | Rebaudioside D | Glcβ1-2(Glcβ1-3)Glcβ1- | Glcβ1-2Glcβ1- | 5 |
| SG25 | — | Glcβ1-2Glcβ1- | Glcβ1-2(Glcβ1-3)Glcβ1- | 5 |
| SG26 | Rebaudioside I | Glcβ1-2(Glcβ1-3)Glcβ1- | Glcβ1-3Glcβ1- | 5 |
| SG27 | — | Glcβ1-3Glcβ1- | Glcβ1-2(Glcβ1-3)Glcβ1- | 5 |
| SG28 | — | Glcβ1-3Glcβ1-2(Glcβ1-3)Glcβ1- | Glcβ1- | 5 |
| SG29 | — | Glcβ1- | Glcβ1-3Glcβ1-2(Glcβ1-3)Glcβ1- | 5 |
| SG30 | — | Glcβ1-2(Glcb1-2Glcβ1-3)Glcβ1- | Glcβ1- | 5 |
| SG31 | — | Glcβ1- | Glcβ1-2(Glcb1-2Glcβ1-3)Glcβ1- | 5 |
| SG32 | Rebaudioside M | Glcβ1-2(Glcβ1-3)Glcβ1- | Glcβ1-2(Glcβ1-3)Glcβ1- | 6 |
| SG33 | — | Glcβ1-3Glcβ1-2(Glcβ1-3)Glcβ1- | Glcβ1-2Glcβ1- | 6 |
| SG34 | — | Glcβ1-3Glcβ1-2(Glcβ1-3)Glcβ1- | Glcβ1-3Glcβ1- | 6 |
| SG35 | — | Glcβ1-2Glcβ1- | Glcβ1-3Glcβ1-2(Glcβ1-3)Glcβ1- | 6 |
| SG36 | — | Glcβ1-3Glcβ1- | Glcβ1-3Glcβ1-2(Glcβ1-3)Glcβ1- | 6 |
| SG37 | — | Glcβ1-2(Glcb1-2Glcβ1-3)Glcβ1- | Glcβ1-2Glcβ1- | 6 |
| SG38 | — | Glcβ1-2(Glcb1-2Glcβ1-3)Glcβ1- | Glcβ1-3Glcβ1- | 6 |
| SG39 | — | Glcβ1-2Glcβ1- | Glcβ1-2(Glcb1-2Glcβ1-3)Glcβ1- | 6 |
| SG40 | — | Glcβ1-3Glcβ1- | Glcβ1-2(Glcb1-2Glcβ1-3)Glcβ1- | 6 |
| SG41 | — | Glcβ1-3Glcβ1-2(Glcβ1-3)Glcβ1- | Glcβ1-2(Glcβ1-3)Glcβ1- | 7 |
| SG42 | — | Glcβ1-2(Glcβ1-3)Glcβ1- | Glcβ1-3Glcβ1-2(Glcβ1-3)Glcβ1- | 7 |
| SG43 | — | Glcβ1-2(Glcb1-2Glcβ1-3)Glcβ1- | Glcβ1-2(Glcβ1-3)Glcβ1- | 7 |
| SG44 | — | Glcβ1-2(Glcβ1-3)Glcβ1- | Glcβ1-2(Glcb1-2Glcβ1-3)Glcβ1- | 7 |
| SG45 | — | Glcβ1-3Glcβ1-2(Glcβ1-3)Glcβ1- | Glcß1-3Glcß1-2(Glcβ1-3)Glcβ1- | 8 |
| SG46 | — | Glcβ1-2(Glcb1-2Glcβ1-3)Glcβ1- | Glcβ1-2(Glcb1-2Glcβ1-3)Glcβ1- | 8 |
| SG47 | — | Glcβ1-3Glcβ1-2(Glcβ1-3)Glcβ1- | Glcβ1-2Glcβ1-2(Glcβ1-3)Glcβ1- | 8 |
| SG48 | — | Glcβ1-2(Glcb1-2Glcβ1-3)Glcβ1- | Glcβ1-3(Glcb1-2Glcβ1-3)Glcβ1- | 8 |

TABLE 11

Fold-change in activity over parental enzyme for point mutants of SrUGT85C2 (C13-O-glycosylating activity).

| WT | Pos. | Mutation | WT | Pos. | Mutation | WT | Pos. | Mutation | WT | Pos. | Mutation | Fold increase stevioimonoside | Fold increase rubusoside |
|---|---|---|---|---|---|---|---|---|---|---|---|---|---|
| D | 2 | G | | | | | | | | | | 1.1 | |
| A | 3 | S | | | | | | | | | | 1.1 | |
| V | 13 | A | | | | | | | | | | 1.0 | |

TABLE 11-continued

Fold-change in activity over parental enzyme for point mutants of SrUGT85C2 (C13-O-glycosylating activity).

| WT | Pos. | Mutation | WT | Pos. | Mutation | WT | Pos. | Mutation | WT | Pos. | Mutation | Fold increase stevioimonoside | Fold increase rubusoside |
|---|---|---|---|---|---|---|---|---|---|---|---|---|---|
| V | 13 | A | L | 40 | F | | | | | | | 1.1 | |
| V | 13 | I | L | 40 | H | | | | | | | 0.9 | |
| I | 14 | V | | | | | | | | | | 1.4 | |
| F | 15 | C | | | | | | | | | | 1.1 | |
| F | 18 | Y | | | | | | | | | | 1.2 | |
| S | 22 | G | | | | | | | | | | 0.6 | |
| S | 22 | G | A | 27 | P | | | | | | | 0.7 | |
| K | 25 | N | | | | | | | | | | 0.8 | |
| A | 26 | P | | | | | | | | | | 0.5 | |
| Q | 32 | K | | | | | | | | | | 1.0 | |
| K | 37 | R | | | | | | | | | | 1.0 | |
| L | 39 | F | | | | | | | | | | 1.1 | |
| Q | 40 | H | | | | | | | | | | 1.1 | |
| Q | 40 | R | | | | | | | | | | 1.0 | |
| D | 47 | E | | | | | | | | | | 1.3 | |
| F | 48 | Y | | | | | | | | | | 1.4 | |
| I | 49 | N | | | | | | | | | | 1.3 | |
| N | 51 | K | | | | | | | | | | 1.4 | |
| Q | 52 | R | | | | | | | | | | 1.1 | |
| F | 53 | L | | | | | | | | | | 1.4 | |
| E | 55 | K | | | | | | | | | | 1.0 | |
| S | 57 | R | | | | | | | | | | 1.0 | |
| H | 60 | N | | | | | | | | | | 1.4 | |
| C | 61 | A | | | | | | | | | | 1.2 | |
| A | 65 | L | | | | | | | | | | 1.1 | |
| G | 67 | D | | | | | | | | | | 0.8 | |
| V | 77 | L | | | | | | | | | | 0.9 | |
| S | 78 | P | | | | | | | | | | 1.0 | |
| H | 79 | P | | | | | | | | | | 0.9 | |
| P | 81 | D | | | | | | | | | | 1.0 | |
| A | 83 | D | | | | | | | | | | 1.1 | |
| S | 84 | A | | | | | | | | | | 0.9 | |
| I | 85 | T | | | | | | | | | | 1.1 | |
| P | 86 | Q | | | | | | | | | | 1.2 | |
| I | 87 | D | | | | | | | | | | 0.9 | |
| R | 88 | I | | | | | | | | | | 0.9 | |
| E | 89 | P | | | | | | | | | | 1.0 | |
| L | 92 | C | | | | | | | | | | 0.9 | |
| R | 93 | E | | | | | | | | | | 1.1 | |
| I | 95 | T | | | | | | | | | | 1.0 | |
| E | 96 | R | | | | | | | | | | 0.9 | |
| T | 97 | K | | | | | | | | | | 1.0 | |
| F | 99 | C | | | | | | | | | | 1.1 | |
| F | 99 | L | F | 127 | W | | | | | | | 1.1 | |
| D | 101 | A | | | | | | | | | | 1.1 | |
| R | 102 | P | | | | | | | | | | 1.2 | |
| I | 104 | E | | | | | | | | | | 1.1 | |
| I | 104 | R | | | | | | | | | | 0.7 | |
| I | 104 | R | K | 134 | E | | | | | | | 1.0 | |
| V | 107 | L | | | | | | | | | | 0.9 | |
| T | 108 | A | | | | | | | | | | 1.0 | |
| P | 111 | N | | | | | | | | | | 0.8 | |
| P | 114 | V | | | | | | | | | | 1.0 | 0.7 |
| I | 118 | V | | | | | | | | | | 1.0 | 0.7 |
| L | 123 | M | | | | | | | | | | 1.0 | 1.0 |
| I | 128 | L | | | | | | | | | | 1.0 | 1.1 |
| K | 132 | E | | | | | | | | | | 1.0 | 1.3 |
| K | 133 | E | | | | | | | | | | 1.0 | 0.8 |
| V | 138 | E | | | | | | | | | | 0.7 | 0.3 |
| V | 138 | R | | | | | | | | | | 0.6 | 0.2 |
| M | 139 | V | | | | | | | | | | 1.0 | 0.8 |
| M | 140 | L | | | | | | | | | | 0.9 | 0.7 |
| Y | 141 | F | | | | | | | | | | 1.0 | 0.9 |
| A | 145 | S | | | | | | | | | | 1.0 | 1.0 |
| F | 152 | Y | | | | | | | | | | 0.8 | 0.4 |
| Y | 153 | L | | | | | | | | | | 0.9 | 0.9 |
| I | 155 | Y | | | | | | | | | | 1.1 | 0.9 |
| H | 156 | R | | | | | | | | | | 1.0 | 1.1 |
| F | 163 | L | | | | | | | | | | 1.2 | 1.2 |
| A | 169 | E | | | | | | | | | | 1.1 | 1.2 |
| V | 184 | I | | | | | | | | | | 1.0 | 1.0 |
| E | 188 | K | | | | | | | | | | 0.9 | 0.9 |
| G | 189 | N | | | | | | | | | | 1.1 | 1.1 |

TABLE 11-continued

Fold-change in activity over parental enzyme for point mutants of SrUGT85C2 (C13-O-glycosylating activity).

| WT | Pos. | Mutation | WT | Pos. | Mutation | WT | Pos. | Mutation | WT | Pos. | Mutation | Fold increase stevioimonoside | Fold increase rubusoside |
|---|---|---|---|---|---|---|---|---|---|---|---|---|---|
| F | 195 | L | | | | | | | | | | 1.0 | 0.9 |
| L | 197 | F | | | | | | | | | | 0.8 | 0.6 |
| D | 198 | I | | | | | | | | | | 1.0 | 0.5 |
| W | 199 | R | | | | | | | | | | 1.0 | 0.8 |
| S | 200 | T | | | | | | | | | | 1.0 | 0.9 |
| L | 203 | P | | | | | | | | | | 0.8 | 0.7 |
| K | 206 | I | | | | | | | | | | 1.1 | 0.5 |
| V | 207 | M | | | | | | | | | | 0.9 | 0.5 |
| M | 209 | N | | | | | | | | | | 1.4 | 0.9 |
| A | 214 | E | | | | | | | | | | 1.0 | 0.5 |
| P | 215 | T | | | | | | | | | | 1.8 | 0.9 |
| Q | 216 | E | | | | | | | | | | 1.2 | 0.6 |
| S | 218 | A | | | | | | | | | | 1.1 | 0.7 |
| V | 221 | A | | | | | | | | | | 1.1 | 0.7 |
| H | 223 | A | | | | | | | | | | 1.2 | 0.8 |
| H | 224 | I | | | | | | | | | | 0.6 | 0.3 |
| I | 225 | L | M | 472 | F | | | | | | | 0.8 | 0.4 |
| F | 226 | L | | | | | | | | | | 1.0 | 0.7 |
| H | 227 | N | | | | | | | | | | 0.1 | 0.0 |
| S | 235 | D | | | | | | | | | | 1.2 | 0.8 |
| I | 236 | V | | | | | | | | | | 1.2 | 0.7 |
| I | 237 | L | | | | | | | | | | 1.2 | 0.8 |
| K | 238 | D | | | | | | | | | | 1.3 | 0.9 |
| T | 239 | A | | | | | | | | | | 1.1 | 0.9 |
| L | 242 | S | | | | | | | | | | 1.4 | 1.1 |
| R | 243 | I | | | | | | | | | | 0.8 | 0.6 |
| Y | 244 | L | | | | | | | | | | 1.3 | 0.7 |
| N | 245 | P | | | | | | | | | | 1.1 | 1.3 |
| H | 246 | P | | | | | | | | | | 0.7 | 0.6 |
| I | 247 | V | | | | | | | | | | 0.9 | 0.7 |
| D | 258 | N | | | | | | | | | | 0.9 | 0.7 |
| F | 285 | L | | | | | | | | | | 0.7 | 0.9 |
| Q | 289 | D | | | | | | | | | | 0.8 | 1.0 |
| K | 291 | Q | Y | 326 | R | | | | | | | 1.2 | 1.0 |
| K | 291 | Q | E | 293 | P | Y | 326 | R | | | | 1.3 | 0.9 |
| E | 292 | P | Y | 326 | R | | | | | | | 0.9 | 0.7 |
| T | 304 | I | | | | | | | | | | 1.3 | 0.9 |
| S | 308 | T | | | | | | | | | | 1.3 | 0.9 |
| D | 311 | Q | | | | | | | | | | 1.3 | 1.1 |
| M | 312 | L | | | | | | | | | | 1.1 | 0.9 |
| M | 312 | L | I | 331 | V | | | | | | | 1.6 | 1.1 |
| G | 316 | A | | | | | | | | | | 1.1 | 1.0 |
| A | 320 | E | H | 350 | R | | | | | | | 1.2 | 0.8 |
| A | 320 | E | E | 346 | G | H | 350 | R | | | | 1.3 | 0.6 |
| N | 323 | G | | | | | | | | | | 1.2 | 1.1 |
| Y | 325 | P | | | | | | | | | | 1.1 | 1.0 |
| I | 329 | V | | | | | | | | | | 1.1 | 1.0 |
| S | 332 | P | | | | | | | | | | 1.3 | 1.0 |
| N | 333 | D | | | | | | | | | | 1.3 | 1.2 |
| N | 339 | S | | | | | | | | | | 0.9 | 0.9 |
| E | 345 | G | | | | | | | | | | 0.9 | 0.9 |
| E | 345 | G | H | 350 | R | | | | | | | 1.4 | 0.9 |
| L | 346 | F | | | | | | | | | | 0.9 | 0.7 |
| L | 346 | F | I | 351 | T | | | | | | | 0.9 | 0.7 |
| H | 349 | E | | | | | | | | | | 1.5 | 1.0 |
| K | 352 | D | | | | | | | | | | 0.9 | 0.8 |
| F | 355 | L | | | | | | | | | | 1.1 | 0.8 |
| S | 361 | P | | | | | | | | | | 1.0 | 0.8 |
| K | 364 | Q | | | | | | | | | | 0.8 | 0.9 |
| L | 375 | V | | | | | | | | | | 0.9 | 1.0 |
| L | 375 | V | I | 395 | V | | | | | | | 0.9 | 0.8 |
| L | 375 | V | I | 395 | V | L | 432 | A | L | 436 | V | 0.2 | 0.7 |
| G | 381 | N | | | | | | | | | | 1.0 | 0.1 |
| I | 384 | L | | | | | | | | | | 1.3 | 0.7 |
| L | 387 | I | | | | | | | | | | 0.8 | 0.9 |
| L | 387 | I | V | 416 | I | | | | | | | 0.9 | 0.7 |
| S | 388 | C | | | | | | | | | | 0.8 | 0.7 |
| I | 394 | V | L | 432 | A | | | | | | | 0.6 | 0.7 |
| I | 394 | V | L | 436 | V | | | | | | | 1.2 | |
| C | 395 | A | | | | | | | | | | 1.4 | |
| C | 395 | A | C | 407 | A | | | | | | | 1.4 | |
| C | 395 | T | C | 407 | A | | | | | | | 1.5 | |
| Y | 398 | F | | | | | | | | | | 0.9 | |

TABLE 11-continued

Fold-change in activity over parental enzyme for point mutants of SrUGT85C2 (C13-O-glycosylating activity).

| WT | Pos. | Mutation | WT | Pos. | Mutation | WT | Pos. | Mutation | WT | Pos. | Mutation | Fold increase stevioimonoside | Fold increase rubusoside |
|---|---|---|---|---|---|---|---|---|---|---|---|---|---|
| S | 399 | F | | | | | | | | | | 1.0 | |
| W | 400 | A | | | | | | | | | | 0.9 | 0.3 |
| L | 403 | Q | | | | | | | | | | 1.0 | |
| I | 409 | V | | | | | | | | | | 0.9 | 0.9 |
| E | 414 | G | | | | | | | | | | 1.3 | |
| E | 414 | K | K | 443 | E | | | | | | | 0.4 | |
| V | 415 | I | | | | | | | | | | 0.5 | |
| L | 417 | M | | | | | | | | | | 0.7 | |
| M | 419 | I | | | | | | | | | | 1.0 | 0.8 |
| G | 420 | D | | | | | | | | | | 1.2 | |
| K | 422 | D | | | | | | | | | | 0.6 | |
| D | 426 | E | | | | | | | | | | 1.0 | |
| K | 429 | E | | | | | | | | | | 1.0 | |
| K | 429 | E | Q | 434 | R | | | | | | | 0.9 | |
| Q | 433 | R | | | | | | | | | | 0.4 | |
| G | 439 | K | | | | | | | | | | 0.9 | |
| H | 441 | K | | | | | | | | | | 1.0 | 1.0 |
| K | 442 | E | | | | | | | | | | 0.9 | 1.1 |
| K | 446 | R | D | 450 | E | | | | | | | 1.0 | 1.0 |
| D | 449 | E | | | | | | | | | | 0.8 | |
| W | 450 | L | | | | | | | | | | 1.1 | |
| E | 452 | K | | | | | | | | | | 0.9 | 1.0 |
| K | 453 | L | | | | | | | | | | 1.1 | |
| R | 455 | E | | | | | | | | | | 0.7 | |
| I | 456 | E | | | | | | | | | | 0.9 | |
| I | 458 | T | | | | | | | | | | 1.0 | |
| N | 461 | G | | | | | | | | | | 1.1 | |
| N | 461 | G | S | 466 | Y | | | | | | | 0.9 | 0.7 |
| I | 468 | L | | | | | | | | | | 0.4 | |
| M | 471 | L | | | | | | | | | | 0.7 | |
| I | 475 | V | | | | | | | | | | 1.0 | |
| T | 476 | L | | | | | | | | | | 0.5 | |
| V | 477 | L | | | | | | | | | | 0.6 | |

TABLE 12

Fold-change in activity over parental enzyme for point mutants of MbUGT1-2 (1-2' glycosylating activity).

| Wild-type residue | Position | Mutation | Insertion | Wild-type residue | Position | Mutation | Fold increase steviolbioside | Fold increase RebD |
|---|---|---|---|---|---|---|---|---|
| S | 14 | W | | | | | 1.8 | 2.4 |
| S | 14 | Y | | | | | 1.7 | 2.3 |
| V | 89 | A | | | | | | |
| G | 185 | A | | | | | 1.1 | 0.6 |
| V | 365 | I | | | | | 1.4 | 1.9 |
| E | 366 | P | | | | | 2.0 | 3.0 |
| V | 395 | Y | | F | 396 | T | 0.1 | 0.2 |
| G | 417 | T | | | | | 0.0 | 0.0 |
| H | 420 | E | | | | | 1.5 | 1.8 |
| M | 421 | F | | | | | 1.2 | 1.7 |
| M | 421 | I | | | | | 0.3 | 0.3 |
| M | 421 | A | | | | | 0.7 | 0.4 |
| S | 424 | D | | | | | 1.6 | 2.1 |
| S | 424 | Y | | | | | 0.8 | 0.4 |
| | | | GPS between 425 and 426 | | | | 0.9 | 1.5 |
| D | 427 | E | | | | | 1.2 | 1.5 |
| D | 427 | S | | | | | 1.1 | 1.0 |
| D | 427 | W | | | | | | |
| R | 428 | E | | | | | 1.4 | 1.9 |
| R | 428 | H | | | | | 1.0 | 1.1 |
| R | 428 | W | | | | | 0.8 | 0.5 |
| E | 431 | A | | | | | | |
| E | 431 | Y | | | | | 1.5 | 1.7 |
| R | 432 | H | | | | | 1.8 | 2.7 |

TABLE 12-continued

Fold-change in activity over parental enzyme for point mutants of MbUGT1-2 (1-2' glycosylating activity).

| Wild-type residue | Position | Mutation | Insertion | Wild-type residue | Position | Mutation | Fold increase steviolbioside | Fold increase RebD |
|---|---|---|---|---|---|---|---|---|
| R | 432 | W | | | | | 1.7 | 2.7 |
| K | 463 | D | | | | | 1.3 | 1.4 |
| K | 463 | E | | | | | 1.4 | 2.0 |

TABLE 13

Fold-change in activity over parental enzyme for point mutants of SrUGT76G1 (1-3' glycosylating activity).

| WT | Pos. | Mut. | Insert. | Delet. | WT | Pos. | Mut. | Delet. | WT | Pos. | Mut. | Delet. | WT | Pos. | Mut. | Fold increase RebA | Fold increase RebM |
|---|---|---|---|---|---|---|---|---|---|---|---|---|---|---|---|---|---|
| F | 22 | V | | | | | | | | | | | | | | 0.3 | 0.1 |
| S | 77 | A | | | | | | | | | | | | | | 1.4 | 1.5 |
| N | 78 | A | | | | | | | | | | | | | | 1.1 | 1.2 |
| T | 81 | A | | | | | | | | | | | | | | 1.0 | 1.3 |
| H | 82 | A | | | | | | | | | | | | | | 1.4 | 0.7 |
| G | 87 | V | | | | | | | | | | | | | | 0.0 | 0.1 |
| | | | | G87-P91 | | | | | | | | | | | | 0.1 | 1.0 |
| I | 90 | V | | | | | | | | | | | | | | 1.1 | 0.4 |
| P | 91 | A | | | | | | | | | | | | | | 0.6 | 0.5 |
| I | 93 | V | | | | | | | | | | | | | | 1.0 | 0.3 |
| N | 94 | G | | | | | | | | | | | | | | 1.3 | 0.5 |
| L | 126 | G | | | | | | | | | | | | | | 0.5 | 0.4 |
| W | 127 | F | | | | | | | | | | | | | | 0.9 | 0.2 |
| M | 145 | V | | | | | | | | | | | | | | 0.5 | 0.4 |
| S | 147 | G | | | | | | | | | | | | | | 1.2 | 0.4 |
| N | 151 | A | | | | | | | | | | | | | | 0.7 | 0.4 |
| H | 155 | A | | | | | | | | | | | | | | 0.7 | 0.3 |
| Y | 155 | Y | | | | | | | | | | | | | | 1.4 | 0.2 |
| S | 192 | A | | | | | | | | | | | | | | 1.0 | 1.1 |
| Y | 194 | G | | | | | | | | | | | | | | 0.8 | 0.1 |
| | | | G between 194 and 195 | | | | | | | | | | | | | 2.4 | 1.1 |
| W | 197 | P | | | | | | | | | | | | | | 1.7 | 0.7 |
| I | 199 | A | | | | | | | | | | | | | | 0.9 | 0.1 |
| L | 200 | A | | | T | 284 | A | | | | | | | | | 8.2 | 8.6 |
| L | 200 | A | | | L | 379 | G | | T | 284 | A | | S | 192 | A | 7.0 | 9.0 |
| L | 200 | A | | | L | 379 | G | | T | 284 | A | | | | | 9.4 | 9.2 |
| L | 200 | A | | | L | 379 | G | | | | | G87-P91 | | | | 0.5 | |
| L | 200 | A | | | L | 379 | G | | | | | | | | | 3.1 | 1.8 |
| L | 200 | A | | | | | | | | | | | | | | 8.0 | 17.0 |
| L | 200 | G | | | | | | | | | | | | | | 6.7 | 3.9 |
| L | 200 | V | | | | | | | | | | | | | | 1.1 | 0.1 |
| L | 200 | A | | | | | | G87-P91 | | | | | | | | 1.6 | 1.6 |
| E | 202 | D | | | | | | | | | | | | | | 1.2 | 0.1 |
| I | 203 | A | | | | | | | | | | | | | | 1.2 | 0.2 |
| L | 204 | A | | | | | | | | | | | | | | 0.6 | 0.2 |
| G | 205 | R | | | K | 206 | A | | K | 209 | E | | | | | 0.8 | 0.1 |
| G | 205 | A | | | | | | | | | | | | | | 1.4 | 0.4 |
| M | 207 | A | | | | | | | | | | | | | | 0.8 | 0.6 |
| T | 284 | A | | | | | | | | | | | | | | 1.0 | 1.5 |
| T | 284 | V | | | | | | | | | | | | | | 1.6 | 0.3 |
| L | 379 | G | | | T | 284 | A | | | | | | | | | 1.1 | 1.5 |
| L | 379 | G | | | | | | | | | | | | | | 0.6 | 2.0 |
| L | 379 | A | | | | | | | | | | | | | | 1.9 | 1.4 |
| L | 397 | V | | | | | | | | | | | | | | 2.1 | 0.9 |

The invention claimed is:

1. A method for making rebaudioside M comprising: culturing a host cell in the presence of rebaudioside D, the host cell expressing a uridine diphosphate-dependent glycosyltransferase (UGT) enzyme comprising an amino acid sequence that has at least 90% sequence identity to SEQ ID NO: 3 and has a L200A or L200G substitution with respect to SEQ ID NO: 3.

2. The method of claim 1, wherein the UGT enzyme comprises an amino acid sequence having at least 95% sequence identity to SEQ ID NO: 3.

3. The method of claim 1, wherein the UGT enzyme comprises an amino acid having at least 97% sequence identity to SEQ ID NO: 3.

4. The method of claim 1, wherein the UGT enzyme comprises an amino acid sequence having at least 98% sequence identity to SEQ ID NO: 3.

5. The method of claim 1, wherein the UGT enzyme comprises an amino acid sequence having at least 99% sequence identity to SEQ ID NO: 3.

6. The method of claim 1, wherein the UGT enzyme further comprises T284A substitution with respect to SEQ ID NO: 3.

7. The method of claim 1, wherein the host cell further expresses a UT enzyme comprising an amino acid sequence having at least 90% sequence identity to an amino acid sequence selected from: SEQ ID NO: 7, SEQ ID NO: 5, SEQ ID NO: 4, SEQ ID NO: 6, and SEQ ID NO: 45.

8. The method of claim 7, wherein the host cell further expresses a UGT enzyme comprising an amino acid sequence having at least 90% sequence identity to SEQ ID NO: 1, and a UGT enzyme comprising an amino acid sequence having at least 90% sequence identity to SEQ ID NO: 2.

9. The method of claim 1, wherein the host cell is prokaryotic.

10. The method of claim 9, wherein the host cell is a bacterial cell selected from *E. coli, Bacillus subtillus*, or *Pseudomonas putida*.

11. The method of claim 1, wherein the host cell is *Saccharomyces cerevisiae, Pichia pastoris*, or *Yarrowia lipolytica*.

12. The method of claim 1, wherein the host cell further comprises one or more genetic modifications increasing the availability of UDP-glucose.

13. The method of claim 1, wherein the UGT enzyme further comprises one or more amino acid modifications with respect to SEQ ID NO: 3 selected from: S77A, N78A, T81A, insertion of G after amino acid 194, T284A, and L379A.

14. A method for making rebaudioside M comprising: culturing a host cell in the presence of rebaudioside D, the host cell expressing a uridine diphosphate-dependent glycosyltransferase (UGT) enzyme comprising an amino acid sequence that has at least 90% sequence identity to SEO ID NO: 3 and has one or more amino acid modifications with respect to SEO ID NO: 3 selected from: S77A, N78A, T81A, insertion of G after amino acid 194, L200A, L200G, T284A, and L379A, wherein the UGT enzyme comprises an Ala inserted or substituted at position 2, with respect to SEQ ID NO: 3.

15. A method for making rebaudioside M comprising: culturing a host cell in the presence of rebaudioside D, the host cell expressing a uridine diphosphate-dependent glycosyltransferase (UGT) enzyme comprising an amino acid sequence that has at least 90% sequence identity to SEO ID NO: 3 and has one or more amino acid modifications with respect to SEO ID NO: 3 selected from: S77A, N78A, T81A, insertion of G after amino acid 194, L200A, L200G, T284A, and L379A, wherein the host cell further comprises one or more genetic modifications increasing the availability of UDP-glycose, wherein the host cell is *E. coli* comprising one or more genetic modifications selected from ΔgalE, ΔgalT, ΔgalK, ΔgalM, ΔushA, Δagp, Δpgm, duplication of *E. coli* GALU, and expression of *Bacillus substillus* UGPA, BaSP.

* * * * *